United States Patent [19]

Soderberg et al.

[11] Patent Number: 4,623,987

[45] Date of Patent: Nov. 18, 1986

[54] POSTAGE METER WITH KEYBOARD KEYS FOR COMMANDING AND REQUESTING PERFORMANCE OF METER OPERATIONS

[75] Inventors: John H. Soderberg, Stratford; Howell A. Jones, Southport; Alton B. Eckert, Norwalk; Edward C. Duwel, Trumbull, all of Conn.; Easwaran C. N. Nambudiri, Hicksville, N.Y.

[73] Assignee: Pitney Bowes Inc., Stamford, Conn.

[21] Appl. No.: 447,901

[22] Filed: Dec. 8, 1982

[51] Int. Cl.[4] .............................................. G06F 15/20

[52] U.S. Cl. ..................................... 364/900; 364/464

[58] Field of Search ... 364/200 MS File, 900 MS File, 364/464, 466

[56] References Cited

U.S. PATENT DOCUMENTS

| | | | |
|---|---|---|---|
| 4,301,507 | 11/1981 | Soderberg et al. | 364/900 X |
| 4,347,506 | 8/1982 | Duwel et al. | 364/900 X |
| 4,484,307 | 11/1984 | Quatse et al. | 364/900 |
| 4,506,344 | 3/1985 | Hubbard | 364/900 |
| 4,525,785 | 6/1985 | Soderberg et al. | 364/900 X |

*Primary Examiner*—Thomas M. Heckler

*Attorney, Agent, or Firm*—Donald P. Walker; William D. Soltow, Jr.; Albert W. Scribner

[57] ABSTRACT

A postage meter, adapted to be connected to a source of supply of power for energization, is provided. The postage meter includes improved structure for entering data. The data entering structure includes a keyboard having a plurality of numeric keys, a postage setting key, at least one special purpose key and a plurality of display keys. In addition, the postage meter includes devices for displaying numerical values and other data, for selecting one of a plurality of dates, and for printing postage values and the selected date. Further, the postage meter includes a computer which is electrically connected to each of the aforesaid entering and displaying and printing devices and is programmed for processing data for controlling the operation of the same. Preferably the computer is also programmed for storing data and for performing calculations utilizing the stored data, for causing the displaying device to display respective numerical values in response to the depression of selected numeric keys, and for causing the displaying device to display the other data in response to the depression of selected keys. Preferably the postage meter features one or more additional methods or apparatus, including those for changing a postage unused amount stored in the postage meter, for causing various meter operations to be performed, for changing various operating constants, for displaying predetermined data pertaining to meter operations or for reminding the operator to check the date of the date setting device.

100 Claims, 11 Drawing Figures

OPTO
SERIAL I/O CHANNEL
90
SYSTEM CLOCK
92
V2
V5
POWER ON RESET
72
V2
V1
LOW VOLTAGE SENSE
88
NVM READY
CPU WAIT
TP
CPU
10a
ADDRESS BUS
94
DATA BUS
108
CONTROL BUS
96
DEVICE SELECT
98
16a
RAM I/O TIMER
TP
SELECT LINES
99
NVM V5 SW
V5
82
76
SWITCH
AC LINE
HOT SW MDV
50
FUSE
58
TRANSFORMER
56
REG.
70
REG.
74
OPTO
TRIAC
54
60
COLD SWITCH
62
SWITCHER
66
V2 FILTER
AC DRIVE MOTOR
36a
48
V2 DISPLAY
V2 LOGIC
RFI FILTER
52
PREREGULATOR
59
V5

POSTAGE METER WITH KEYBOARD KEYS FOR COMMANDING AND REQUESTING PERFORMANCE OF METER OPERATIONS

BACKGROUND OF INVENTION

This application is related to U.S. application Ser. No. 447,815 of D. P. Baun et al., for "Stand-Alone Electronic Mailing Machine", now U.S. Pat. No. 4,579,054, and to U.S. application Ser. No. 447,913 of A. B. Eckert, Jr. et. al., for "Initializing The Print Wheels In An Electronic Postage Meter", abandoned; both of which applications were filed concurrently herewith, are assigned to the assignee of the present invention and are hereby specifically incorporated herein by reference. In addition, this application is related to five additional concurrently filed co-pending patent applications, each of which is assigned to the assignee of the present invention, i.e., U.S. patent application Ser. Nos: 447,861, for POSTAGE METER WITH KEYBOARD KEYS FOR CAUSING METER OPERATIONS TO BE PERFORMED, now U.S. Pat. No. 4,577,283; 447,870, for POSTAGE METER WITH KEYBOARD KEYS USED FOR CHANGING POSTAGE UNUSED AMOUNTS, now U.S. Pat. No. 4,535,407; 447,905, for POSTAGE METER WITH KEYBOARD KEYS USED FOR CHANGING OPERATING CONSTANTS, now U.S. Pat. No. 4,509,141; 447,914, for POSTAGE METER WITH DATE CHECK REMINDER MEANS; and 447,919, for POSTAGE METER WITH KEYBOARD KEYS FOR CAUSING DISPLAY OF DATA PERTAINING TO METER OPERATIONS.

Currently available electronic postal meters of, for example, the type disclosed in U.S. Pat. No. 4,301,507 for an Electronic Postage Meter Having Plural Computing Systems, issued Nov. 17, 1981 to J. H. Soderberg et al., and assigned to the assignee of the present invention, are generally provided with a keyboard for entering numerical postal values that are to be printed, a display for visually indicating the entered postage and other values, a printing mechanism and a micro-computer including accounting means and means for controlling the various functions of the postal meter.

In the aforesaid U.S. Pat. No. 4,301,507 the various components of the postal meter are compartmented according to their functions to form three units, referred to as the control, accounting and printing units. Each of the units incorporates a dedicated microprocessor having a separately controlled clock and programs. And, two-way communications are conducted via serial channels between the units, and via serial channels between the postage meter and any external apparatus connected to the meter, in the form of serially transmitted single byte "header" only messages, consisting of ten bits including a start bit followed by an 8 bit byte which is in turn followed by a stop bit, or in the form of a multi-byte message consisting of a header and one or more additional bytes of information. All transmitted messages are followed by a no error pulse if the echoplex message was received error free. In practice, each of the units is capable of processing data independently and asynchronously of the other. Further, to allow for compatibility between the postal meter and any external apparatus, all operational data transmitted to, from and between each of the three units and all stored operator information is accessible via the postal meter interface, as a result of which the external apparatus (if any) may be adapted to have complete control of the postal meter as well as access to all current operational information in the postal meter. In addition, the flow of messages to, from and between the three internal units is in a predetermined, hierarchical direction. For example, any command message from the control unit is communicated to the accounting unit, where it is processed either for local action in the accounting unit and/or for a command message in the printing unit. On the other hand, any message from the printing unit is communicated to the accounting unit, where it is either used for internal information or merged with additional data and communicated to the control unit. And, any message from the accounting unit is initially directed to the printing unit or to the control unit.

Some commercially available postal meters which utilize the aforesaid communication system have been provided with a mechanically operable field service switch which is operable to indicate to the meter that a service mode of operation of the meter is in effect in which various messages are given an alternate interpretation, for example, commanding or requesting the postal meter to display selected values stored in the postal meter. In this connection reference is made to U.S. Pat. No. 4,280,180 for an Electronic Postage Meter Having Field Resettable Control Values, issued to A. B. Eckert et al. and assigned to the assignee of the present invention. In U.S. Pat. No. 4,280,180, a second, key controlled, three-position, mechanical switch, is also provided, to permit an authorized user to initiate a series of routines allowing the user to recharge the postal meter with a predetermined amount of additional postage.

To that end, the positions of the three position switch are identified as the "operate", "enter amount" and "enter combination" positions. By positioning the three-position switch in either the "enter combination" or "enter amount" positions the operator may enter the combination or amount respectively into the meter via the keyboard. In each instance the entry results in providing an indication on the display of the entered amount or combination, as the case may be. Leaving each position generates a message causing the displayed value to be entered into the accounting unit and blanking the display for the next entry. Return of the three-position switch to the operate position in either instance causes the accounting unit to complete the recharging routine and return the meter to normal usage with the amount added to the postage unused register. In practise, the combination for this feature is obtained by calling a Data Center having information relevant to remotely enabling the resetting of the postal meter/-mailing machine for which the value is being modified, such as the Data Center of Pitney Bowes Inc. To obtain the combination the operator identifies the meter by serial number, and provides the Data Center with the code which is generated and displayed to the operator upon initially moving the key from the operate position, and also provides the value of the postage which the operator is desirous of adding to the postage unused register. Whereupon the Data Center provides the operator with a unique combination for use with the enter combination key, which combination is a random or pseudorandom number which changes with each resetting of the postage used register for security reasons.

Aside from the aforesaid usage, the three position switch is disclosed in U.S. Pat. No. 4,280,180 as being operable in combination with the service switch for changing certain other values stored in the meter, including a settable limit value, consisting of a predetermined maximum postage value which will not be printed if equaled or exceeded, a low postage warning value, consisting of a predetermined value which causes the postal meter to provide a visual indicator informing the user that the postal meter should be recharged, and a dollar unlock value, consisting of a predetermined postal value which will not be printed at any one time unless something is additionally done by the operator after the select postage key is initially actuated.

An object of the present invention is to provide a simply constructed, non-compartmentalized postal meter/mailing machine which includes a modified version of the aforesaid prior art communication system;

Another object is to provide a simply constructed non-compartmentalized, stand-alone, mailing machine which includes an electronically controlled postal meter incorporating a modified version of the aforesaid prior art communication system, and which includes improved means for servicing the mailing machine;

Another object is to provide an electronically controlled postal meter/mailing machine, having a keyboard, with means for entering and modifying various values in the same, including the serial number of the meter/machine via the keyboard; and A further object is to provide an electronically controlled postal meter/mailing machine including a communication system having a single micro-computer which is programmed so as to retain the hierarchical communication and serial message transmission features of the aforesaid prior art communication system for implementing the control, accounting and printing functions of the postal meter/mailing machine, and which includes improved means for informing the user that the date should be checked, invoking various routines for displaying information stored in the postal meter and changing selected values stored in the postal meter.

SUMMARY OF THE INVENTION

A postage meter, which is adapted to be connected to a source of supply of power for energization thereof, comprises means for entering data, said data entering means including a keyboard, said keyboard including a plurality of numeric keys and a postage setting key, said keyboard including at least one special purpose key and a plurality of display keys, means for displaying numerical values and other data, means for selecting one of a plurality of dates, means for printing postage values and the selected date, computer means electrically connected to each of the aforesaid entering and displaying and printing means and programmed for processing data for controlling the operation thereof, said computer means is programmed for storing data and for performing calculations utilizing stored data, said computer means programmed for causing said displaying means to display respective numerical values in response to the depression of selected numeric keys, and said computer means programmed for causing said displaying means to display said other data in response to the depression of selected keys. The postage meter preferably includes one or more specialized methods and apparatus; including methods and apparatus for changing a postage unused amount stored in the meter, for causing various meter operations to be performed, for changing various operating constants, for displaying predetermined data pertaining to meter operations or for reminding the operator to check the date of the date setting means.

BRIEF DESCRIPTION OF THE DRAWINGS

As shown in the drawings wherein like reference numerals designate like or corresponding parts throughout the several views.

DESCRIPTION OF THE PREFERRED EMBODIMENTS

Figure 1:
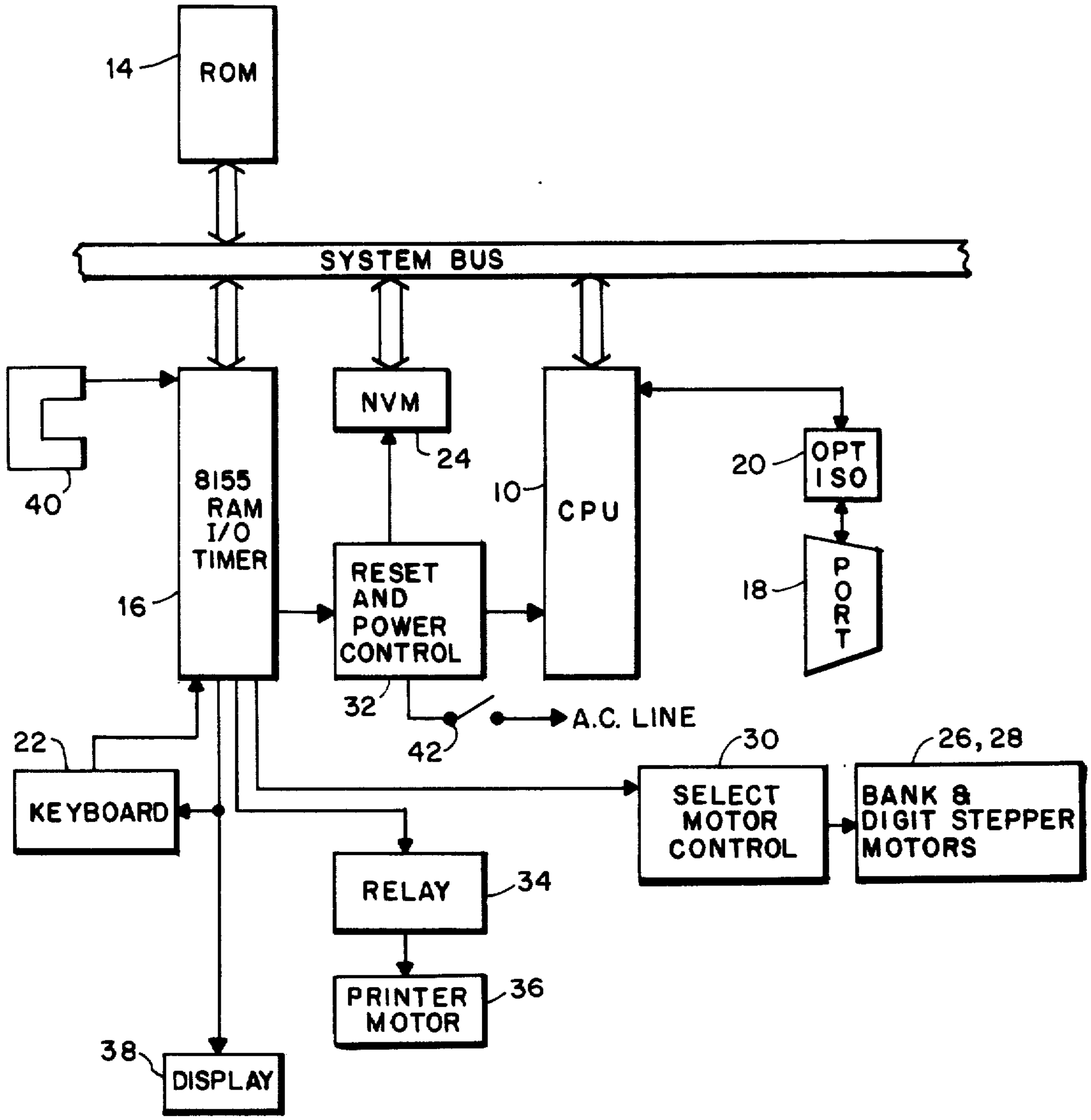
FIG. 1 is a block diagram of the electronic circuits of an electronic postage meter.

The electronic postal meter 130 (FIG. 3) includes an 8-bit microprocessor 10 (FIG. 1) (CPU), such as an Intel Model 8085A microprocessor which is connected to various electronically operable components through a system bus 12, including a ROM 14. The ROM 14, which is provided for storing the programs for controlling the postal meter, includes permanently programmed as well as reprogrammable devices. An integrated circuit 16, such as an Intel Model 8155, is connected to the system bus 12 and includes a RAM, input and output (I/O) lines and a timer. The RAM portion of the integrated circuit 16 has memory allocated for transient storage of the data for the ascending register and descending register. An external data communication port 18 which is connected to the microprocessor 10 through an optical isolator 20, allows for the connection to the postal meter of devices such as an electronic scale, external computer various types of servicing equipment and the like. Also electrically connected to the microprocessor 10 through the system bus 12 is the keyboard 22 of the postal meter and a non-volatile memory (NVM) 24. The bank and digit stepper motors 26, 28 of the postal meter are in electrical connection with the microprocessor 10 via a motor driver 30 and the integrated circuit 16. A reset and power control 32 is electrically connected between the integrated circuit 16, the NVM 24 and the microprocessor 10. A relay 34 connects the AC printer motor 36 to the integrated circuit 16. A display 38 is also electrically connected to the integrated circuit 16. Preferably the display 38 includes a plurality of, and preferably ten or less, seven segment (with decimal) digit display sections. And, for the purpose of this disclosure each decimal shall be considered to be a segment. And, a trip photosensor 40, which is connected to the microprocessor 10 through the integrated circuit 16, is provided for indicating the presence of an envelope to be imprinted, as described more fully in the aforementioned patent application entitled "Stand-Alone Electronic Mailing Machine".

The electronic postage meter is controlled by the microprocessor 10 operating under control of the programs stored in the ROM 14. The microprocessor 10 accepts information entered via the keyboard 22 or via the external communication port 18 from external message generators. Critical accounting data and other important information is stored in the non-volatile memory 24. The non-volatile memory 24, which may be an MNOS semiconductor type memory, a battery augmented CMOS memory, core memory, or other suitable non-volatile memory component, stores critical postal meter data during periods when power is not applied to the postal meter. This data includes, in addition to the serial number of the mailing machine or postal meter, information as to the value in the descending register (the amount of postage available for printing), the value in the ascending register (the total amount of postage printed by the meter), and the value in the piece count register (the total number of cycles the meter has performed), as well as other types of data, such as trip status, initialization and service information, which are desired to be retained in the memory even though no power is applied to the postal meter.

When an on/off power switch 42 is turned on (closed) a power supply internal to the mailing machine energizes the microprocessor 10 and the balance of the electronic components. Whereupon information stored in the non-volatile memory 24 is copied into the RAM by the microprocessor 10. Accordingly, after power up the RAM contains an image or copy of the information which was stored only in the non-volatile memory 24 prior to energization. During operation of the postal meter, certain portions of the data in the RAM are ordinarily modified. For example, whenever postage is printed, the value stored in descending register will be reduced by the value of the printed postage, the value in the ascending register will be increased by the value of the printed postage and the value stored in the piece counter register will be incremented. When the power switch 42 is turned off (opened), the updated data reflecting such changed values in the RAM is transferred via the microprocessor 10 back into a suitably prepared area of the non-volatile memory 24. A like transfer of information between the non-volatile memory 24 and the RAM takes place during power failure.

Figure 2A:
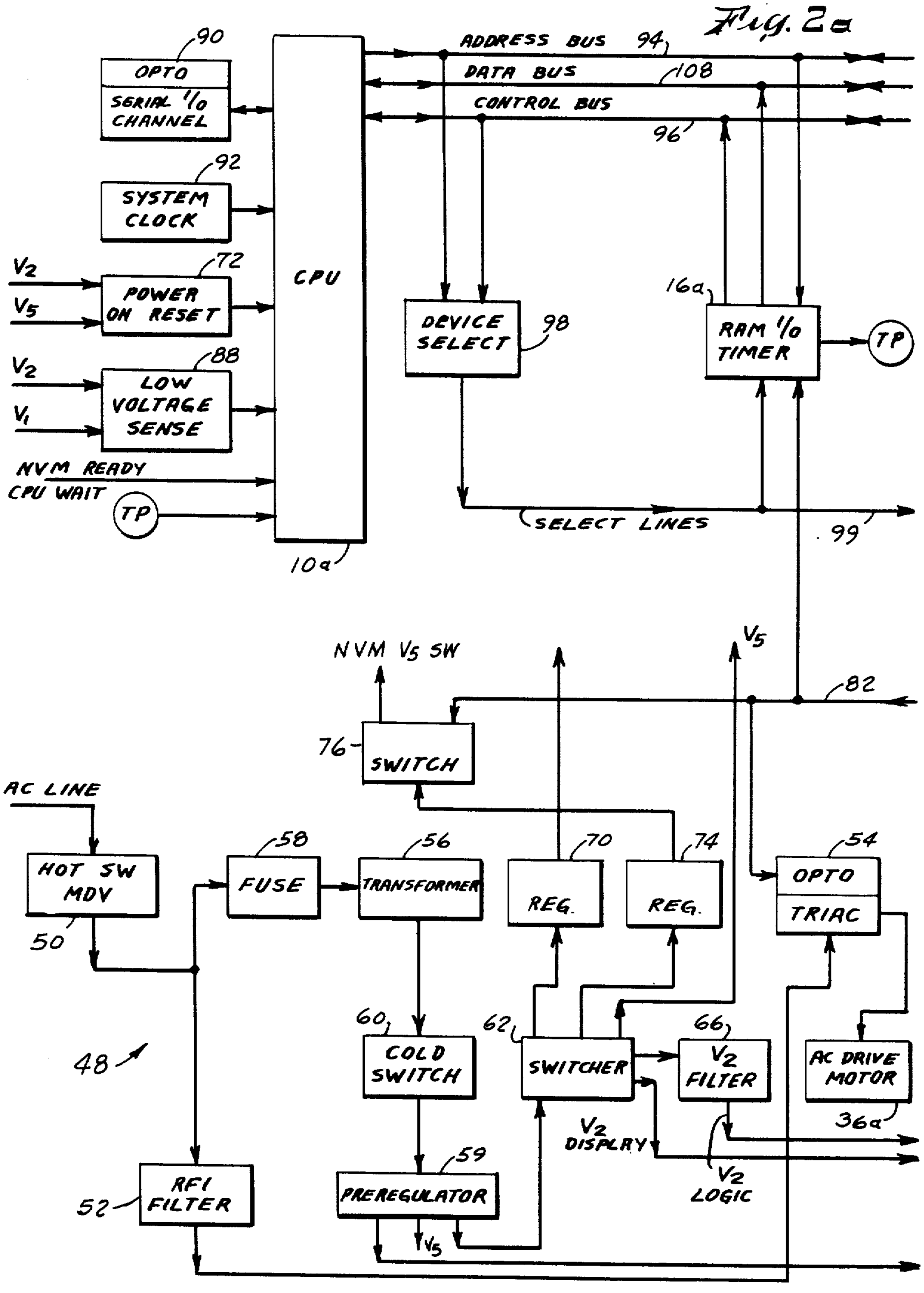
FIG. 2, which consists of FIGS. 2*a* and 2*b*, is a detailed block diagram of the electronic circuits of the electronic postage meter.
Figure 2B:
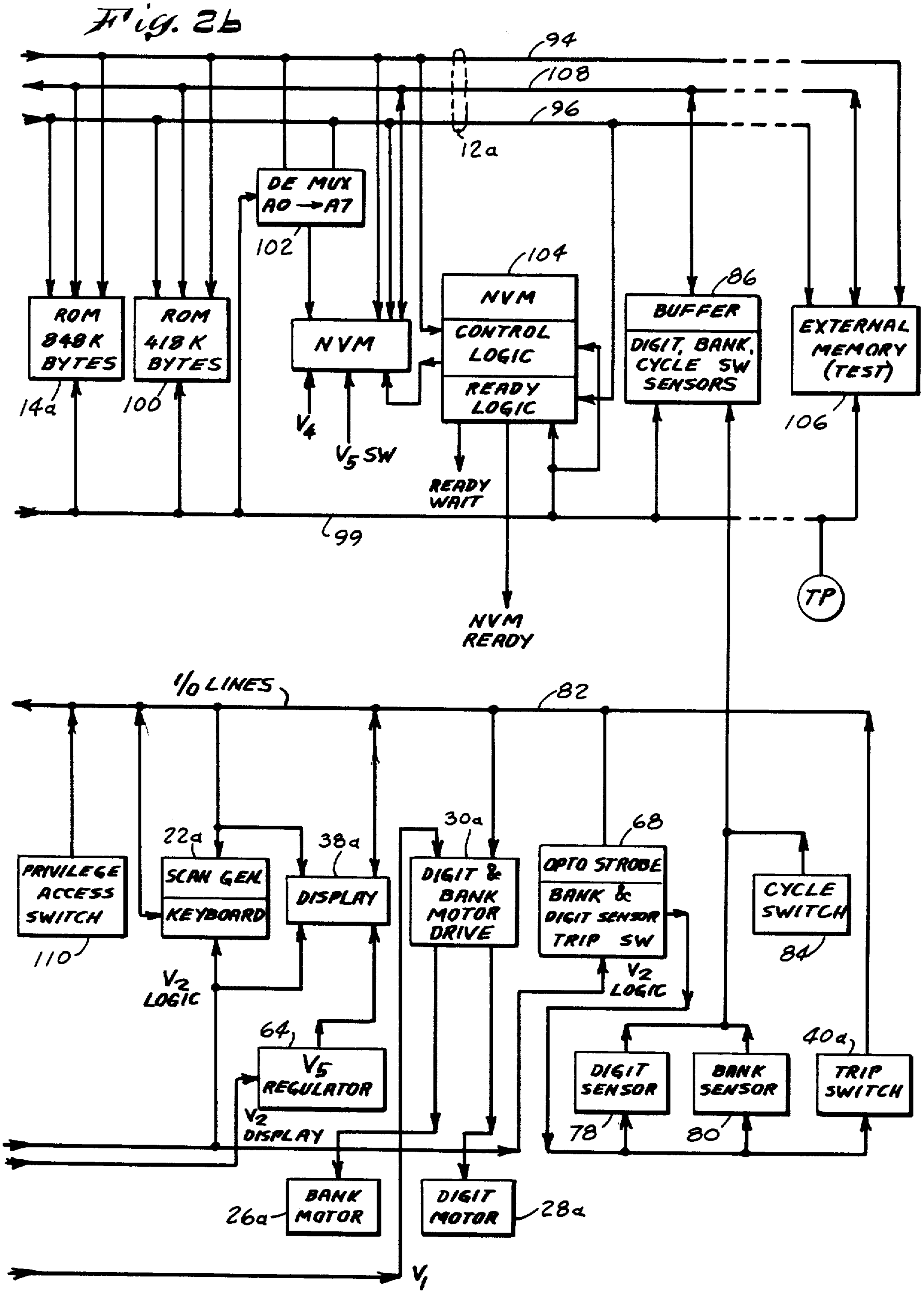

Referring to FIG. 2, a more detailed block diagram of the arrangement of the electrical components of the postage meter is illustrated generally as 48. Power is supplied to the postage meter from the AC line voltage, typically 115 volts. This line voltage is applied to the meter through a hot switch 50 which cuts off power to the postage meter to protect the electrical components thereof if the temperature rises about a preset limit, nominally 70° C. The hot switch 50 is connected to the AC drive motor 36A through an RF filter 52 and an opto-triac 54 which provides isolation between the line voltage and the control logic for the meter. The hot switch 50 is also suitably connected to a transformer 56 protected by a fuse 58. The output of the transformer 56 is coupled to a pre-regulator 59 through a cold switch 60. The cold switch 60 cuts off power to the pre-regulator 59 if the temperature drops below a preset limit, nominally 0° C. The pre-regulator 59 provides an output voltage of a predetermined range to a switcher 62 which generates the output voltage +5 V; and the voltages for generating −12 V and −30 V.

The +5 V is applied to a +3 volt regulator 64 and then to the display 38A. The +5 V from the switcher 62 is also applied to a +5 V filter 66 which provides +5 V for logic circuits. Specifically, the +5 V is applied to the keyboard 22A, the display board 38A, and bank, digit and trip sensor logic 68 and to the integrated circuits. The −12 V is applied to a −12 V regulator 70 and then to the non-volatile memory 24A.

The −30 V output from the switcher 62 is also applied to a −30 V regulator 74 and then to a −30 V switch 76 which switches its output voltage on and off in response to the requirements of writing in NVM as dictated by a program. The output of the −+V switch is applied to the non-volatile memory 24A. The −30 V supply is connected to the power on reset 72 of the microprocessor 10A.

+5 V from the switcher 62 is also supplied to one input of the power on reset 72; the other input receives −30 V from the regulator 74 as previously described. A low voltage sensor 88 also receives one input of +5 V from the switcher 62 and its other input from the pre-regulator 59 the output of the voltage sensor 88 is applied to the microprocessor 10A. The low voltage sensor 88 detects power failure and communicates this to the microprocessor 10A which in turn addresses the RAM through system bus 12A to transfer all security data present in the RAM to the non-volatile memory 24A.

Another output from the pre-regulator 59 in the from of +24 V is applied to the digit and bank motor drive 30A for the bank motor 26A and digit motor 28A, which respectively select the particular printing wheel (bank) which is to be activated and the particular digit of the selected printing wheel which is to be set.

An output strobe from the integrated circuit 16A is buffered through buffer driver 68 and applied to a digit sensor (encoder) 78, bank sensor (encoder) 80, and trip sensor 40A. The opto strobe applies power to the digit sensor 78, bank sensor 80 and trip sensor 40A when needed. The output from the trip sensor 40A is applied to the input/output lines 82 which are coupled to the integrated circuit 16A. The outputs from the digit sensor 78 and bank sensor 80 and cycle switch 84 are applied to a storage buffer 86.

During power up, the key switch 42 (FIG. 1) is closed, and the AC line voltage energizes the electrical components previously described and an Initialization process will occur. Such initialization may include a hard and/or soft initialization process as disclosed in the aforementioned U.S. Pat. No. 4,301,507. Preferably the initialization process for the mechanical components of the meter/machine is as disclosed in the aforementioned patent application entitled "Initializing The Print Wheels In An Electronic Postage Meter".

In operation, the microprocessor 10A under control of the ROM 14A and possibly the auxiliary ROM 100 communicates over the address bus 94 and control bus 98 with the device select 98. The output of the device select 98 communicates with the particular component to be addressed over select lines 99, including the RAM, the ROM 14A, an auxiliary ROM 100, a demultiplexer 102, NVM logic 104 and the buffer 86. The RAM of integrated circuit 16A provides the working memory for the postage meter and the microprocessor 10A. The ROM 14A stores the program; the auxiliary ROM 100 may be used to provide additional program storage space. The non-volatile memory 24A provides storage of all security information for the meter and retains such information during power down or power failure. The demultiplexer 102 latches the lower eight (8) bits of address information that defines a particular location which is used immediately thereafter. The NVM logic 104 controls the mode of operation of the NVM 24A and also provides ready, wait and NVM ready signals to the microprocessor 10A to indicate the presence of the slow speed device (NVM) as active on the bus 12A.

As previously mentioned, the digital sensor 78 (optical encoder) and bank sensor 80 (optical encoder) and cycle switch 84 whose current state is read, i.e., "Home" or "In Cycle", apply input signals to the buffer 86 which sends output signals over data bus 108 to the microprocessor 10A for storage in the proper RAM location.

The RAM is also electrically coupled to the I/O lines to transmit receive data from the trip sensor 40A, the display 38A, keyboard 22A, and, if present, a privileged access switch 110 which is kept under seal. The switch 110 is provided for use in applications which require manual resetting of meter postage by authorized personnel of, for example, the Postal Service.

Figure 3:
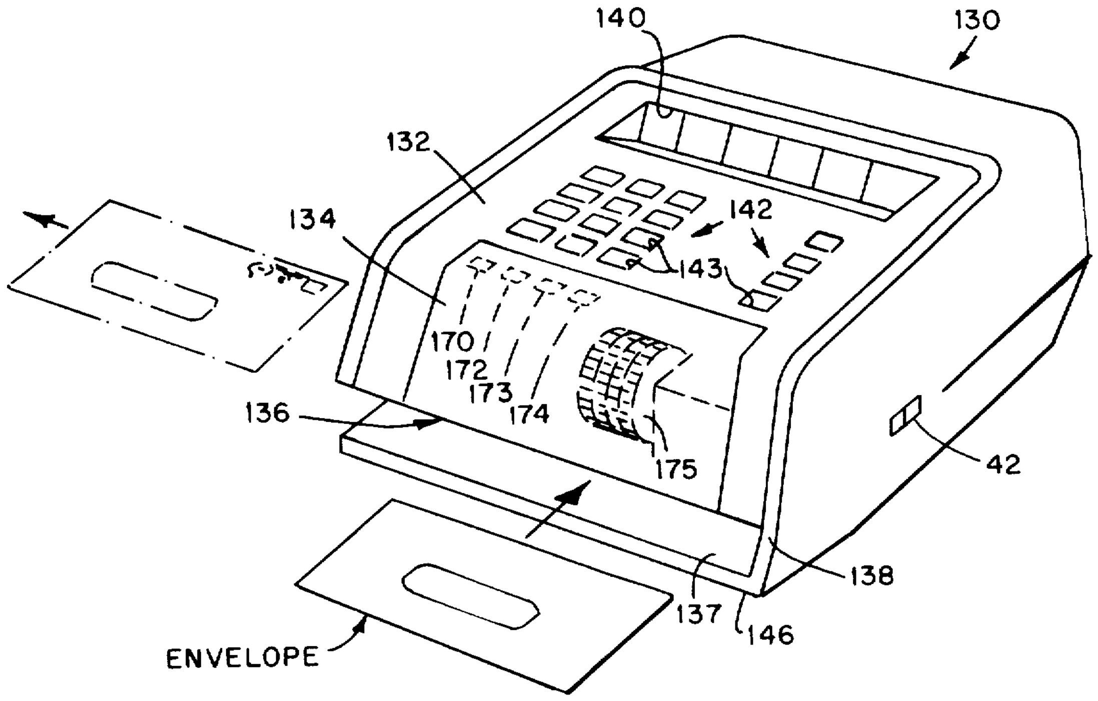
FIG. 3 is a front perspective view of a mailing machine, including a postal meter, which incorporates the features of the present invention.
Figure 4:
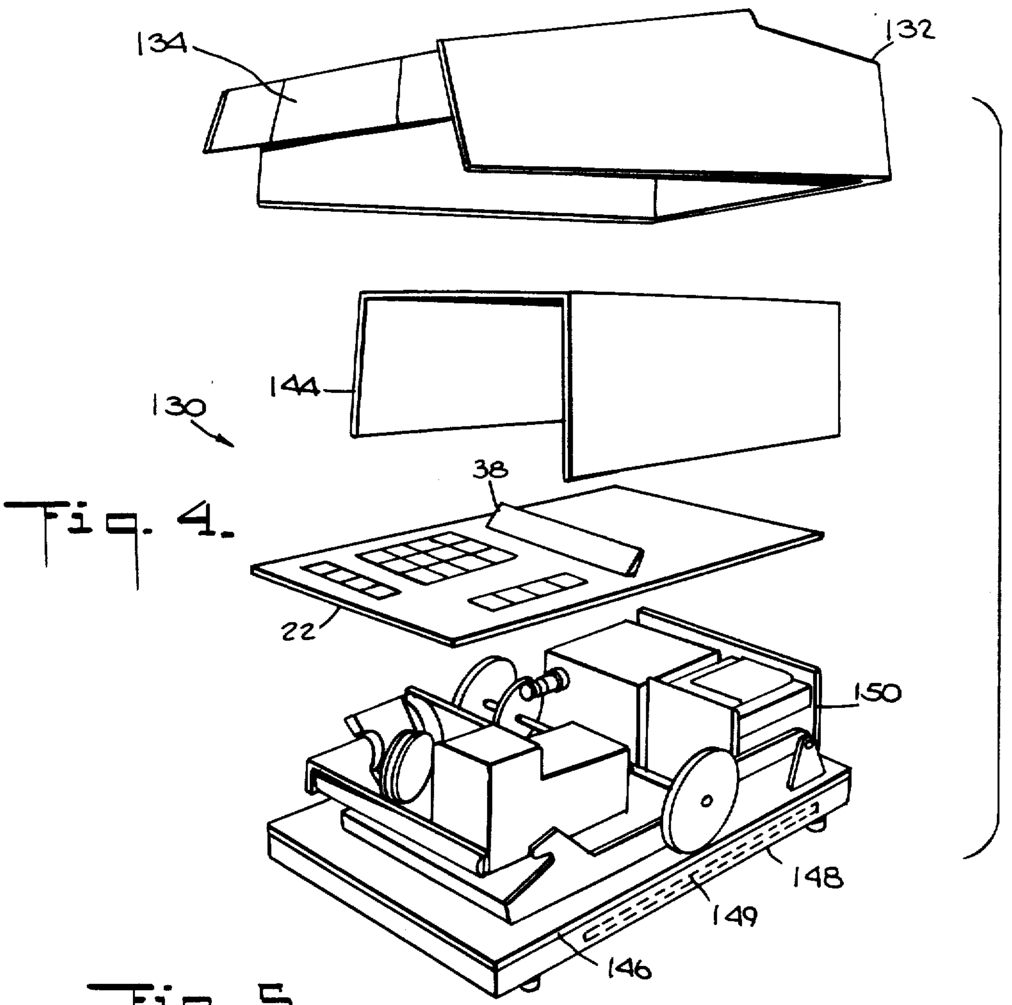
FIG. 4 is an exploded view of the mailing machine of FIG. 3.

As shown in FIG. 3, a mailing machine 130 adapted to house the aforesaid electronic postal meter includes a cover 132 having a hinged lid 134, and a slot 136 therein with a closed end 138 at the right hand side thereof. A portion of the slot 136 forms a deck 137 on which an envelope is placed when inserted into the slot 136 for printing postage thereon. At the top of the cover 132 is an opening 140, and a control panel 142 having a plurality of openings 143 formed therein. The cover 132 (FIG. 4) has nested therein an electromagnetic insulating shield 144. The cover 132 and shield 144 are attached to a base 146; the cover 132 and base 146 together forming a housing. Depending from the base 146 is a plan 148 that contains a logic board 149. A power supply board 150 is mounted on the base 146. The display 38 and the keyboard 22 are conventionally supported within the housing, with the display 38 aligned with the opening 140 in the cover 132. The keyboard 22 (FIG. 5), which serves as an information inputting and information retrieval device, has a plurality of keys which extend through the openings 143 of the control panel 142 for access by the operator. Such keys include the numeric setting keys 156 numbered 0–9, a clear key 159, a decimal key 160, a postage used key 162, a postage unused key 164, a piece count key 166 and a select postage key 168. In addition, towards the front of the mailing machine 130 (FIG. 3), located under the lid 134, are a plurality of special purpose keys of the keyboard 22. Such keys including an access code key 170, an enter amount key 172, an enter combination key 173 and a date key 174. Also located under the lid 134 are a plurality of thumbwheels 175 which are mechanically connected to the date printing mechanism for adjustment thereof as described more fully in the aforementioned application entitled "Stand-Alone Electronic Mailing Machine". Preferably the keys of the keyboard 22 are membrane switches.

In general, the electronic communication system of the postal meter is in many respects the same as the system disclosed in the aforesaid U.S. Pat. No. 4,301,507. In this connection it is noted that the software architecture of the communication system disclosed in U.S. Pat. No. 4,301,507 services three separately compartmented units of electronic structure, referred to as the control unit, accounting unit and printing unit. Each of such units includes a dedicated central processing unit connected by way of conventional data lines, control lines and address lines to, in the case of the control unit, a multipurpose conventional RAM/ROM/I/O timer circuit incorporating timing control elements and input/output interface hardware, in the case of the accounting unit, a conventional EAROM and a plurality of PROMs incorporating timing control elements and input/output interface hardware, and, in the case of the printing unit, conventional buffers, timing control elements and input/output interface hardware. And, communications between the three units are conducted via serial channels connected between the respective microprocessors of the control, accounting and printing units.

In the postal meter/mailing machine disclosed herein the functionally comparable units of electronic structure, although not compartmented from each other are treated and function as separate and independent structures. And, although a single microprocessor 10 is used, the ROM 14 is organized for storing three substantially independently functioning sets of routines, one for each of the control, accounting and printing functions. Further, although the serial channel communication lines between the compartmented units of the prior art have been eliminated, the RAM of the integrated circuit 16 includes dedicated control, accounting and printing registers for communication between the three functional modules, and includes dedicated buffers for communications with external devices. Accordingly, information is communicated in message form between the three functional modules and between the mailing machine 130 and any external device connected to the external ports 18. Aside from the foregoing, since the three crystal controlled clocks used in the compartmented units of the prior art communication system have been replaced in the present communication system with a single crystal controlled clock, the three functional modules of the present communications system are no longer internally asynchronously operable. Rather the control, accounting and printing routines are independently selected under the control of a single idle loop program stored in the ROM 14. On the other hand, as in the prior art communication system processing precedence is given to messages and requests received from external devices, over those that are internally generated for processing. Thus, as in the prior art, the external device may, as a general rule, take control of the operation of the postal meter/mailing machine. In addition, as a general rule, once the processing of a message has been commenced, such processing will proceed to completion. For example, when printing cycle has been commenced, by tripping the postal meter/mailing machine, nothing is permitted to interrupt the completion of the postage printing cycle and processing the postage value associated therewith under the control of the selected accounting routines.

In addition to the above referred to circuits of the control structure, the control structure includes the circuits of the integrated circuit 16. The control routines utilize two buffers in the RAM, one in which messages corresponding to the digits of the display are built and stored, and the other in which a bit for bit copy or image of displayed digits is stored. As information is entered into the keyboard 22 by depressing one or more keys, a copy of such information in numerical message format is built in the display buffer and transferred in bit format to the image buffer for driving the display. When the postal meter responds to any message from the keyboard 22, the response is communicated to the external device from the transmit buffer. And, with the exception of status responses any message stored in the transmit buffer is copied from the transmit buffer into the display buffer. On the other hand, when the postal meter responds to messages from the external device the responses are only communicated to the external device. Such messages are not displayed, with the exception of postal value messages which are copied into the display buffer as well as being communicated to the external device. Thus the display is mainly used for displaying responses to entries from the keyboard 22. And the keyboard 22 is utilized for inputting information to the microprocessor 10, which interprets each switch closure and in response thereto drives the display 38.

As is hereinafter more fully discussed, for reminding the user to adjust the date by manipulating the thumbwheels 175, the control structure is responsive to the application of power via the power supply board 150 to the mailing machine 130, for selectively energizing the LED display to visually display a predetermined code, which is preferably a single segment in the middle, or minus sign position, in the extreme left digit position of the LED display, and to concurrently intermittently flash the entire display until the lid 134 is opened and the date key 174 depressed.

Further, the control structure is selectively responsive to utilization of the appropriate numerical keys 156 in combination with the access code key 170 for generating command and request messages for which separate keys have not been provided, for example a command to enter or exit the service mode.

In addition, in the service mode of operation the control structure is selectively responsive to utilization of the remote resetting keys, including the enter amount key 172 and enter combination key 173, for generating data entry messages which invoke various accounting routines for modifying values stored in the RAM to conform to customer requests, for example, for modifying the settable limit value, low postage warning value and dollar unlock value. In addition, in the service mode of operation provision is made for modifying the serial number of the postal meter if it is stored in the postal meter in modifiable form.

Further, in the non-service mode of operation the control structure is selectively responsive to utilization of the access code key 170, enter amount key 172 and enter combination key 174 for generating data entry messages which invoke various accounting routines for, in the case of the access code key 170, displaying an access code which is used by the operator for calling into a Data Center to obtain a combination code, and in the case of the enter amount and enter combination keys, 172 and 174, for modifying (normally increasing) the postage unused value stored in the RAM to permit the postal meter to print additional postage.

In addition to the above referred to circuits thereof, the accounting structure includes the non-volatile memory 24 for storing critical data, including the serial number, current values in the ascending and descending and piece count registers. The accounting structures also includes volatile memories, including a plurality of registers in the RAM which function as working ascending, descending and piece count registers for storing total amounts that are appropriately adjusted whenever postage is printed or the remote resetting function keys are utilized. The working volatile memories store such critical operational data for current use and transfer the same to the nonvolatile memory 24 at such time as a reduction in power is sensed or the main power switch 42 is moved to its off position.

In addition to the above referred to circuits thereof, the printing structure includes the circuits of the optical sensors, 78 and 80, which are respectively associated with the digit and bank selector stepper motors 28 and 26, respectively, for sensing the relative positioning of the print wheels of the postal meter. And the printing structure also includes the circuits of the photosensor 40 associated with the trip lever for sensing the movement of the lever in response to appropriate insertion of an envelope into the mailing machine slot 136 as discussed more fully in the aforesaid patent application entitled "Stand-Alone Electronic Mailing Machine".

Assuming initialization of the postal meter has been completed for example as disclosed in U.S. Pat. No. 4,301,507 and in U.S. application Ser. No. 447,913 of A. B. Eckert et al., for "Initializing The Print Wheels In An Electronic Postage Meter", the microprocessor 10 executes a scan routine under the control of the idle loop program. The scan routine continuously searches the keyboard 22 for key closures resulting from depression of keys. When each key is depressed, thereby closing the associated switch, the microprocessor 10 executes a control routine which causes a subroutine stored in the control structure to drive the LED display in response to such key depressions. Upon turning the power switch to its "on" position 600 (FIG. 6), the postal meter/mailing machine flags the date key as not checked 602. Thereafter, in the course of the initialization process, a zero postal value is displayed and flagged as a postage setting being on display 604. Whereupon, according to the invention, the date check logic routine of FIG. 6 is invoked.

Figure 6A:
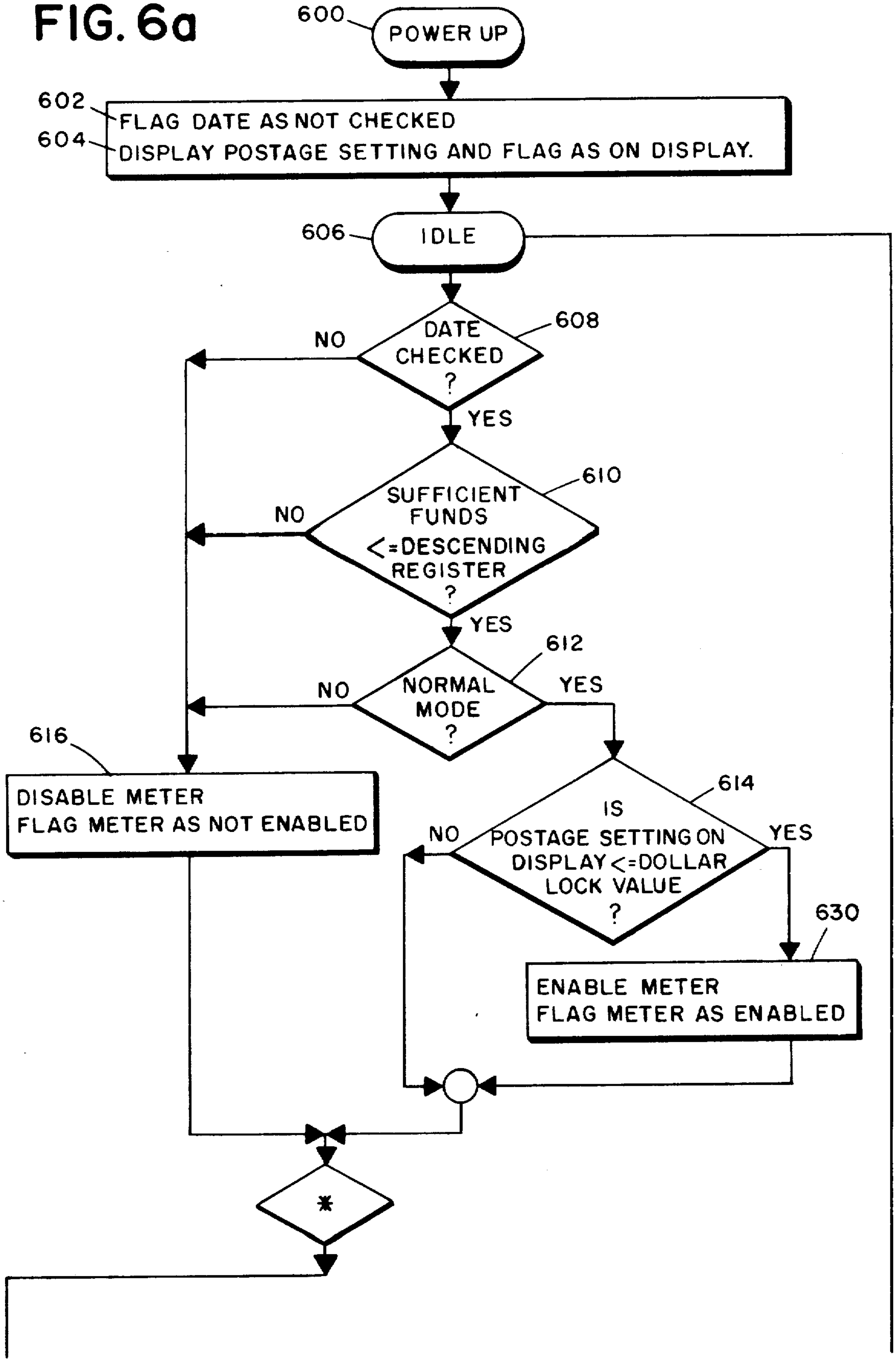
FIG. 6, which consists of FIGS. 6*a* and 6*b*, is a flow chart of the date check logic routine according to the invention.
Figure 6B:
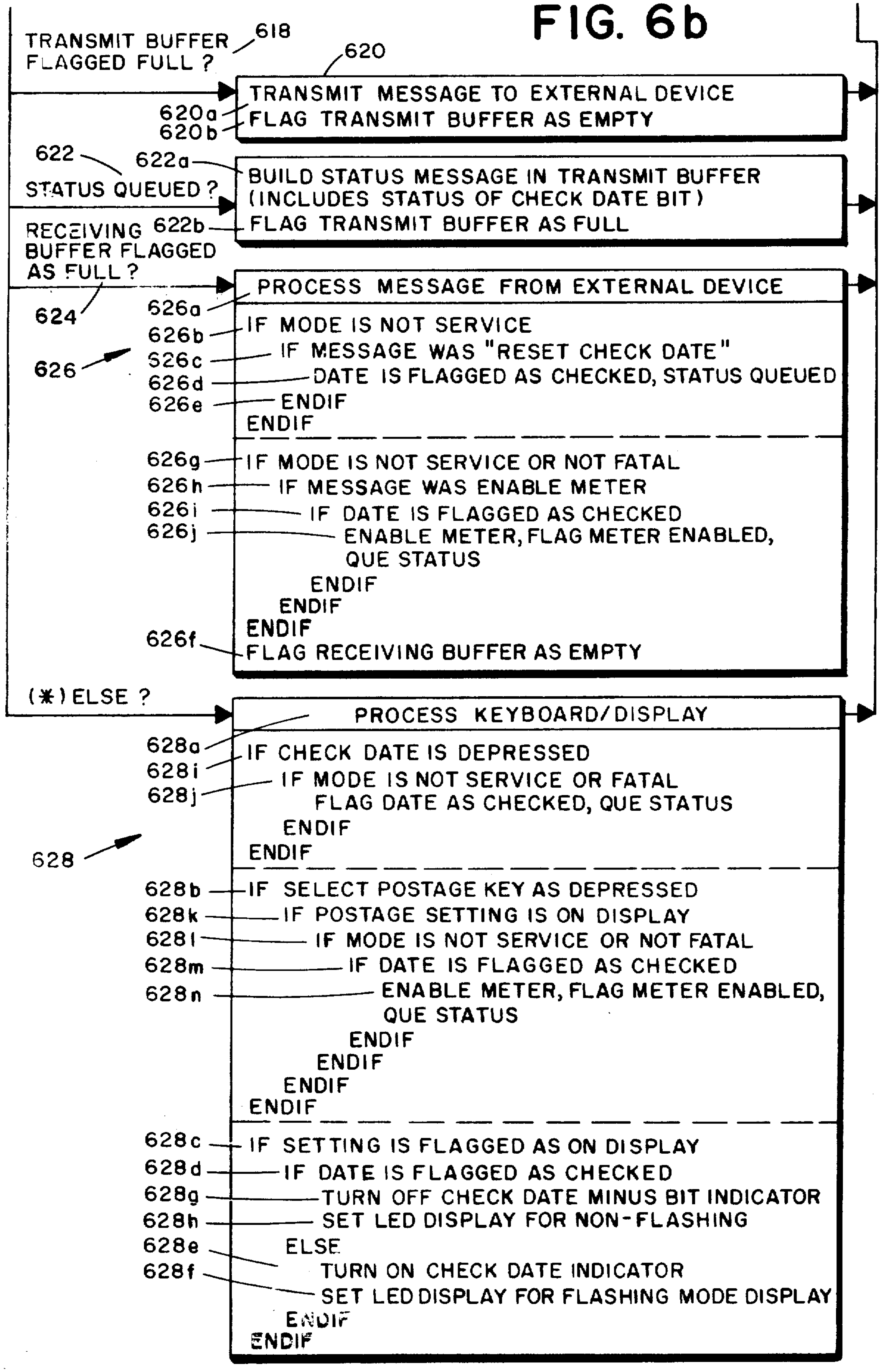

As shown in FIG. 6, wherein the 600 series of numbers is utilized to identify steps of the process shown therein, the microprocessor executes the program starting from idle 606, commencing with a determination as to whether or not the date has been checked 608. If it is not, the postal meter is disabled 616 and flagged as such, as a result of which the postal meter cannot print postage. If it were, determinations would also be made as to whether or not sufficient funds are available in the meter to print the displayed value 610, whether or not the postal meter is in the normal mode of operation 612, and whether or not the dollar unlock value stored in the meter is greater than the postage value which is displayed 614. Thus, if any one of these first three questions, 608, 610, 612, is answered in the negative, the postal meter is disabled 616 and flagged as such. On the other hand, if all of the first three questions, 608, 610 and 612, are answered in the affirmative, a determination is made as to whether or not the dollar unlock value is equalled or exceeded by the postage setting on display 614. If the dollar unlock value has not been equalled or exceeded the postage meter is enabled 630 and flagged as such, otherwise it is not; and, thereafter, in both instances, the transmit buffer 618, receiving buffer 624 and keyboard/display buffer/flags 628 are scanned for processing. For the purpose of this discussion, until otherwise stated, it will be assumed that the postage setting on display remains at the zero value displayed in the course of the initialization process, as a result of which the postage setting is less than the dollar unlock value 614. In addition it will be assumed that there are sufficient funds 610 and that the mode is normal 612.

As shown in FIG. 6, the remainder of the organization of the check date logic routine calls for processing precedence to be given in turn to transmitting messages to the external device which are stored in the transmit buffer 618, then to processing messages generated by the external device and stored in the receiving buffer 624 and then to processing messages generated by the keyboard 628. Before discussing the same in greater detail, there follows a general discussion of such processing steps.

The transmit buffer is initially scanned to determine whether it is full or empty 618. If it is full, then, as shown in the first block 620, the message stored in the transmit buffer is transmitted to the external device 620*a*, the transmit buffer is flagged as empty 620*b* and processing returns to idle 606. Thereafter the microprocessor scans the various flags to determine whether status information has been queued 622, that is, has been flagged to indicate that it is information which is to be transmitted to the external device. If status has been queued, a message corresponding to the status of the postage meter is built in the transmit buffer 622*a*, for example a message including a bit which indicates the status of the date as not being checked, and the transmit buffer is flagged as full 622*b*. Whereupon processing returns to idle 606. On the next scan, since the transmit buffer is now flagged as full 618, the message stored in the transmit buffer is transmitted to the external device 620*a* and the transmit buffer is again flagged as empty 620*b* and processing returns to idle 606. The aforesaid processing continues until all of the queue flags have resulted in a message being transmitted to the external device, one for each such queue flags. At this juncture, the transmit buffer having been flagged as empty, is available for filling with subsequent data to be transmitted, and processing returns to idle 606.

If on the next scan the receiving buffer is flagged as full 624, the check date message stored therein is procesed provided the postal meter is not in the service mode of operation 626*b*, 626*g*. Date check processing does not occur in the service mode because the postal meter is not equipped to process and account for printed postage when it is in the service mode. Also, in the case of a meter enable message being processed 626*h*, processing is ended if the meter is in the fatal mode of operation. This occurs when, for example, the meter has experienced a malfunction requiring the attention of a qualified serviceman. If the receiving buffer is flagged as empty 624, processing occurs in the fourth block 628, wherein keyboard generated messages 628*a*, pertaining to the postage setting being on display 628*c*, are processed.

Referring now to the date check query 608, and assuming that the date is not checked, the meter is disabled 616 and flagged as such. Thereafter assuming the transmit buffer 618 and receive buffer 624 are both flagged as empty, processing occurs in the fourth block 628. If none of the keys 628*a* or 628*b* have been depressed, since the postage setting (zero value) is still flagged as on display 628*c* (from 604) and the date is still flagged as checked 628*d* (from 602), the check date indicator, preferably a minus sign in the extreme left digit position of the LED display, is turned on 628*e* and the entire LED display is set to a flashing mode of operation 628*f*. Thus the keyboard operator is visually reminded to check the setting of the thumbwheels 175 (FIG. 3). In addition, status is queued, 628*f*, 622 (FIG. 6) and processed as hereinbefore discussed in the case of an external device being utilized to operate the postal meter.

Assuming the postal meter is being operated from the keyboard, the operator would at this juncture check the setting of the date and change the same, if necessary, by manipulating the thumbwheels 175 (FIG. 3). Thereafter, the operator would depress the date key 174. Upon doing so, the date will not as yet have been checked 608 (FIG. 6). Accordingly, the meter would remain disabled 616 and flagged as such. On the other hand, since the transmit buffer is flagged as empty 618, the receiving buffer flagged as empty 624 and the check date key has been depressed 628*a*, the date is then flagged as checked 628*i*. In addition, since the postage setting is still on display 628*c* and the date flagged as checked 628*d*, the minus bit indicator is turned off 628*g*, the LED display set to its non-flashing mode 628*h*, and processing returned to idle 606. At this juncture since the date has now been flagged as checked 608 (from 628*j*), and the answer to the questions 610, 612 and 614 are all yes, the meter is enabled and flagged as such.

Assuming the postal meter is being operated from an external device, the external device would normally be operated to generate and transmit to the postal meter a "reset check date" message, i.e., a header only message which simulates the depression of the date key of the postal meter. Assuming this has occurred, the transmit buffer is flagged as full 624, and the message processed. Since the postal meter is not in the service mode 626*b* and the message was "reset check date" 626*c*, the date is flagged as checked 626*d*, the receiving buffer is flagged as empty 626*f* and processing returned to idle 606. Since the date has now been flagged as checked 608 (from 626*d*), and the questions 610, 612 and 614 are all answered affirmatively, the meter is enabled and flagged as such. Thereafter, all queued status is processed as hereinbefore discussed and transmitted to the external device. Then, since the date is flagged as checked (from 626*d*) and the setting is still flagged as on display 628*c*, the check date minus bit indicator is turned off 628*g*, the LED display set for the non-flashing mode 628*h*, and processing returned to idle 606.

As shown in FIG. 6, the external device can enable the meter 626*j* by transmitting an enable meter message to the postal meter. Assuming this occurs and the postage setting on display 614 is greater than the dollar unlock value, the receiving buffer will be flagged as full 624 and the message therein processed in block 626. Whereupon if the mode is not service or not fatal 626*g* and the date is flagged as checked 626*i*, the enabled meter message will be processed, preferably, on an unconditional basis. However, it is within the scope of the invention to conditionally enable the meter 626*j*. This may be deemed to be a desirable occurrence due to it being generally impermissable to unconditionally enable the meter 626*j* when the postage value on display exceeds the dollar unlock value 614. For example, it may be desirable that the processing step 626*j* include a conventional subroutine to permit enablement of the postal meter by the external device when the enable meter message 626*h* simulates more than one discrete depression of the select postage key.

Similarly, the postal meter may be enabled from the keyboard by depressing the select postage key 628*b*. Again, assuming the postage is on display 628*k*, the mode not service or not fatal 628*l* and the date flagged as checked 628*m*, the meter will be, preferably, unconditionally enabled. However, as hereinbefore discussed it may be desirable to conditionally enable the postage meter, for example if the postage setting on display exceeds the dollar lock value. Thus the remarks hereinbefore made with regard to processing at step **626*j* apply with equal force to the processing at step 628*n*, except that meter enablement would occur, for example, when the select postage key 628*b*** is actually depressed a second time.

Aside from the foregoing, if the date has been checked 608 but there are insufficient funds in the postal meter to print the displayed postage 610, the meter will be disabled 616 and flagged as such. Reading down the flow chart (FIG. 6) it will be noted that nothing in chart can cure this problem, as a result of which processing is ended and returns to idle 606. Ordinarily the operator would at this juncture recharge the meter.

If the date has been checked 608 and there are sufficient funds 610 but the meter is not in the normal mode 612, then, the meter will be disabled and flagged as such, processing ended and returned to idle 606 since there is nothing in the flow chart (FIG. 6) for curing this problem. Ordinarily, if the meter is in the service mode, the operator would have to take it out of the service mode before proceeding with check date processing. On the other hand, if the meter were not in the service mode but was in the fatal mode, the user would ordinarily call a serviceman to cure the problem.

Assuming that the problems which could occur with respect to insufficient funds 610 or not being in the normal mode 612, are cured, it will then be assumed that the date is checked 608, but the setting on display is less than the dollar lock value 614, as a result of which nothing is done. However, this state of affairs can be dealt with as hereinbefore discussed by the check date logic routine. Since the date was checked 608 at the outset, the operator can operate the select postage key **628*b* to depress the same a second time for overriding the dollar unlock feature of the postal meter. And, upon doing so, since the setting is on display 628*k*, the mode of operation is normal 628, and the date was flagged as checked 628*m*, the meter is enabled 628*n* to print postage. After which, processing is ended and returns to idle 606**.

Accordingly, when the postal meter/machine is powered-up, the date is flagged as not checked, as a result of which the check date program is invoked and executed by the microprocessor to determine whether or not a postage setting is on display and, if it is and the date is not checked, the microprocessor disables the meter to prevent postage from being printed. In addition, the display is then driven to display at least one segment in a predetermined digit position of the display. In the preferred embodiment, a minus sign is displayed in the extreme left digit position. In addition, the entire LED display commences flashing, intermittently, to inform the user that the date has not been checked. Further, the postal meter/machine is programmed to respond to depression of the date key to turn off the minus sign bit in the extreme left hand digit position of the LED display and set the LED display to a non-flashing mode. In addition, the postal meter/machine is programmed to respond to messages from an external device for simulating depression of the date key and for enabling the meter/machine without operator intervention. Further, the postal meter is programmed to permit utilization of the select postage key for generating an enable meter message after the date has been checked although the postage setting on display exceeds the dollar unlock value; and provision is made to permit an external device to simulate such operation of the postage meter.

Figure 5:
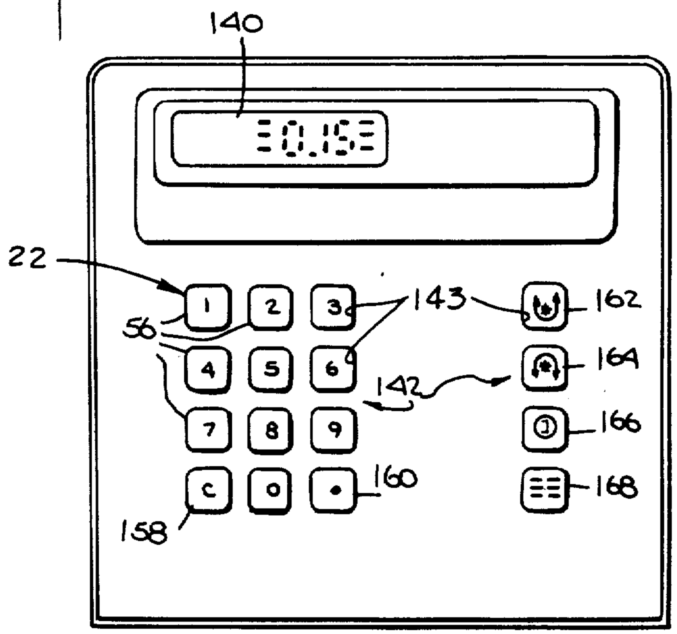
FIG. 5 is a plan view of the keyboard and display of the postal meter/mailing machine of FIG. 3.

Referring now to FIG. 5, in any mode of meter operation other than the service mode, depression of the postage used key 162 effects the display at the display panel 140 of the total value in the ascending register of all postage that has been printed, depression of the postage unused key 164 effects the display of the total value in the descending register of the postage then available for printing, and depression of the piece count key 166 effects the display of the total count of all printing operations of the mailing machine 130. In each instance the depression of the selected key results in the current value associated with the key being displayed for a predetermined time interval after the key is released, for example several seconds, after which time interval the display will return to the then current postage setting.

According to the invention, the numerical keys 156 (FIG. 5) in combination with the access code key 170 (FIG. 3) may be used for displaying the aforesaid information and other information which is not ordinarily the kind of information that a customer needs or is able to interpret. And, when the meter is in the service mode of operation, the postage used, postage unused and piece count keys, 162, 164 and 166 (FIG. 5) may each be used to effectuate the display of some of such other information. The latter case is hereinafter initially discussed since it exemplifies both usages of the keyboard.

In order to effectuate utilization of the keyboard 22 (FIG. 4) to initiate command or request functions for which separate keys have not been provided, a predetermined numerical code, having at least two and preferably four characters without a decimal, is entered in the keyboard 22 by depressing the appropriate numerical keys 156 (FIG. 5), followed by depression of the access code key 170 (FIG. 3). Upon depression of the access code key 70 a control routine is invoked which causes the generation of a request or command header corresponding to the two low order digits in the display. For example, although a service mode key has not been provided, entering the numerals 6946 in the keyboard followed by depression of the access code key 170 will cause the generation of a "46" command header. Whereupon the microprocessor will invoke a conventional subroutine causing the meter to enter the service mode of operation. When this occurs, a predetermined code, preferably consisting of a segment inserted in the low segment position of each blank digit position will be displayed to inform the user that the postal meter and thus the machine is in the service mode of operation. Thereafter, depression of the postage used key 162 will result in the display of the "dollar unlock" value, consisting of a predetermined value which if equaled or exceeded, in the course of use of the postal meter, will not be printed unless the operator depresses the select postage key a second time after the value is originally displayed. On the other hand, in the service mode of operation, the depression of the postage unused key 164 will result in the display of the "low postage warning" value, consisting of a predetermined postage value which results in the display of a warning signal informing the operator that the postal meter/mailing machine should be recharged. And, depression of the piece count key 166 will result in a diagnostic status display identifying the last fatal condition that occurred, even though that condition was subsequently cleared.

Figure 7:
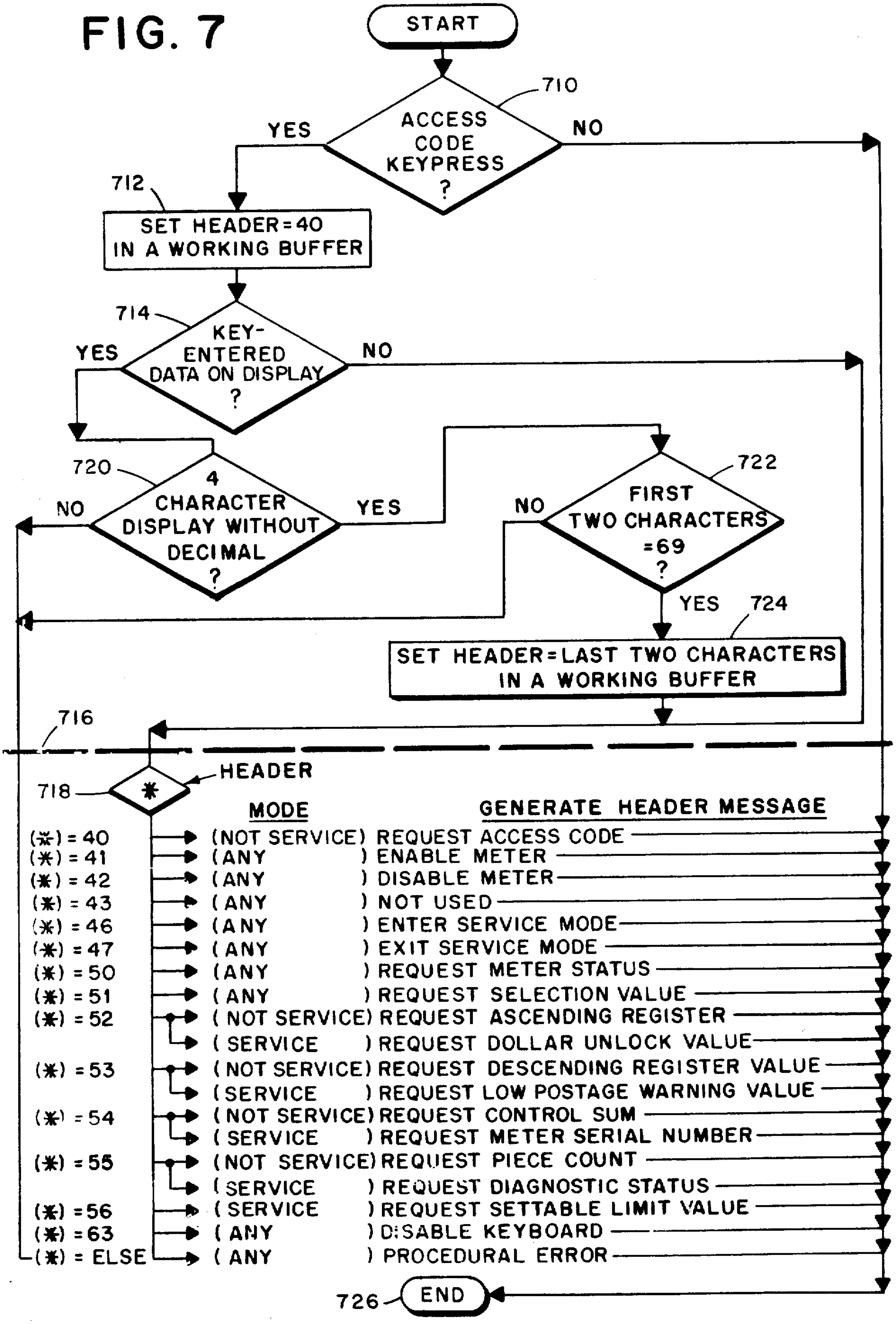
FIG. 7 is a flow chart of the header message logic routine according to the invention.

For the general case of usage of the numerical keys in combination with the access key 170 (FIG. 3) for displaying all of the above referred to information and still further information, reference is made to FIG. 7, wherein the 700 series of numbers are utilized to identify the steps of processing. As shown in FIG. 7, until the access code key is depressed 710, the microprocessor under the direction of the idle loop program continues its idle routine. When the access key is depressed 710, a single byte header message corresponding to the numerical value of "40" is built and stored in an available working buffer 712. If there is no key entered data in the display 714 at this juncture, the microprocessor invokes the header message execution routine 716 shown below the dashed line in FIG. 7 to execute the header message 718. Since the header message corresponds to the numeral 40, a "request access code" message is generated, which message results in the microprocessor invoking a conventional subroutine for building an access code in the display buffer. And, as hereinbefore discussed, the display buffer is copied into the image buffer in bit format for driving the LED display, as a result of which the access code is displayed to the operator, i.e., the code ordinarily used by the operator, for example for calling into Pitney Bowes Data Center, when charging the postal meter with additional postage. On the other hand, after the aforesaid numeral 40 header is generated 712 and set in the available buffer, if there is key entered data is in the display 714 the header will not be executed. Rather, the display buffer will be scanned, and, if the data in the display buffer is not a four character display without a decimal 720, then the microprocessor invokes a conventional sub-routine which generates a "procedural error" message, i.e., a meter status message having a procedural error bit, which message is transferred to the display image buffer to drive the LED display to display the notation "ERR". Similarly, if the display is a four character display without a decimal, but the first two characters 722 are not the numerals "69", the microprocessor invokes the aforesaid sub-routine to generate the procedural error message and display the same error notation. On the other hand, if the first two characters 722, of the four character display without a decimal, are the numerals "69", then, a single byte header message 724 utilizing the last two characters is generated and stored in an available working buffer, whereupon the microprocessor invokes the header message execution routine 716 below the dashed line in FIG. 37 and execute the same to generate a message corresponding to the last two digits.

Upon execution of the header message routine 716 (FIG. 7), if the aforesaid last two digit header message is "40", a "request access code" message is generated, resulting in the display hereinbefore discussed. If the two digit header message is "41" an "enable meter" message is generated, if it is "42" a "meter disable" message is generated, if it is "46" an "enter service mode" message is generated, if it is "47" an "exit service mode" message is generated, if it is "50" a "request status" message is generated, and if it is "51" a "request selection value" message is generated. If it is "52" and the meter is not in the service of operation a "request ascending register" message is generated. On the other hand, if it is "52" and the meter is in the service mode of operation the request ascending register message is interpreted as a "request dollar lock value" message. If the two digit code is "53", "54" or "55" and the meter is not in the service mode of operation, then the "request descending register", "request control sum" or "request piece count" messages will be respectively generated; whereas if it is "53", "54" or "55" and the meter is in the service mode of operation then these same messages will be respectively interpreted as the "request low postage warning value", "request meter serial number" or "request diagnostic status" messages. Further, if it is "56" and the meter is in the service mode of operation the "request settable limit value" message will be generated, if it is "63" the "disable keyboard" message will be generated, and, if the last two digits are any two digits other than one of the foregoing last two digits, then the "procedural error" message will be generated. In each instance, upon generating or otherwise providing the particular message, processing is ended 726, and thereafter the microprocessor invokes a conventional sub-routine which is executed by the microprocessor to cause the performance of the particular operation of the meter which corresponds to the message and to provide a display corresponding to the message. For example, when the message "request access code" and "procedural error" were respectively generated as hereinbefore discussed, an access code and the notation "ERR" were respectively displayed.

To effectuate utilization of the keyboard 22 to initiate data entry functions for which separate keys have not been provided, and to obviate the necessity of entering and end of entry command from the keyboard without providing a separate key therefor, the postal meter/mailing machine is also programmed to permit an operator, usually a factory trained serviceman, to modify or initially store various predetermined values in the mailing machine which effect its operational characteristics. These values include the settable limit value, low postage warning value and dollar unlock value, which are usually modified to comply with customer needs or preferences. According to the invention, for modifying such values the machine is initially put into the service mode of operation as hereinbefore discussed. Having done so it should be noted that since the access code key is not involved with modifying values stored in the meter, the flow chart of FIG. 7 is not hereinafter referred to in the following discussion.

Before modifying the aforesaid values, after putting the postal meter in the service mode of operation, the operator may optionally check the values that are to be modified, by depressing the appropriate key 162, 164 or 166 (FIG. 5) to determine whether or not modification is necessary. Thereafter the operator ordinarily enters the new value to be stored into the keyboard 22, by depressing the appropriate numerical keys 156, which results in the display of the corresponding value, and then depressing the enter amount key 172 (FIG. 3), which results in the storage of the displayed amount and blanking the display. Either before or after entry of the new value, the operator may enter a predetermined combination, having at least one digit, into the keyboard by utilizing the numerical keys 156 (FIG. 5), which results in the display of the corresponding value, and then depressing the enter combination key 173 (FIG. 3), which results in the storage of the combination corresponding to the keyboard entry and blanking of the display. As a result of having entered both the amount and combination, the microprocessor automatically invokes the end of entry program shown in FIG. 8 for processing the entered amount and combination, as if an end of entry command had been received, thereby causing the value stored in the register identified by the combination to be changed to the new value.

Figure 8A:
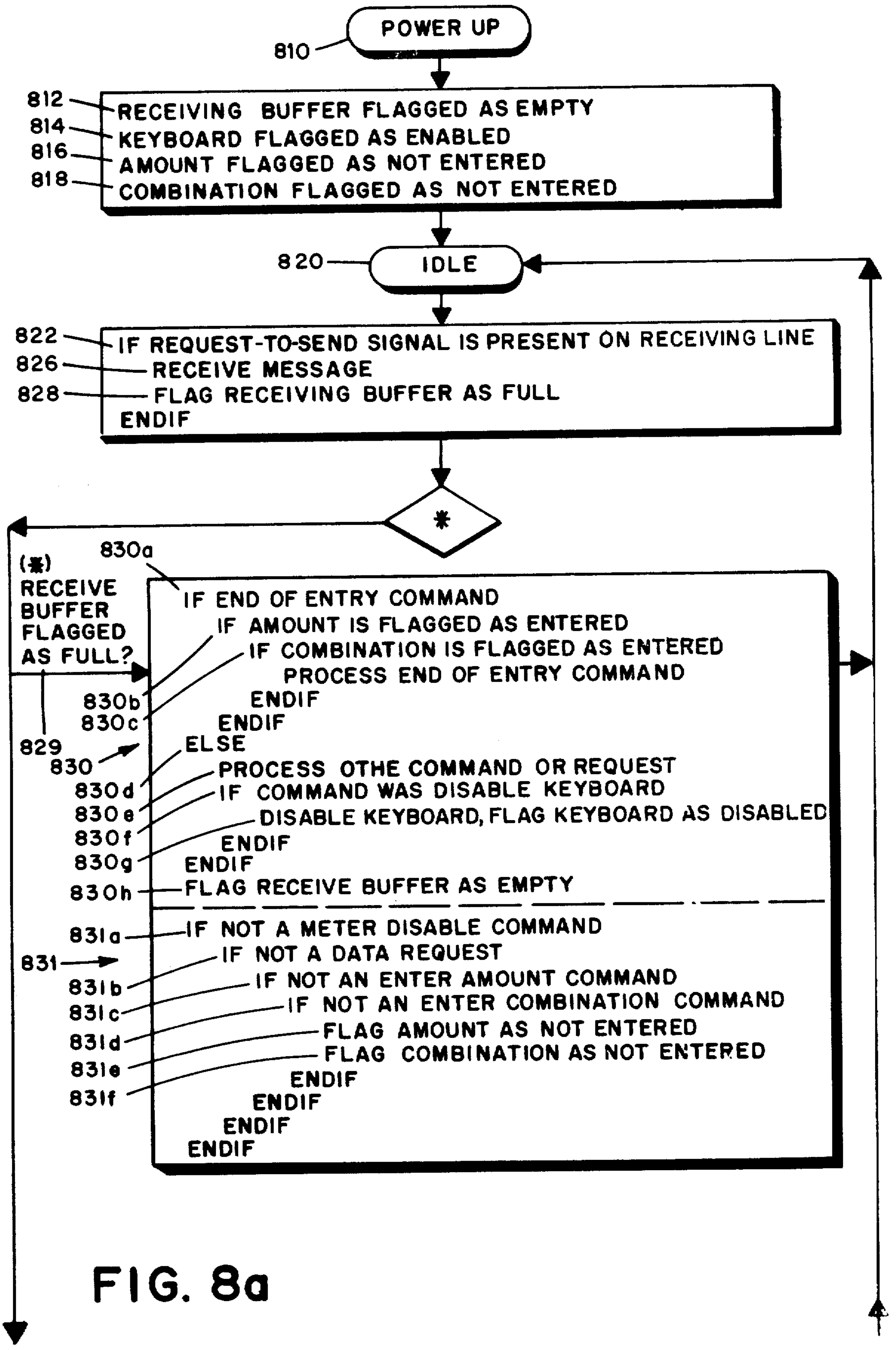
FIG. 8, which consists of FIGS. 8*a* and 8*b*, is a flow chart of the amount and combination, end of entry, logic routine according to the invention.
Figure 8B:
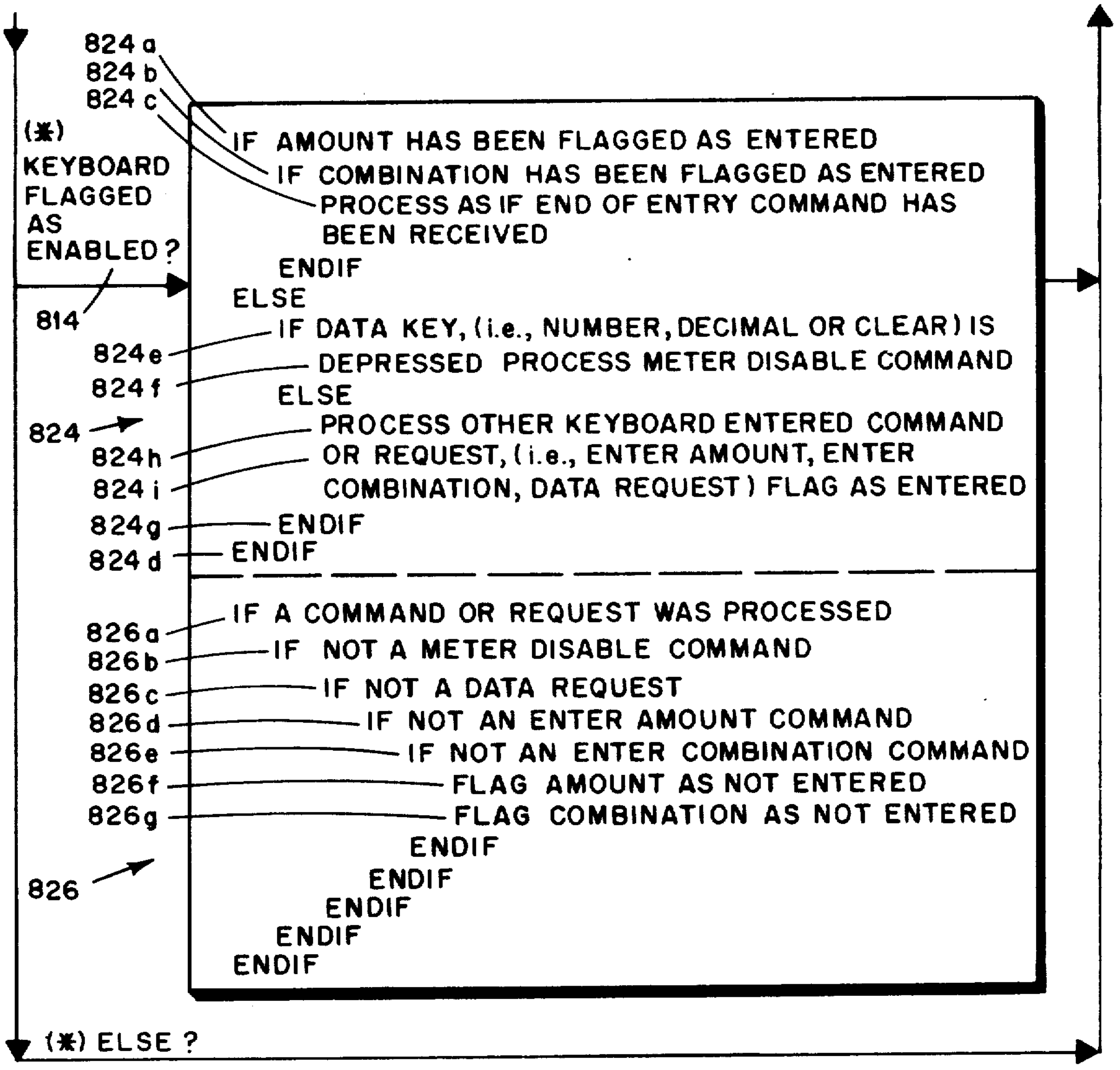

The end of entry program (FIG. 8) is executed by the microprocessor under the control of the appropriate accounting routine. As shown in FIG. 8, after power 810 is applied to the postal meter the receiving buffer is flagged as empty 812, the keyboard is flagged as enabled 814. In addition, the amount and combination working registers of the RAM are flagged as not entered, 816 and 818, in the course of initialization of the postal meter/machine. Under the control of the idle loop program, the microprocessor then searches for executable instruction in the various working buffers of the RAM.

As shown in FIG. 8, wherein the 800 series of numbers are used for identifying the processing steps, processing precedence from idle 820 is given to messages received from external devices, over those that are internally generated. For the purpose of this discussion, it will be assumed until otherwise stated that a request-to-send signal 822 has not been received from any external device since the initialization process was completed, and that the receiving buffer remains flagged as empty 812, the keyboard remains flagged as enabled 814, the amount remains flagged as not entered 816 and the combination remains flagged as not entered 818. Accordingly, messages are processed in accordance with the steps of the process set forth in the lower block 824 (FIG. 8). If the amount has been flagged as entered 824*a*, due to a new value having been entered on the keyboard and the enter amount key having been depressed, and if the combination code has also been flagged as entered 824*b*, due to the appropriate code having been entered in the keyboard and the enter combination key having been depressed, then, the amount and combination code are processed 824*c* as if an end of entry command has been received. On the other hand, if the amount has been flagged as entered 824*a* but the combination has not been so flagged, then, processing is ended 824*d*. If however the amount has not been flagged as entered 824*a* and if a numerical data key is depressed 824*e*, then, the keyed data 824*f* generates a meter disable command. In this connection it should be noted that disabling the meter prevents the same from printing postage, and that the keyboard remains enabled. Referring again to FIG. 8, if the amount has not been flagged as entered 824*a* and a numerical data key is not depressed 824*e*, processing is ended 824*g* unless some other key is depressed 824*h*, in which event the other command or request is processed 824*i*.

After the aforesaid processing is completed, all such processing is additionally subjected to the abort analysis subroutine 826 shown below the dashed line in the lower block 826. As shown in this subroutine 826, if a command or request has been processed above the dashed line 826*a*, and if it was not a meter disable command 826*b*, and it was not a keyboard entered data request 826*c* i.e., a message generated as a result of depression of any one of the postage used, postage unused or piece count keys, and it was not an enter amount command 826*d*, and it was not an enter combination command 826*e*, then, the amount 826*f* and combination 826*g* are both flagged as not entered. If however the command or request was processed above the dashed line 826*a* and it was a meter disable command 826*b* processing is ended; or, if it was not a meter disable 826*b* but was a keyed data request 826, then processing is ended; or, if it was neither a meter disable command 826*b* nor a numerically keyed data request 826*c*, but was an enter amount command 826*d*, then, processing is ended; or if it was not a meter disable command 826*b* nor data request 826*c* nor enter amount command 826*d*, but was an enter combination command 826*d*, then, processing is ended. And, in each instance in which processing is ended, the amount and combination, 826*b*, 826*g* are not flagged as not entered, or, otherwise stated, if one or the other of the amount or combination had been flagged as entered due to prior processing above the dashed line it will remain flagged as entered.

The aforesaid abort analysis subroutine 826 (FIG. 8) is provided to be sure that once the operator commences the process of modifying one of the values stored in the postal meter, and certain other information other than the appropriate information for completing the value modification process is entered into the keyboard before completing the value modification process, then the operator is forced to recommence the value modification process. For example, if after the operator enters an amount, the operator then enters a postage value via the keyboard 824*e*, the meter will be disabled due to a meter disable command being generated and processed 824*f* each time a key is depressed. Such entries will not clear the amount and combination entry flags since a meter disable command was processed 826*b*. However, when the operator depresses the select postage key, the message generated is a select postage command 826*b* not a data request 826*c*, not an enter amount command 826*d* and not an enter combination command 826*e*; as a result of which the amount and combination code will both be flagged as not entered. Thus the previously entered amount will have to be reentered by the operator. On the other hand, it is permissable to interrupt processing the new value/combination code entry sequence for the purpose of displaying values by depressing data request keys. Thus the postage used key may be depressed by displaying the "dollar unlock" value, the postage unused key may be depressed for displaying the "low postage warning" value, and the piece count key may be depressed for displaying the "diagnostic status"; these values, rather than those associated with the name of the key, being displayed since the new value/combination code is entered when the postal meter is in the service mode of operation. Under these circumstances, the amount and combination will not be flagged as not entered, since the depression of such keys results in generating a data request message and processing data request message 826*a* results in ending the abort analysis subroutine. Accordingly, a previously entered amount or combination will not be flagged as not entered. Thus, although the postal meter is programmed for forcing the operator to complete the value modification process after having commenced the same, or, otherwise stated, is programmed for preventing the value modification process from being aborted after its commencement, information which is relevant to value modification processing may be displayed after the process has been commenced with respect to any of the values that are ordinarily modified.

At any time in the course of the foregoing procedures the operator of an external device may take control of the meter to transmit a command or message by sending a request-to-send signal. However, the message associated with the signal will not be processed until internal processing then in progress is completed.

As shown in FIG. 8, after idle 810, if there is not a request to send signal 822 on the receiving line nothing is done. If however a request to send signal 822 is on the receiving line, then the message is received 826 and the receive buffer is flagged as full 828. Having flagged the receive buffer as full 828, 829 the message will be processed in the upper block 830 whether or not the keyboard is enabled, due to processing receiving buffer messages taking precedence over processing keyboard entered messages.

As shown in the upper block 830, if the message following the request to send signal is an end of entry command 830*a* and the amount and combination are both flagged as entered 830*b* and 830*c*, then, the amount and combination are processed. However, it should be noted that if the keyboard entry routine hereinbefore discussed was interrupted by a request-to-send signal 822 after entry of the amount and combination via the keyboard, the amount and combination would not be effected, since processing would have already automatically occurred as if an end of entry command had been received, inasmuch as the end of entry message associated with the request-to-send signal 822 will not be processed until the processing then in progress is completed. Accordingly, the incoming end of entry command 830*a* would find both the amount and combination flagged as not entered 830*b* and 830*c*, as a result of which processing of the end of entry command in the upper block diagram would be ended. This would also occur if the external device operator were to consecutively enter the amount and then enter the combination, in any order, unless the operator of the external device initially disables the keyboard. Assuming the external device is equipped to disable the keyboard, the operator of the external device has the option of allowing automatic processing, as previously discussed, as if an end of entry command had been sent, or, preventing such processing until an end of entry command is transmitted.

Referring back to the upper block 830 (FIG. 8) assuming the message following the request-to-send signal 822 is not an end of entry command, but is something else 830*d*, that request or command is processed 830*e*. And if the message is a disable keyboard command 830*f*, the keyboard is flagged as not enabled 830*g*. In any event, after processing the request or command received from the external device, processing is ended and the receiving buffer is flagged as empty 830*h*.

As discussed in connection with processing the keyboard entries, commands and messages from the external device are also subjected to an abort analysis subroutine 831, in this instance as shown in the upper block 830. As shown below the dashed line 831, if a command or request was not a meter disable command 830*a*, not a numerical data request 830*b*, not an enter amount command 830*c* and not an enter combination cammand 830*d*, then, both the amount 830*a* and combination 830*f* are flagged as not entered. On the other hand, if the request or command was a meter disable command 830*a*, or, if it was not, but was a data request 830*b*; or, if it was neither a meter disable command 830*c* nor a data request 830*d* but was an enter amount command 830*e*; or if it was not a meter disable command 830*a* nor data request 830*b* nor enter amount command 830*c*, but was an enter combination command 830*d*; then, in each instance, processing below the dashed line is ended and returns to idle 820.

The main difference between the processing steps involved in modifying the values in the registers via the external device rather than via keyboard entries, is that an end of entry command 830*a* must be sent from the external device to command processing the amount and combination code if the operator of the external device initially transmitted a disable keyboard command; whereas, as shown in the lower block 824, an end of entry command need not be initiated by the operator to commence processing the amount and combination code data, rather it is automatically processed when the last of the two (amount or combination) are entered. Thus the external operator has a choice of methodology which is unavailable to the keyboard operator.

Assuming the operator of the external device sends a disable keyboard command, it must be sent prior to entering either the amount or combination. For example, assuming the amount has been entered 830*b* but the combination has not been entered 830*c* and a disable keyboard command 831*a* has not as yet been sent by the operator of the external device, if at this time a request to send signal 822 is sent, followed by a disable keyboard command 826, since this is not an end of entry command 830 it would be processed by the upper block 830 as any other command or request 830*d* and, in addition, the keyboard would be flagged as not enabled 830*g*. However, since all processing above the dashed line of the upper block 830 is analyzed below the dashed line, and since the keyboard disable command is not a meter disable command 831*a*, and not a data request 830*b*, and not an enter amount command 830*c* and not an enter combination command 830*d*; the amount 830*e* and combination 830*e* will both be flagged as not entered. As a result, the previously entered amount would be cleared.

Assuming the external device operator chooses to disable the keyboard before entering the amount and combination, since he wants to avoid automatic processing, then, after such processing, unless the external operator transmits an enable keyboard command, the keyboard will remain disabled. If this state of affairs is not intended, the keyboard operator can cure the problem by turning the power switch "off" and then "on" again, as a result of which the keyboard will be flagged as enabled 814 in the course of the initialization process.

The aforesaid discussion concerning the end of entry processing is based on the assumption that the postal meter is in the service mode of operation. When the postal meter is in the non-service mode of operation, the amount and combination keys 172 and 714 are utilized in the same fashion to effectuate modifying the amount stored in the postage unused register of the RAM. And, processing any message generated by depression of the amount and combination keys 172 and 174 is in all respects the same as is hereinbefore discussed. In addition, the same may be said for processing messages generated by the external device. And all other remarks hereinbefore made with regard to utilization of other keys of the keyboard, and processing messages from the external device other than those pertaining to entry of the amount and combination, apply with equal force to utilization of the meter in the non-service mode. However, it is critical to the security of the postal meter that the combination code used for modifying the value stored in the postage unused register not be made available to anyone other than authorized users of the postal meter. Therefore the code is obtained from the Data Center by following the steps of depressing the access code key 170, which results in the display of a code other than the combination code, and then calling this code into the appropriate Data Center, as hereinbefore discussed, along with the serial number of the postal meter/machine and the amount which is to be added to the postage unused register, to obtain from the Data Center the then current combination code which must be used for entry in order to effectuate modification of the value stored in the postage unused register.

Since it is critical to the security of the postal meter to be sure that the serial number cannot be modified except by authorized personnel, any modification of the serial number is ordinarily undertaken in the course manufacture of the machine and, in any event, before the machine is placed in service. For preventing the serial number from being modified by unauthorized personnel, the above discussed modification procedure can only be used for modifying the serial number if it is stored in modifiable form. For example, assuming the postal meter/mailing machine does not have a serial number or has a serial number which is to be modified; the foregoing procedure may be followed, utilizing as the new value, a serial number having at least one digit prefixed by a "zero" digit, for either initial entry or any modification of an unlocked serial number. However, at such time as it is desirable to fix the serial number of the postal meter/mailing machine, the operator repeats the aforesaid modification procedure another time, utilizing the next previously entered serial number prefixed by a "one" digit rather than a "zero" digit, whereupon the microprocessor invokes a conventional subroutine which locks the next previously entered combination in place in the serial number register.

It is known and understood that the terms postage meter and postal meter, as used herein, refer to the general definition of a device for the imprinting of a defined unit value for governmental or private carrier parcel, evelope or package delivery, or other like application for unit value printing. Thus, although the term postal meter is utilized, it is both known and employed in the trade as a general term for devices utilized in conjunction with services other than those exclusively employed by governmental postal services. For example, private parcel or freight services purchase and employ postal meters as a means to provide unit value pricing for individual parcels, including acounting and printing functions.

A more detailed description of the programs hereinbefore discussed is disclosed in the appended program listing describing in detail all of the various routines incorporated in, and used in the operation of, the postal meter/mailing machine.

While the inventions disclosed herein have been described with reference to a simple embodiment thereof, it will be apparent to those skilled in the art that variations and modifications may be made therein without departing from the spirit and scope of the same. Accordingly, it is intended in the following claims to cover each such variation and modification as falls within the true spirit and scope of the claimed inventions.

PROGRAM APPENDIX

PATENT APPLICATION

OF: John H. Soderberg, Howell A. Jones, Alton B. Eckert,

Edward C. Duwel and Easwaran C. N. Nambudiri

FOR: POSTAGE METER WITH KEYBOARD KEYS FOR COMMANDING AND REQUESTING PERFORMANCE OF METER OPERATIONS

```
<<< ASSEMBLY COMMAND STRING >>>

/LIST=_DRA1:[OPT1.DEBUG]PATENT.LIS
/OBJECT=_DRA1:[OPT1.DEBUG]PATENT.OBJ
+       LINES 60
+       LIST   A,E,G,O,S,X
+       NLIST  M
_DRA1:[OPT1.DEBUG]SYMBOL.SRC
;       I N T E R R U P T   V E C T O R   T A B L E
_DRA1:[OPT1.DEBUG]VECTBL.SRC
;       I N T E R R U P T   P R O C E S S I N G
+       ORG     40H
_DRA1:[OPT1.NEWINT]CLKDEC
_DRA1:[OPT1.NEWINT]DBOUNC
_DRA1:[OPT1.NEWINT]DISPLY
_DRA1:[OPT1.NEWINT]INT75
_DRA1:[OPT1.NEWINT]KDIO
_DRA1:[OPT1.NEWINT]MVDDAT
_DRA1:[OPT1.NEWINT]RDROW
_DRA1:[OPT1.NEWINT]STPTMR
_DRA1:[OPT1.NEWINT]STRTMR
_DRA1:[OPT1.NEWINT]TIMINT
;       P O W E R   U P   &   D O W N
```

```
;_DRA1:[OPT1.DEBUG]PWRUP
_DRA1:[OPT1.NEWCTL]PWRABN
_DRA1:[OPT1.NEWCTL]PWRDN
_DRA1:[OPT1.NEWCTL]PWRNOR
_DRA1:[OPT1.NEWCTL]PWRUNG
_DRA1:[OPT1.NEWCTL]PWRUOK
;       K E Y B O A R D   &   D I S P L A Y
_DRA1:[OPT1.NEWKEY]CDBUF
_DRA1:[OPT1.NEWKEY]FILDIM
_DRA1:[OPT1.NEWKEY]KEYBRD
_DRA1:[OPT1.NEWKEY]MODDSP
_DRA1:[OPT1.NEWKEY]PAUTHK
_DRA1:[OPT1.NEWKEY]PCLRK
_DRA1:[OPT1.NEWKEY]PDCMK
_DRA1:[OPT1.NEWKEY]PERDSP
_DRA1:[OPT1.NEWKEY]PNUMK
_DRA1:[OPT1.NEWKEY]PROKEY
_DRA1:[OPT1.NEWKEY]PSETK
_DRA1:[OPT1.NEWKEY]SEGCOD
_DRA1:[OPT1.NEWKEY]VALDSP
;       C O N T R O L   &   P R O C E S S I N G
;+      ORG     400H
_DRA1:[OPT1.NEWCTL]CMDDSB
_DRA1:[OPT1.NEWCTL]CMDENB
_DRA1:[OPT1.NEWCTL]CONFIG
_DRA1:[OPT1.NEWCTL]CONSUM
_DRA1:[OPT1.NEWCTL]CTLSUM
_DRA1:[OPT1.NEWCTL]DBLHDR
_DRA1:[OPT1.NEWCTL]DECADD
_DRA1:[OPT1.NEWCTL]DECCOM
_DRA1:[OPT1.NEWCTL]DECERR
_DRA1:[OPT1.NEWCTL]DECSUB
_DRA1:[OPT1.NEWCTL]DOACCT
_DRA1:[OPT1.NEWCTL]DOSTAT
_DRA1:[OPT1.NEWCTL]DOTRIP
_DRA1:[OPT1.NEWCTL]ENDENT
_DRA1:[OPT1.NEWCTL]ENTAMT
_DRA1:[OPT1.NEWCTL]ENTSER
_DRA1:[OPT1.NEWCTL]EXTSER
_DRA1:[OPT1.NEWCTL]EXTTRP
_DRA1:[OPT1.NEWCTL]FATERR
_DRA1:[OPT1.NEWCTL]FINTRP
_DRA1:[OPT1.NEWCTL]HDRONY
_DRA1:[OPT1.NEWCTL]HDRPLS
_DRA1:[OPT1.NEWCTL]IDLE
_DRA1:[OPT1.NEWCTL]MANRST
_DRA1:[OPT1.NEWCTL]MESAGE
_DRA1:[OPT1.NEWCTL]MSERNO
_DRA1:[OPT1.NEWCTL]MSG2MU
_DRA1:[OPT1.NEWCTL]MTRSTS
_DRA1:[OPT1.NEWCTL]NPAUSE
_DRA1:[OPT1.NEWCTL]POSUPD
_DRA1:[OPT1.NEWCTL]PROERR
_DRA1:[OPT1.NEWCTL]RDCYC
_DRA1:[OPT1.NEWIO]RECEVE
_DRA1:[OPT1.NEWCTL]REDSTS
_DRA1:[OPT1.NEWCTL]SELVAL
_DRA1:[OPT1.NEWCTL]SEREOE
_DRA1:[OPT1.NEWCTL]SETPOS
_DRA1:[OPT1.NEWCTL]SRVCNV
_DRA1:[OPT1.NEWCTL]SRVREQ
_DRA1:[OPT1.NEWCTL]VALREQ
_DRA1:[OPT1.NEWCTL]XEQHDR
_DRA1:[OPT1.NEWIO]XMIT
;       U T I L I T I E S
_DRA1:[OPT1.NEWUTL]CLRBLK
_DRA1:[OPT1.NEWUTL]CMPARE
_DRA1:[OPT1.NEWUTL]CRC
_DRA1:[OPT1.NEWUTL]CRCNIB
_DRA1:[OPT1.NEWUTL]DBLANK
_DRA1:[OPT1.NEWUTL]DFLUSH
_DRA1:[OPT1.NEWUTL]DSBKBD
_DRA1:[OPT1.NEWUTL]ENAKBD
_DRA1:[OPT1.NEWUTL]FILNIB
_DRA1:[OPT1.NEWUTL]GETNIB
_DRA1:[OPT1.NEWUTL]LSTATE
_DRA1:[OPT1.NEWUTL]MOVBIT
_DRA1:[OPT1.NEWUTL]MVLNIB
_DRA1:[OPT1.NEWUTL]MVRNIB
_DRA1:[OPT1.NEWUTL]PUTNIB
_DRA1:[OPT1.NEWUTL]RSCAN
_DRA1:[OPT1.NEWUTL]TDBITM
_DRA1:[OPT1.NEWUTL]VCALL
_DRA1:[OPT1.NEWUTL]VCALLS
;       N O N   V O L A T I L E   M E M O R Y
_DRA1:[OPT1.NEWNVM]NVM30F
_DRA1:[OPT1.NEWNVM]NVM30T
_DRA1:[OPT1.NEWNVM]NVMBYT
_DRA1:[OPT1.NEWNVM]NVMCHG
_DRA1:[OPT1.NEWNVM]NVMDED
_DRA1:[OPT1.NEWNVM]NVMDXB
_DRA1:[OPT1.NEWNVM]NVMER
_DRA1:[OPT1.NEWNVM]NVMFND
_DRA1:[OPT1.NEWNVM]NVMLOD
_DRA1:[OPT1.NEWNVM]NVMMAP
_DRA1:[OPT1.NEWNVM]NVMNBK
_DRA1:[OPT1.NEWNVM]NVMNXT
_DRA1:[OPT1.NEWNVM]NVMOPN
_DRA1:[OPT1.NEWNVM]NVMPRP
_DRA1:[OPT1.NEWNVM]NVMRD
_DRA1:[OPT1.NEWNVM]NVMSTO
_DRA1:[OPT1.NEWNVM]NVMWN
_DRA1:[OPT1.NEWNVM]NVMWR
;       V R M R S
_DRA1:[OPT1.VRMRS]ACCODE
_DRA1:[OPT1.VRMRS]BINOCT
_DRA1:[OPT1.VRMRS]VRCDR
_DRA1:[OPT1.VRMRS]VRCLR
_DRA1:[OPT1.VRMRS]VRCREC
_DRA1:[OPT1.VRMRS]VRMRS
_DRA1:[OPT1.VRMRS]VRSET
_DRA1:[OPT1.DEBUG]PATENT
;       M O T O R   S U B S Y S T E M
;_DRA1:[OPT1.DEBUG]STUB
_DRA1:[EASWARAN.CONTROL]DMOVE
_DRA1:[EASWARAN.CONTROL]ENCMOV
_DRA1:[EASWARAN.CONTROL]ENDMOV
_DRA1:[EASWARAN.CONTROL]MDSEEK
_DRA1:[EASWARAN.CONTROL]MOPEN
_DRA1:[EASWARAN.CONTROL]MOTMOV
_DRA1:[EASWARAN.CONTROL]POHOME
_DRA1:[EASWARAN.CONTROL]RENC
_DRA1:[EASWARAN.CONTROL]SETCLS

<<< end of assembly command string >>>
```

```
1                    LINES 60
3                    NLIST  M
5                 ;  ********************************
6                 ;  ***   RAM LABEL DEFINATIONS   ***
7                 ;  ********************************
  21  0000                 +FIXSED  EQU   PTR
  26  0008                 +VARSED  EQU   PTR
  31  0010                 +CTLCRC  EQU   PTR
  36  0012                 +RSTCNT  EQU   PTR
  41  0013                 +ERRST  EQU   PTR
  46  0014                 +ERRCOD  EQU   PTR
  51  0016                 +ERRCNT  EQU   PTR
  56  0018                 +UNLOCK  EQU   PTR
  61  001C                 +LOWWRN  EQU   PTR
  66  001E                 +SETLIM  EQU   PTR
  71  0020                 +SERFLG  EQU   PTR
  76  0021                 +SERNUM  EQU   PTR
  81  0028                 +PCEREG  EQU   PTR
  86  002F                 +DSCREG  EQU   PTR
  91  0036                 +DSCCRC  EQU   PTR
  96  0038                 +ASCREG  EQU   PTR
 101  0040                 +ASCCRC  EQU   PTR
 106  0042                 +POSREG  EQU   PTR
 111  0046                 +MTRCHR  EQU   PTR
 116  0048                 +MRSTS1  EQU   PTR
 121  004A                 +MRSTS2  EQU   PTR
 126  004C                 +NORFLG  EQU   PTR
 131  004E                 +KDCTRL  EQU   PTR
 136  0050                 +BLKTMR  EQU   PTR
 141  0052                 +DSPTMR  EQU   PTR
 146  0054                 +KEYBKT  EQU   PTR
 151  0056                 +CTLBKT  EQU   PTR
 156  0058                 +CHRBKT  EQU   PTR
 161  005A                 +CURBKT  EQU   PTR
 166  005C                 +DBCTR  EQU   PTR
 171  005E                 +SKPVAL  EQU   PTR
 176  0060                 +SKPCNT  EQU   PTR
 181  0062                 +TIMVEC  EQU   PTR
 186  0066                 +NVMCTL  EQU   PTR
 191  0068                 +OLDSWT  EQU   PTR
 196  006A                 +DIEDCM  EQU   PTR
 201  006C                 +DEFDCM  EQU   PTR
 206  006E                 +PORTBI  EQU   PTR
 214  0070                 +SPARE  EQU   PTR
 219  0080                 +DBUF  EQU   PTR
 224  008C                 +SPARE1  EQU   PTR
 229  0090                 +RECBUF  EQU   PTR
 234  00A0                 +XMTBUF  EQU   PTR
 239  00B0                 +SPARE2  EQU   PTR
 244  00C0                 +WORK1  EQU   PTR
 249  00D0                 +WORK2  EQU   PTR
 254  00E0                 +AMTBUF  EQU   PTR
 259  00F0                 +CMBBUF  EQU   PTR
 265  0000                 +DIMAGE  EQU   PTR
269                NLIST M
SYMBOL TABLES
272               ;                        FLAG ASSIGNMENTS

274               ; RAM                BIT
275               ; LABEL     BIT      LABEL     DESCRIPTION

277               ; Serflg    0        Dead      Unrecoverable Fatal Error
278               ;            1
279               ;             2      Weknvm    Retention qualities of NVM poor
280               ;              3     Snolck    Sernum can no longer be changed
281               ;
```

```
; Mrsts1   0        Unksel   Unknown selection value
;           1       Datdor   Check date warning
;            2      Insfnd   Insufficient funds
;             3     Lowpos   Low postage warning
;              4    Sermod   In service mode
;               5   Enabld   Meter enabled
;                6  Incyc    Trip mechanism in cycle
;                 7 Quereg   Trip request being processed
;
; Mrsts2   0        Fatmod   Detected fatal error condition
;           1
;            2
;             3
;              4    Trpsw    Trip switch status
;               5
;                6
;                 7 Prvmod   Privileged mode set
;
; Norflg   0        Quests   Status is to be transmitted
;           1       Quepos   Current selection is to be transmitted
;            2      Cmbin    Combination entered
;             3     Amtin    Amount entered
;              4    Trpreq   Trip waiting to be processed
;               5   Comdsb   External communications disabled
;                6  Unvsel   Selected postage not verified
;                 7 Latdsb   Commanded disable (latched)
;
; Kdctrl   0        Stgdsp   Setting is on display
;           1       Flsdsp   Flashing display
;            2      Timed    Display is timed
;             3
;              4
;               5   Flsdcm   Flashing decimal
;                6
;                 7 Kbddsb   Keyboard disabled
; *************************************
; ***  HARDWARE ADDRESS POINTERS   ***
; *************************************

7400      X       EQU  7400H  BASE ADDRESS OF RAM
7480      Y  EQU  7480H  BASE ADDRESS OF RAM UPPER HALF
7000      CTLREG  EQU  7000H  8155 CONTROL REGISTER
6800      DATA1   EQU  6800H  SWITCH DATA ADDRESS
02BE      KILCOD  EQU   2BEH  ADDRESS OF KILCODES IN NVM
4800      NVMWRT  EQU  4800H  WRITE ADDRESS FOR NON VOLATILE MEMORY
4400      NVMRED  EQU  4400H  READ ADDRESS FOR NON VOLATILE MEMORY
4000      NVMERS  EQU  4000H  ERASE ADDRESS FOR NON VOLATILE MEMORY
6800      PORT2A  EQU  DATA1
7001      PORTA   EQU  7001H  8155 PORT A ADDRESS
7002      PORTB   EQU  7002H  8155 PORT B ADDRESS
7003      PORTC   EQU  7003H  8155 PORT C ADDRESS
00FE      RETAIN  EQU   0FEH  ADDRESS OF NVM RETENTION LOCATION
8000      TEST    EQU  8000H  ADDRESS OF EXTERNAL TEST SOFTWARE
7004      TIMER   EQU  7004H  8155 TIMER DATA ADDRESS


; *******************************
; ***  P A R A M E T E R S  ***
; *******************************

0002      DBVAL   EQU  2      DEBOUNCE COUNT
0007      DSPVAL  EQU  7.     COUNT FOR 5.5 SEC TIMED DISPLAY
0002      KDSKIP  EQU  2      TIMER INT SKIP COUNT
4C96      KEYINT  EQU  (18.*179.).OR.4000H   VALUE FOR 1.8 MILLI SEC INT RATE
7FA1      MAXINT  EQU  (91.*179.).OR.4000H  MAX TIMER INTERVAL , 9.1 MILLI SEC
```

```
0080        MULKEY  EQU   80H    VALUE ASSIGNED TO MULTI KEY DEPRESSION
0002        NDISP   EQU   2      NO. OF DISPLAY PACKS
0008        DSPCHR  EQU   (NDISP*4) MAX NO. OF CHAR DISPLAYABLE
            ;   NON-VOLATILE MEMORY PARAMETERS
0000        SRVSTR   EQU   FIXSED  NIBB OFFSET FOR START OF SERVICE BLOCK IN RAM
0028        NORSTR   EQU   PCEREG  NIBB OFFSET FOR START OF NORMAL BLOCK IN RAM
0028        SRVSIZ   EQU   NORSTR-SRVSTR
0022        NORSIZ   EQU   MRSTS2-NORSTR
            ;  *********************************************
            ; ***   VALUE SIZE IN NIBBLES ( DIGITS )   ***
            ; *********************************************

0008        ASCSIZ   EQU   8     ASCENDING REGISTER
0007        DSCSIZ   EQU   7     DESCENDING REGISTER
0004        NBANKS   EQU   4     BANKS FOR POSTAGE PRINTING
0007        PCESIZ   EQU   7     PIECE REGISTER

            ; **************************************
            ; ***   V A L U E   F O R M A T S   ***
            ; **************************************

            ;  FORMAT OF DATA  2 DIGITS
            ;     LEFT DIGIT = NO. OF DIGITS
            ;     RIGHT DIGIT = NO. OF DECIMAL PLACES EXCEPT
            ;                   = F HEX  NOT DECIMAL NO ( COUNT )
            ;                   = 0 USE NO. OF DECIMALS INDICATED BY DIEDCM

008F        ACCFMT  EQU   8FH    ACCESS CODE
0080        ASCFMT  EQU   80H    ASCENDING REG
0080        CSMFMT  EQU   80H    CONTROL SUM
005F        DIAFMT  EQU   5FH    DIAGNOSTIC STATUS
0070        DSCFMT  EQU   70H    DESCENDING REG
0040        LOKFMT  EQU   40H    UNLOCK
007F        MSNFMT  EQU   7FH    METER SERIAL NO
007F        PCEFMT  EQU   7FH    PEICE COUNT
0040        POSFMT  EQU  NBANKS*10H SELECTION
            ; **************************************
            ; ***   MISSING ENTRY POINT TRAPS   ***
            ; **************************************

            ; ******************************
            ; ***   FATAL ERROR CODES   ***
            ; ******************************

0002        SFTWRE   EQU   02H   DETECTED INCONSISTANT SET OF ARGUMENTS ON CALL
0008        TRPTIM   EQU   08H   TRIP FAILED TO COMPLETE WITHIN ALLOWED TIME
0009        RSTTRY   EQU   09H   EXCEEDED ALLOWED NO OF UNSUCESSFUL RESET ATTEMPTS
0011        BADSW    EQU   11H   DETECTED ILLOGICAL SWITCH CONDITION
0012        BUFOVR   EQU   12H   INFORMATION WAS OVER WRITTEN IN TRANSMIT BUF
0017        BARF     EQU   17H   UNEXPECTED INTERRUPT
0018        NINCYC   EQU   18H   CYCLE SWITCH FAILED TO INDICATE NOT HOME

            ; *********************
            ; ***   KILL CODES   ***
            ; *********************

            ;  CODES 0 - 9 WILL RESULT IN THE METER BEING
```

```
              ;               PERMINITELY INOPERATIVE
              ;  CODES A - E WILL RESULT IN CPU BEING HALTED
              ;  CODE F  IS NORMAL OPERATION
     0000     BADCRC   EQU   0H    DETECTED BAD CRC
     0001     NVMBAD   EQU   1H    ERRASE OR WRITE TO NVM UNSUCESSFUL
     0002     NVMRET   EQU   2H    READ BEFORE ERASE FAILED.  IE UNACCEPTABLE RETENTIO
     0003     FATRST   EQU   3H    DESCENDING REG CLEARED WHILE FATAL MODE
     0004     BADCYC   EQU   4H    UNACCEPTABLE RESPONSE FROM CYCLE SWITCH
              ;        EQU   5H    SPARE
              ;        EQU   6H    SPARE
              ;        EQU   7H    SPARE
              ;        EQU   8H    SPARE
              ;        EQU   9H    SPARE
              ;   WILL RESULT IN CPU HALTING ON POWER UP
     000A     BADRAM   EQU   0AH   DETECTED BAD RAM ON POWERUP
              ;        EQU   0BH   SPARE
              ;        EQU   0CH   SPARE
              ;        EQU   0DH   SPARE
              ;        EQU   0EH   SPARE

              ;  ***************************
              ;  ***   MESSAGE HEADERS   ***
              ;  ***************************

              ;  COMMANDS
     0041     HENABL  EQU   41H    ENABLE METER
     0042     HDISAB  EQU   42H    DISABLE METER
     0043     HENDEN  EQU   43H    END OF ENTRY
     0046     HSETSV  EQU   46H    SET SERVICE MODE
     0047     HCLRSV  EQU   47H    CLEAR SERVICE MODE
     004E     HEXTRP  EQU   4EH    EXTERNAL TRIP
     0062     HENAKB  EQU   62H    ENABLE KEYBOARD
     0063     HDISKB  EQU   63H    DISABLE KEYBOARD

     00C0     HSETMN  EQU   0C0H   ENTER METER SERIAL NUMBER
     00C1     HSETPO  EQU   0C1H   SET POSTAGE
     00C4     HSETDA  EQU   0C4H   CLEAR CHECK DATE
     00C5     HENTAM  EQU   0C5H   ENTER AMOUNT
     00C6     HENTCO  EQU   0C6H   ENTER COMBINATION
              ;  SERVICE
              ;  NAME              COMBO    AMT FMT MAX
              ;  UNLOCK VALUE        0          42
              ;  LOW POSTAGE WARN    1          2F
              ;  SETTABLE LIMIT      2          2F

              ;REQUESTS - NORMAL MODE
     0040     HREQAC   EQU   40H   ACCESSCODE REQUEST
     0050     HREQST   EQU   50H   STATUS REQUEST
     0051     HREQPO   EQU   51H   CURRENT SELECTION VALUE
     0052     HREQAR   EQU   52H   ASCENDING REGISTER VALUE
     0053     HREQDR   EQU   53H   DESCENDING REGISTER VALUE
     0054     HREQCS   EQU   54H   CONTROL SUM VALUE
     0055     HREQPC   EQU   55H   PEICE COUNT VALUE
     005B     HREQCF   EQU   5BH   CONFIGURATION REQUEST
     005C     HREQSN   EQU   5CH   SERIAL NUMBER VALUE

              ;REQUESTS - SERVICE MODE

              ;              50H   STATUS REQUEST
              ;              51H   CURRENT SELECTION VALUE
     0052     HREQDL   EQU   52H   LOCK VALUE
     0053     HREQLP   EQU   53H   LOW POSTAGE WARNING
     0054     HREQMN   EQU   54H   METER SERIAL NO.
     0055     HREQDS   EQU   55H   DIAGNOSTIC STATUS
     0056     HREQSL   EQU   56H   SETTABLE LIMIT
              ;              5CH   SERIAL NUMBER VALUE
     0000     EJEC
```

```
                 ;VALUE HEADERS
0080             HSTAT   EQU   80H    METER STATUS
0081             HPSET   EQU   81H    POSTAGE VALUE
0082             HAREG   EQU   82H    ASCENDING REGISTER
0083             HDREG   EQU   83H    DESCENDING REGISTER
0084             HCSUM   EQU   84H    CONTROL SUM
0085             HPCNT   EQU   85H    PIECE COUNT
008A             HDLOCK  EQU   8AH    UNLOCK VALUE
008B             HLOPOS  EQU   8BH    LOW POSTAGE WARNING
008C             HMTRNO  EQU   8CH    METER SERIAL NUMBER
008D             HDIAGS  EQU   8DH    DIAGNOSTIC STATUS
008E             HHSLIM  EQU   8EH    SETTABLE LIMIT
0090             HACODE  EQU   90H    ACCESS CODE
00AB             HCONFG  EQU   0ABH   METER CONFIGURATION
                 ;   INTERRUPT JUMP TABLE TO VECTOR INTERRUPTS TO CORRECT ENTRY POINT
                  ORG   0
0000 C3 C5 01     JMP   PWRUP      RST 0  POWER ON RESET
                  ORG   8H         RST1
0008 C3 A1 0B     JMP   PROERR
                  ORG   10H        RST2
0010 C3 A1 0B     JMP   PROERR
                  ORG   18H        RST3
0018 C3 A1 0B     JMP   PROERR
                  ORG   20H        RST4
0020 C3 A1 0B     JMP   PROERR
                  ORG   24H        TRAP  ( WATCH DOG TIMER )
0024 C3 7E 08     JMP   FATINT
                  ORG   28H        RST5
0028 C3 A1 0B     JMP   PROERR
                  ORG   2CH        5.5  ( POWER FAIL )
002C C3 7E 08     JMP   FATINT
                  ORG   30H        RST6
0030 C3 A1 0B     JMP   PROERR
                  ORG   34H        6.5
0034 C3 B6 01     JMP   PWRDN
                  ORG   38H        RST7
0038 C3 A1 0B     JMP   PROERR
                  ORG   3CH        7.5  ( TIMER )
003C C3 9D 00     JMP   INT75
                     ORG      40H
                 ;CLKDEC/CLKDGT(KDCTRL,BLKMSK,PORTA )
                 ;              (BITSTR,BYTE  ,BITSTR)
                 ;              ( I    , I    , I/O  )
                 ;              ( PSW  , B    , @HL  )
                 ;              ( C    , NC   , C    )
                 ;
                 ;REGISTER A DESTROYED
                 ;PSW DESTROYED
                 ;
                 ;CLOCK DECIMAL/DIGIT BITS FROM PORTA INTO DISPLAYS.
                 ;MODIFIES BITS TO CAUSE BLINKING.
                 ;
                 CLKDEC;                ****ENTRY FROM DSPLY ONLY
0040 EA 46 00      JPE  CLKD01          IF(KDCTRL.FLSDCM .OR. KDCTRL.FLSDSP)
                 ;                        .EQ. TRUE
                 ;                        MODIFY BITS WITH BLINK CONTROL MASK
                 ;                      ENDIF
                 ;                      PULSE CLOCK BITS
                 ;                      RETURN
                 CLKDGT;                ****ENTRY FROM DSPLY ONLY
0043 C2 49 00      JNZ  CLKD02          IF KDCTRL.FLSDSP .EQ. TRUE
                 CLKD01;                  MODIFY BITS WITH BLINK CONTROL MASK
0046 7E            MOV  A,M               PORTA = PORTA .OR. BLKMSK
0047 B0            ORA  B
0048 77            MOV  M,A
                 CLKD02;                ENDIF
0049 35            DCR  M               PULSE CLOCK BIT
```

```
004A 34           INR  M
004B C9           RET                   RETURN
                 ;DBOUNC()(KEYBKT,CTLBKT,CHRBKT)(DBCTR)
                 ;        (BYTE  ,BYTE  ,BYTE  )(UBYTE)
                 ;        ( I    , O    , O    )( I/O )
                 ;        ( RAM  , RAM  , RAM  )( RAM )
                 ;        ( NC   , C    , C    )( C   )
                 ;
                 ;REGISTERS DESTROYED
                 ;PSW DESTROYED
                 ;
                 ;DEFINES DEBOUNCED KEYCODES CTLBKT AND CHRBKT FOR USE OF
                 ;MAINLINE KEYBOARD ROUTINE.  CHRBKT DIFFERS FROM CTLBKT
                 ;IN THAT THE MAINLINE ROUTINE MAY SET CHRBKT = 0.
                 ;
                 DBOUNC;                **** ENTRY FROM KDIO ONLY
004C 3A 2A 74     LDA  KEYBKT/2+X       A = KEYBKT
                 ;                      DECREMENT DBOUNCE COUNTER
004F 21 2E 74     LXI  H,DBCTR/2+X      HL = ADDRESS, DBCTR
0052 35           DCR  M                DBCTR = DBCTR - 1
                 ;                      CHECK WHETHER COUNTER WAS STOPPED AT 1
0053 C2 5D 00     JNZ  DBOUN1           IF DBCTR .EQ. 0
                 ;                        KEEP COUNTER AT 1
0056 34           INR  M                  DBCTR = 1
                 ;                        KEYBOARD IS DEBOUNCED
                 ;                        DEFINE NEW KEYCODE OUTPUT BUCKETS
0057 32 2C 74     STA  CHRBKT/2+X         CHRBKT = KEYBKT
005A 32 2B 74     STA  CTLBKT/2+X         CTLBKT = KEYBKT
                 DBOUN1;                ENDIF
                 ;                      CHECK WHETHER KEY IS  PRESSED
005D B7           ORA  A                IF KEYBKT .NE. HEX00
005E C8           RZ
                 ;                        SET DEBOUNCE PERIOD
005F 36 02        MVI  M,DBVAL            DBCTR = DBVAL
                 ;                      ENDIF
0061 C9           RET                   RETURN

                 ;DISPLY()(KDCTRL,BLKTMR,PORTA )
                 ;        (BITSTR,BYTE  ,BITSTR)
                 ;        ( I    , I    , I/O  )
                 ;        ( RAM  , RAM  , 7001 )
                 ;        ( NC   , NC   , C    )
                 ;
                 ;REGISTERS DESTROYED
                 ;PSW DESTROYED
                 ;
                 ;DISPLAY ROUTINE
                 ;
                 DISPLY;                 **** ENTRY FROM KDIO ONLY
                 ;                       FETCH DISPLAY CONTROL BYTE
0062 2A 27 74     LHLD KDCTRL/2+X
                 ;                       L = KDCTRL
                 ;                       H = BLKTMR
0065 5D           MOV  E,L               E = KDCTRL
                 ;                       DEFINE DISPLAY BLINK CONTROL MASK
0066 06 01        MVI  B,01H             B = BLKMSK = HEX01, FOR DISPLAY ON
0068 24           INR  H                 IF (BLKTMR+1) .GE. 0
0069 FA 72 00     JM   DISP02
006C 2C           INR  L                   IF KDCTRL.STGDSP .EQ. TRUE
006D F2 72 00     JP   DISP01
0070 06 0F        MVI  B,0FH                 B = BLKMSK = HEX0F, FOR DISPLAY OFF
                 DISP01;                   ENDIF
                 DISP02;                 ENDIF
                 ;                       OUTPUT START BITS FOR DISPLAY LOAD
0072 21 01 70     LXI  H,PORTA           HL = ADDRESS, PORTA
0075 7E           MOV  A,M               PORTA = PORTA.AND.HEXF1, 3 START BITS
0076 E6 F1        ANI  0F1H
0078 77           MOV  M,A
```

```
0079 35        DCR  M             PULSE CLOCK BIT
007A 34        INR  M
              ;                   SET TO LOAD 4 DIGITS INTO EACH DISPLAY
007B 0E 04     MVI  C,4           C = CHRCNT = 4
              DISP03;             DO UNTIL CHRCNT .EQ. 0
              ;                     DEFINE BIT SELECTION MASK
007D 16 80     MVI  D,80H           D = BITMSK = HEX80
              DISP04;               DO UNTIL BITMSK .EQ. HEX01
              ;                       MOVE DIGIT BITS FROM DIMAGE TO
              ;                       PORTA
007F CD DE 00  CALL MVDDAT            MVDDAT(CHRCNT,BITMSK,KDCTRL,PORTA,
              ;                             ( C    , D    , E    , @HL ,
              ;                             ( I    , I    , I    , I/O ,
              ;
              ;                             KDCTRL)
              ;                              PSW  )
              ;                              0    )
              ;                       CLOCK OUT DIGIT BITS
0082 CD 43 00  CALL CLKDGT            CLKDGT(KDCTRL,BLKMSK,PORTA )
              ;                             ( PSW  , B    , @HL  )
              ;                             ( I    , I    , I/O  )
              ;                       SHIFT BIT SELECTION MASK TO RIGHT
0085 7A        MOV  A,D               D = BITMSK = BITMSK/2
0086 0F        RRC
0087 57        MOV  D,A
0088 1F        RAR                    TEST BITMSK
0089 D2 7F 00  JNC  DISP04
              ;                     ENDDO
              ;                     MOVE DECIMAL BITS FROM DIMAGE TO
              ;                     PORTA
008C CD DE 00  CALL MVDDAT          MVDDAT(CHRCNT,BITMSK,KDCTRL,PORTA,
              ;                           ( C    , D    , E    , @HL ,
              ;                           ( I    , I    , I    , I/O ,
              ;
              ;                           KDCTRL)
              ;                            PSW  )
              ;                            0    )
              ;                     CLOCK OUT DECIMAL BITS
008F CD 40 00  CALL CLKDEC          CLKDEC(KDCTRL,BLKMSK,PORTA)
              ;                           ( PSW  , B    , @HL )
              ;                           ( I    , I    , I/O )
0092 0D        DCR  C               C = CHRCNT = CHRCNT-1
0093 C2 7D 00  JNZ DISP03
              ;                   ENDDO
0096 35        DCR  M             3 CLOCK CYCLES TO FINISH LOAD
0097 34        INR  M
0098 35        DCR  M
0099 34        INR  M
009A 35        DCR  M
009B 34        INR  M
009C C9        RET               RETURN
              ;INT75
              ;
              ;SERVICE INTERRUPT 7.5
              ;
              INT75;             ****INTERRUPT ENTRY 7.5
009D E5        PUSH H            SAVE HL
009E 21 7C 01  LXI  H,TIMINT     HL = ADRESS = ADDRESS, TIMINT
00A1 CD 25 10  CALL VCALLS       VCALLS(ADRESS)
              ;                        ( HL    )
              ;                        ( I     )
00A4 E1        POP  H            RESTORE HL
00A5 FB        EI                ENABLE INTERRUPTS
00A6 C9        RET               RETURN
              ;KDIO()(KDCTRL,PORTBI,PORTB ,BLKTMR,DSPTMR,KEYBKT)
              ;      (BITSTR,BITSTR,BITSTR,BYTE  ,UBYTE ,BITSTR)
              ;      ( I    , I    , I/O  , I/O  , I/O  , O     )
              ;      ( RAM  , RAM  , 7002 , RAM  , RAM  , RAM   )
```

```
                ;       ( NC   , NC   , C    , C    , C    , C    )
                ;
                ;REGISTERS DESTROYED
                ;PSW DESTROYED
                ;
                ;KEYBOARD/DISPLAY I/O ROUTINE MAKES REAL TIME ASPECTS OF
                ;KEYBOARD/DISPLAY PROCESSING INVISIBLE TO APPLICATION
                ;LEVEL ROUTINES.
                ;
                KDIO;                  ****ENTRY FROM TIMINT ONLY
                ;                      INCREMENT CONTINUOUS RUN BLINK TIMER
00A7 21 28 74     LXI  H,BLKTMR/2+X   HL = ADDRESS, BLKTMR
00AA 34           INR  M              BLKTMR = BLKTMR+1
00AB 5E           MOV  E,M            E = BLKTMR
00AC C2 B7 00     JNZ  KDIO02         IF BLKTMR .EQ. 0
                ;                       DECREMENT TIMED DISPLAY TIMER. 1=STOP
00AF 21 29 74     LXI  H,DSPTMR/2+X     HL = ADDRESS, DSPTMR
00B2 35           DCR  M                DSPTMR = DSPTMR-1
00B3 C2 B7 00     JNZ  KDIO01           IF DSPTMR .EQ. 0
00B6 34           INR  M                  DSPTMR = 1
                KDIO01;                 ENDIF
                KDIO02;               ENDIF
                ;                     TOGGLE MOTOR FOR HALF POWER HOLD
00B7 3A 37 74     LDA  PORTBI/2+X     A = PORTBI
00BA 21 02 70     LXI  H,PORTB        HL = ADDRESS, PORTB
00BD AE           XRA  M              PORTB = PORTB .XOR. PORTBI
00BE 77           MOV  M,A
                ;                     DEFINE PROGRAM CONTROL COUNTER
00BF 7B           MOV  A,E            E = IOCTR = BLKTMR .AND. HEX07
00C0 E6 07        ANI  07H
00C2 5F           MOV  E,A
                ;                     CASE (IOCTR)
00C3 FE 05        CPI  5
00C5 D2 D0 00     JNC  KDIO03
                ;                       **0,1,2,3,4: READ KEYROWS
00C8 3A 27 74     LDA  KDCTRL/2+X         IF KDCTRL.KBDDSB .EQ. FALSE
00CB 1F           RAR
                ;                           KEYBOARD IS NOT DISABLED
00CC D2 0A 01     JNC  RDROW                RDROW(IOCTR)
                ;                                ( E   )
                ;                                ( I   )
                ;                         ENDIF
00CF C9           RET
                KDIO03;
00D0 C0           RNZ                   **5: START KEYBOARD/DISPLAY OUTPUT
00D1 CD 4C 00     CALL DBOUNC             DEBOUNCE KEYBOARD
                ;                         INITIALIZE FOR NEXT KEYBOARD SCAN
00D4 AF           XRA  A                  KEYBKT = 0
00D5 32 2A 74     STA  KEYBKT/2+X
00D8 CD F6 0E     CALL DFLUSH             FLUSH NOISE FROM DISPLAY SHIFT REG
00DB C3 62 00     JMP  DISPLY             OUTPUT TO DISPLAY
                ;                       **ELSE:
                ;                         COMPLETE PROCESSING INITIATED
                ;                         IN CASE **5:. THIS INTERRUPT LEVEL
                ;                         ROUTINE IS ITSELF INTERRUPTED.
                ;                     ENDCASE
                ;                     RETURN
                ;MVDDAT(CHRCNT,BITMSK,KDCTRL,PORTA ,KDCTRL)(DIMAGE)
                ;      (BYTE  ,BYTE  ,BITSTR,BITSTR,BITSTR)(BYTSTR)
                ;      ( I    , I    , I    , I/O  , O    )( I    )
                ;      ( C    , D    , E    , @HL  , PSW  )( RAM  )
                ;      ( NC   , NC   , NC   , C    , C    )( NC   )
                ;
                ;REGISTER A DESTROYED
                ;PSW DESTROYED
                ;
                ;FETCH SELECTED BITS FROM DIMAGE, INVERT THEM,
                ;AND MOVE THEM TO PORTA.
```

```
                 ;COPY KDCTRL INTO PSW FOR LATER USE
                 ;
                 MVDDAT;                 ****ENTRY FROM DSPLY ONLY
0ODE C5            PUSH B                SAVE REGISTERS
00DF E5            PUSH H
                 ;                       SET DATA AND CLOCK BITS
00E0 7E            MOV  A,M              PORTA = PORTA .OR. HEXOF
00E1 F6 OF         ORI  OFH
00E3 77            MOV  M,A
                 ;                       DEFINE INVERTED OUTPUT BIT FOR PORTA
00E4 06 FD         MVI  B,OFDH           B = OUTBIT = HEXFD
                 ;                       CALCULATE INDEX
00E6 3E 04         MVI  A,4              A = INDEX = 4-CHRCNT
00E8 91            SUB  C
                 ;                       SET TO MOVE 1 BIT INTO EACH DISPLAY
00E9 0E 02         MVI  C,NDISP          C = BITCTR = NDISP
                 ;                       HL = ADDRESS,
                 ;                       DIMAGE[INDEX+(NDISP-BITCTR)*4]
00EB 21 80 74      LXI  H,DIMAGE/2+Y
00EE 85            ADD  L
00EF 6F            MOV  L,A
                 MVDD01;                 DO UNTIL BITCTR .EQ. 0
00F0 7E            MOV  A,M                IF(DIMAGE[INDEX+(NDISP-BITCTR)*4]
                 ;                           .AND. BITMSK) .NE. 0
00F1 A2            ANA  D
00F2 CA FA 00      JZ   MVDD02
                 ;                           PUT OUTBIT INTO PORTA
00F5 E3            XTHL                      HL = ADDRESS, PORTA
00F6 7E            MOV  A,M                  PORTA = PORTA .AND. OUTBIT
00F7 A0            ANA  B
00F8 77            MOV  M,A
00F9 E3            XTHL                      HL = ADDRESS,
                 ;                           DIMAGE[INDEX+(NDISP-BITCTR)*4]
                 MVDD02;                   ENDIF
                 ;                         SHIFT OUTBIT TO LEFT
00FA 78            MOV  A,B                B = OUTBIT = OUTBIT*2+1
00FB 07            RLC
00FC 47            MOV  B,A
00FD 0D            DCR  C                  C = BITCTR = BITCTR-1
                 ;                         HL = ADDRESS,
                 ;                         DIMAGE[INDEX+(NDISP-BITCTR)*4]
00FE 23            INX  H
00FF 23            INX  H
0100 23            INX  H
0101 23            INX  H
0102 C2 F0 00      JNZ  MVDD01             TEST BITCTR
                 ;                       ENDDO
0105 E1            POP  H                RESTORE REGISTERS
0106 C1            POP  B
                 ;                       SET PSW FOR CALL TO CLKDEC/CLKDAT
0107 D5            PUSH D                PSW = KDCTRL
0108 F1            POP  PSW
0109 C9            RET                   RETURN
                 ;RDROW(IOCTR )(PORTA ,PORTC ,KEYBKT)
                 ;     ( MOD8 )(BITSTR,BITSTR,NIBSTR)
                 ;     ( I    )( I/O  , I    , I/O  )
                 ;     ( E    )( 7001 , 7002 , RAM  )
                 ;     ( C    )( C    , NC   , C    )
                 ;
                 ;REGISTERS DESTROYED
                 ;STATUS DESTROYED
                 ;
                 ;READS THE KEYROWS DESIGNATED BY IOCTR.  CONSOLIDATES
                 ;DATA AS THE SCAN OF 5 KEYROWS PROGRESSES.  OUTPUTS
                 ;CODES TO KEYBKT INDICATING WHICH KEY, OR WHETHER NO
                 ;SINGLE KEY IS DOWN.
                 ;
                 RDROW;                  ****ENTRY FROM KDIO ONLY
```

```
                ;                     FORM STROBE MASK
010A 7B          MOV  A,E             B = STRMSK = (2*IOCTR) .XOR. HEXFF
010B 07          RLC
010C 2F          CMA
010D 47          MOV  B,A
                ;                     FORM ROW CODE
010E 2F          CMA                  C = ROWCOD = IOCTR*HEX10
010F 07          RLC
0110 07          RLC
0111 07          RLC
0112 4F          MOV  C,A
                ;                     STROBE KEYROW
0113 21 01 70    LXI  H,PORTA         HL = ADDRESS, PORTA
0116 7E          MOV  A,M             PORTA =
                ;                     PORTA .OR. HEXOF .AND. STRMSK
0117 F6 0F       ORI  0FH
0119 A0          ANA  B
011A 77          MOV  M,A
                ;                     READ POSITIVE LOGIC IMAGE OF KEYROW
011B 3A 03 70    LDA  PORTC           A = COLCOD = PORTC .AND. HEXOF
011E E6 0F       ANI  0FH
0120 C8          RZ                   IF COLCOD .NE. 0
                ;                       A KEY IN CURRENT ROW IS DOWN
0121 21 2A 74    LXI  H,KEYBKT/2+X      HL = ADDRESS, KEYBKT
0124 34          INR  M                 PSW:Z = NOPREV = KEYBKT .EQ. 0
0125 35          DCR  M
                ;                       ASSUME MULTIPLE KEYS DOWN
0126 36 80       MVI  M,MULKEY          KEYBKT = MULKEY
0128 C0          RNZ                    IF NOPREV .EQ. TRUE
                ;                         NO KEY SEEN IN PREVIOUS ROW
0129 FE 09       CPI  9                   IF COLCOD .LT. 9
012B D0          RNC
                ;                           COL CODE VALUES 1 THRU 8 REMAIN
012C B7          ORA  A                     PSW:P = PARITY, COLCOD
012D E8          RPE                        IF PARITY .EQ. ODD
                ;                             COL CODES 1,2,4,7,8 REMAIN
012E FE 07       CPI  7                       IF COLCOD .NE. 7
0130 C8          RZ
                ;                               A SINGLE KEY IN ROW IS DOWN
0131 B1          ORA  C                         KEYBKT = ROWCOD .OR. COLCOD
0132 77          MOV  M,A
                ;                             ENDIF
                ;                           ENDIF
                ;                         ENDIF
                ;                       ENDIF
                ;                     ENDIF
0133 C9          RET                  RETURN
                ;STPTMR(WASOFF)(PORTBI,PORTB ,SKPCNT,CTLREG)
                ;      (BIT   )(BITSTR,BITSTR,UBYTE ,TIMCTL)
                ;      ( O    )( I    , O    , O    , O    )
                ;      (PSW:Z )(RAM   ,7002  ,RAM   ,7000  )
                ;      ( C    )( NC   , C    , C    , C    )
                ;
                ;PSW:CY = NO CHANGE
                ;PSW:S, Z, P CHANGED; CORRESPOND TO SKPCNT AT ENTRY
                ;
                ;STOP INTERRUPT TIMER
                ;
                STPTMR;               ****ENTRY POINT
0134 E5          PUSH H               SAVE HL
                ;                     INDICATE TIMER STATUS AT ENTRY
0135 2A 30 74    LHLD SKPCNT/2+X      L = SKPCNT
0138 2C          INR  L               PSW:Z = WASOFF = SKPCNT .EQ. 0
0139 2D          DCR  L
013A E1          POP  H               RESTORE HL
013B F5          PUSH PSW             SAVE A, PSW:CY, WASOFF
                ;                     CHECK FOR RUNNING TIMER
013C CA 51 01    JZ   STPTM1          IF WASOFF .EQ. FALSE
```

```
0013F 3E 43        MVI  A,43H          STOP TIMER
0141 32 00 70      STA  CTLREG
                   ;                   DISABLE TIMER INTERRUPT
0144 3E 0D         MVI  A,0DH          A = HEXOD
0146 30            SIM
                   ;                   INDICATE THAT TIMER IS STOPPED
0147 AF            XRA  A              SKPCNT = 0
0148 32 30 74      STA  SKPCNT/2+X
                   ;                   HOLD DIGIT MOTOR IN POSITION
014B 3A 37 74      LDA  PORTBI/2+X     PORTB = PORTBI
014E 32 02 70      STA  PORTB
                  STPTM1;             ENDIF
0151 F1            POP  PSW            RESTORE A, PSW:CY
                   ;                   PSW:Z = WASOFF
0152 C9            RET                 RETURN
                  ;STRTMR(ISADR,SKIPCT,PERIOD,WASOFF)(TIMER ,SKPCNT,SKPVAL,
                  ;      (ADDR ,UBYTE ,TMODCT,BIT   )(TMODCT,UBYTE ,UBYTE ,
                  ;      ( I   , I    , I    , 0    )( 0    , 0    , 0    ,
                  ;      ( HL  , A    , DE   , PSW:Z)(7004  , RAM  , RAM  ,
                  ;      ( NC  , NC   , NC   , C    )( C    , C    , C    ,
                  ;
                  ;      TIMVEC,CTLREG,PORTB ,PORTBI)
                  ;      ADDR  ,TIMCTL,BYTE  ,BYTE  )
                  ;       0    , 0    , I    , 0    )
                  ;      RAM   ,7000  ,7002  , RAM  )
                  ;       C    , C    , NC   , C    )
                  ;
                  ;PSW:CY = NO CHANGE
                  ;PSW:S, Z, P CHANGED; CORRESPOND TO SKPCNT AT ENTRY
                  ;
                  ;STARTS TIMER INTERRUPTS AFTER DEFINING INFORMATION NEEDED
                  ;BY TIMINT.  ISADR IS ADDRESS OF INTERRUPT SERVICE RTN
                  ;WHICH WILL BE ENTERED EVERY SKIPCT(TH) OCCURRENCE OF
                  ;INTERRUPT.
                  ;PERIOD WILL CONTAIN THE PARAMETER VALUE KEYINT.
                  ;
                  STRTMR;             ***ENTRY POINT
0153 E5            PUSH H              SAVE HL
                   ;                   INDICATE TIMER STATUS AT ENTRY
0154 2A 30 74      LHLD SKPCNT/2+X     L = SKPCNT
0157 2C            INR  L              PSW:Z = WASOFF = SKPCNT .EQ. 0
0158 2D            DCR  L
0159 E1            POP  H              RESTORE HL
015A F5            PUSH PSW            SAVE A, PSW:CY, WASOFF
                   ;                   CHECK FOR STOPPED TIMER
015B C2 7A 01      JNZ  STRTM1         IF WASOFF .EQ. TRUE
                   ;                     SET TIMER MODE AND COUNT
015E EB            XCHG                  HL = PERIOD
                   ;                     DE = ISADR
015F 22 04 70      SHLD TIMER            TIMER = PERIOD
0162 EB            XCHG                  HL = ISADR
                   ;                     DE = PERIOD
                   ;                     INITIALIZE SKIP COUNTER
0163 32 30 74      STA  SKPCNT/2+X       SKPCNT = SKIPCT
                   ;                     SET REINITIALIZATION VALUE
0166 32 2F 74      STA  SKPVAL/2+X       SKPVAL = SKIPCT
                   ;                     SET INTERRUPT SERVICE ROUTINE ADDR
0169 22 31 74      SHLD TIMVEC/2+X       TIMVEC = ISADR
016C 3E 19         MVI  A,19H            RESET AND ENABLE TIMER INTERRUPT
016E 30            SIM
016F 3E C3         MVI  A,0C3H           START TIMER
0171 32 00 70      STA  CTLREG
                   ;                     UPDATE IMAGE OF PORTB
0174 3A 02 70      LDA  PORTB            PORTBI = PORTB
0177 32 37 74      STA  PORTBI/2+X
                  STRTM1;             ENDIF
017A F1            POP  PSW            RESTORE A, PSW:CY
                   ;                   PSW:Z = WASOFF
017B C9            RET                 RETURN
```

```
                ;TIMINT()(SKPCNT,SKPVAL,TIMVEC)
                ;        (UBYTE ,UBYTE ,ADDR  )
                ;        ( I/O  , I    , I    )
                ;        ( RAM  , RAM  , RAM  )
                ;        ( C    , NC   , NC   )
                ;
                ;PSW:S, Z, P, CY CHANGED
                ;
                ;DETERMINE WHETHER IT IS TIME TO TRANSFER CONTROL
                ;TO CURRENTLY ACTIVE INTERRUPT SERVICE ROUTINE.
                ;
                TIMINT;                 ****ENTRY FROM INT75 ONLY
017C CD C7 0B     CALL RECEVE           TRY TO RECEIVE MESSAGE
                ;                       DECREMENT SKIP COUNTER
017F 21 30 74     LXI  H,SKPCNT/2+X     HL = ADDRESS, SKPCNT
0182 35           DCR  M                SKPCNT = SKPCNT-1
                ;                       CHECK FOR COMPLETED COUNTDOWN
0183 C0           RNZ                   IF SKPCNT .EQ. 0
                ;                         REINITIALIZE SKIP COUNTER
0184 3A 2F 74     LDA  SKPVAL/2+X         A = SKPVAL
0187 77           MOV  M,A                SKPCNT = SKPVAL
0188 FB           EI                      ENABLE INTERRUPT
                ;                         PERFORM CURRENT INTRPT SERVICE RTN
0189 2A 31 74     LHLD TIMVEC/2+X         HL = ADRESS = TIMVEC
018C E9           PCHL
                ;                       ENDIF
                ;                       RETURN
                ;PWRABN
                ;
                ;A,PSW DESTROYED
                ;REGISTERS DESTROYED
                ;
                ;ABNORMAL POWER-UP OF METER WHICH POWERED DOWN DURING
                ;SETTING OR TRIP CYCLE
                ;
                PWRABN;                 ****ENTRY POINT
018D 3A 24 74     LDA  MRSTS1/2+X       IF MRSTS1.QUEREG .EQ. TRUE
0190 1F           RAR
0191 D2 AA 01     JNC  PWRAB2
                ;                         POWERED DOWN DURING TRIP
0194 1F           RAR                     IF MRSTS1.INCYC .EQ. FALSE
0195 DA A7 01     JC   PWRAB1
                ;                           ACCOUNTING NOT COMPLETED
0198 CD 71 18     CALL SEKTRP               PREPARE TO TRIP
019B F3           DI                        DISABLE INTERRUPTS
019C CD 44 07     CALL DOACCT               DO ACCOUNTING
                ;                           INDICATE ACCOUNTING COMPLETE
019F 21 24 74     LXI  H,MRSTS1/2+X         HL = ADDRESS, MRSTS1
01A2 7E           MOV  A,M                  MRSTS1.INCYC = TRUE
01A3 F6 02        ORI  2
01A5 77           MOV  M,A
01A6 FB           EI                        ENABLE INTERRUPTS
                PWRAB1;                   ENDIF
01A7 C3 A0 08     JMP  FINTRP             COMPLETE TRIP CYCLE
                PWRAB2;                 ENDIF
                ;                       TRIP CYCLE COMPLETE
                ;                       PREPARE TO ZERO SET METER
01AA CD 4E 0F     CALL LSTATE           LSTATE(FATMOD,NORMOD,SERMOD,PRVMOD)
                ;                             (PSW:S ,PSW:Z ,PSW:P ,PSW:CY)
                ;                             ( 0    , 0    , 0    , 0    )
01AD F8           RM                    IF FATMOD .NE. TRUE
                ;                         METER IS HOME AND NOT DEAD
                ;                         DRIVE METER TO ZERO SETTING
01AE CD 25 16     CALL SEKPOS             SEKPOS(ERROR)
                ;                               ( A   )
                ;                               ( 0   )
01B1 B7           ORA  A                  IF ERROR .NE. 0
```

```
               ;                          DECLARE FATAL ERROR
01B2 C2 80 08   JNZ  FATERR               FATERR(ERROR,ERRFLG)
               ;                                 ( A   ,PSW:Z )
               ;                                 ( I   , 0    )
               ;                            ENDIF
               ;                          ENDIF
01B5 C9         RET                       RETURN
               ;PWRDN/PWRUP
               ;
               ;A,PSW DESTROYED
               ;REGISTERS DESTROYED
               ;
               ;ENFORCE ORDERLY POWER-UP AND POWER-DOWN
               ;
               PWRDN;                     ****ENTRY POINT
01B6 F3         DI                        DISABLE INTERRUPTS
               ;                          TURN OFF DEVICES ON PORTA AND PORTB
01B7 AF         XRA  A                    PORTB = HEX00
01B8 32 02 70   STA  PORTB
01BB 3D         DCR  A                    PORTA = HEXFF
01BC 32 01 70   STA  PORTA
01BF CD DE 0E   CALL DBLANK               CLEAR DISPLAY
               ;                          WRITE AND CLOSE ANY OPEN BLOCK
01C2 CD 9E 12   CALL NVMWR                NVMWR(ERRFLG)
               ;                               (PSW:Z )
               ;                               ( 0    )
               PWRUP;                     ****ENTRY POINT
               PWRU01;                    DO UNTIL INT6.5 .EQ. 0
01C5 20         RIM
01C6 07         RLC
01C7 07         RLC
01C8 07         RLC                         PSW:CY = INT6.5
               ;                            A.0  = INT5.5
01C9 DA C5 01   JC   PWRU01
                                          ENDDO
               ;                          POWER IS NOW FULLY ON
01CC B7         ORA  A                    PSW:S = INT5.5
               ;                          IF INT5.5 .EQ. TRUE
01CD FA 00 80   JM   TEST                   GO TO SPECIAL SERVICE ROUTINE
               ;                          ENDIF
               ; >>OMITTED<<              PULSE DEAD STICK TIMER
               ;                          INITIALIZE STACK POINTER
01D0 31 00 75   LXI  SP,7500H             SP = HEX7500
               ;                          INITIALIZE 8155 TIMER AND PORTS
01D3 3E 43      MVI  A,043H               CTLREG = HEX43
01D5 32 00 70   STA  CTLREG
               ;                          TIMER SET FOR REPETITIVE SQUARE WAVE
               ;                          PORTA = PORTB = 0; OUTPUT MODE SET
               ;                          PORTC; INPUT MODE SET
01D8 3E FF      MVI  A,0FFH               PORTA = HEXFF
01DA 32 01 70   STA  PORTA
               ;                          TEST AND CLEAR ALL OF RAM
               ;                          FILL 256 BYTES OF RAM WITH HEXAA
01DD 06 AA      MVI  B,0AAH               B = HEXAA
01DF 21 00 74   LXI  H,X                  HL = ADDRESS, X(I=0)
               PWRU02;                    DO UNTIL (ADDR,X(I)) .EQ. (ADDR,X(0))
01E2 70         MOV  M,B                    X(I) = HEXAA
01E3 2C         INR  L                      HL = ADDRESS, X(I=I+1)
01E4 C2 E2 01   JNZ  PWRU02
               ;                          ENDDO
               ;                          XOR 256 BYTES OF RAM WITH HEX55
01E7 06 55      MVI  B,55H                B = HEX55
               PWRU03;                    DO UNTIL (ADDR,X(I)) .EQ. (ADDR,X(0))
01E9 7E         MOV  A,M                    X(I) = X(I) .XOR. HEX55
01EA A8         XRA  B
01EB 77         MOV  M,A
01EC 2C         INR  L                      HL = ADDRESS, X(I=I+1)
01ED C2 E9 01   JNZ  PWRU03
               ;                          ENDDO
```

```
01F0 3E 0A      MVI  A,BADRAM          A = BADRAM
               ;                       INCREMENT AND TEST 256 BYTES OF RAM
               PWRU04;                 DO UNTIL (ADDR,X(I)) .EQ. (ADDR,X(0))
01F2 34         INR  M                   X(I) = X(I)+1
01F3 CA FC 01   JZ   PWRU05              IF X(I) .NE. 0
               ;                           DECLARE DEAD METER. BAD RAM
01F6 CD 85 10   CALL NVMDED                NVMDED(BADRAM,ERRFLG)
               ;                                  ( A     ,PSW:Z )
               ;                                  ( I     , 0    )
01F9 C3 00 02   JMP  PWRU06                BREAK
               PWRU05;                   ENDIF
01FC 2C         INR  L                   HL = ADDRESS, X(I=I+1)
01FD C2 F2 01   JNZ  PWRU04
               PWRU06;                 ENDDO
               ;                       READ SPECIAL NVM LOCATION
0200 3A BE 46   LDA  NVMRED+KILCOD A = NVMRED[KILCOD]
0203 3C         INR  A                 IF (A .GE. 10).AND.(A .LT. 15) = TRUE
0204 E6 0F      ANI  0FH
0206 FE 0B      CPI  11
0208 DA 0C 02   JC   PWRU07
               ;                         METER IS OUT OF SERVICE
020B 76         HLT                      HALT
               PWRU07;                 ENDIF
020C CD 6D 15   CALL INITSM            INITIALIZE STEPPER MOTORS
               ;                       FILL NVM DATA AREA WITH HEXFF
020F 01 00 48   LXI  B,((MTRCHR+1)-(FIXSED+0)+1)*100H+(FIXSED+0)
               ;                       B = NIBCNT; NVM DATA AREA
               ;                       C = OFFSET, FIXSED[0]
0212 3E FF      MVI  A,0FFH            A = HEXFF
0214 CD 24 0F   CALL FILNIB            FILNIB(FIXSED[0],HEXFF,NIBCNT)
               ;                             ( @C       , A    , B     )
               ;                             ( 0        , I    , I     )
               ;                       CLEAR DISPLAY IMAGE
0217 AF         XRA  A                 A = HEX00
0218 CD 22 03   CALL FILDIM            FILDIM(HEX00)
               ;                             ( A    )
               ;                             ( I    )
               ;                       ENABLE INTERRUPT 6.5
021B 3E 0D      MVI  A,0DH             INTMSK = HEX0D
021D 30         SIM
021E CD 6B 11   CALL NVMLOD            LOAD AND CHECK NON VOLATILE MEMORY
               ;                       CHECK METER STATUS
0221 CD 4E 0F   CALL LSTATE            LSTATE(FATMOD,NORMOD,SERMOD,PRVMOD)
               ;                             (PSW:S ,PSW:Z ,PSW:P ,PSW:CY)
               ;                             ( 0    , 0    , 0    , 0     )
0224 FA 45 02   JM   PWRU09            IF FATMOD .EQ. FALSE
               ;                         NVM LOADED OK
               ;                         DEFINE DECIMAL POSITIONS ON DIE
0227 3A 23 74   LDA  MTRCHR/2+X          A = MTRCHR
022A E6 03      ANI  3                   DIEDCM = MTRCHR .AND. HEX03
022C 32 35 74   STA  DIEDCM/2+X
               ;                         DEFINE DEFAULT DECIMAL POSITION
022F E6 02      ANI  2                   DEFDCM = DIEDCM .AND. HEX02
0231 32 36 74   STA  DEFDCM/2+X
               ;                         CHECK NVM STATUS
0234 21 45 02   LXI  H,PWRU08            SET TO RETURN TO ENDIF
0237 E5         PUSH H
0238 3A BE 46   LDA  NVMRED+KILCOD       A = CODE = NVMRED[KILCOD]
023B E6 0F      ANI  0FH
023D FE 0F      CPI  0FH                 IF NVMRED[KILCOD] .EQ. HEX0F
023F CA 9B 02   JZ   PWRUOK                CONTINUE NORMAL INITIALIZATION
               ;                         ELSE
               ;                           CONTINUE FATAL INITIALIZATION
0242 C2 83 02   JNZ  PWRUNG                PWRUNG(CODE)
               ;                                  ( A  )
               ;                                  ( I  )
               PWRU08;                   ENDIF
               PWRU09;                 ENDIF
```

```
                  ;                     RECHECK METER STATUS
0245 CD 4E 0F      CALL LSTATE          LSTATE(FATMOD,NORMOD,SERMOD,PRVMOD)
                  ;                           (PSW:S ,PSW:Z ,PSW:P ,PSW:CY)
                  ;                           ( 0    , 0    , 0    , 0    )
0248 F2 50 02      JP   PWRU10          IF FATMOD .EQ. TRUE
                  ;                       TURN ON SENSOR LEDS FOR SERVICE CHECK
024B 3E DF         MVI  A,0DFH            PORTA = HEXDF
024D 32 01 70      STA  PORTA
                  PWRU10;               ENDIF
                  ;                     INITIALIZE DEBOUNCE COUNTER
0250 3E 01         MVI  A,1             DBCTR = 1
0252 32 2E 74      STA DBCTR/2+X
0255 C3 7E 09      JMP  IDLE            ENTER IDLE STATE
                  ;PWRNOR
                  ;
                  ;A,PSW DESTROYED
                  ;REGISTERS DESTROYED
                  ;
                  ;CONTINUE POWER-UP FOR NORMAL SITUATION THAT POWER-DOWN
                  ;OCCURRED WHEN METER WAS HOME
                  ;
                  PWRNOR;               ****ENTRY POINT
                  ;                     SET METER TO ALL NINES
0258 21 24 74      LXI  H,MRSTS1/2+X    HL = ADDRESS, MRSTS1
025B 7E            MOV  A,M             MRSTS1.UNKSEL = TRUE
025C F6 80         ORI  80H
025E 77            MOV  M,A
025F 01 CC 04      LXI  B,NBANKS*100H+(WORK1+16-NBANKS)
                  ;                     B = NIBCNT = NBANKS
                  ;                     C = OFFSET, WORK1[I=16-NBANKS]
0262 3E 09         MVI  A,9             A = HEX09
0264 CD 24 0F      CALL FILNIB          FILNIB(WORK1[I],HEX09,NIBCNT)
                  ;                           ( @C      , A   , B    )
                  ;                           ( 0       , I   , I    )
0267 CD 25 1A      CALL MVPOST          MVPOST(ERROR)
                  ;                           ( A   )
                  ;                           ( 0   )
026A B7            ORA  A               IF ERROR .NE. 0
                  ;                       SETTING ERROR IS FATAL
026B C2 80 08      JNZ  FATERR            FATERR(ERROR,ERRFLG)
                  ;                             ( A   ,PSW:Z )
                  ;                             ( I   , 0    )
                  ;                     ELSE
                  ;                       UPDATE BUFFER TO AGREE WITH SETTING
026E 01 42 04      LXI  B,NBANKS*100H+POSREG
                  ;                       B = NIBCNT = NBANKS
                  ;                       C = OFFSET, POSREG
0271 3E 09         MVI  A,9               A = HEX09
0273 CD 24 0F      CALL FILNIB            FILNIB(POSREG,HEX09,NIBCNT)
                  ;                             ( @C .  , A   , B    )
                  ;                             ( 0     , I   , I    )
                  ;                       SET METER TO ALL ZEROES
0276 3E C0         MVI  A,WORK1           A = OFFSET, WORK1
0278 CD 85 0E      CALL CLRBLK            CLRBLK(WORK1)
                  ;                             ( @A  )
                  ;                             ( 0   )
027B CD 25 1A      CALL MVPOST            MVPOST(ERROR)
                  ;                             ( A   )
                  ;                             ( 0   )
027E B7            ORA  A                 IF ERROR .NE. 0
                  ;                         SETTING ERROR IS FATAL
027F C2 80 08      JNZ  FATERR              FATERR(ERROR,ERRFLG)
                  ;                               ( A   ,PSW:Z )
                  ;                               ( I   , 0    )
                  ;                       ENDIF
                  ;                     ENDIF
0282 C9            RET                  RETURN
```

```
                ;PWRUNG(CODE  )
                ;      (NIBBLE)
                ;      ( I    )
                ;      ( A    )
                ;      ( C    )
                ;
                ;A,PSW DESTROYED
                ;REGISTERS CHANGED
                ;
                ;HANDLE POWER-UP OF METER PREVIOUSLY DECLARED DEAD
                ;
                PWRUNG;             ****ENTRY POINT
0283 F5           PUSH PSW          SAVE A,PSW
                ;                   DECLARE FATAL ERROR
                ;                   FLAG METER DEAD
0284 47           MOV  B,A          B = CODE
0285 CD 99 10     CALL NVMDE1       NVMDE1(CODE,ERRFLG)
                ;                         ( B   ,PSW:Z )
                ;                         ( I   , O    )
0288 F1           POP  PSW          RESTORE A,PSW
0289 FE 03        CPI  FATRST       IF CODE .EQ. FATRST
028B C0           RNZ
                ;                     FAILED WHILE CLEARING DESC REGISTER
                ;                     CLEAR DESCENDING REGISTER
028C 01 2F 07     LXI  B,DSCSIZ*100H+DSCREG
                ;                     B = NIBCNT = DSCSIZ
                ;                     C = OFFSET, DSCREG
028F AF           XRA  A              A = HEX00
0290 CD 24 0F     CALL FILNIB         FILNIB(DSCREG,HEX00,NIBCNT)
                ;                            ( @C    , A    , B     )
                ;                            ( O     , I    , I     )
                ;                     UPDATE CRC
0293 CD B1 0E     CALL CRC            CRC(DSCREG,NIBCNT,CRCVAL)
                ;                        ( @C    , B     , D     )
                ;                        ( I     , I     , O     )
0296 7A           MOV  A,D            DSCCRC = CRCVAL
0297 32 1B 74     STA  DSCCRC/2+X
                ;                   ENDIF
029A C9           RET               RETURN
                ;PWRUOK
                ;
                ;A,PSW DESTROYED
                ;REGISTERS DESTROYED
                ;
                ;CONTINUATION OF SUCCESSFUL POWER-UP SEQUENCE
                ;
                PWRUOK;             ****ENTRY POINT
                ;                   OPEN NORMAL NVM BLOCK
029B CD C4 11     CALL NVMOPN       NVMOPN(ERRFLG)
                ;                         (PSW:Z )
                ;                         ( O    )
029E C8           RZ                IF ERRFLG .EQ. FALSE
                ;                     NVM BLOCK IS NOW OPEN
029F 21 AD 02     LXI  H,PWRU01       SET TO RETURN TO ENDIF
02A2 E5           PUSH H
02A3 3A 24 74     LDA  MRSTS1/2+X     IF MRSTS1.UNKSEL .EQ. TRUE
02A6 B7           ORA  A
                ;                       POWERED DOWN DURING SETTING OR TRIP
02A7 FA 8D 01     JM   PWRABN           PERFORM ABNORMAL POWER-UP
                ;                     ELSE
02AA F2 58 02     JP   PWRNOR           PERFORM NORMAL POWER-UP
                PWRU01;               ENDIF
                ;                     CHECK METER STATUS
02AD CD 4E 0F     CALL LSTATE         LSTATE(FATMOD,NORMOD,SERMOD,PRVMOD)
                ;                            (PSW:S ,PSW:Z ,PSW:P ,PSW:CY)
                ;                            ( O    , O    , O    , O    )
02B0 FA C1 02     JM   PWRU02         IF FATMOD .EQ. FALSE
                ;                       POWER-UP COMPLETED
```

```
                  ;                        CONTINUE WITH INITIALIZATION
                  ;                        CLEAR POSTAGE REGISTER
02B3 01 42 04      LXI  B,NBANKSA100H+POSREG
                  ;                        B = NIBCNT = NBANKS
                  ;                        C = OFFSET, POSREG
02B6 AF            XRA  A                  A = HEX00
02B7 CD 24 0F      CALL FILNIB             FILNIB(POSREG,HEX00,NIBCNT)
                  ;                              ( @C    , A    , B     )
                  ;                              ( O     , I    , I     )
                  ;                        REGISTER NOW MATCHES SETTING
02BA 21 24 74      LXI  H,MRSTS1/2+X       HL = ADDRESS, MRSTS1
02BD 7E            MOV  A,M                MRSTS1.UNKSEL = FALSE
02BE E6 7F         ANI  7FH
02C0 77            MOV  M,A
                  PWRU02;                ENDIF
                  ;                      CHECK MEMORY RETENTION OF NVM
02C1 3A FE 44      LDA  NVMRED+RETAIN    A = NVMRED[RETAIN]
02C4 E6 0F         ANI  0FH
02C6 FE 0A         CPI  0AH              IF NVMRED[RETAIN] .NE. HEX0A
02C8 CA DE 02      JZ   PWRU04
                  ;                        MEMORY IS FAILING
02CB 21 10 74      LXI  H,SERFLG/2+X       HL = ADDRESS, SERFLG
02CE 7E            MOV  A,M                IF SERFLG.WEKNVM .EQ. FALSE
02CF E6 20         ANI  20H
02D1 C2 DE 02      JNZ  PWRU03
                  ;                          SERFLG.WEKNVM NOT SET IN NVM
02D4 7E            MOV  A,M                  SERFLG.WEKNVM = TRUE
02D5 F6 20         ORI  20H
02D7 77            MOV  M,A
                  ;                          WRITE NORMAL BLOCK
                  ;                          LEAVE NO BLOCKS OPEN
02D8 CD 9E 12      CALL NVMWR                NVMWR(ERRFLG)
                  ;                                (PSW:Z )
                  ;                                ( O    )
                  ;                          WRITE NEW SERVICE BLOCK
                  ;                          OPEN ERASED NORMAL BLOCK
02DB CD 19 12      CALL NVMSTO               NVMSTO(ERRFLG)
                  ;                                 (PSW:Z )
                  ;                                 ( O    )
                  PWRU03;                  ENDIF
                  PWRU04;                ENDIF
02DE CD 47 10      CALL NVM30I           TURN ON -30V FOR NVM
                  ;                      START ERASING RETENTION LOCATION
02E1 32 FE 40      STA  NVMERS+RETAIN    NVMERS[RETAIN] = A
                  ;                      PAUSE FOR 10 MSEC
02E4 01 64 00      LXI  B,100            BC = LOOPCT = 100
                  PWRU05;                DO UNTIL LOOPCT .EQ. 0
02E7 CD 19 0B      CALL NPAUSE             NPAUSE(LOOPCT,ZROFLG)
                  ;                              ( BC   ,PSW:Z )
                  ;                              ( I/O  , O    )
02EA C2 E7 02      JNZ. PWRU05
                  ;                      ENDDO
                  ;                      TERMINATE ERASURE
02ED 3A FE 44      LDA  NVMRED+RETAIN    A[1] = NVMRED[RETAIN] = GARBAGE
                  ;                      CHECK ERASURE
02F0 3A FE 44      LDA  NVMRED+RETAIN    A[1] = NVMRED[RETAIN]
02F3 F6 F0         ORI  0F0H             A[0] = HEXF
02F5 3C            INR  A                PSW:Z=ERASED=NVMRED[RETAIN].EQ.HEXF
02F6 3E 01         MVI  A,NVMBAD         A = NVMBAD
                  ;                      IF ERASED .EQ. FALSE
                  ;                        DECLARE DEAD METER. BAD NVM.
02F8 C2 85 10      JNZ  NVMDED             NVMDED(NVMBAD,ERRFLG)
                  ;                              ( A    ,PSW:Z )
                  ;                              ( I    , O    )
                  ;                      ENDIF
                  ;                      WRITE HEX0A INTO RETENTION LOCATION
02FB 21 FE 00      LXI  H,RETAIN         HL = BASE = ADDRESS, RETAIN
02FE 3E 0A         MVI  A,0AH            A = HEX0A
```

```
0300 CD 61 12   CALL NVMWN          NVMWN(HEXOA,BASE,ERRFLG)
               ;                         ( A[1], HL ,PSW:Z )
               ;                         ( I    , I  , O    )
0303 C3 31 10   JMP  NVM30F          TURN OFF -30 V TO NVM
               ;                   ENDIF
               ;                   RETURN
               ;CDBUF/CDBUFC/CDBUFD()(DBUF   )
               ;                    (NIBSTR)
               ;                    ( I/O  )
               ;                    ( RAM  )
               ;                    ( C    )
               ;
               ;PSW:S, Z, P, CY = NO CHANGE
               ;
               ;------------------------------------------------------
               ;                   DISABLE METER AND CLEAR DBUF ONLY ON
               ;                   CONDITION THAT DISPLAYED VALUE WAS
               ;                   NOT ENTERED FROM KEYBOARD
               ;
               CDBUFC;             ****ENTRY POINT
0306 F5          PUSH PSW          SAVE A, PSW
               ;                   CHECK FOR KEY ENTERED DISPLAY
0307 3A 40 74    LDA  DBUF/2+X     A = DBUF[0..1]
030A B7          ORA  A            IF DBUF[0..1] .EQ. HEX00
030B CA 20 03    JZ   CDBUF1
               ; >>JUMP AHEAD<<
               ;                     DISPLAY WAS KEY ENTERED
               ;                     RESTORE A, PSW
               ;                     RETURN
               ;                   ENDIF
030E F1          POP  PSW          RESTORE A, PSW
               ;------------------------------------------------------
               ;                   DISABLE METER AND CLEAR DISPLAY BUFFER
               ;
               CDBUFD;             ****ENTRY POINT
030F F5          PUSH PSW          SAVE A, PSW
               ;                   DISABLE METER
0310 3E 42       MVI  A,HDISAB     A = HDISAB
0312 CD C7 0D    CALL XEQHDR       XEQHDR(HDISAB,ERROR)
               ;                         ( A    ,PSW:Z)
               ;                         ( I    , O   )
0315 F1          POP  PSW          RESTORE A, PSW
               ;------------------------------------------------------
               ;                   CLEAR DISPLAY BUFFER
               ;
               CDBUF;              ****ENTRY POINT
0316 F5          PUSH PSW          SAVE A, PSW
               ;                   SET DBUF HEADER TO KEY ENTRY
0317 AF          XRA  A            A = HEX00
0318 32 40 74    STA  DBUF/2+X     OUTPUT DBUF[0..1] = HEX00
               ;                   SET DBUF FORMAT FOR NUL MESSAGE
031B 3E 0F       MVI  A,0FH        DBUF[2..3] = HEX0F
031D 32 41 74    STA  DBUF/2+X+1
               CDBUF1;             >>TARGET OF JUMP AHEAD<<
0320 F1          POP  PSW          RESTORE A, PSW
0321 C9          RET               RETURN
               ;FILDIM(VALUE )(DIMAGE)
               ;      (UBYTE )(BITSTR)
               ;      ( I    )( O    )
               ;      ( A    )( RAM  )
               ;      ( NC   )( C    )
               ;
               ;PSW DESTROYED
               ;REGISTERS DESTROYED
               ;
               ;FILL DISPLAY IMAGE BUFFER WITH VALUE
               ;
               FILDIM;              ****ENTRY POINT
```

```
                   ;                  SET TO FILL (NDISPA4) BYTES
0322 06 07           MVI  B,NDISPA4-1   B = BYTNO = NDISPA4-1
0324 21 87 74        LXI  H,DIMAGE/2+Y+NDISPA4-1
                   ;                  HL = ADDRESS, DIMAGE[BYTNO]
                   FILDI1;            DO UNTIL BYTNO .LT. 0
0327 77              MOV  M,A           DIMAGE[BYTNO] = VALUE
0328 05              DCR  B             BYTNO = BYTNO-1
0329 2B              DCX  H             HL = ADDRESS, DIMAGE[BYTNO]
032A F2 27 03        JP   FILDI1        TEST BYTNO
                   ;                  ENDDO
032D C9              RET              RETURN
                   ;KEYBRD()(NORFLG,CTLBKT,CHRBKT,KDCTRL,DSPTMR,CURBKT)
                   ;        (BITSTR,BYTE  ,BYTE  ,BITSTR,UBYTE ,BYTE  )
                   ;        ( I    , I    , I/O  , I    , I    , O     )
                   ;        ( RAM  , RAM  , RAM  , RAM  , RAM  , RAM   )
                   ;        ( NC   , NC   , C    , NC   , NC   , C     )
                   ;
                   ;PSW AND REGISTERS DESTROYED
                   ;
                   ;SAMPLES INTERRUPT LEVEL KEYCODE BUCKETS.  DEFINES A
                   ;STABLE KEYCODE BUCKET FOR APPLICATION USE.  INITIATES
                   ;PROCESSING OF KEYPRESS.  UPDATES DISPLAY TO CONFORM TO
                   ;METER STATUS.  INITIATES END OF ENTRY PROCESSING.
                   ;
                   KEYBRD;            AAAAENTRY POINT
032E 3A 27 74        LDA  KDCTRL/2+X  IF (KDCTRL.KBDDSB .EQ. FALSE) .AND.
0331 1F              RAR                ((NORFLG.CMBIN .AND. NORFLG.AMTIN).EQ.
0332 DA 4A 03        JC   KEYB01        TRUE)
0335 3A 26 74        LDA  NORFLG/2+X
0338 E6 30           ANI  30H
033A FE 30           CPI  30H
033C C2 4A 03        JNZ  KEYB01
033F CD DE 0E        CALL DBLANK        BLANK DISPLAY
                   ;                    EXECUTE END OF ENTRY
0342 3E 43           MVI  A,HENDEN      A = HENDEN
0344 CD C7 0D        CALL XEQHDR        XEQHDR(HENDEN,ERROR)
                   ;                           ( A    ,PSW:Z)
                   ;                           ( I    , O    )
0347 C3 8C 03        JMP  KEYB09
                   KEYB01;            ELSE
                   ;                    READ INTERRUPT BUCKETS TOGETHER
034A 2A 2B 74        LHLD CTLBKT/2+X
034D EB              XCHG               E = CTLBKT
                   ;                    D = CHRBKT
034E 1C              INR  E             IF CTLBKT .EQ. HEX00
034F 1D              DCR  E
0350 C2 78 03        JNZ  KEYB06
                   ;                      NO KEY IS DOWN
0353 21 27 74        LXI  H,KDCTRL/2+X    HL = ADDRESS, KDCTRL
0356 7E              MOV  A,M             A = KDCTRL
0357 E6 20           ANI  20H             IF KDCTRL.TIMED .EQ. TRUE
0359 CA 75 03        JZ   KEYB05
                   ;                        CURRENT DISPLAY IS TIMED
035C 3A 29 74        LDA  DSPTMR/2+X        A = DSPTMR
035F 3D              DCR  A                 IF DSPTMR .EQ. 1
0360 C2 75 03        JNZ  KEYB04
                   ;                          DISPLAY TIME IS UP
                   ;                          REVERT TO POSTAGE DISPLAY
                   ;                          CHECK FOR FATAL ERROR
0363 CD 4E 0F        CALL LSTATE              LSTATE(FATAL,NORM,SERV,PRIV)
                   ;                                (PSW:S, :Z , :P , :C )
                   ;                                ( O   , O  , O  , O  )
0366 F2 70 03        JP   KEYB02              IF FATAL .EQ. TRUE
                   ;                            SET FOR FATAL SETTING DISPLY
0369 7E              MOV  A,M                   KDCTRL.STGDSP = TRUE
036A F6 80           ORI  80H
036C 77              MOV  M,A
036D C3 75 03        JMP  KEYB03
```

```
                 KEYB02;                          ELSE
                  ;                                 MAKE NORMAL SETTING DISPLAY
0370 3E 51         MVI  A,HREQPO                    A = HREQPO
0372 CD C7 0D      CALL XEQHDR                      XEQHDR(HREQPO,ERROR)
                  ;                                        ( A     ,PSW:Z)
                  ;                                        ( I     , O    )
                 KEYB03;                          ENDIF
                 KEYB04;                        ENDIF
                 KEYB05;                      ENDIF
0375 C3 8C 03      JMP  KEYB08
                 KEYB06;                    ELSE
                  ;                           KEYS ARE DOWN
                  ;                           RESTART DISPLAY TIMER
0378 3E 07         MVI  A,DSPVAL                DSPTMR = DSPVAL
037A 32 29 74      STA  DSPTMR/2+X
037D 7A            MOV  A,D                   A = CHRBKT
037E B7            ORA  A                     IF CHRBKT .NE. HEX00
037F CA 8C 03      JZ   KEYB07
                  ;                             A SINGLE UNPROCESSED KEY IS DOWN
                  ;                             DEFINE A STABLE KEYBUCKET
0382 32 2D 74      STA  CURBKT/2+X              CURBKT = CHRBKT
                  ;                             PREVENT REPROCESSING KEYPRESS
0385 AF            XRA  A                       CHRBKT = NOKEY
0386 32 2C 74      STA  CHRBKT/2+X
0389 CD CE 04      CALL PROKEY                  PROCESS KEYPRESS
                 KEYB07;                      ENDIF
                 KEYB08;                    ENDIF
                 KEYB09;                  ENDIF
038C 3A 26 74      LDA  NORFLG/2+X        IF NORFLG.QUEPOS .EQ. TRUE
038F E6 40         ANI  40H
0391 C0            RNZ                      RETURN
                  ;                       ELSE
0392 CD A0 03      CALL MODDSP              MODIFY DISPLAY TO MATCH METER STATUS
                  ;                         START KEYBOARD/DISPLAY INTERRUPTS
0395 21 A7 00      LXI  H,KDIO              HL = ADRESS = ADDRESS, KDIO
0398 3E 02         MVI  A,KDSKIP            A = KDSKIP
039A 11 96 4C      LXI  D,KEYINT            DE = KEYINT
039D C3 53 01      JMP  STRTMR              STRTMR(ADRESS,KDSKIP,KEYINT,WASOFF)
                  ;                                ( HL    , A    , DE   ,PSW:Z )
                  ;                                ( I     , I    , I    , O    )
                  ;                         RETURN
                  ;                       ENDIF
                  ;MODDSP()(DIMAGE, MRSTS1, KDCTRL)
                  ;        (BYTSTR, BITSTR, BITSTR)
                  ;        (  O   ,   I   ,   O   )
                  ;        ( RAM  ,  RAM  ,  RAM  )
                  ;        (  C   ,  NC   ,   C   )
                  ;
                  ;ALL REGISTERS CHANGED
                  ;PSW: S, Z, P, CY CHANGED
                  ;
                  ;UPDATE DISPLAY CONTROL FLAGS AND DISPLAY IMAGE
                  ;TO REFLECT CURRENT METER STATUS
                  ;
                 MODDSP;                  ****ENTRY POINT
                  ;                        CHECK DISPLAY TYPE
03A0 21 27 74      LXI  H,KDCTRL/2+X      HL = ADDRESS, KDCTRL
03A3 7E            MOV  A,M               A = KDCTRL
03A4 E6 BB         ANI  0BBH              A.FLSDSP = FALSE
                  ;                       A.FLSDCM = FALSE
                  ;                       PSW:S = KDCTRL.STGDSP
03A6 FA AD 03      JM   MODD01            IF KDCTRL.STGDSP .EQ. FALSE
                  ;                         SETTING NOT ON DISPLAY
                  ;                         PREVENT FLASHING DISPLAY
03A9 77            MOV  M,A                 KDCTRL.FLSDSP = FALSE
                  ;                         KDCTRL.FLSDCM = FALSE
03AA C3 FF 03      JMP  MODD07
                 MODD01;                  ELSE
```

```
                       ;                        SETTING IS ON DISPLAY
                       ;                        DECIDE WHETHER TO FLASH DISPLAY
     03AD 3A 24 74      LDA  MRSTS1/2+X         B = MRSTS1
     03B0 47            MOV  B,A
                       ;                        D.DATDOR = D.0 = MRSTS1.DATDOR
                       ;                        E.FLSDSP = E.1 = MRSTS1.DATDOR .OR.
                       ;                                         MRSTS1.INSFND
                       ;                        E.FLSDCM = E.5 = MRSTS1.LOWPOS
     03B1 E6 70         ANI  70H
     03B3 57            MOV  D,A
     03B4 0F            RRC
     03B5 0F            RRC
     03B6 B2            ORA  D
     03B7 57            MOV  D,A
     03B8 07            RLC
     03B9 B2            ORA  D
     03BA 57            MOV  D,A
     03BB E6 44         ANI  44H
     03BD 5F            MOV  E,A
                       ;                        KDCTRL.FLSDSP = E.FLSDSP
                       ;                        KDCTRL.FLSDCM = E.FLSDCM
     03BE 21 27 74      LXI  H,KDCTRL/2+X
     03C1 7E            MOV  A,M
     03C2 E6 BB         ANI  0BBH
     03C4 B3            ORA  E
     03C5 77            MOV  M,A
                       ;                        DETERMINE METER STATUS
     03C6 CD 4E 0F      CALL LSTATE             LSTATE(FATMOD,NORMOD,SERMOD,PRVMOD)
                       ;                              (PSW:S ,PSW:Z ,PSW:P ,PSW:CY)
                       ;                              ( 0    , 0    , 0    , 0     )
     03C9 FA F5 03      JM   MODD04             IF FATMOD .EQ. FALSE
                       ;                          METER NOT FATAL
                       ;                          TURN DATER DOOR LAMP ON OR OFF
     03CC 21 80 74      LXI  H,DIMAGE/2+Y         HL = ADDRESS, DIMAGE
     03CF 7E            MOV  A,M                  A = DIMAGE
     03D0 E6 FD         ANI  0FDH                 A.DATLMP = FALSE
     03D2 14            INR  D                    PSW:S = D.DATDOR
     03D3 F2 D8 03      JP   MODD02               IF D.DATDOR .EQ. TRUE
     03D6 F6 02         ORI  2                      A.DATLMP = TRUE
                       MODD02;                    ENDIF
     03D8 77            MOV  M,A                  DIMAGE = A
                       ;                          SELECT WING TYPE
     03D9 16 02         MVI  D,02H                D = WING, DISABLED
     03DB 3E 04         MVI  A,04H                A = MRSTS1.ENABLD
     03DD A0            ANA  B
     03DE CA E3 03      JZ   MODD03               IF MRSTS1.ENABLD .EQ. TRUE
     03E1 16 92         MVI  D,92H                  D = WING, ENABLED
                       MODD03;                    ENDIF
                       ;                          INSERT RIGHT HAND WING
     03E3 21 87 74      LXI  H,DIMAGE/2+Y+(NDISP*4-1)
                       ;                          HL = ADDRESS, DIMAGE[(NDISP*4-1)]
     03E6 72            MOV  M,D                  DIMAGE[(NDISP*4-1)] = WING
                       ;                          INSERT LEFT HAND WING
     03E7 06 82         MVI  B,DBUF+2             B = OFFSET, DBUF[2]
     03E9 CD 35 0F      CALL GETNIB               GETNIB(NCHAR,ZERO ,DBUF[2])
                       ;                                 ( A    ,PSW:Z, @B     )
                       ;                                 ( 0    , 0   , I      )
     03EC 2F            CMA                       BC = -NCHAR-1
     03ED 4F            MOV  C,A
     03EE 06 FF         MVI  B,0FFH
     03F0 09            DAD  B                    HL = ADDRESS,
                       ;                          DIMAGE[(NDISP*4-2)-NCHAR]
     03F1 72            MOV  M,D                  DIMAGE[(NDISP*4-2)-NCHAR] = WING
     03F2 C3 FF 03      JMP  MODD06
                       MODD04;                  ELSE
                       ;                          METER IS FATAL
                       ;                          SET TO DISPLAY ALL DECIMALS
     03F5 3E 01         MVI  A,01H                A = DECBIT = HEX01
     03F7 E2 FC 03      JPO  MODD05               IF SERMOD .EQ. TRUE
```

```
                  ;                          SET TO DISPLAY DECIMALS+DASHES
03FA 3E 11          MVI  A,11H               A = DECBIT = HEX11
                  MODD05;                  ENDIF
03FC CD 22 03       CALL FILDIM              FILDIM(DECBIT)
                  ;                              ( A     )
                  ;                              ( I     )
                  MODD06;                 ENDIF
                  MODD07;                ENDIF
                  ;                      BUILD SERVICE/NORMAL MODE EDIT MASK
03FF AF             XRA  A               A = MASK, BLANK
0400 CD 4E 0F       CALL LSTATE          LSTATE(FATMOD,NORMOD,SERMOD,PRVMOD)
                  ;                          (PSW:S ,PSW:Z ,PSW:P ,PSW:CY)
                  ;                          ( 0    , 0    , 0    , 0    )
0403 E2 08 04       JPO  MODD08          IF SERMOD .EQ. TRUE
0406 3E 10          MVI  A,10H             A = MASK, UNDERSCORE
                  MODD08;                ENDIF
0408 4F             MOV  C,A             C = MASK
                  ;                      EDIT MASK INTO DISPLAY
0409 06 07          MVI  B,(NDISPA4-1) B = DISPNO = (NDISPA4-1)
040B 21 B7 74       LXI  H,DIMAGE/2+Y+(NDISPA4-1)
                  ;                      HL = ADDRESS, DIMAGE[DISPNO]
                  MODD09;                FOR DISPNO = (NDISPA4-1) DOWNTO 0
040E 7E             MOV  A,M               IF(DIMAGE[DISPNO] .AND. HEXEE).EQ.0
040F E6 EE          ANI  0EEH
0411 C2 19 04       JNZ  MODD10
                  ;                          COPY MASK INTO DISPLAY
0414 7E             MOV  A,M                 A = IMAGE = DIMAGE[DISPNO]
0415 E6 EF          ANI  0EFH                IMAGE = IMAGE, WITHOUT UNDERSCORE
0417 B1             ORA  C                   IMAGE = IMAGE, WITH EDIT MASK
0418 77             MOV  M,A                 DIMAGE[DISPNO] = IMAGE
                  MODD10;                  ENDIF
0419 05             DCR  B                 B = DISPNO = DISPNO-1
041A 2B             DCX  H                 HL = ADDRESS, DIMAGE[DISPNO]
041B F2 0E 04       JP   MODD09            TEST DISPNO
                  ;                      ENDFOR
041E C9             RET                  RETURN
                  ;PAUTHK()(DBUF  ,NORFLG)
                  ;         (NIBSTR,BITSTR)
                  ;         ( I    , I     )
                  ;         ( RAM  , RAM   )
                  ;
                  ;PSW DESTROYED
                  ;REGISTERS DESTROYED
                  ;
                  ;PROCESS AUTHORIZATION KEY
                  ;
                  PAUTHK;                AAAAENTRY POINT
                  ;                      TEST DISPLAY HEADER
041F 21 40 74       LXI  H,DBUF/2+X      HL = ADDRESS, DBUF[0..1]
0422 7E             MOV  A,M             A = DHEAD = DBUF[0..1]
0423 B7             ORA  A               PSW:Z = KEYDAT = DHEAD .EQ. 0
                  ;                      DEFINE REQUEST HEADER
0424 3E 40          MVI  A,HREQAC        A = RHEAD = HREQAC
                  ;                      IF KEYDAT .EQ. FALSE
                  ;                        NO KEYENTERED DATA IN DISPLAY
                  ;                        REQUEST AUTHORIZATION CODE
0426 C2 C7 0D       JNZ  XEQHDR            XEQHDR(RHEAD,ERRFLG)
                  ;                            ( A    ,PSW:Z )
                  ;                            ( I    , 0    )
                  ;                      ELSE
0429 23             INX  H               HL = ADDRESS, DBUF[2..3]
042A 7E             MOV  A,M             A = FORMAT = DBUF[2..3]
042B FE 4F          CPI  4FH             IF FORMAT .NE. HEX4F
                  ;                        DISPLAY NOT 4 CHAR WITHOUT DECIMAL
                  ;                        DECLARE PROCEDURAL ERROR
042D C2 A1 0B       JNZ  PROERR            PROERR(ERRFLG)
                  ;                            (PSW:Z )
                  ;                            ( 0    )
```

```
                 ;                        ELSE
0430 23           INX  H                  HL = ADDRESS, DBUF[4..5]
0431 7E           MOV  A,M                A = CODE = DBUF[4..5]
0432 FE 69        CPI  69H                IF CODE .NE. HEX69
                 ;                          FIRST 2 CHARACTERS IN DISPLAY NOT 69
                 ;                          DECLARE PROCEDURAL ERROR
0434 C2 A1 0B     JNZ  PROERR               PROERR(ERRFLG)
                 ;                                (PSW:Z )
                 ;                                ( 0    )
                 ;                        ELSE
                 ;                          ISSUE LAST 2 CHARACTERS OF DISPLAY
                 ;                          AS REQUEST HEADER
0437 23           INX  H                    HL = ADDRESS, DBUF[6..7]
0438 7E           MOV  A,M                  A = RHEAD = DBUF[6..7]
0439 CD C7 0D     CALL XEQHDR               XEQHDR(RHEAD,ERRFLG)
                 ;                                ( A   ,PSW:Z )
                 ;                                ( I   , 0    )
                 ;                          TEST THE REQUEST HEADER
043C FE 46        CPI  HSETSV               IF RHEAD .EQ. HSETSV
043E C0           RNZ
                 ;                            SERVICE MODE ENTERED VIA KEYBOARD
                 ;                            DISABLE COMMUNICATIONS
043F 21 26 74     LXI  H,NORFLG/2+X           HL = ADDRESS, NORFLG
0442 7E           MOV  A,M                    NORFLG.COMDSB = TRUE
0443 F6 04        ORI  04H
0445 77           MOV  M,A
                 ;                          ENDIF
                 ;                        ENDIF
0446 C9           RET                     RETURN
                 ;PCLRK
                 ;
                 ;PSW:S, Z, P, CY = NO CHANGE
                 ;
                 ;PROCESS CLEAR KEY
                 ;
                 PCLRK;                  ****ENTRY POINT
0447 CD 06 03     CALL CDBUFC            IF DISPLAY WAS NOT KEY ENTERED
                 ;                         DISABLE METER
                 ;                         CLEAR DISPLAY BUFFER
                 ;                       ENDIF
044A CD 16 03     CALL CDBUF             CLEAR DISPLAY BUFFER
044D C3 5A 05     JMP  VALDSP            DISPLAY VALUE IN DBUF
                 ;                       RETURN
                 ;PDCMK()(DBUF  )
                 ;       (NIBSTR)
                 ;       ( I/O  )
                 ;       ( RAM  )
                 ;       ( C    )
                 ;
                 ;PSW AND REGISTERS DESTROYED
                 ;
                 ;PROCESS DECIMAL KEY
                 ;
                 PDCMK;                  ****ENTRY POINT
                 ;                       CHECK FOR NON KEYENTRY DISPLAY
                 ;                       IF DBUF[0..1] .NE. HEX00
0450 CD 06 03     CALL CDBUFC              PUT NUL MESSAGE IN DBUF
                 ;                         DISABLE METER
                 ;                       ENDIF
                 ;                       CHECK THAT DECIMAL NOT ALREADY ENTERED
0453 01 83 83     LXI B,(DBUF+3)*100H+DBUF+3
                 ;                       B = OFFSET, DBUF[3]
                 ;                       C = OFFSET, DBUF[3]
0456 CD 35 0F     CALL GETNIB            GETNIB(DECPOS,ZERO ,DBUF[3])
                 ;                             ( A    ,PSW:Z, @B     )
                 ;                             ( 0    , 0   , I      )
0459 D6 0F        SUI  0FH               IF DECPOS .EQ. HEX0F
045B C2 61 04     JNZ  PDCMK1
```

```
                   ;                      A = DECPOS = 0, RIGHTMOST POSITION
                   ;                      OUTPUT DECPOS
045E CD EE 0F       CALL PUTNIB           PUTNIB(DBUF[3],DECPOS)
                   ;                            ( @C    , A    )
                   ;                            ( O     , I    )
                   PDCMK1;               ENDIF
0461 C3 5A 05       JMP  VALDSP          MAKE NEW DISPLAY
                   ;                     RETURN
                   ;PERDSP()(KDCTRL,DIMAGE,DSPTMR)
                   ;        (BITSTR,BYTSTR,UBYTE )
                   ;        ( O    , O    , O    )
                   ;        ( RAM  , RAM  , RAM  )
                   ;        ( C    , C    , C    )
                   ;
                   ;PSW:S, Z, P, CY = NO CHANGE
                   ;
                   ;MAKE PROCEDURAL ERROR DISPLAY
                   ;
                   PERDSP;               ****ENTRY POINT
0464 F5             PUSH PSW             SAVE A, PSW
                   ;                     CLEAR SETTING-ON-DISPLAY FLAG
0465 3A 27 74       LDA  KDCTRL/2+X      A = KDCTRL
0468 E6 7F          ANI  7FH             KDCTRL.STGDSP = FALSE
                   ;                     SET DISPLAY-IS-TIMED FLAG
046A F6 20          ORI  20H             KDCTRL.TIMED = TRUE
046C 32 27 74       STA  KDCTRL/2+X
046F CD 16 03       CALL CDBUF           CLEAR DISPLAY BUFFER
                   ;                     CLEAR DISPLAY IMAGE BUFFER
0472 AF             XRA  A               A = BLANK
0473 CD 22 03       CALL FILDIM          FILDIM(BLANK)
                   ;                            ( A    )
                   ;                            ( I    )
                   ;                     INSERT 'ERR' IN DISPLAY IMAGE
0476 3E 9E          MVI  A,9EH           DIMAGE[0] = 'E'
0478 32 80 74       STA  DIMAGE/2+Y
047B 3E 0A          MVI  A,0AH           DIMAGE[1] = 'r'
047D 32 81 74       STA  DIMAGE/2+Y+1
0480 32 82 74       STA  DIMAGE/2+Y+2 DIMAGE[2] = 'r'
                   ;                     START DISPLAY TIMER
0483 3E 07          MVI  A,DSPVAL        DSPTMR = DSPVAL
0485 32 29 74       STA  DSPTMR/2+X
0488 F1             POP  PSW             RESTORE A, PSW
0489 C9             RET                  RETURN
                   ;PNUMK(CURKEY)(DBUF  ,WORK1 )
                   ;     (BYTE  )(NIBSTR,NIBSTR)
                   ;     ( I    )( I/O  , O     )
                   ;     ( A    )( RAM  , RAM   )
                   ;     ( C    )( C    , C     )
                   ;
                   ;PSW AND REGISTERS DESTROYED
                   ;
                   ;PROCESS NUMERIC KEY
                   ;
                   PNUMK;                 ****ENTRY POINT
048A 57             MOV  D,A              D = CURKEY
048B CD 06 03       CALL CDBUFC           IF DBUF[0..1] .NE. HEX00
                   ;                        NOT IN KEYENTRY MODE
                   ;                        DISABLE METER
                   ;                        ENTER KEYENTRY MODE
                   ;                        DBUF[0..1] = HEADER = HEX00
                   ;                        DECLARE DBUF CLEAR
                   ;                        DBUF[2..3] = FORMAT = HEX0F
                   ;                      ENDIF
                   ;                      CHECK DATA LENGTH IN DISPLAY
048E 21 41 74       LXI  H,(DBUF+2)/2+X
                   ;                      HL = ADDRESS, DBUF[2..3]
0491 7E             MOV  A,M              E = NCHAR*16 = DBUF[2]*16
0492 E6 F0          ANI  0F0H
```

```
0494 5F        MOV  E,A
0495 FE 80     CPI  DSPCHR*16     IF NCHAR .LT. DSPCHR
0497 D0        RNC
              ;                     THERE IS ROOM IN DISPLAY FOR CHAR
              ;                     CALCULATE NEXT DECIMAL POSITION
0498 7E        MOV  A,M             A = DECPOS = (DBUF[3]+1) .AND. HEX0F
0499 3C        INR  A
049A E6 0F     ANI  0FH
049C FE 08     CPI  DSPCHR          IF DECPOS .LT. DSPCHR
049E D0        RNC
              ;                       THERE IS ROOM TO SHIFT DECIMAL
049F B7        ORA  A                 IF DECPOS .EQ. 0
04A0 C2 A5 04  JNZ  PNUMK1
              ;                         DECIMAL HASN'T BEEN ENTERED
              ;                         INDICATE NO DECIMAL
04A3 3E 0F     MVI  A,0FH               A = DECPOS = HEX0F
              PNUMK1;                 ENDIF
              ;                       UPDATE FORMAT BYTE
04A5 B3        ORA  E                 DBUF[2..3] = (NCHAR+1)*16+DECPOS
04A6 C6 10     ADI  10H
04A8 77        MOV  M,A
04A9 06 82     MVI  B,DBUF+2          B = OFFSET, DBUF[2]
04AB CD 35 0F  CALL GETNIB            GETNIB(NCHAR,ZROFLG,DBUF[2])
              ;                              ( A    ,PSW:Z , @B     )
              ;                              ( O    , O    , I      )
04AE 5F        MOV  E,A               E = NCHAR
              ;                       COPY DBUF INTO WORK AREA
04AF 01 C0 84  LXI  B,(DBUF+4)*100H+(WORK1+0)
              ;                       B = OFFSET, DBUF[I=4]
              ;                       C = OFFSET, WORK1[J=0]
04B2 CD B3 0F  CALL MVLNIB            MVLNIB(WORK1[J],DBUF[I],NCHAR,
              ;                              ( @C      , @B     , A    ,
              ;                              ( O       , I      , I    ,
              ;
              ;                              NONBCD,ZROFLG)
              ;                              PSW:S ,PSW:Z )
              ;                               O     , O    )
              ;                       ZERO PAD DISPLAY BUFFER
04B5 23        INX  H                 HL = ADDRESS, DBUF[4..5]
04B6 36 00     MVI  M,0               DBUF[4..5] = 0
              ;                       INSERT NEW CHAR IN WORK AREA
04B8 81        ADD  C                 C=OFFSET, WORK1[J=NCHAR.AND.HEXFE]
04B9 E6 FE     ANI  0FEH
04BB 4F        MOV  C,A
04BC 7A        MOV  A,D               A = CURKEY
04BD CD EE 0F  CALL PUTNIB            PUTNIB(WORK1[J],CURKEY)
              ;                              ( @C      , A     )
              ;                              ( O       , I     )
              ;                       MOVE WORK AREA TO DISPLAY BUFFER
04C0 41        MOV  B,C               B = OFFSET, WORK1[I=J]
04C1 3E 83     MVI  A,DBUF+3          C=OFFSET,DBUF[J=(3+NCHAR).OR.HEX01]
04C3 83        ADD  E
04C4 F6 01     ORI  1
04C6 4F        MOV  C,A
04C7 7B        MOV  A,E               A = NCHAR
04C8 CD C2 0F  CALL MVRNIB            MVRNIB(DBUF[J],WORK1[I],NCHAR,
              ;                              ( @C     , @B      , A    ,
              ;                              ( O      , I       , I    ,
              ;
              ;                              NONBCD,ZROFLG)
              ;                              PSW:S ,PSW:Z )
              ;                               O     , O    )
04CB C3 5A 05  JMP  VALDSP            UPDATE DISPLAY IMAGE
              ;                     ENDIF
              ;                   ENDIF
              ;                   RETURN
              ;PROKEY()(CURBKT)
              ;         ( BYTE )
```

```
                  ;         ( I    )
                  ;         ( RAM  )
                  ;         ( NC   )
                  ;
                  ;PSW AND REGISTERS DESTROYED
                  ;
                  ;INITIATE PROCESSING OF A KEYPRESS
                  ;
                  PROKEY;               ****ENTRY POINT
04CE CD DE 0E       CALL DBLANK         STOP TIMER, BLANK DISPLAY
                  ;                     BUILD INDEX FOR TABLE LOOKUP
                  ;                     CURBKT = ORRR CCCC WHERE:
                  ;                     RRR = 0, 1, 2, 3, OR 4 = ROW CODE
                  ;                     CCCC= 1, 2, 4, OR 8 = COLUMN CODE
04D1 3A 2D 74       LDA CURBKT/2+X      A = CURBKT
04D4 57             MOV  D,A            D = CURBKT
04D5 E6 70          ANI  70H            E = INDEX = (CURBKT .AND. HEX70)/4
04D7 0F             RRC
04D8 0F             RRC
04D9 5F             MOV  E,A
04DA 7A             MOV  A,D            A = CURBKT
                  PROKE1;               DO WHILE COLUMN CODE BIT NOT IN CARRY
04DB 1F             RAR
04DC DA E3 04       JC   PROKE2
04DF 1C             INR  E                E = INDEX = INDEX + 1
04E0 C3 DB 04       JMP  PROKE1
                  PROKE2;               ENDDO
                  ;                     DEFINE CURRENT KEYCODE OR HEADER
04E3 16 00          MVI  D,0            DE = INDEX
04E5 21 02 05       LXI  H,PROKE3       HL = ADDRESS, PROKE3
04E8 19             DAD  D              HL = ADDRESS, PROKE3[INDEX]
04E9 7E             MOV  A,M            A = CURKEY = PROKE3[INDEX]
                  ;                     PROCESS CURRENT KEYCODE
04EA FE 0A          CPI  10             IF CURKEY .LT. 10
                  ;                       PROCESS NUMERIC KEY
04EC DA 8A 04       JC   PNUMK            PNUMK(CURKEY)
                  ;                             ( A    )
                  ;                             ( I    )
                  ;                       RETURN
                  ;                     ELSE IF CURKEY .EQ. 10
04EF CA 47 04       JZ   PCLRK            PROCESS CLEAR KEY
                  ;                       RETURN
04F2 FE 0C          CPI  12             ELSE IF CURKEY .EQ. 11
04F4 DA 50 04       JC   PDCMK            PROCESS DECIMAL KEY
                  ;                       RETURN
                  ;                     ELSE IF CURKEY .EQ. 12
04F7 CA 16 05       JZ   PSETK            PROCESS SET KEY
                  ;                       RETURN
04FA FE 0D          CPI  13             ELSE IF CURKEY .EQ. 13
04FC CA 1F 04       JZ   PAUTHK           PROCESS AUTHORIZATION KEY
                  ;                       RETURN
                  ;                     ELSE
                  ;                       A = HEADER = PROKE3[INDEX]
                  ;                       EXECUTE HEADER
04FF C3 C7 0D       JMP  XEQHDR           XEQHDR(HEADER,ERROR)
                  ;                             ( A    ,PSW:Z)
                  ;                             ( I    , O   )
                  ;                       RETURN
                  ;                     ENDIF
                  PROKE3;    CURKEY     INDEX   DESCRIPTION
                  ;            OR
                  ;          HEADER
                  ;
0502 C4             DB       HSETDA       0     SET DATE
0503 C6             DB       HENTCO       1     ENTER COMBINATION
0504 C5             DB       HENTAM       2     ENTER AMOUNT
0505 0D             DB       13           3     AUTHORIZATION KEY
0506 0C             DB       12           4     SET KEY
```

```
0507 0B          DB     11          5      DECIMAL KEY
0508 00          DB      0          6      0 KEY
0509 0A          DB     10          7      CLEAR KEY
050A 55          DB     HREQPC      8      REQUEST PIECE COUNT
050B 09          DB      9          9      9 KEY
050C 08          DB      8         10      8 KEY
050D 07          DB      7         11      7 KEY
050E 53          DB     HREQDR     12      REQUEST DESCENDING REGISTER
050F 06          DB      6         13      6 KEY
0510 05          DB      5         14      5 KEY
0511 04          DB      4         15      4 KEY
0512 52          DB     HREQAR     16      REQUEST ASCENDING REGISTER
0513 03          DB      3         17      3 KEY
0514 02          DB      2         18      2 KEY
0515 01          DB      1         19      1 KEY
                ;PSETK()(DBUF   ,NORFLG)
                ;       (NIBSTR,BITSTR)
                ;       ( I     , O     )
                ;       ( RAM   , RAM   )
                ;       ( C     , C     )
                ;
                ;PSW AND REGISTERS DESTROYED
                ;
                ;PROCESS SET KEY
                ;
                PSETK;                 ****ENTRY POINT
                ;                      PROCESS SET KEY ACCORDING TO DISPLAY
0516 3A 40 74    LDA  DBUF/2+X         A = DBUF[0..1]
0519 B7          ORA  A                IF DBUF[0..1] .EQ. HEX00
051A C2 2F 05    JNZ  PSETK1
                ;                        DISPLAY IS IN KEYENTRY MODE
051D 21 36 05    LXI  H,PSETK2           SET TO QUE POSTAGE VIA RETURN
0520 E5          PUSH H
0521 3A 41 74    LDA  (DBUF+2)/2+X       A = DBUF[2..3]
0524 FE 0F       CPI  0FH                IF DBUF[2..3] .EQ. HEX0F
0526 C8          RZ                        DISPLAY IS CLEAR
                ; >>RETURN AHEAD<<         QUE POSTAGE REQUEST
                ;                          NORFLG.QUEPOS = TRUE
                ;                        ELSE
                ;                          DISPLAY CONTAINS KEYENTERED VALUE
                ;                          SET POSTAGE
0527 3E C1       MVI  A,HSETPO             A = HSETPO
0529 CD C7 0D    CALL XEQHDR               XEQHDR(HSETPO,ERRFLG)
                ;                                ( A     ,PSW:Z )
                ;                                ( I     , O    )
052C C0          RNZ                       IF ERRFLG .EQ. FALSE
                ; >>RETURN AHEAD<<           QUE POSTAGE REQUEST
                ;                            NORFLG.QUEPOS = TRUE
                ;                          ENDIF
                ;                        ENDIF
052D E1          POP  H                  CLEAN UP STACK
052E C9          RET
                PSETK1;                ELSE
                ;                        DISPLAY NOT IN KEYENTRY MODE
052F FE 81       CPI  HPSET              PSW:Z = SETTING=DBUF[0..1].EQ.HPSET
0531 3E 41       MVI  A,HENABL           A = HENABL
                ;                        IF SETTING .EQ. TRUE
                ;                          SETTING IS ON DISPLAY
                ;                          ENABLE METER
0533 CA C7 0D    JZ   XEQHDR               XEQHDR(HENABL,ERRFLG)
                ;                                ( A     ,PSW:Z )
                ;                                ( I     , O    )
                ;                        ELSE
                ;                          SETTING IS NOT ON DISPLAY
                PSETK2;                    >>TARGET OF RETURN AHEAD<<
                ;                          QUE POSTAGE REQUEST
0536 21 26 74    LXI  H,NORFLG/2+X         HL = ADDRESS, NORFLG
0539 7E          MOV  A,M                  A = NORFLG
```

```
053A F6 40      ORI  40H                NORFLG.QUEPOS = TRUE
053C 77         MOV  M,A
                ;                          ENDIF
                ;                        ENDIF
053D C9         RET                      RETURN
                ;SEGCOD(CODE)
                ;      (BYTE)
                ;      (I/O )
                ;      ( A  )
                ;      ( C  )
                ;
                ;PSW:S, Z, P, CY DESTROYED
                ;
                ;CONVERT 4 BIT HEX VALUE INTO 7 SEGMENT DISPLAY CODE
                ;
                SEGCOD;              ****ENTRY POINT
053E E5           PUSH H             SAVE HL
                ;                    FETCH 7 SEGMENT DISPLAY CODE
053F C6 4A        ADI  >SEGC01       HL = ADDRESS, SEGC01[CODE]
0541 6F           MOV  L,A
0542 3E 00        MVI  A,0
0544 CE 05        ACI  <SEGC01
0546 67           MOV  H,A
0547 7E           MOV  A,M           A = CODE = SEGC01[CODE]
0548 E1           POP  H             RESTORE HL
0549 C9           RET                RETURN
                ;
                SEGC01; 7 SEG CODE;  HEX VALUE;  GRAPHIC
                ;
054A FC           DB      0FCH          0         0
054B 60           DB      060H          1         1
054C DA           DB      0DAH          2         2
054D F2           DB      0F2H          3         3
054E 66           DB      066H          4         4
054F B6           DB      0B6H          5         5
0550 BE           DB      0BEH          6         6
0551 E0           DB      0E0H          7         7
0552 FE           DB      0FEH          8         8
0553 F6           DB      0F6H          9         9
0554 9E           DB      09EH          A         E
0555 0A           DB      00AH          B         r
0556 3A           DB      03AH          C         o
0557 92           DB      092H          D         WING, ENABLED
0558 02           DB      002H          E         WING, DISABLED
0559 00           DB      000H          F         BLANK
                ;VALDSP()(DIMAGE,KDCTRL,DBUF  ,DSPTMR)
                ;        (BYTSTR,BITSTR,NIBSTR,UBYTE )
                ;        ( O    , O    , I    , O    )
                ;        ( RAM  , RAM  , RAM  , RAM  )
                ;        ( C    , C    , NC   , C    )
                ;
                ;PSW:S, Z, P, CY = NO CHANGE
                ;
                ;TRANSLATE CONTENTS OF DISPLAY BUFFER INTO 7 SEGMENT
                ;CHARACTER CODES WHICH ARE PLACED IN THE DISPLAY IMAGE
                ;BUFFER
                ;
                VALDSP;              ****ENTRY POINT
055A E5           PUSH H             SAVE HL
055B D5           PUSH D             SAVE DE
055C C5           PUSH B             SAVE BC
055D F5           PUSH PSW           SAVE A, PSW
                ;                    CLEAR DISPLAY IMAGE BUFFER
055E AF           XRA  A             A = BLANK
055F CD 22 03     CALL FILDIM        FILDIM(BLANK)
                ;                           ( A   )
                ;                           ( I   )
                ;                    DEFINE DEFAULT DISPLAY MODE
0562 3A 27 74     LDA  KDCTRL/2+X    A = KDCTRL
```

```
0565 E6 7F      ANI  7FH          KDCTRL.STGDSP = FALSE
0567 F6 20      ORI  20H          KDCTRL.TIMED = TRUE
0569 57         MOV  D,A          D = KDCTRL
               ;                  FETCH VALUES FROM DBUF'S FORMAT BYTE
056A 06 82      MVI  B,DBUF+2     B = OFFSET, DBUF[2]
056C CD 35 0F   CALL GETNIB       GETNIB(NCHAR,ZERO ,DBUF[2])
               ;                        ( A    ,PSW:Z, @B    )
               ;                        ( O    , O   , I     )
056F 4F         MOV  C,A          C = NCHAR
0570 04         INR  B            B = OFFSET, DBUF[3]
0571 CD 35 0F   CALL GETNIB       GETNIB(DECPOS,ZERO ,DBUF[3])
               ;                        ( A    ,PSW:Z, @B    )
               ;                        ( O    , O   , I     )
0574 5F         MOV  E,A          E = DECPOS
               ;                  POINT AT L/O OF DISPLAY IMAGE BUFFER
0575 21 87 74   LXI  H,DIMAGE/2+Y+(NDISP*4-1)
               ;                  HL = ADDRESS, DIMAGE[NDISP*4-1]
               ;                  CHECK FOR KEYENTRY IN DISPLAY BUFFER
0578 3A 40 74   LDA  DBUF/2+X     A = DBUF[0..1]
057B B7         ORA  A            IF DBUF[0..1] .EQ. HEX00
057C C2 8D 05   JNZ  VALDS2
               ;                    CHECK FOR NULL MESSAGE IN DBUF
057F 3A 41 74   LDA  (DBUF+2)/2+X   A = DBUF[2..3]
0582 FE 0F      CPI  0FH            IF DBUF[2..3] .EQ. HEX0F
0584 C2 89 05   JNZ  VALDS1
               ;                      PUT SMALL O IN DISPLAY
0587 36 3A      MVI  M,3AH            OUTPUT DIMAGE[NDISP*4-1] = 'o'
               VALDS1;              ENDIF
0589 7A         MOV  A,D            A = KDCTRL
               ;                    MAKE UNTIMED DISPLAY
058A C3 97 05   JMP  VALDS3
               ; >>JUMP AHEAD<<
               VALDS2;            ENDIF
               ;                  CHECK WHETHER SETTING IS ON DISPLAY
058D FE 81      CPI  HPSET        COMPARE DBUF[0..1] WITH HPSET
058F 7A         MOV  A,D          A = KDCTRL
0590 C2 99 05   JNZ  VALDS4       IF DBUF[0..1] .EQ. HPSET
               ;                    SHIFT DESTINATION TO LEFT
0593 1C         INR  E              E = DECPOS = DECPOS + 1
0594 2B         DCX  H              HL = ADDRESS, DIMAGE[DST=NDISP*4-2]
               ;                    SET SETTING-ON-DISPLAY FLAG
0595 F6 80      ORI  80H            KDCTRL.STGDSP = TRUE
               VALDS3;              >>TARGET OF JUMP AHEAD<<
               ;                    CLEAR DISPLAY-IS-TIMED FLAG
0597 E6 DF      ANI  0DFH           KDCTRL.TIMED = FALSE
               VALDS4;            ENDIF
0599 32 27 74   STA  KDCTRL/2+X   OUTPUT KDCTRL
               ;                  POINT AT L/O DATA IN DBUF
059C 79         MOV  A,C          A = N = NCHAR
059D B7         ORA  A            A = N/2;  CY = N .MOD. 2
059E 1F         RAR
059F CE 00      ACI  0            B = OFFSET, DBUF[SRC=(N/2+N.MOD.2)*2+3]
05A1 17         RAL
05A2 C6 83      ADI  DBUF+3
05A4 47         MOV  B,A
               VALDS5;            DO WHILE NCHAR .GT. 0
05A5 0D         DCR  C
05A6 FA B5 05   JM   VALDS6
               ;                    FETCH BCD CHARACTER FROM DBUF
05A9 CD 35 0F   CALL GETNIB         GETNIB(CODE,ZERO ,DBUF[SRC])
               ;                          ( A   ,PSW:Z, @B      )
               ;                          ( O   , O   , I       )
               ;                    TRANSLATE TO 7 BIT DISPLAY CODE
05AC CD 3E 05   CALL SEGCOD         SEGCOD(CODE)
               ;                          ( A  )
               ;                          ( I/O)
               ;                    PUT CODE INTO DISPLAY IMAGE BUFFER
05AF 77         MOV  M,A            DIMAGE[DST] = CODE
```

```
                      ;                   MOVE INDICES LEFT
05B0 05                DCR  B             B = OFFSET, DBUF[SRC=SRC-1]
05B1 2B                DCX  H             HL = ADDRESS, DIMAGE[DST=DST-1]
05B2 C3 A5 05          JMP  VALDS5
                      VALDS6;            ENDDO
                      ;                  CHECK WHETHER DECIMAL IS DISPLAYABLE
05B5 7B                MOV  A,E          A = DECPOS
05B6 FE 08             CPI  DSPCHR       IF DECPOS .LT. DSPCHR
05B8 D2 C3 05          JNC  VALDS7
                      ;                     CALC DECIMAL'S ADDRESS IN DIAMGE
05BB 2F                CMA                  A = -DECPOS-1
05BC C6 88             ADI  (DIMAGE/2+Y-X)+(NDISP*4)
05BE 6F                MOV  L,A
                      ;                     HL = ADDRESS,
                      ;                     DIMAGE[N=(NDISP*4-1)-DECPOS]
                      ;                     INSERT DECIMAL INTO DISPLAY
05BF 7E                MOV  A,M             DIMAGE[N] = DIMAGE[N] .OR. HEX01
05C0 F6 01             ORI  01H
05C2 77                MOV  M,A
                      VALDS7;            ENDIF
                      ;                  START DISPLAY TIMER
05C3 3E 07             MVI  A,DSPVAL     DSPTMR = DSPVAL
05C5 32 29 74          STA  DSPTMR/2+X
05C8 F1                POP  PSW          RESTORE A, PSW
05C9 C1                POP  B            RESTORE BC
05CA D1                POP  D            RESTORE DE
05CB E1                POP  H            RESTORE HL
05CC C9                RET               RETURN
                      ;CMDDSB/DISABL()(MRSTS1,NORFLG)
                      ;                (BITSTR,BITSTR)
                      ;                ( I/O  , 0    )
                      ;                ( RAM  , RAM  )
                      ;                ( C    , C    )
                      ;
                      ;PSW = NO CHANGE
                      ;
                      ;DISABLE METER
                      ;
                      CMDDSB;            ****ENTRY POINT FOR EXTERNAL DISABLES
05CD F5                PUSH PSW          SAVE A, PSW
                      ;                  SET TO SET NORFLG.LATDSB = TRUE
05CE 3E 01             MVI  A,1          A = LATMSK = HEX01
05D0 C3 D5 05          JMP  DISAB1
                      ; >>JUMP AHEAD<<
                      DISABL;            ****ENTRY POINT FOR INTERNAL DISABLES
05D3 F5                PUSH PSW          SAVE A,PSW
                      ;                  SET TO PRESERVE NORFLG.LATSDB
05D4 AF                XRA  A            A = LATMSK = HEX00
                      DISAB1;            >>TARGET OF JUMP AHEAD<<
05D5 D5                PUSH D            SAVE DE
05D6 E5                PUSH H            SAVE HL
05D7 21 26 74          LXI  H,NORFLG/2+X HL = ADDRESS, NORFLG
                      ;                  UPDATE NORFLG.LATDSB
05DA B6                ORA  M            NORFLG = NORFLG .OR. LATMSK
05DB 77                MOV  M,A
05DC 11 24 74          LXI  D,MRSTS1/2+X DE = ADDRESS, MRSTS1
05DF 1A                LDAX D            IF MRSTS1.ENABLD .EQ. TRUE
05E0 E6 04             ANI  4
05E2 CA EF 05          JZ   DISAB2
05E5 1A                LDAX D               MRSTS1.ENABLD = FALSE
05E6 E6 FB             ANI  0FBH
05E8 12                STAX D
05E9 7E                MOV  A,M             NORFLG.TRPREQ = FALSE
05EA E6 F7             ANI  0F7H
05EC F6 80             ORI  80H             NORFLG QUESTS = TRUE
05EE 77                MOV  M,A
                      DISAB2;            ENDIF
05EF E1                POP  H            RESTORE HL
```

```
05F0 D1         POP  D             RESTORE DE
05F1 F1         POP  PSW           RESTORE A, PSW
05F2 C9         RET                RETURN
               ;CMDENB/ENABLE()(MRSTS1,NORFLG,NVMCTL)
               ;               (BITSTR,BITSTR,BITSTR)
               ;               ( I/O  , I/O  , I    )
               ;               ( RAM  , RAM  , RAM  )
               ;               ( C    , C    , NC   )
               ;
               ;PSW = NO CHANGE
               ;
               ;ENABLE METER
               ;
               CMDENB;             ****ENTRY POINT FOR EXTERNAL ENABLES
05F3 F5         PUSH PSW           SAVE A, PSW
               ;                   SET TO SET NORFLG.LATDSB = FALSE
05F4 3E FE      MVI  A,0FEH        A = LATMSK = HEXFE
05F6 C3 FC 05   JMP  ENABL1
               ; >>JUMP AHEAD<<
               ENABLE;             ****ENTRY POINT FOR INTERNAL ENABLES
05F9 F5         PUSH PSW           SAVE A, PSW
               ;                   SET TO PRESERVE NORFLG.LATDSB
05FA 3E FF      MVI  A,0FFH        A = LATMSK = HEXFF
               ENABL1;             >>TARGET OF JUMP AHEAD<<
05FC C5         PUSH B             SAVE BC
05FD D5         PUSH D             SAVE DE
05FE E5         PUSH H             SAVE HL
05FF 21 26 74   LXI  H,NORFLG/2+X  HL = ADDRESS, NORFLG
               ;                   UPDATE NORFLG.LATDSB
0602 A6         ANA  M             NORFLG = NORFLG .AND. LATMSK
0603 77         MOV  M,A
0604 3A 33 74   LDA  NVMCTL/2+X    IF NVMCTL[0] .NE. HEXF
0607 B7         ORA  A
0608 FA 27 06   JM   ENABL4
               ;                     A BLOCK IS OPEN
060B CD 4E 0F   CALL LSTATE          LSTATE(FATMOD,NORMOD,SERMOD,PRVMOD)
               ;                           (PSW:S ,PSW:Z ,PSW:P ,PSW:CY)
               ;                           ( 0    , 0    , 0    , 0     )
060E C2 27 06   JNZ  ENABL3          IF NORMOD .EQ. TRUE
0611 11 24 74   LXI  D,MRSTS1/2+X      DE = ADDRESS, MRSTS1
0614 1A         LDAX D
0615 E6 EC      ANI  0ECH
0617 47         MOV  B,A               B = FLAGS = MRSTS1.UNKSEL,
               ;                                   MRSTS1.DATDOR,
               ;                                   MRSTS1.INSFND,
               ;                                   MRSTS1.ENABLD
0618 7E         MOV  A,M
0619 E6 03      ANI  3
061B B0         ORA  B                 A = FLAGS = FLAGS .OR.
               ;                                   NORFLG.UNVSEL,
               ;                                   NORFLG.LATDSB
061C C2 27 06   JNZ  ENABL2             IF FLAGS .EQ. FALSE
061F 7E         MOV  A,M                  NORFLG.QUESTS = TRUE
0620 F6 80      ORI  80H
0622 77         MOV  M,A
0623 1A         LDAX D                    MRSTS1.ENABLD = TRUE
0624 F6 04      ORI  4
0626 12         STAX D
               ENABL2;                  ENDIF
               ENABL3;                ENDIF
               ENABL4;              ENDIF
0627 E1         POP  H             RESTORE HL
0628 D1         POP  D             RESTORE DE
0629 C1         POP  B             RESTORE BC
062A F1         POP  PSW           RESTORE A, PSW
062B C9         RET                RETURN
               ;CONFIG(ERRFLG)(MTRCHR,XMTBUF)
               ;      (BIT   )(BYTE  ,BYTSTR)
```

```
                ;        ( 0      )( I    , 0     )
                ;        (PSW:S )( RAM   , RAM'  )
                ;        ( C      )( NC    , C     )
                ;
                ;REGISTERS DESTROYED
                ;PSW DESTROYED
                ;
                ;PUT METER CONFIGURATION MESSAGE IN TRANSMIT BUFFER
                ;
                CONFIG;                  ****ENTRY POINT
062C 21 50 74     LXI  H,XMTBUF/2+X  HL = ADDRESS, XMTBUF[0]
                ;                        DEFINE MESSAGE LENGTH
062F 36 02        MVI  M,2             XMTBUF[0] = 2
                ;                        DEFINE MESSAGE HEADER
0631 23           INX  H               HL = ADDRESS, XMTBUF[1]
0632 36 AB        MVI  M,HCONFG        XMTBUF[1] = HCONFG
                ;                        DEFINE ERROR FLAG
0634 2C           INR  L               HL = ADDRESS, XMTBUF[2]
                ;                        PSW:Z = ERRFLG = FALSE
                ;                        DEFINE METER CHARACTERISTICS
0635 3A 23 74     LDA  MTRCHR/2+X      XMTBUF[2] = MTRCHR
0638 77           MOV  M,A
0639 C9           RET                  RETURN
                ;CONSUM(ERRFLG)(CTLCRC)
                ;        (BIT    )(BYTE  )
                ;        ( 0     )( I     )
                ;        (PSW:Z )( RAM   )
                ;        ( C     )( NC    )
                ;
                ;REGISTERS DESTROYED
                ;PSW DESTROYED
                ;
                ;CHECK CONTROL SUM CRC AGAINST EXPECTED CRC
                ;
                CONSUM;                  ****ENTRY POINT
                ;                        CALCULATE CONTROL SUM CRC
063A CD 4E 06     CALL CTLSUM          CTLSUM(CSMCRC,ERRFLG)
                ;                              ( D     ,PSW:Z )
                ;                              ( 0     , 0     )
063D CA 47 06     JZ   CONSU1          IF ERRFLG .EQ. TRUE
                ; >>JUMP AHEAD<<         DECLARE DEAD METER. BAD CRC
                ;                          A = BADCRC
                ;                          NVMDED(BADCRC,ERRFLG)
                ;                                ( A     ,PSW:Z )
                ;                                ( I     , 0     )
                ;                        ELSE
0640 3A 08 74     LDA  CTLCRC/2+X      A = DIF = CTLCRC-CSMCRC
0643 92           SUB  D
0644 CA 4C 06     JZ   CONSU2          IF DIF .NE. 0
                CONSU1;                    >>TARGET OF JUMP AHEAD<<
                ;                          DECLARE DEAD METER. BAD CRC
0647 3E 00        MVI  A,BADCRC          A = BADCRC
0649 C3 85 10     JMP  NVMDED            NVMDED(BADCRC,ERRFLG)
                ;                                ( A     ,PSW:Z )
                ;                                ( I     , 0     )
                CONSU2;                  ELSE
064C 3C           INR  A                   PSW:Z = ERRFLG = FALSE
                ;                        ENDIF
064D C9           RET                  RETURN
                ;CTLSUM(CSMCRC,ERRFLG)(ASCREG,DSCREG,WORK1 )
                ;        (BYTE  ,BIT    )(NIBSTR,NIBSTR,NIBSTR)
                ;        ( 0     , 0     )( I     , I     , 0     )
                ;        ( D     ,PSW:Z )( RAM   , RAM   , RAM   )
                ;        ( C     , C     )( NC    , NC    , C     )
                ;
                ;REGISTERS DESTROYED
                ;PSW DESTROYED
                ;
                ;CALCULATE CONTROL SUM AND ITS CRC FOR THE CURRENT VALUES
```

```
                ;OF THE ASCENDING AND DESCENDING REGISTERS
                ;
                CTLSUM;                 ****ENTRY POINT
                ;                       COPY ASCENDING REGISTER INTO WORK AREA
064E 01 C9 3F    LXI  B,(ASCREG+ASCSIZ-1)*100H+(WORK1+9)
                ;                       B = OFFSET, ASCREG[I=ASCSIZ-1]
                ;                       C = OFFSET, WORK1[J=10-1]
0651 3E 08       MVI  A,ASCSIZ          A = ASCSIZ
0653 CD C2 0F    CALL MVRNIB            MVRNIB(WORK1[J],ASCREG[I],ASCSIZ,
                ;                             ( @C     , @B      , A    ,
                ;                             ( 0      , I       , I    ,
                ;
                ;                             NONBCD,ZROFLG)
                ;                             PSW:S ,PSW:Z )
                ;                              0    , 0    )
0656 F2 5B 06    JP   CTLSU1            IF NONBCD .EQ. TRUE
0659 AF          XRA  A                   PSW:Z = ERRFLG = TRUE
065A C9          RET
                CTLSU1;                 ELSE
065B 3A 17 74    LDA  DSCREG/2+X        IF DSCREG[0..1] .EQ. HEXFF
065E FE FF       CPI  0FFH                PSW:Z = ERRFLG = TRUE
0660 C8          RZ
                ;                       ELSE
                ;                         CALCULATE CONTROL SUM IN WORK AREA
0661 06 35       MVI  B,DSCREG+DSCSIZ-1
                ;                         B = OFFSET, DSCREG[K=DSCSIZ-1]
0663 11 08 07    LXI  D,DSCSIZ*100H+ASCSIZ
                ;                         D = DSCSIZ
                ;                         E = ASCSIZ
0666 CD F8 06    CALL DECADD              DECADD(WORK1[J],DSCREG[K],
                ;                               ( 0      , I        ,
                ;                               ( @C     , @B       ,
                ;
                ;                               ASCSIZ,DSCSIZ,OVRFLO)
                ;                                I    , I    , O    )
                ;                                E    , D    ,PSW:CY)
                ;                         CALCULATE CRC FOR CONTROL SUM
0669 01 C2 08    LXI  B,(ASCSIZ)*100H+(WORK1+10-ASCSIZ)
                ;                         B = ASCSIZ
                ;                         C = OFFSET, WORK1[L=10-ASCSIZ]
066C CD B1 0E    CALL CRC                 CRC(WORK1[L],ASCSIZ,CSMCRC)
                ;                            ( I      , I    , O    )
                ;                            ( @C     , B    , D    )
066F 04          INR  B                   PSW:Z = ERRFLG = FALSE
                ;                       ENDIF
0670 C9          RET                    RETURN
                ;DBLHDR(HEADER,ERRFLG)(LOWWRN,SERNUM,ERRST ,SETLIM,ASCREG,
                ;      (BYTE  ,BIT   )(NIBSTR,NIBSTR,NIBSTR,NIBSTR,NIBSTR,
                ;      ( I    , O    )( I    , I    , I    , I    , I    ,
                ;      ( A    ,PSW:Z )( RAM  , RAM  , RAM  , RAM  , RAM  ,
                ;      ( NC   , C    )( NC   , NC   , NC   , NC   , NC   ,
                ;
                ;      DSCREG,WORK1 ,PCEREG,MRSTS1)
                ;      NIBSTR,NIBSTR,NIBSTR,BITSTR)
                ;       I    , I    , I    , O    )
                ;       RAM  , RAM  , RAM  , RAM  )
                ;       NC   , NC   , NC   , C    )
                ;
                ;REGISTERS DESTROYED
                ;PSW DESTROYED
                ;
                ;PROCESS DOUBLY DEFINED HEADERS
                ;
                DBLHDR;                 ****ENTRY POINT
0671 CD 4E 0F    CALL LSTATE            LSTATE(FATMOD,NORMOD,SERMOD,PRVMOD)
                ;                             (PSW:S ,PSW:Z ,PSW:P ,PSW:CY)
                ;                             ( 0    , 0    , 0    , 0    )
0674 21 E2 06    LXI  H,DBLH04          SET TO RETURN TO ENDCASE
```

```
0677 E5          PUSH H
0678 E2 A6 06    JPO  DBLH02         IF SERMOD .EQ. TRUE
                ;                    --CASE (HEADER)
067B FE 52       CPI  HREQDL           **52: DOLLAR LOCK VALUE REQUEST
067D 11 E3 06    LXI  D,DBLH05+0
0680 CA 5B 0D    JZ   VALREQ           VALREQ(UNLOCK,LOKFMT,HDLOCK,ERRFLG)
                ;                             (@@DE+0,@DE+1 ,@DE+2 ,PSW:Z )
                ;                             ( I    , I    , I    , 0     )
0683 FE 53       CPI  HREQLP           **53: LOW POSTAGE WARNING VALUE REQ
0685 01 8B 1C    LXI  B,LOWWRN*100H+HLOPOS
0688 CA 34 0D    JZ   SRVREQ           SRVREQ(LOWWRN,HLOPOS,ERRFLG)
                ;                             ( @B   , C    ,PSW:Z )
                ;                             ( I    , I    , 0     )
068B FE 54       CPI  HREQMN           **54: METER SERIAL NUMBER REQUEST
                DBLH01;                ****ALTERNATE ENTRY POINT
068D 11 E6 06    LXI  D,DBLH05+3
0690 CA 5B 0D    JZ   VALREQ           VALREQ(SERNUM,MSNFMT,HMTRNO,ERRFLG)
                ;                             (@@DE+0,@DE+1 ,@DE+2 ,PSW:Z )
                ;                             ( I    , I    , I    , 0     )
0693 FE 55       CPI  HREQDS           **55: DIAGNOSTIC REQUEST
0695 11 E9 06    LXI  D,DBLH05+6
0698 CA 5B 0D    JZ   VALREQ           VALREQ(ERRST ,DIAFMT,HDIAGS,ERRFLG)
                ;                             (@@DE+0,@DE+1 ,@DE+2 ,PSW:Z )
                ;                             ( I    , I    , I    , 0     )
069B FE 56       CPI  HREQSL           **56: SETTING LIMIT VALUE REQUEST
069D 01 8E 1E    LXI  B,SETLIM*100H+HHSLIM
06A0 CA 34 0D    JZ   SRVREQ           SRVREQ(SETLIM,HHSLIM,ERRFLG)
                ;                             ( @B   , C    ,PSW:Z )
                ;                             ( I    , I    , 0     )
                ;                      **ELSE: PROCESS ERROR
06A3 C3 A1 0B    JMP  PROERR           PROERR(ERRFLG)
                ;                             (PSW:Z )
                ;                             ( 0    )
                ;                    --ENDCASE
                DBLH02;              ELSE
                ;                    --CASE (HEADER)
06A6 FE 52       CPI  HREQAR           **52: ASCENDING REGISTER REQUEST
06A8 11 EC 06    LXI D,DBLH05+9
06AB CA 5B 0D    JZ   VALREQ           VALREQ(ASCREG,ASCFMT,HAREG ,ERRFLG)
                ;                             (@@DE+0,@DE+1 ,@DE+2 ,PSW:Z )
                ;                             ( I    , I    , I    , 0     )
06AE FE 53       CPI  HREQDR           **53: DESCENDING REGISTER REQUEST
06B0 11 EF 06    LXI  D,DBLH05+12
06B3 CA 5B 0D    JZ   VALREQ           VALREQ(DSCREG,DSCFMT,HDREG ,ERRFLG)
                ;                             (@@DE+0,@DE+1 ,@DE+2 ,PSW:Z )
                ;                             ( I    , I    , I    , 0     )
06B6 FE 54       CPI  HREQCS           **54: CONTROL SUM REQUEST
06B8 C2 C5 06    JNZ  DBLH03
06BB CD 3A 06    CALL CONSUM           CONSUM(ERRFLG)
                ;                             (PSW:Z )
                ;                             ( 0    )
06BE 11 F2 06    LXI  D,DBLH05+15
                ;                      IF ERRFLG .EQ. FALSE
                ;                        I = 10-ASCSIZ
06C1 C4 5B 0D    CNZ  VALREQ             VALREQ(WORK1[I],CSMFMT,HCSUM,ERRFLG)
                ;                               (@@DE+0  ,@DE+1 ,@DE+2,PSW:Z )
                ;                               ( I      , I    , I   , 0     )
                ;                      ENDIF
06C4 C9          RET
                DBLH03;
06C5 FE 55       CPI  HREQPC           **55: PIECE COUNT REQUEST
06C7 11 F5 06    LXI  D,DBLH05+18
06CA CA 5B 0D    JZ   VALREQ           VALREQ(PCEREG,PCEFMT,HPCNT ,ERRFLG)
                ;                             (@@DE+0,@DE+1 ,@DE+2 ,PSW:Z )
                ;                             ( I    , I    , I    , 0     )
06CD FE 5B       CPI  HREQCF           **5B: CONFIGURATION DATA REQUEST
06CF CA 2C 06    JZ   CONFIG           CONFIG(ERRFLG)
                ;                             (PSW:Z )
```

```
                   ;                          ( 0     )
06D2 FE C4           CPI   HSETDA          **C4: RESET DATER DOOR
06D4 C2 A1 0B        JNZ   PROERR
06D7 21 24 74        LXI   H,MRSTS1/2+X     HL = ADDRESS, MRSTS1
06DA 7E              MOV   A,M              MRSTS1.DATDOR = FALSE
06DB E6 BF           ANI   0BFH
06DD 77              MOV   M,A
06DE 24              INR   H                PSW:Z = ERRFLG = FALSE
06DF C3 48 0C        JMP   SELVAL           DISPLAY SELECTION VALUE
                   ;                        **ELSE: PROCESS ERROR
                   ;                        PROERR(ERRFLG)
                   ;                              (PSW:Z )
                   ;                              ( 0    )
                   DBLH04;                --ENDCASE
                   ;                      ENDIF
06E2 C9              RET                  RETURN
                   DBLH05;                ARGUMENTS FOR VALREQ
06E3 18 40 8A        DB    UNLOCK,LOKFMT,HDLOCK             ;+0
06E6 21 7F 8C        DB    SERNUM,MSNFMT,HMTRNO             ;+3
06E9 13 5F 8D        DB    ERRST,DIAFMT,HDIAGS              ;+6
06EC 38 80 82        DB    ASCREG,ASCFMT,HAREG              ;+9
06EF 2F 70 83        DB    DSCREG,DSCFMT,HDREG              ;+12
06F2 C2 80 84        DB    WORK1+10-ASCSIZ,CSMFMT,HCSUM     ;+15
06F5 28 7F 85        DB    PCEREG,PCEFMT,HPCNT              ;+18
                   ;DECADD(V1[V1DGTS-1],V2[V2DGTS-1],V1DGTS,V2DGTS,OVRFLO)
                   ;       (NIBSTR      ,NIBSTR      ,BYTE  ,BYTE  , BIT  )
                   ;       ( I/O        , I          , I    , I    , 0    )
                   ;       ( @C         , @B         , E    , D    ,PSW:CY)
                   ;       ( C          , NC         , C    , C    , C    )
                   ;
                   ;PSW DESTROYED
                   ;REGISTERS DESTROYED
                   ;
                   ;BCD ADDITION OF UNSIGNED BCD VALUE STRINGS
                   ;V1[0..V1DGTS-1] = V1[0..V1DGTS-1] + V2[0..V2DGTS-1]
                   ;WHERE V1DGTS .GE. V2DGTS
                   ;
                   DECADD;                ****ENTRY POINT
                   ;                      C  OFFSET, V1[I=V1DGTS-1]
                   ;                      B  OFFSET, V2[J=V2DGTS-1]
06F8 7B              MOV   A,E            IF V1DGTS .LT. V2DGTS
06F9 BA              CMP   D
06FA DA 20 07        JC    DECERR           DECLARE BAD ARGUMENT
                   ;                        ENTER FATAL ERROR MODE
                   ;                      ENDIF
06FD AF              XRA   A              PSW:CY = CARRY = FALSE
                   DECAD1;                DO WHILE V1DGTS .GE. 0
06FE 1D              DCR   E                E = V1DGTS = V1DGTS-1
06FF F8              RM
0700 CD 0C 07        CALL DECCOM            DECCOM(V1[I],V2[J],V1DGTS,V2DGTS,
                   ;                              ( @C  , @B  , E    , D    ,
                   ;                              ( I   , I/O , -    , I/O  ,
                   ;
                   ;                              VAL1,VAL2)
                   ;                               L  , A  )
                   ;                               0  , 0  )
                   ;                        L[0..1] = VAL1 = HEX90 .OR. V1[I]
                   ;                        A[0..1] = VAL2 = V2[J]
                   ;                        B = OFFSET, V2[J=J-1]
                   ;                        D = V2DGTS = V2DGTS-1
0703 8D              ADC   L                A[1] = VAL1 = VAL1+VAL2+CARRY
0704 27              DAA
                   ;                        PSW:CY = CARRY
0705 CD EE 0F        CALL PUTNIB            PUTNIB(V1[I],VAL1)
                   ;                              ( @C  ,A[1])
                   ;                              ( 0   , I  )
0708 0D              DCR   C                C = OFFSET, V1[I=I-1]
```

```
0709 C3 FE 06   JMP  DECAD1
                ;                          ENDDO
                ;                          RETURN
                ;DECCOM(V1[I] ,V2[J] ,V1DGTS,V2DGTS,VAL1,VAL2)
                ;     (NIBBLE,NIBBLE,BYTE  ,BYTE  ,BYTE,BYTE)
                ;     ( I    , I/O  , -    , I/O  , O  , O  )
                ;     ( @C   , @B   , E    , D    , L  , A  )
                ;     ( NC   , C    , NC   , C    , C  , C  )
                ;
                ;PSW:CY = NO CHANGE
                ;PSW:S, Z, P CHANGED
                ;REGISTERS DESTROYED
                ;
                ;COMMON ROUTINE CALLED BY DECADD AND DECSUB
                ;FETCHES NEXT PAIR OF OPERANDS
                ;VAL1 = HEX90 .OR. V1[I]
                ;VAL2 = V2[J]
                ;J AND V2DGTS WILL BE DECREMENTED
                ;
                DECCOM;                    ****ENTRY POINT
070C F5          PUSH PSW                  SAVE PSW:CY
070D 60          MOV  H,B                  H = OFFSET, V2[J]
070E 41          MOV  B,C                  B = OFFSET, V1[I]
070F CD 35 0F    CALL GETNIB               GETNIB(VAL1,ZROFLG,V1[I])
                ;                                 ( A  ,PSW:Z , @B  )
                ;                                 ( O  , O    , I   )
0712 F6 90       ORI  90H                  L[0..1] = VAL1 = HEX90 .OR. VAL1
0714 6F          MOV  L,A
0715 44          MOV  B,H                  B = OFFSET, V2[J]
0716 F1          POP  PSW                  RESTORE PSW:CY
0717 3E 00       MVI  A,0                  A[0..1] = VAL2 = 0
0719 15          DCR  D                    D = V2DGTS = V2DGTS-1
071A F8          RM                        IF V2DGTS .GE. 0
071B CD 35 0F    CALL GETNIB                 GETNIB(VAL2   ,ZROFLG,V2[J])
                ;                                  (A[0..1],PSW:Z , @B  )
                ;                                  ( O     , O    , I   )
071E 05          DCR  B                      B = OFFSET, V2[J=J-1]
                ;                          ENDIF
071F C9          RET                       RETURN
                ;DECERR()
                ;
                ;PSW DESTROYED
                ;ALL REGISTERS DESTROYED
                ;
                ;ERROR ROUTINE CALLED BY DECADD AND DECSUB
                ;
                DECERR;                    ****ENTRY POINT
0720 3E 02       MVI  A,SFTWRE             A = SFTWRE
0722 CD 80 08    CALL FATERR               ENTER FATAL MODE. SOFTWARE ERROR
0725 CD 68 10    CALL NVMCHG               SAVE NONVOLATILE MEMORY
0728 C3 B6 01    JMP  PWRDN                FREEZE UNTIL NEXT POWER UP
                ;DECSUB(V1[V1DIGS-1],V2[V2DGTS-1],V1DGTS,V2DGTS)
                ;      (NIBSTR      ,NIBSTR      ,BYTE  ,BYTE  )
                ;      ( I/O        , I          , I    , I    )
                ;      ( @C         , @B         , E    , D    )
                ;      ( C          , NC         , C    , C    )
                ;
                ;PSW DESTROYED
                ;REGISTERS DESTROYED
                ;
                ;BCD SUBTRACTION OF UNSIGNED BCD VALUE STRINGS
                ;V1[0..V1DGTS-1] = V1[0..V1DGTS-1] - V2[0..V2DGTS-1]
                ;WHERE V1DGTS .GE. V2DGTS
                ;
                DECSUB;                    ****ENTRY POINT
                ;                          C = OFFSET, V1[I=V1DGTS-1]
                ;                          B = OFFSET, V2[J=V2DGTS-1]
072B 7B          MOV  A,E                  IF V1DGTS .LT. V2DGTS
```

```
072C BA          CMP  D
072D DA 20 07    JC   DECERR         DECLARE BAD ARGUEMENT
                ;                    ENTER FATAL ERROR MODE
                ;                   ENDIF
0730 AF          XRA  A             PSW:CY = BORROW = FALSE
                DECSU1;             DO WHILE V1DGTS .GE. 0
0731 1D          DCR  E              E = V1DGTS = V1DGTS-1
0732 F8          RM
0733 CD 0C 07    CALL DECCOM         DECCOM(V1[I],V2[J],V1DGTS,V2DGTS,
                ;                           ( @C   , @B  , E    , D    ,
                ;                           ( I    , I/O , -    , I/O  ,
                ;
                ;                           VAL1,VAL2)
                ;                            L   , A  )
                ;                            O   , O  )
                ;                    L[0..1] = VAL1 = HEX90 .OR. V1[I]
                ;                    A[0..1] = VAL2 = V2[J]
                ;                    B = OFFSET, V2[J=J-1]
                ;                    D = V2DGTS = V2DGTS-1
0736 CE F6       ACI  -10            A[1] = VAL1-VAL2-BORROW
0738 2F          CMA
0739 3C          INR  A
073A 85          ADD  L
073B 27          DAA
073C 3F          CMC                 PSW:CY = BORROW
073D CD EE 0F    CALL PUTNIB         PUTNIB(V1[I],VAL1)
                ;                           ( @C   , A  )
                ;                           ( O    , I  )
0740 0D          DCR  C              C = OFFSET, V1[I=I-1]
0741 C3 31 07    JMP  DECSU1
                ;                   ENDDO
                ;                   RETURN
                ;DOACCT()(POSREG,ASCCRC,ASCREG,DSCCRC,DSCREG,PCEREG,WORK1 )
                ;         (NIBSTR,BYTE  ,NIBSTR,BYTE  ,NIBSTR,NIBSTR,NIBSTR)
                ;         ( I    , O    , I/O  , O    , I/O  , I/O  , O     )
                ;         ( RAM  , RAM  , RAM  , RAM  , RAM  , RAM  , RAM   )
                ;         ( NC   , C    , C    , C    , C    , C    , C     )
                ;
                ;PSW DESTROYED
                ;REGISTERS DESTROYED
                ;
                ;DO ACCOUNTING FOR METER TRIP
                ;
                DOACCT;             ****ENTRY POINT
                ;                   ADD POSTAGE TO ASCENDING REGISTER
0744 11 08 04    LXI  D,NBANKS*100H+ASCSIZ
                ;                   D = NBANKS
                ;                   E = ASCSIZ
0747 01 3F 45    LXI  B,(POSREG+NBANKS-1)*100H+(ASCREG+ASCSIZ-1)
                ;                   B = OFFSET, POSREG[I=NBANKS-1]
                ;                   C = OFFSET, ASCREG[J=ASCSIZ-1]
074A CD F8 06    CALL DECADD        DECADD(ASCREG[J],POSREG[I],
                ;                         ( @C      , @B      ,
                ;                         ( I/O     , I       ,
                ;
                ;                         ASCSIZ,NBANKS)
                ;                          E    , D    )
                ;                          I    , I    )
                ;                   COMPUTE CRC FOR ASCENDING REGISTER
074D 01 38 08    LXI  B,ASCSIZ*100H+ASCREG
                ;                   B = ASCSIZ
                ;                   C = OFFSET, ASCREG
0750 CD B1 0E    CALL CRC           CRC(ASCREG,ASCSIZ,CRCVAL)
                ;                      ( @C    , B    , D     )
                ;                      ( I     , I    , O     )
0753 7A          MOV  A,D           ASCCRC = CRCVAL
0754 32 20 74    STA  ASCCRC/2+X
                ;                   SUBTRACT POSTAGE FROM DESCENDING REG
```

```
0757 11 07 04   LXI  D,NBANKS*100H+DSCSIZ
                ;                     D = NBANKS
                ;                     E = DSCSIZ
075A 01 35 45   LXI  B,(POSREG+NBANKS-1)*100H+(DSCREG+DSCSIZ-1)
                ;                     B = OFFSET, POSREG[I=NBANKS-1]
                ;                     C = OFFSET, DSCREG[J=DSCSIZ-1]
075D CD 2B 07   CALL DECSUB           DECSUB(DESCREG[J],POSREG[I],
                ;                            ( @C      , @B      ,
                ;                            ( I/O     , I       ,
                ;
                ;                            DSCSIZ,NBANKS)
                ;                             E    , D    )
                ;                             I    , I    )
                ;                     COMPUTE CRC FOR DESCENDING REGISTER
0760 01 2F 07   LXI  B,DSCSIZ*100H+DSCREG
                ;                     B = DSCSIZ
                ;                     C = OFFSET,DSCREG
0763 CD B1 0E   CALL CRC              CRC(DSCREG,DSCSIZ,CRCVAL)
                ;                        ( @C   , B    , D    )
                ;                        ( I    , I    , O    )
0766 7A         MOV  A,D              DSCCRC = CRCVAL
0767 32 1B 74   STA  DSCCRC/2+X
                ;                     INCREMENT THE PIECE COUNT
076A 3E 10      MVI  A,10H            WORK1[0] = 1
076C 32 60 74   STA  WORK1/2+X
076F 11 07 01   LXI  D,1*100H+PCESIZ
                ;                     D = ONESIZ = 1
                ;                     E = PCESIZ
0772 01 2E C0   LXI  B,(WORK1+1-1)*100H+(PCEREG+PCESIZ-1)
                ;                     B = OFFSET, WORK1[I=ONESIZ-1]
                ;                     C = OFFSET, PCEREG[J=PCESIZ-1]
0775 C3 F8 06   JMP  DECADD           DECADD(PCEREG[J],WORK1[I],
                ;                            ( @C      , @B      ,
                ;                            ( I/O     , I       ,
                ;
                ;                            PCESIZ,ONESIZ)
                ;                             E    , D    )
                ;                             I    , I    )
                ;                     RETURN
                ;DOSTAT()(MRSTS1,MRSTS2,NORFLG)
                ;        (BITSTR,BITSTR,BITSTR)
                ;        ( I    , I/O  , I/O  )
                ;        ( RAM  , RAM  , RAM  )
                ;        ( NC   , C    , C    )
                ;
                ;REGISTERS DESTROYED
                ;PSW DESTROYED
                ;
                ;UPDATE METER STATUS TO AGREE WITH SWITCHES AND SENSORS
                ;
                DOSTAT;               ****ENTRY POINT
                ;                     FETCH PRESENT SWITCH VALUES
0778 CD 31 0C   CALL REDSTS           REDSTS(TRPSW,PRVSW)
                ;                            ( B    , A    )
                ;                            ( O    , O    )
077B E6 01      ANI  1                C = PRVSW = PRVSW .AND. HEX01
077D 4F         MOV  C,A
077E 78         MOV  A,B              B = TRPSW = TRPSW .AND. HEX08
077F E6 08      ANI  8
0781 47         MOV  B,A
0782 81         ADD  C                C = NEWSWS = PRVSW + TRPSW
0783 4F         MOV  C,A
0784 21 25 74   LXI  H,MRSTS2/2+X     HL = ADDRESS, MRSTS2
                ;                     SAVE ENTRY STATUS
0787 7E         MOV  A,M              A = MRSTS2
0788 57         MOV  D,A              D = OLDST2 = MRSTS2
                ;                     UPDATE STATUS
                ;                     MRSTS2.TRPSW = TRPSW
```

```
                  ;                        MRSTS2.PRVMOD = PRVSW
0789 E6 F6          ANI  OF6H              MRSTS2 = MRSTS2.AND.HEXF6.OR.NEWSWS
078B B1             ORA  C
078C 77             MOV  M,A
                  ;                        CHECK METER STATUS
078D CD 4E OF       CALL LSTATE            LSTATE(FATMOD,NORMOD,SERMOD,PRVMOD)
                  ;                              (PSW:S ,PSW:Z ,PSW:P ,PSW:CY)
                  ;                              ( 0    , 0    , 0    , 0    )
0790 F8             RM                     IF FATMOD .EQ. FALSE
                  ;                          READ CYCLE SWITCH
0791 CD AF 0B       CALL RDCYC               RDCYC(INCYC,INCYC,ADRESS,MRSTS1)
                  ;                                ( A    ,PSW:C, HL    , @HL  )
                  ;                                ( 0    , 0   , 0     , -    )
0794 3E 04          MVI  A,BADCYC            A = BADCYC
                  ;                          IF INCYC .EQ. TRUE
                  ;                            CYCLE SWITCH SAYS METER NOT HOME
                  ;                            DECLARE DEAD METER, BAD SWITCH
0796 DA 85 10       JC   NVMDED                NVMDED(BADCYC,ERRFLG)
                  ;                                  ( A     ,PSW:Z )
                  ;                                  ( I     , 0    )
                  ;                          ELSE
                  ;                            CALC SEQ SWITCH CLOSURE VALUE
0799 7A             MOV  A,D
079A A0             ANA  B
079B A8             XRA  B
079C 4F             MOV  C,A                   C = CLOSUR = OLDST2.TRPSW .AND.
                  ;                                         TRPSW .XOR. TRPSW
                  ;                            DEFINE TRIP REQUEST VALUE
079D 7E             MOV  A,M                   A=TRPREQ=MRSTS1.ENABLD.AND.CLOSUR
079E 17             RAL
079F A1             ANA  C
                  ;                            UPDATE TRIP REQUEST STATUS
                  ;                            NORFLG.TRPREQ = TRPREQ
07A0 23             INX  H                     HL = ADDRESS, NORFLG
07A1 23             INX  H
07A2 B6             ORA  M                     NORFLG = TRPREQ .OR. NORFLG
07A3 77             MOV  M,A
                  ;                          ENDIF
                  ;                        ENDIF
07A4 C9             RET                    RETURN
                  ;DOTRIP()(MRSTS1,NORFLG,PORTA )
                  ;         (BITSTR,BITSTR,BITSTR)
                  ;         ( 0    , 0    , 0    )
                  ;         ( RAM  , RAM  , 7001 )
                  ;         ( C    , C    , C    )
                  ;
                  ;REGISTERS DESTROYED
                  ;PSW DESTROYED
                  ;
                  ;TRIP METER
                  ;
                  DOTRIP;                  ****ENTRY POINT
07A5 CD DE OE       CALL DBLANK            TURN OFF DISPLAY
                  ;                        CHECK CYCLE SWITCH WHILE METER HOME
07A8 CD AF 0B       CALL RDCYC             RDCYC(INCYC,INCYC,ADRESS,MRSTS1)
                  ;                              ( A    ,PSW:C, HL    , @HL  )
                  ;                              ( 0    , 0   , 0     , -    )
07AB 3E 04          MVI  A,BADCYC          A = BADCYC
                  ;                        IF INCYC .EQ. TRUE
                  ;                          CYCLE SWITCH SAYS METER NOT HOME
                  ;                          DECLARE DEAD METER, BAD SWITCH
07AD DA 85 10       JC   NVMDED              NVMDED(BADCYC,ERRFLG)
                  ;                                ( A     ,PSW:Z )
                  ;                                ( I     , 0    )
                  ;                        ELSE
                  ;                          CYCLE SWITCH SAYS METER IS HOME
                  ;                          INDICATE TRIP HAS STARTED
07B0 7E             MOV  A,M                 A = MRSTS1
```

```
07B1 F6 81       ORI  81H            MRSTS1.UNKSEL = TRUE
                ;                    MRSTS1.QUEREG = TRUE
07B3 77          MOV  M,A
07B4 23          INX  H              HL = ADDRESS, NORFLG
07B5 23          INX  H
07B6 7E          MOV  A,M            NORFLG.TRPREQ = FALSE
07B7 E6 F7       ANI  0F7H
07B9 F6 40       ORI  40H            NORFLG.QUEPOS = TRUE
07BB 77          MOV  M,A
                ;                    TRIP METER
07BC CD 7C 18    CALL MVTRIP         MVTRIP(ERROR)
                ;                          ( A    )
                ;                          ( 0    )
07BF B7          ORA  A              IF ERROR .NE. 0
                ;                      DECLARE TRIP ERROR
07C0 C2 80 08    JNZ  FATERR           FATERR(ERROR,ERRFLG)
                ;                            ( A   ,PSW:Z )
                ;                            ( I   , 0    )
                ;                    ELSE
                ;                      TRIP STARTED OK
                ;                      START AC MOTOR TO CONTINUE CYCLE
07C3 21 01 70    LXI  H,PORTA          HL = ADDRESS, PORTA
07C6 7E          MOV  A,M              PORTA = PORTA .AND. HEXEF
07C7 E6 EF       ANI  0EFH
07C9 77          MOV  M,A
07CA F3          DI                    DISABLE INTERRUPT
07CB CD 44 07    CALL DOACCT           ACCOUNT FOR TRIP
                ;                      PREVENT DOUBLE ACCOUNTING
07CE 21 24 74    LXI  H,MRSTS1/2+X     HL = ADDRESS, MRSTS1
07D1 7E          MOV  A,M              MRSTS1.INCYC = TRUE
07D2 F6 02       ORI  2
07D4 77          MOV  M,A
07D5 FB          EI                    ENABLE INTERRUPT
                ;                      CHECK CYCLE SWITCH WHILE NOT HOME
07D6 01 B8 0B    LXI  B,3000           BC = N = 3000 ;FOR 300 MSEC LOOP
                DOTR01;                LOOP
07D9 CD AF 0B    CALL RDCYC              RDCYC(INCYC,INCYC,ADRESS,MRSTS1)
                ;                              ( A   ,PSW:C, HL   , @HL  )
                ;                              ( 0   , 0   , 0    , -    )
                ;                        IF INCYC .EQ. TRUE
07DC DA ED 07    JC   DOTR02               BREAK
                ;                        ENDIF
07DF CD 19 0B    CALL NPAUSE             NPAUSE(N  ,ZROFLG)
                ;                               (BC ,PSW:Z )
                ;                               (I/O, 0    )
07E2 C2 D9 07    JNZ  DOTR01             IF N .EQ. 0
                ;                          TIMEOUT
                ;                          CYC SWT SAYS MOTOR STILL HOME
                ;                          FATAL ERROR, NOT IN CYCLE
07E5 3E 18       MVI  A,NINCYC             A = NINCYC
07E7 CD 80 08    CALL FATERR               FATERR(NINCYC,ERRFLG)
                ;                                ( A    ,PSW:Z )
                ;                                ( I    , 0    )
07EA C3 A0 08    JMP  FINTRP               TRY TO DRIVE METER HOME
                ;                          RETURN
                ;                        ENDIF
                DOTR02;                ENDLOOP
                ;                      CYCLE SWITCH SAYS CYCLE STARTED
                ;                      MOVE FROM TRIP TO LOCK
07ED CD 96 18    CALL MVLOCK           MVLOCK(ERROR)
                ;                            ( A    )
                ;                            ( 0    )
07F0 B7          ORA  A                IF ERROR .NE. 0
                ;                        DECLARE LOCK ERROR
07F1 C4 80 08    CNZ  FATERR             FATERR(ERROR,ERRFLG)
                ;                              ( A   ,PSW:Z )
                ;                              ( I   , 0    )
                ;                      ENDIF
```

```
                  ;                          CHECK CYCLE SWITCH WHEN HOME AGAIN
07F4 01 10 27       LXI  B,10000             BC = N = 10000 ;FOR 1 SEC LOOP
                  DOTR03;                    LOOP
07F7 CD AF 0B       CALL RDCYC                 RDCYC(INCYC,INCYC,ADRESS,MRSTS1)
                  ;                                ( A    ,PSW:C, HL    , @HL  )
                  ;                                ( 0    , 0   , 0     , -    )
                  ;                            IF INCYC .EQ. FALSE
07FA D2 0D 08       JNC  DOTR04                  BREAK
                  ;                            ENDIF
07FD CD 19 0B       CALL NPAUSE                NPAUSE(N  ,ZROFLG)
                  ;                                 (BC ,PSW:Z )
                  ;                                 (I/O, 0    )
0800 C2 F7 07       JNZ  DOTR03                IF N .EQ. 0
                  ;                              TIMEOUT
                  ;                              CYC SWT SAYS MOTOR NOT HOME
0803 E5             PUSH H                       SAVE HL
0804 CD D0 08       CALL FINTR4                  FATAL ERROR, SLOW TRIP
0807 E1             POP  H                       RESTORE HL
0808 3E FB          MVI  A,0FBH                  A = MASK, WILL SET:
                  ;                              MRSTS1.ENABLD = FALSE
080A C3 0F 08       JMP  DOTR05                  DISABLE METER
                  ; >>JUMP AHEAD<<               STOP AC MOTOR
                  ;                              RETURN
                  ;                            ENDIF
                  DOTR04;                    ENDLOOP
                  ;                          CYCLE SWITCH SAYS METER CAME HOME
                  ;                          INDICATE TRIP COMPLETION
080D 3E 7B          MVI  A,7BH               A = MASK, WILL SET:
                  ;                          MRSTS1.ENABLD = FALSE
                  ;                          MRSTS1.UNKSEL = FALSE
                  DOTR05;                    >>TARGET OF JUMP AHEAD<<
                  ;                          UPDATE MRSTS1 ACCORDING TO MASK
080F A6             ANA  M                   MRSTS1 = MASK .AND. MRSTS1
0810 77             MOV  M,A
                  DOTR06;                    ****ALTERNATE ENTRY POINT
                  ;                          STOP AC MOTOR
0811 21 01 70       LXI  H,PORTA             HL = ADDRESS, PORTA
0814 7E             MOV  A,M                 PORTA = PORTA .OR. HEX10
0815 F6 10          ORI  10H
0817 77             MOV  M,A
                  ;                        ENDIF
                  ;                      ENDIF
0818 C9             RET                  RETURN
                  ;ENDENT(ERRFLG)(NORFLG)
                  ;      (BIT   )(BITSTR)
                  ;      ( 0    )( I    )
                  ;      (PSW:Z )( RAM  )
                  ;      ( C    )( NC   )
                  ;
                  ;PSW DESTROYED
                  ;REGISTERS DESTROYED
                  ;
                  ;PROCESS END OF ENTRY HEADER
                  ;
                  ENDENT;                ****ENTRY POINT
0819 3A 26 74       LDA  NORFLG/2+X      IF(NORFLG.CMBIN .AND.
                  ;                         NORFLG.AMTIN) .NE. TRUE
081C 2F             CMA
081D E6 30          ANI  30H
                  ;                        PROCEEDURAL ERROR
081F C2 A1 0B       JNZ  PROERR            PROERR(ERRFLG)
                  ;                              (PSW:Z )
                  ;                              ( 0    )
                  ;                      ELSE
0822 CD 4E 0F       CALL LSTATE            LSTATE(FATMOD,NORMOD,SERMOD,PRVMOD)
                  ;                              (PSW:S ,PSW:Z ,PSW:P ,PSW:CY)
                  ;                              ( 0    , 0    , 0    , 0    )
                  ;                        IF SERMOD .EQ. TRUE
```

```
                  ;                           SERVICE MODE END OF ENTRY
0825 EA 63 0C      JPE  SEREOE                SEREOE(ERRFLG)
                  ;                                 (PSW:Z )
                  ;                                 ( 0    )
                  ;                         ELSE
                  ;                         IF PRVMOD .EQ. TRUE
                  ;                           MANUAL RESET
0828 DA E9 09      JC   MANRST                MANRST(ERRFLG)
                  ;                                 (PSW:Z )
                  ;                                 ( 0    )
                  ;                         ELSE
                  ;                           VARIABLE REMOTE RESET
082B C3 BE 13      JMP  VRMRS                 VRMRS(ERRFLG)
                  ;                                (PSW:Z )
                  ;                                ( 0    )
                  ;                         ENDIF
                  ;                       ENDIF
                  ;ENTAMT/ENTCMB(MSGBUF)(AMTBUF,CMBBUF,NORFLG)
                  ;             (NIBSTR)(NIBSTR,NIBSTR,BITSTR)
                  ;             ( I    )( 0    , 0    , 0    )
                  ;             ( @B   )( RAM  , RAM  , RAM  )
                  ;             ( NC   )( C    , C    , C    )
                  ;REGISTERS DESTROYED
                  ;PSW DESTROYED
                  ;
                  ;MOVE FIELD, FORMAT AND VALUE
                  ;FROM MESSAGE BUFFER TO APPROPRIATE RESET BUFFER
                  ;
                  ENTAMT;                 ****ENTRY POINT FOR RESET AMOUNT
082E 0E E0         MVI  C,AMTBUF          C = OFFSET, DEST = OFFSET, AMTBUF
                  ;                       SET TO SET NORFLG.AMTIN = TRUE
0830 3E 10         MVI  A,10H             A = MASK = HEX10
0832 C3 39 08      JMP  ENTCM1
                  ; >>JUMP AHEAD<<
                  ENTCMB;                 ****ENTRY POINT FOR RESET COMBINATION
0835 0E F0         MVI  C,CMBBUF          C = OFFSET, DEST = OFFSET, CMBBUF
                  ;                       SET TO SET NORFLG.CMBIN = TRUE
0837 3E 20         MVI  A,20H             A = MASK = HEX20
                  ENTCM1;                 >>TARGET OF JUMP AHEAD<<
0839 21 26 74      LXI  H,NORFLG/2+X      HL = ADDRESS, NORFLG
                  ;                       UPDATE FLAG
083C B6            ORA  M                 NORFLG = NORFLG .OR. MASK
083D 77            MOV  M,A
                  ;                       FETCH COUNT FROM MESSAGE FORMAT
083E CD 35 0F      CALL GETNIB            GETNIB(CNT,ZERO,MSGBUF)
                  ;                             ( A ,PSW:Z, @B  )
                  ;                             ( 0 , 0   , I   )
                  ;                       INCLUDE LEAD ZERO AND FORMAT IN COUNT
0841 C6 03         ADI  3                 CNT = (CNT+3) .AND. HEXFE
0843 E6 FE         ANI  0FEH
                  ;                       MOVE MESSAGE TO DESTINATION BUFFER
0845 C3 B3 0F      JMP  MVLNIB            MVLNIB(DEST,MSGBUF,CNT,PSW)
                  ;                             ( @C , @B   , A ,PSW)
                  ;                             ( 0  , I    , I , 0 )
                  ;                       RETURN
                  ;ENTSER()(MRSTS1)
                  ;         (BITSTR)
                  ;         ( 0    )
                  ;         ( RAM  )
                  ;         ( C    )
                  ;
                  ;PSW DESTROYED
                  ;REGISTERS DESTROYED
                  ;
                  ;ENTER SERVICE MODE
                  ;
                  ENTSER;                 ****ENTRY POINT
0848 21 24 74      LXI  H,MRSTS1/2+X      HL = ADDRESS, MRSTS1
```

```
084B 7E           MOV  A,M           MRSTS1.SERMOD = TRUE
084C F6 08        ORI  08H
084E E6 FB        ANI  0FBH          MRSTS1.ENABLD = FALSE
0850 77           MOV  M,A
0851 C9           RET                RETURN
                 ;EXTSER()(MRSTS1,NORFLG)
                 ;        (BITSTR,BITSTR)
                 ;        ( 0    , 0    )
                 ;        ( RAM  , RAM  )
                 ;        ( C    , C    )
                 ;
                 ;PSW DESTROYED
                 ;REGISTERS DESTROYED
                 ;
                 ;EXIT SERVICE MODE
                 ;
                 EXTSER;             ****ENTRY POINT
0852 21 24 74     LXI  H,MRSTS1/2+X  HL = ADDRESS, MRSTS1
0855 7E           MOV  A,M           MRSTS1.SERMOD = FALSE
0856 E6 F7        ANI  0F7H
0858 77           MOV  M,A
0859 23           INX  H             HL = ADDRESS, NORFLG
085A 23           INX  H
085B 7E           MOV  A,M           NORFLG.COMDSB = FALSE
085C E6 FB        ANI  0FBH
085E 77           MOV  M,A
085F C9           RET                RETURN
                 ;EXTTRP()(KDCTRL,MRSTS1,MTRCHR,SERFLG)
                 ;        (BITSTR,BITSTR,BITSTR,BITSTR)
                 ;        ( I    , I    , I    , I    )
                 ;        ( RAM  , RAM  , RAM  , RAM  )
                 ;        ( NC   , NC   , NC   , NC   )
                 ;
                 ;REGISTERS DESTROYED
                 ;PSW DESTROYED
                 ;
                 ;INITIATE TRIP IN RESPONSE TO EXTERNAL MESSAGE
                 ;
                 EXTTRP;             ****ENTRY POINT
                 ;                   SET TO REACH PROERR VIA RETURN
0860 21 A1 0B     LXI  H,PROERR
0863 E5           PUSH H
0864 3A 27 74     LDA KDCTRL/2+X     PSW:CY = KDCTRL.KBDDSB
0867 1F           RAR
                 ;                   IF KDCTRL.KBDDSB .EQ. FALSE
                 ;                     KEYBOARD HAS NOT BEEN DISABLED
0868 D0           RNC                  PROERR(ERRFLG)
                 ;                   ELSE
0869 21 24 74     LXI  H,MRSTS1/2+X  HL = ADDRESS, MRSTS1
086C 7E           MOV  A,M           PSW:Z =DISABL=MRSTS1.ENABLD .EQ. FALSE
086D E6 04        ANI  4
                 ;                   IF DISABL .EQ. TRUE
                 ;                     METER IS DISABLED
086F C8           RZ                   PROERR(ERRFLG)
                 ;                   ELSE
0870 2B           DCX  H               HL = ADDRESS, MTRCHR
0871 3A 10 74     LDA  SERFLG/2+X      A.2 = (.NOT. SERFLG.SNOLCK) .OR.
                 ;                           MTRCHR.TRPCTL
0874 17           RAL
0875 2F           CMA
0876 B6           ORA  M
0877 E6 20        ANI  20H             PSW:Z = TRPLCK = A.2 .EQ. FALSE
                 ;                     IF TRPLCK .EQ. TRUE
                 ;                       RESPONSE TO EXT TRIP IS FORBIDDEN
0879 C8           RZ                     PROERR(ERRFLG)
                 ;                     ELSE
                 ;                       EXTERNAL TRIPPING ALLOWED
087A E1           POP  H                 CLEAN UP STACK
```

```
087B C3 A5 07   JMP  DOTRIP            TRIP METER
               ;                      ENDIF
               ;                     ENDIF
               ;                     RETURN
               ;FATERR(CODE,ERRFLG)(MRSTS2,ERRCOD,NORFLG,ERRCNT)
               ;      (BYTE,BIT   )(BITSTR,BYTE  ,BITSTR,NIBSTR)
               ;      ( I  , 0    )( 0     , 0     , 0     , 0    )
               ;      ( A  ,PSW:Z )( RAM   , RAM   , RAM   , RAM  )
               ;      ( C  , C    )( C     , C     , C     , C    )
               ;
               ;PSW DESTROYED
               ;REGISTERS DESTROYED
               ;
               ;PROCESS FATAL ERROR
               ;
               FATINT;               ****ENTRY POINT FROM INTERRUPT VECTOR
               ;                     INDICATE WATCHDOG INTERRUPT OR
               ;                     INCORRECTLY ENABLED TEST INTERRUPT
087E 3E 17      MVI  A,BARF          A = BARF
               FATERR;               ****ENTRY POINT
0880 21 25 74   LXI  H,MRSTS2/2+X    HL = ADDRESS, MRSTS2
0883 46         MOV  B,M             IF MRSTS2.FATMOD .EQ. FALSE
0884 04         INR  B
0885 FA 9E 08   JM   FATE01
0888 32 0A 74   STA  ERRCOD/2+X        ERRCOD = CODE
088B 7E         MOV  A,M               MRSTS2.FATMOD = TRUE
088C F6 80      ORI  80H
088E 77         MOV  M,A
088F 23         INX  H                 HL = ADDRESS, NORFLG
0890 7E         MOV  A,M               NORFLG.QUESTS = TRUE
0891 F6 80      ORI  80H
0893 77         MOV  M,A
0894 21 0B 74   LXI  H,ERRCNT/2+X      HL = ADDRESS, ERRCNT
0897 7E         MOV  A,M               ERRCNT[0..1] = ERRCNT[0..1]+1
0898 3C         INR  A
0899 27         DAA
089A 77         MOV  M,A
089B CD 64 04   CALL PERDSP            MAKE ERROR DISPLAY
               FATE01;               ENDIF
089E AF         XRA  A               PSW:Z = ERRFLG = TRUE
089F C9         RET                  RETURN
               ;FINTRP()(MRSTS1,PORTA )
               ;         (BITSTR,BITSTR)
               ;         ( 0    , 0    )
               ;         ( RAM  , 7001 )
               ;         ( C    , C    )
               ;
               ;REGISTERS DESTROYED
               ;PSW DESTROYED
               ;
               ;ATTEMPT TO DRIVE METER HOME
               ;
               FINTRP;               ****ENTRY POINT
               ;                     START AC MOTOR
08A0 21 01 70   LXI  H,PORTA         HL = ADDRESS, PORTA
08A3 7E         MOV  A,M             PORTA = PORTA .AND. HEXEF
08A4 E6 EF      ANI  0EFH
08A6 77         MOV  M,A
               ;                     DRIVE METER FOR 0.2 SEC. TO INSURE
               ;                     THAT METER AT START OF TRIP CYCLE IS
               ;                     DRIVEN FAR ENOUGH TO MAKE THE CYCLE
               ;                     SWITCH AGREE WITH THE METER STATE.
08A7 01 D0 07   LXI  B,2000          BC = N = 2000; FOR 0.2 SEC. LOOP
               FINTR1;               DO UNTIL N .EQ. 0
08AA CD 19 0B   CALL NPAUSE            NPAUSE(N   ,ZROFLG)
               ;                             (BC  ,PSW:Z )
               ;                             (I/O, 0     )
08AD C2 AA 08   JNZ  FINTR1
```

```
                   ;                      ENDDO
                   ;                      NOW DRIVE METER HOME
08B0 01 40 1F       LXI  B,8000           BC = N = 8000; FOR 0.8 SEC. LOOP
                   FINTR2;                LOOP
                   ;                        READ CYCLE SWITCH
08B3 CD AF 0B       CALL RDCYC              RDCYC(INCYC,INCYC,ADRESS,MRSTS1)
                   ;                             ( A    ,PSW:C, HL    , @HL  )
                   ;                             ( O    , O   , O     , -    )
                   ;                        IF INCYC .EQ. FALSE
08B6 D2 BF 08       JNC  FINTR3               BREAK
                   ;                        ENDIF
08B9 CD 19 0B       CALL NPAUSE             NPAUSE(N   ,ZROFLG)
                   ;                              (BC ,PSW:Z )
                   ;                              (I/O, O    )
08BC C2 B3 08       JNZ  FINTR2             IF N .EQ. 0
                   ;                          BREAK
                   ;                        ENDIF
                   FINTR3;                ENDLOOP
08BF CD 11 08       CALL DOTR06           STOP AC MOTOR
                   ;                      READ CYCLE SWITCH
08C2 CD AF 0B       CALL RDCYC            RDCYC(INCYC,INCYC,ADRESS,MRSTS1)
                   ;                           ( A    ,PSW:C, HL    , @HL  )
                   ;                           ( O    , O   , O     , -    )
08C5 F5             PUSH PSW              SAVE A, PSW
                   ;                      COPY INCYC INTO MRSTS1
08C6 E6 82          ANI  82H
08C8 57             MOV  D,A
08C9 7E             MOV  A,M
08CA E6 7D          ANI  7DH
08CC B2             ORA  D
08CD 77             MOV  M,A              MRSTS1.UNKSEL = INCYC
                   ;                      MRSTS1.INCYC  = INCYC
08CE F1             POP  PSW              RESTORE A, PSW
08CF D0             RNC                   IF INCYC .EQ. TRUE
                   ;                        CYC SWT SAYS METER DIDN'T COME HOME
                   FINTR4;                  ****ALTERNATE ENTRY POINT
                   ;                        FATAL ERROR, SLOW TRIP
08D0 3E 08          MVI  A,TRPTIM           A = TRPTIM
08D2 C3 80 08       JMP  FATERR             FATERR(TRPTIM,ERRFLG)
                   ;                               ( A    ,PSW:Z )
                   ;                               ( I    , O    )
                   ;                      ENDIF
                   ;                      RETURN
                   ;HDRONY(HEADER,ERRFLG)(NORFLG,XMTBUF)
                   ;      (BYTE  ,BIT   )(BITSTR,NIBSTR)
                   ;      ( I    , O    )( O    , I    )
                   ;      ( A    ,PSW:Z )( RAM  , RAM  )
                   ;      ( NC   , C    )( C    , NC   )
                   ;
                   ;REGISTERS DESTROYED
                   ;PSW DESTROYED
                   ;
                   ;INITIATE PROCESSING  RELATED TO HEADERS WHICH CONSIST
                   ;OF A HEADER NOT FOLLOWED BY DATA
                   ;
                   HDRONY;                ****ENTRY POINT
08D5 B7             ORA  A                PSW:Z = ERRFLG = HEADER .EQ. HEX00
08D6 F5             PUSH PSW              SAVE A, PSW
08D7 21 1F 09       LXI  H,HDR002         SET TO RETURN TO ENDCASE
08DA E5             PUSH H
                   ;                      CASE (HEADER)
08DB FE 41          CPI  HENABL             **41: ENABLE METER
08DD CA F3 05       JZ   CMDENB
08E0 FE 42          CPI  HDISAB             **42: DISABLE METER
08E2 CA CD 05       JZ   CMDDSB
08E5 FE 46          CPI  HSETSV             **46: ENTER SERVICE MODE
08E7 CA 48 08       JZ   ENTSER
08EA FE 47          CPI  HCLRSV             **47: EXIT SERVICE MODE
```

```
0BEC CA 52 08   JZ   EXTSER
0BEF FE 4E      CPI  HEXTRP          **4E: EXTERNAL TRIP
0BF1 CA 60 08   JZ   EXTTRP
0BF4 FE 50      CPI  HREQST          **50: STATUS REQUEST
0BF6 C8         RZ                         CONTINUE
0BF7 FE 62      CPI  HENAKB          **62: ENABLE KEYBOARD
0BF9 CA 14 0F   JZ   ENAKBD
0BFC FE 63      CPI  HDISKB          **63: DISABLE KEYBOARD
0BFE CA 02 0F   JZ   DSBKBD
0901 21 1C 09   LXI  H,HDR001        SET TO RETURN TO ALTERNATE ENDCASE
0904 E3         XTHL
0905 FE 40      CPI  HREQAC          **40: ACCESS CODE REQUEST
0907 CA EE 12   JZ   ACCODE                ACCODE(ERRFLG)
                ;                                (PSW:Z )
                ;                                ( 0    )
090A FE 43      CPI  HENDEN          **43: END OF ENTRY
090C CA 19 08   JZ   ENDENT                ENDENT(ERRFLG)
                ;                                (PSW:Z )
                ;                                ( 0    )
090F FE 51      CPI  HREQPO          **51: SELECTION VALUE REQUEST
0911 CA 48 0C   JZ   SELVAL                SELVAL(ERRFLG)
                ;                                (PSW:Z )
                ;                                ( 0    )
0914 FE 5C      CPI  HREQSN          **5C: SERIAL NUMBER REQUEST
0916 CA 8D 06   JZ   DBLH01                DBLH01(TRUE ,ERRFLG)
                ;                                (PSW:Z,PSW:Z )
                ;                                ( I    , 0   )
                ;                    **ELSE: DOUBLY DEFINED HEADER
0919 C3 71 06   JMP  DBLHDR                DBLHDR(HEADER,ERRFLG)
                ;                                ( A    ,PSW:Z )
                ;                                ( I    , 0    )
                HDR001;              ALTERNATE ENDCASE, SAVES NEW ERRFLG
                ;                    PSW:Z = ERRFLG
091C C1          POP  B              A = HEADER
091D 78          MOV  A,B
091E F5          PUSH PSW            SAVE A, PSW
                HDR002;            ENDCASE
091F 21 26 74    LXI  H,NORFLG/2+X HL = ADDRESS, NORFLG
0922 3A 50 74    LDA  XMTBUF/2+X   IF XMTBUF[0..1] .EQ. 0
0925 B7          ORA  A
0926 C2 2D 09    JNZ  HDR003
                ;                    QUE DEFAULT STATUS MESSAGE
0929 7E          MOV  A,M            NORFLG.QUESTS = TRUE
092A F6 80       ORI  80H
092C 77          MOV  M,A
                HDR003;            ENDIF
092D F1          POP  PSW          A = HEADER
092E F5          PUSH PSW
092F FE 42       CPI  HDISAB       IF HEADER .NE. HDISAB
0931 CA 3F 09    JZ   HDR005
0934 E6 F0       ANI  0F0H           IF (HEADER .AND. HEXF0) .NE. HEX50
0936 FE 50       CPI  50H
0938 CA 3F 09    JZ   HDR004
                ;                      CANCEL ANY RESET IN PROGRESS
093B 7E          MOV  A,M
093C E6 CF       ANI  0CFH
093E 77          MOV  M,A              NORFLG.CMBIN = FALSE
                ;                      NORFLG.AMTIN = FALSE
                HDR004;              ENDIF
                HDR005;            ENDIF
093F F1          POP  PSW          A = HEADER
                ;                  PSW:Z = ERRFLG
0940 C9          RET               RETURN
                ;HDRPLS(HEADER,MSGBUF,ERRFLG)(NORFLG)
                ;      (BYTE  ,NIBSTR,BIT   )(BITSTR)
                ;      ( I    , I    , 0    )( 0    )
                ;      ( A    , @B   ,PSW:Z )( RAM  )
                ;      ( NC   , NC   , C    )( C    )
```

```
                   ;
                   ;REGISTERS DESTROYED
                   ;PSW DESTROYED
                   ;
                   ;INITIATE PROCESSING RELATED TO HEADERS WHICH CONSIST
                   ;OF A HEADER ASSOCIATED WITH DATA
                   ;
                   HDRPLS;                  ****ENTRY POINT
0941 B7              ORA  A                 PSW:Z = ERRFLG = HEADER .EQ. HEX00
0942 F5              PUSH PSW               SAVE A, PSW
0943 21 26 74        LXI  H,NORFLG/2+X      HL = ADDRESS, NORFLG
                   ;                        CHECK FOR INTERRUPTED RESET SEQUENCE
0946 FE C5           CPI  HENTAM            IF HEADER .NE. HENTAM
0948 CA 54 09        JZ   HDRP02
094B FE C6           CPI  HENTCO              IF HEADER .NE. HENTCO
094D CA 54 09        JZ   HDRP01
0950 7E              MOV  A,M
0951 E6 CF           ANI  0CFH
0953 77              MOV  M,A                   NORFLG.CMBIN. = FALSE
                   ;                            NORFLG.AMTIN = FALSE
                   HDRP01;                    ENDIF
                   HDRP02;                  ENDIF
                   ;                        QUE STATUS MESSAGE
0954 7E              MOV  A,M               NORFLG.QUESTS = TRUE
0955 F6 80           ORI  80H
0957 77              MOV  M,A
0958 F1              POP  PSW               A = HEADER
0959 F5              PUSH PSW
095A 21 7C 09        LXI  H,HDRP04          SET TO RETURN TO ENDCASE
095D E5              PUSH H
                   ;                        CASE (HEADER)
095E FE C5           CPI  HENTAM              **C5: ENTER AMOUNT
0960 CA 2E 08        JZ   ENTAMT                    ENTAMT(MSGBUF)
                   ;                                       ( @B    )
                   ;                                       ( I     )
0963 FE C6           CPI  HENTCO              **C6: ENTER COMBINATION
0965 CA 35 08        JZ   ENTCMB                    ENTCMB(MSGBUF)
                   ;                                       ( @B    )
                   ;                                       ( I     )
0968 21 79 09        LXI  H,HDRP03            SET TO RETURN TO ALTERNATE ENDCASE
096B E3              XTHL
096C FE C0           CPI  HSETMN              **C0: ENTER SERIAL NUMBER
096E CA 38 0A        JZ   MSERNO                    MSERNO(MSGBUF,ERRFLG)
                   ;                                       ( @B    ,PSW:Z )
                   ;                                       ( I     , O    )
0971 FE C1           CPI  HSETPO              **C1: SET POSTAGE
0973 CA 9F 0C        JZ   SETPOS                    SETPOS(MSGBUF,ERRFLG)
                   ;                                       ( @B    ,PSW:Z )
                   ;                                       ( I     , O    )
                   ;                          **ELSE: PROCESS ERROR
0976 C3 A1 0B        JMP   PROERR                   PROERR(ERRFLG)
                   ;                                       (PSW:Z )
                   ;                                       ( O    )
                   HDRP03;                    ALTERNATE ENDCASE, SAVES NEW ERRFLG
0979 C1              POP  B                   A = HEADER
097A 78              MOV  A,B                 PSW:Z = ERRFLG
097B F5              PUSH PSW                 SAVE A, PSW
                   HDRP04;                  ENDCASE
097C F1              POP  PSW               A = HEADER
                   ;                        PSW:Z = ERRFLG
097D C9              RET                    RETURN
                   ;IDLE()(CTLBKT,KDCTRL,MRSTS1,NORFLG,RECBUF,XMTBUF)
                   ;      (BYTE  ,BITSTR,BITSTR,BITSTR,BYTSTR,BYTSTR)
                   ;      ( I    , I    , I/O  , I    , I    , I    )
                   ;      ( RAM  , RAM  , RAM  , RAM  , RAM  , RAM  )
                   ;      ( NC   , NC   , C    , NC   , NC   , NC   )
                   ;
                   ;MAINLINE IDLE LOOP
```

```
                     ;
                     IDLE;                    LOOP
097E FB                EI                       ENABLE INTERRUPTS
                     ;                          SET TO RESTART LOOP
097F 21 7E 09          LXI  H,IDLE              HL = ADDRESS, IDLE
0982 E5                PUSH H                   PUSH HL, USED BY RETURN STATEMENTS
                     ;                          UPDATE METER STATUS:
0983 CD 78 07          CALL DOSTAT              WITH RESPECT TO SWITCHES/SENSORS
0986 CD 23 0B          CALL POSUPD              WITH RESPECT TO POSTAGE SETTING
0989 CD 6B 10          CALL NVMCHG              WITH RESPECT TO NONVOLATILE MEMORY
098C 3A 50 74          LDA  XMTBUF/2+X          A = XMTBUF[0]
098F B7                ORA  A                   IF XMTBUF[0] .NE. 0
0990 C2 15 0E          JNZ  XMIT                  TRANSMIT MESSAGE
                     ;                          ELSE
0993 3A 26 74          LDA  NORFLG/2+X          A = NORFLG
0996 4F                MOV  C,A                 C = NORFLG
0997 17                RAL                      PSW:CY = NORFLG.QUESTS
                     ;                          IF NORFLG.QUESTS .EQ. TRUE
0998 DA F4 0A          JC   MTRSTS                TRANSMIT METER STATUS
                     ;                          ELSE
099B 17                RAL                      PSW:CY = NORFLG.QUEPOS
099C D2 A4 09          JNC  IDLE01              IF NORFLG.QUEPOS .EQ. TRUE
                     ;                            REQUEST POSTAGE SETTING
099F 3E 51             MVI  A,HREQPO              A = HREQPO
09A1 C3 C7 0D          JMP  XEQHDR                XEQHDR(HREQPO,ERRFLG)
                     ;                                  ( A    ,PSW:Z )
                     ;                                  ( I    , 0    )
                     IDLE01;
                     ;                          ELSE
09A4 CD 4E 0F          CALL LSTATE              LSTATE(FATMOD,NORMOD,SERMOD,PRVMOD)
                     ;                                (PSW:S ,PSW:Z ,PSW:P ,PSW:CY)
                     ;                                ( 0    , 0    , 0    , 0     )
09A7 C2 D1 09          JNZ  IDLE03              IF NORMOD .EQ. TRUE
09AA 21 24 74          LXI  H,MRSTS1/2+X          HL = ADDRESS, MRSTS1
09AD 7E                MOV  A,M                   PSW:CY = MRSTS1.QUEREG
09AE 1F                RAR
09AF D2 D1 09          JNC  IDLE02                IF MRSTS1.QUEREG .EQ. TRUE
                     ;                              TRIP HAS COMPLETED NORMALLY
09B2 B7                ORA  A                       MRSTS1.QUEREG = FALSE
09B3 17                RAL
09B4 77                MOV  M,A
09B5 21 2B 74          LXI  H,CTLBKT/2+X            HL = ADDRESS, CTLBKT
09B8 3E 41             MVI  A,41H                   PSW:Z = CTLBKT .EQ. HEX41
09BA AE                XRA  M
09BB 3E 52             MVI  A,HREQAR                A = HREQAR
                     ;                              IF CTLBKT .EQ. HEX41
                     ;                                REQUEST ASCENDING REGISTER
09BD CA C7 0D          JZ   XEQHDR                    XEQHDR(HREQAR,ERRFLG)
                     ;                                      ( A    ,PSW:Z )
                     ;                                      ( I    , 0    )
                     ;                              ELSE
09C0 3E 31             MVI  A,31H                   PSW:Z = CTLBKT .EQ. HEX31
09C2 AE                XRA  M
09C3 3E 53             MVI  A,HREQDR                A = HREQDR
                     ;                              IF CTLBKT .EQ. HEX31
                     ;                                REQUEST DESCENDING REGISTER
09C5 CA C7 0D          JZ   XEQHDR                    XEQHDR(HREQDR,ERRFLG)
                     ;                                      ( A    ,PSW:Z )
                     ;                                      ( I    , 0    )
                     ;                              ELSE
09C8 3E 21             MVI  A,21H                   PSW:Z = CTLBKT .EQ. HEX21
09CA AE                XRA  M
09CB 3E 55             MVI  A,HREQPC                A = HREQPC
                     ;                              IF CTLBKT .EQ. HEX21
                     ;                                REQUEST PIECE COUNT
09CD CA C7 0D          JZ   XEQHDR                    XEQHDR(HREQPC,ERRFLG)
                     ;                                      ( A    ,PSW:Z )
                     ;                                      ( I    , 0    )
```

```
                    ;                        ENDIF
09D0 C9               RET
                    IDLE02;                ENDIF
                    IDLE03;              ELSE
09D1 3A 48 74        LDA  RECBUF/2+X      A = RECBUF[0]
09D4 B7               ORA  A              IF RECBUF[0] .NE. 0
09D5 C2 EE 09         JNZ  MESAGE           PROCESS MESSAGE
                    ;                    ELSE
09D8 3E 08            MVI  A,08H          PSW:Z = NORFLG.TRPREQ .EQ. FALSE
09DA A1               ANA  C
09DB CA E6 09         JZ   IDLE04         IF NORFLG.TRPREQ .EQ. TRUE
09DE 3A 27 74         LDA  KDCTRL/2+X       PSW:CY = KDCTRL.KBDDSB
09E1 1F               RAR
                    ;                       IF KDCTRL.KBDDSB .EQ. FALSE
09E2 D2 A5 07         JNC  DOTRIP             PROCESS TRIP REQUEST
                    ;                       ENDIF
09E5 C9               RET
                    IDLE04;              ELSE
09E6 C3 2E 03         JMP  KEYBRD           PROCESS KEYBOARD
                    ;                    ENDIF
                    ;                  ENDLOOP
                    ;MANRST
                    ;
                    ;REGISTERS DESTROYED
                    ;PSW DESTROYED
                    ;
                    ;MANUAL METER RESET
                    ;
                    MANRST;            ****ENTRY POINT
                    ;                  DECLARE SOFTWARE ERROR
09E9 3E 02            MVI  A,SFTWRE       A = SFTWRE
09EB C3 80 08         JMP  FATERR         FATERR(SFTWRE,ERRFLG)
                    ;                           ( A    ,PSW:Z )
                    ;                           ( I    , O    )
                    ;                  RETURN
                    ;MESAGE()(RECBUF,XMTBUF,DBUF   )
                    ;        (NIBSTR,NIBSTR,NIBSTR)
                    ;        ( I/O  , I    , O    )
                    ;        ( RAM  , RAM  , RAM  )
                    ;        ( C    , NC   , C    )
                    ;
                    ;PSW DESTROYED
                    ;REGISTERS DESTROYED
                    ;
                    ;PROCESS MESSAGE RECEIVED FROM EXTERNAL DEVICE
                    ;
                    MESAGE;            ****ENTRY POINT
                    ;                  REMEMBER IF XMTBUF CLEAR ON ENTRY
09EE 3A 50 74         LDA  XMTBUF/2+X     PSW:Z = XMTCLR = XMTBUF[0..1] .EQ. 0
09F1 B7               ORA  A
09F2 F5               PUSH PSW            SAVE A, PSW
09F3 21 48 74         LXI  H,RECBUF/2+X   HL = ADDRESS, RECBUF[0..1]
                    ;                  FETCH MESSAGE SIZE, IN BYTES
09F6 4E               MOV  C,M            C = SIZE = RECBUF[0..1]
                    ;                  FLAG MESSAGE AS PROCESSED
09F7 36 00            MVI  M,0            RECBUF[0..1] = 0
09F9 23               INX  H              HL = ADDRESS, RECBUF[2..3]
09FA 0D               DCR  C              C = SIZE-1
09FB C2 1A 0A         JNZ  MESAG3         IF (SIZE-1) .EQ. 0
09FE 7E               MOV  A,M              A = HEADER = RECBUF[2..3]
                    ;                    PROCESS MESSAGE WITHOUT DATA
09FF CD D5 08         CALL HDRONY           HDRONY(HEADER,ERRFLG)
                    ;                            ( A    ,PSW:Z )
                    ;                            ( I    , O    )
0A02 CA 17 0A         JZ   MESAG2           IF ERRFLG .EQ. FALSE
0A05 FE 51            CPI  HREQPO             IF HEADER .EQ. HREQPO
0A07 C2 17 0A         JNZ  MESAG1
                    ;                           REVERT TO SETTING DISPLAY
```

```
0A0A 01 80 A2   LXI  B,(XMTBUF+2)*100H+DBUF+0
               ;                        B = OFFSET, XMTBUF[2]
               ;                        C = OFFSET, DBUF[0]
0A0D 3A 50 74   LDA  XMTBUF/2+X         A = NIBCNT = XMTBUF[0..1]*2
0A10 87         ADD  A
0A11 CD B3 0F   CALL MVLNIB             MVLNIB(DBUF[0],XMTBUF[2],NIBCNT,
               ;                               ( @C    , @B      , A    ,
               ;                               ( 0     , I       , I    ,
               ;
               ;                               NONBCD,ZERO )
               ;                               PSW:S ,PSW:Z)
               ;                                0    , 0    )
0A14 CD 5A 05   CALL VALDSP             DISPLAY CONTENTS OF DBUF
               MESAG1;                 ENDIF
               MESAG2;                ENDIF
0A17 C3 31 0A   JMP  MESAG6
               MESAG3;               ELSE
               ;                       CHECK FORMAT AGAINST MESSAGE SIZE
0A1A 06 94      MVI  B,RECBUF+4         B = OFFSET, RECBUF[4]
0A1C CD 35 0F   CALL GETNIB             GETNIB(NIBCNT,ZERO ,RECBUF[4])
               ;                              ( A    ,PSW:Z, @B      )
               ;                              ( 0    , 0   , I       )
0A1F 3C         INR  A                  A = BYTCNT = (NIBCNT+1)/2
0A20 B7         ORA  A
0A21 1F         RAR
0A22 0D         DCR  C                  C = SIZE-2
0A23 B9         CMP  C                  IF BYTCNT .EQ. (SIZE-2)
0A24 C2 2E 0A   JNZ  MESAG4
               ;                         PROCESS MESSAGE WITH DATA
0A27 7E         MOV  A,M                 A = HEADER = RECBUF[2..3]
0A28 CD 41 09   CALL HDRPLS              HDRPLS(HEADER,RECBUF[4],ERRFLG)
               ;                                ( A    , @B      ,PSW:Z )
               ;                                ( I    , I       , 0    )
0A2B C3 31 0A   JMP  MESAG5
               MESAG4;                 ELSE
               ;                         BAD MESSAGE, PROCEEDURAL ERROR
0A2E CD A1 0B   CALL PROERR              PROERR(ERRFLG)
               ;                                (PSW:Z )
               ;                                ( 0    )
               MESAG5;                 ENDIF
               MESAG6;               ENDIF
               ;                     CHECK FOR OVERLAY OF TRANSMIT BUFFER
0A31 F1         POP  PSW             PSW:Z = XMTCLR
0A32 3E 12      MVI  A,BUFOVR        A = BUFOVR
               ;                     IF XMTCLR .EQ. FALSE
               ;                       BUFFER OVERLAY, FATAL ERROR
0A34 C4 80 08   CNZ  FATERR            FATERR(BUFOVR,ERRFLG)
               ;                              ( A    ,PSW:Z )
               ;                              ( I    , 0    )
               ;                     ENDIF
0A37 C9         RET                  RETURN
               ;MSERNO(MSGBUF,ERRFLG)(ASCCRC,ASCREG,CTLCRC,DSCCRC,DSCREG,
               ;      (NIBSTR,BIT   )(BYTE  ,NIBSTR,BYTE  ,BYTE  ,NIBSTR,
               ;      ( I     , 0   )( 0    , 0    , 0    , 0    , 0    ,
               ;      ( @B    ,PSW:Z )( RAM , RAM  , RAM  , RAM  , RAM  ,
               ;      ( NC    , C   )( C    , C    , C    , C    , C    ,
               ;
               ;      ERRCNT,ERRCOD,PCEREG,SERFLG,SERNUM)
               ;      NIBSTR,BYTE  ,NIBSTR,BITSTR,NIBSTR)
               ;       0    , 0    , 0    , I/O  , I/O  )
               ;       RAM  , RAM  , RAM  , RAM  , RAM  )
               ;       C    , C    , C    , C    , C    )
               ;
               ;PSW DESTROYED
               ;REGISTERS DESTROYED
               ;
               ;REDEFINE UNLOCKED SERIAL NUMBER OR
               ;LOCK SERIAL NUMBER TO PREVENT FURTHER REDEFINITION
```

```
                  ;                       ****ENTRY POINT
                  MSERNO;                 
                  ;                       SET TO REACH PROERR VIA RETURN
0A38 21 A1 0B      LXI  H,PROERR
0A3B E5            PUSH H
                  ;                       CONVERT OFFSET INTO ADDRESS
0A3C 16 74         MVI  D,X/100H          DE = ADDRESS, MSGBUF[0..1]
0A3E AF            XRA  A
0A3F 78            MOV  A,B
0A40 1F            RAR
0A41 5F            MOV  E,A
                  ;                       ADJUST OFFSET
0A42 04            INR  B                 B = OFFSET, MSGBUF[3]
0A43 04            INR  B
0A44 04            INR  B
                  ;                       CHECK FOR VARIOUS ERROR CONDITIONS
0A45 CD 4E 0F      CALL LSTATE            LSTATE(FATMOD,NORMOD,SERMOD,PRVMOD)
                  ;                           (PSW:S ,PSW:Z ,PSW:P ,PSW:CY)
                  ;                           ( 0    , 0    , 0    , 0     )
                  ;                       IF FATMOD .EQ. TRUE
                  ;                         METER HAS FATALED
0A48 F8            RM                       PROERR(ERRFLG)
                  ;                         RETURN
                  ;                       ELSE
                  ;                       IF SERMOD .EQ. FALSE
                  ;                         METER NOT IN SERVICE MODE
0A49 E0            RPO                      PROERR(ERRFLG)
                  ;                         RETURN
                  ;                       ELSE
0A4A 3A 10 74      LDA  SERFLG/2+X        PSW:Z = OPEN = SERFLG.SNOLCK .EQ. TRUE
0A4D E6 10         ANI  10H
                  ;                       IF OPEN .EQ. FALSE
                  ;                         METER NUMBER ALREADY LOCKED
0A4F C0            RNZ                      PROERR(ERRFLG)
                  ;                         RETURN
                  ;                       ELSE
0A50 1A            LDAX D                 PSW:Z = FMTOK = MSGBUF[0..1].EQ.HEX8F
0A51 FE 8F         CPI  8FH
                  ;                       IF FMTOK .EQ. FALSE
                  ;                         NOT 8 CHARACTERS WITHOUT DECIMAL
0A53 C0            RNZ                      PROERR(ERRFLG)
                  ;                         RETURN
                  ;                       ELSE
0A54 13            INX  D                 DE = ADDRESS, MSGBUF[2..3]
0A55 1A            LDAX D                 A = MSGBUF[2..3]
0A56 FE 20         CPI  20H               PSW:CY = CODEOK = MSGBUF[2..3].LT.HEX20
                  ;                       IF CODEOK .EQ. FALSE
                  ;                         CODE IS NOT 0 OR 1
0A58 D0            RNC                      PROERR(ERRFLG)
                  ;                         RETURN
                  ;                       ENDIF
                  ;                       PROCESS ACCORDING TO CODE IN MSGBUF[2]
0A59 FE 10         CPI  10H               PSW:CY = CODE0 = MSGBUF[2..3].LT.HEX10
0A5B 3E 07         MVI  A,7               A = NIBCNT = 7
0A5D D2 6D 0A      JNC MSERN1             IF CODE0 .EQ. TRUE
                  ;                         SERIAL NUMBER IS BEING ENTERED
                  ;                         CHECK INPUT DATA
0A60 48            MOV  C,B                 C = OFFSET, MSGBUF[3]
0A61 CD B3 0F      CALL MVLNIB              MVLNIB(MSGBUF[3],MSGBUF[3],NIBCNT,
                  ;                               ( @C      , @B      , A    ,
                  ;                               ( 0       , I       , I    ,
                  ;
                  ;                               NONBCD,ZROFLG)
                  ;                               PSW:S ,PSW:Z )
                  ;                                0    , 0    )
                  ;                         IF NONBCD .EQ. TRUE
                  ;                           BAD INPUT
0A64 F8            RM                         PROERR(ERRFLG)
```

```
                ;                     ELSE
                ;                       STORE NEW SERIAL NUMBER
0A65 0E 21       MVI  C,SERNUM          C = OFFSET, SERNUM
0A67 CD B3 0F    CALL MVLNIB            MVLNIB(SERNUM[0],MSGBUF[3],NIBCNT,
                ;                              ( @C       , @B       , A    ,
                ;                              ( 0        , I        , I    ,
                ;
                ;                              NONBCD,ZROFLG)
                ;                              PSW:S ,PSW:Z )
                ;                               0    , 0    )
                ;                     ENDIF
0A6A E1          POP  H               CLEAN UP STACK
0A6B 0C          INR  C               PSW:Z = ERRFLG = (C+1).EQ.0 = FALSE
0A6C C9          RET
               MSERN1;              ELSE
                ;                     SERIAL NUMBER IS BEING LOCKED
                ;                     CHECK INPUT DATA
0A6D 50          MOV  D,B             D = OFFSET, MSGBUF[3]
0A6E 1E 21       MVI  E,SERNUM        E = OFFSET, SERNUM[0]
0A70 CD 8E 0E    CALL CMPARE          CMPARE(MSGBUF[3],SERNUM[0],NIBCNT,
                ;                            ( @D       , @E       , A    ,
                ;                            ( I        , I        , I    ,
                ;
                ;                            NEGFLG,ZROFLG)
                ;                            PSW:S ,PSW:Z )
                ;                             0    , 0    )
                ;                     IF ZROFLG .EQ. FALSE
                ;                       INPUT DOESN'T MATCH SERIAL NUMBER
0A73 C0          RNZ                    PROERR(ERRFLG)
                ;                     ELSE
0A74 CD 9E 12    CALL NVMWR             WRITE NEW ACTIVE SERVICE BLOCK
                ;                       NO BLOCK IS NOW OPEN
                ;                       LOCK SERIAL NUMBER
0A77 21 10 74    LXI  H,SERFLG/2+X      HL = ADDRESS, SERFLG
0A7A 7E          MOV  A,M               SERFLG.SNOLCK = TRUE
0A7B F6 10       ORI  10H
0A7D 77          MOV  M,A
                ;                       UPDATE DATA FOR NORMAL BLOCK
                ;                       CLEAR PIECE COUNT REGISTER
                ;                       CLEAR ASCENDING REGISTER
                ;                       CLEAR DESCENDING REGISTER
0A7E AF          XRA A                  A = NULL = 0
0A7F 01 28 1A    LXI  B,(4+PCESIZ+DSCSIZ+ASCSIZ)*100H+PCEREG
                ;                       B = NIBCNT = 4+PCESIZ+DSCSIZ+ASCSIZ
                ;                       C = OFFSET, PCEREG
0A82 CD 24 0F    CALL FILNIB            FILNIB(PCEREG,NULL,NIBCNT)
                ;                              ( @C    , A  , B    )
                ;                              ( 0     , I  , I    )
                ;                       CLEAR ERROR CODE
0A85 32 0A 74    STA  ERRCOD/2+X        ERRCOD = 0
                ;                       CLEAR ERROR COUNT
0A88 32 0B 74    STA  ERRCNT/2+X        ERRCNT = 0
                ;                       STORE NEW CONTROL SUM CRC
0A8B CD 4E 06    CALL CTLSUM            CTLSUM(CSMCRC,ERRFLG)
                ;                              ( D    ,PSW:Z )
                ;                              ( 0    , 0    )
0A8E 7A          MOV  A,D               CTLCRC = CSMCRC
0A8F 32 08 74    STA  CTLCRC/2+X
                ;                       STORE NEW ASCENDING REGISTER CRC
0A92 01 38 08    LXI  B,ASCSIZ*100H+ASCREG
                ;                       B = NIBCNT = ASCSIZ
                ;                       C = OFFSET, ASCREG
0A95 CD B1 0E    CALL CRC               CRC(ASCREG,NIBCNT,CRCVAL)
                ;                         ( @C    , B    , D    )
0A98 7A          MOV  A,D               ASCCRC = CRCVAL
0A99 32 20 74    STA  ASCCRC/2+X
                ;                       STORE NEW DESCENDING REGISTER CRC
0A9C 01 2F 07    LXI  B,DSCSIZ*100H+DSCREG
```

```
                     ;                       B = NIBCNT = DSCSIZ
                     ;                       C = OFFSET, DSCREG
0A9F CD B1 0E   CALL CRC                     CRC(DSCREG,NIBCNT,CRCVAL)
                     ;                          ( @C   , B    , D    )
                     ;                          ( I    , I    , O    )
0AA2 7A         MOV  A,D                     DSCCRC = CRCVAL
0AA3 32 1B 74   STA  DSCCRC/2+X
0AA6 E1         POP  H                       CLEAN UP STACK
                     ;                       WRITE NORMAL BLOCK AND
                     ;                       OPEN ERASED SERVICE BLOCK
0AA7 C3 19 12   JMP  NVMSTO                  NVMSTO(ERRFLG)
                     ;                             (PSW:Z )
                     ;                             ( O    )
                     ;                     ENDIF
                     ;                   ENDIF
                     ;                   RETURN
                ;MSG2MU(FMTNIB,DSTSIZ,ERRFLG)(WORK1 ,DEFDCM,DIEDCM)
                ;      (NIBSTR,UBYTE ,BIT   )(NIBSTR,BYTE  ,BYTE  )
                ;      ( I    , I    , O    )( O    , I    , I    )
                ;      ( @B   , D    ,PSW:Z )( RAM  , RAM  , RAM  )
                ;      ( NC   , NC   , C    )( C    , NC   , NC   )
                ;
                ;PSW DESTROYED
                ;REGISTERS DESTROYED
                ;
                ;TRANSFORM FORMAT AND DATA IN MESSAGE FORMAT INTO A  METER
                ;UNIT FORMAT BCD STRING RIGHT JUSTIFIED IN WORK1.
                ;
                MSG2MU;                 ****ENTRY POINT
                ;                       CLEAR OUTPUT BLOCK
0AAA 3E C0      MVI  A,WORK1            A = OFFSET, WORK1[J=0]
0AAC CD 85 0E   CALL CLRBLK             CLRBLK(WORK1)
                ;                             ( @A  )
                ;                             ( O   )
0AAF 2E 01      MVI  L,1                L = FLAGV = 1; WHICH DECREMENTS TO 0
                ;                       PRODUCING:
                ;                       PSW:Z = ERRFLG = TRUE
                ;                       CALCULATE TOTAL CHARACTER COUNT
                ;                       INCLUDING POSSIBLE LEADING ZERO
                ;                       B = OFFSET, FMTNIB[I=0]
0AB1 CD 35 0F   CALL GETNIB             GETNIB(NTOTAL,ZERO ,FMTNIB[I])
                ;                             ( A    ,PSW:Z, @B       )
                ;                             ( O    , O   , I        )
0AB4 3C         INR  A                  H = NTOTAL = (NTOTAL+1) .AND. HEXFE
0AB5 E6 FE      ANI  0FEH
0AB7 67         MOV  H,A
                ;                       CALCULATE COUNT OF CHARACTERS TO RIGHT
                ;                       OF DECIMAL POINT
0AB8 04         INR  B                  B = OFFSET, FMTNIB[I=1]
0AB9 CD 35 0F   CALL GETNIB             GETNIB(NFRAC,ZERO ,FMTNIB[I])
                ;                             ( A   ,PSW:Z, @B       )
                ;                             ( O   , O   , I        )
                ;                       CHECK FOR UNSPECIFIED DECIMAL POSITION
0ABC FE 0F      CPI  0FH                IF NFRAC .EQ. HEXOF
0ABE C2 C4 0A   JNZ  MSG2M1
                ;                         USE DEFAULT DECIMAL POSITION
0AC1 3A 36 74   LDA  DEFDCM/2+X           A = NFRAC = DEFDCM
                MSG2M1;                 ENDIF
                ;                       CHECK FOR TOO MANY FRACTIONAL DIGITS
0AC4 4F         MOV  C,A                C = NFRAC
0AC5 3A 35 74   LDA  DIEDCM/2+X         A = DIEDCM
0AC8 B9         CMP  C                  IF DIEDCM .GE. NFRAC
0AC9 DA F2 0A   JC   MSG2M5
                ;                         THERE IS ROOM FOR FRACTIONAL DIGITS
                ;                         CALCULATE INDEX FOR LOW ORDER DIGIT
0ACC 2F         CMA                       A = J = 15-DIEDCM+NFRAC
0ACD C6 10      ADI  16
```

```
OACF 81         ADD  C
                ;                        CHECK DATA LENGTH AND ALIGNMENT WITH
                ;                        RESPECT TO WORK AREA
OAD0 BC         CMP  H                   IF DINDEX .GE. NTOTAL
OAD1 DA F2 0A   JC   MSG2M4
                ;                          DATA FITS IN WORK AREA
                ;                          MOVE DATA INTO WORK AREA
OAD4 C6 C0      ADI  WORK1                 C = OFFSET, WORK1[J]
OAD6 4F         MOV  C,A
OAD7 78         MOV  A,B                   B = OFFSET, FMTNIB[I=NTOTAL+1]
OAD8 84         ADD  H
OAD9 47         MOV  B,A
OADA 7C         MOV  A,H                   A = NTOTAL
OADB CD C2 0F   CALL MVRNIB                MVRNIB(WORK1[J],FMTNIB[I],NTOTAL,
                ;                                ( @C      , @B      , A    ,
                ;                                ( O       , I       , I    ,
                ;
                ;
                ;                          NONBCD,ZROFLG)
                ;                          PSW:S ,PSW:Z )
                ;                           O    , O     )
                ;                          CHECK CHARACTERS MOVED
OADE FA F2 0A   JM   MSG2M3                IF NONBCD .EQ. FALSE
                ;                            ONLY NUMERIC CHARS WERE MOVED.
                ;                            CHECK DATA LENGTH WITH RESPECT TO
                ;                            DECLARED SIZE OF DESTINATION.
                ;                            SET INDEX TO LEFT OF DECLARED
                ;                            HIGH ORDER DIGIT POSITION.
OAE1 7A         MOV  A,D                     A = I = 15-DSTSIZ
OAE2 2F         CMA
OAE3 C6 10      ADI  16
                ;                            CALCULATE NUMBER OF DIGIT
                ;                            POSITIONS ABOVE HIGH ORDER
                ;                            DIGIT POSITION
OAE5 67         MOV  H,A                     H = NTOTAL = 16-DSTSIZ
OAE6 24         INR  H
                ;                            SCAN POSITIONS ABOVE HIGH ORDER
                ;                            DIGIT POSITION
OAE7 C6 C0      ADI  WORK1                   B = OFFSET, WORK1[I]
OAE9 47         MOV  B,A
OAEA 7C         MOV  A,H                     A = NTOTAL
OAEB CD 0F 10   CALL RSCAN                   RSCAN(WORK1[I],NTOTAL,
                ;                                ( @B      , A    ,
                ;                                ( I       , I    ,
                ;
                ;                                NONBCD,ZROFLG)
                ;                                PSW:S ,PSW:Z )
                ;                                 O    , O     )
                ;                            CHECK CHARACTERS SCANNED
OAEE C2 F2 0A   JNZ  MSG2M2                  IF ZROFLG .EQ. FALSE
                ;                              DECLARED DATA LENGTH EXCEEDED
OAF1 2C         INR  L                         L = FLAGV = 2; DECREMENTS TO 1
                ;                              PRODUCING:
                ;                              PSW:Z = ERRFLG = FALSE
                MSG2M2;                      ENDIF
                MSG2M3;                    ENDIF
                MSG2M4;                  ENDIF
                MSG2M5;                ENDIF
OAF2 2D         DCR  L                 PSW:Z = ERRFLG
OAF3 C9         RET                    RETURN
                ;MTRSTS()(XMTBUF,KDCTRL,MRSTS1,MRSTS2,NORFLG)
                ;        (BYTSTR,BITSTR,BITSTR,BITSTR,BITSTR)
                ;        ( O    , I    , I    , I    , O     )
                ;        ( RAM  , RAM  , RAM  , RAM  , RAM   )
                ;        ( C    , NC   , NC   , NC   , C     )
                ;
                ;ALL REGISTERS DESTROYED
                ;PSW DESTROYED
```

```
                   ;
                   ;PUT CURRENT STATUS MESSAGE INTO TRANSMIT BUFFER
                   ;
                   MTRSTS;                 ****ENTRY POINT
0AF4 21 03 80        LXI  H,HSTAT*100H+3
                   ;                       L = BYTCNT = 3
                   ;                       H = HSTAT
0AF7 22 50 74        SHLD XMTBUF/2+X+0     XMTBUF[0] = BYTCNT
                   ;                       XMTBUF[1] = HSTAT
0AFA 11 52 74        LXI  D,XMTBUF/2+X+2
                   ;                       DE = ADDRESS, XMTBUF[2]
0AFD 21 24 74        LXI  H,MRSTS1/2+X     HL = ADDRESS, MRSTS1
                   ;                       XMTBUF[2].0 = 0
                   ;                       XMTBUF[2].1 = MRSTS1.DATDOR
                   ;                       XMTBUF[2].2 = MRSTS1.INSFND
                   ;                       XMTBUF[2].3 = MRSTS1.LOWPOS
                   ;                       XMTBUF[2].4 = MRSTS1.SERMOD
                   ;                       XMTBUF[2].5 = MRSTS1.ENABLD
                   ;                       XMTBUF[2].6 = 0
                   ;                       XMTBUF[2].7 = MRSTS1.QUEREG
0B00 7E              MOV  A,M
0B01 E6 7D           ANI  7DH
0B03 12              STAX D
0B04 23              INX  H                HL = ADDRESS, MRSTS2
0B05 13              INX  D                DE = ADDRESS, XMTBUF[3]
                   ;                       XMTBUF[3].0 = MRSTS2.FATMOD
                   ;                       XMTBUF[3].1 = KDCTRL.KBDDSB
                   ;                       XMTBUF[3].2..7 = 0
0B06 7E              MOV  A,M
0B07 E6 80           ANI  80H
0B09 47              MOV  B,A
0B0A 3A 27 74        LDA  KDCTRL/2+X
0B0D 0F              RRC
0B0E 0F              RRC
0B0F E6 40           ANI  40H
0B11 B0              ORA  B
0B12 12              STAX D
0B13 23              INX  H                HL = ADDRESS, NORFLG
0B14 7E              MOV  A,M              NORFLG.QUESTS = FALSE
0B15 E6 7F           ANI  7FH
0B17 77              MOV  M,A
0B18 C9              RET                   RETURN
                   ;NPAUSE(N    ,ZROFLG)
                   ;       (WORD,BIT    )
                   ;       (I/O ,0      )
                   ;       (BC  ,PSW:Z  )
                   ;       ( C  , C     )
                   ;
                   ;REGISTERS DESTROYED
                   ;PSW DESTROYED
                   ;
                   ;PAUSE FOR ABOUT 100 USEC, AND DECREMENT N
                   ;
                   NPAUSE;                 ****ENTRY POINT
                   ;                       PAUSE
0B19 3E 0A           MVI  A,10             A = 10
                   NPAUS1;                 DO UNTIL A = 0
0B1B 3D              DCR  A                  A = A-1
0B1C C2 1B 0B        JNZ  NPAUS1
                   ;                       ENDDO
                   ;                       DECREMENT N
0B1F 0B              DCX  B                BC = N = N-1
                   ;                       DEFINE STATUS OF N
0B20 78              MOV  A,B              PSW:Z = ZROFLG = N .EQ. 0
0B21 B1              ORA  C
0B22 C9              RET                   RETURN
                   ;POSUPD()(WORK1 ,LOWWRN,POSREG,ASCREG,DSCREG,
                   ;         (NIBSTR,NIBSTR,NIBSTR,NIBSTR,NIBSTR,
```

```
                  ;       ( I/O  , I    , I    , I    , I    ,
                  ;       ( RAM  , RAM  , RAM  , RAM  , RAM  ,
                  ;       ( C    , NC   , NC   , C    , C    ,
                  ;
                  ;        ASCCRC,DSCCRC,UNLOCK,MRSTS1,MRSTS2)
                  ;        BYTE  ,BYTE  ,NIBSTR,BITSTR,BITSTR)
                  ;         I    , I    , I    , I/O  , I    )
                  ;         RAM  , RAM  , RAM  , RAM  , RAM  )
                  ;         NC   , NC   , NC   , C    , NC   )
                  ;
                  ;PSW DESTROYED
                  ;REGISTERS DESTROYED
                  ;
                  ;UPDATE METER STATUS FOR CURRENT POSTAGE SETTING
                  ;
                  POSUPD;                AAAAENTRY POINT
                  ;-----------------------------------------------------
                  ;                      BUILD WARNING VALUE SAME LENGTH AS
                  ;                      DESCENDING REGISTER STARTING AT
                  ;                      WORK1[0]
                  ;                      CLEAR WORK AREA
0B23 3E C0          MVI  A,WORK1         A = OFFSET, WORK1
0B25 CD 85 0E       CALL CLRBLK          CLRBLK(WORK1)
                  ;                             ( @A  )
                  ;                             ( 0   )
0B28 06 1D          MVI  B,LOWWRN+1      B = OFFSET, LOWWRN[1]
0B2A CD 35 0F       CALL GETNIB          GETNIB(EXPONT,ZROFLG,LOWWRN[1])
                  ;                             ( A     ,PSW:Z , @B      )
                  ;                             ( 0     , 0    , I       )
0B2D 2F             CMA                  A = -EXPONT-1
0B2E C6 C7          ADI  WORK1+DSCSIZ    C = OFFSET, WORK1[DSCSIZ-1-EXPONT]
0B30 4F             MOV  C,A
0B31 05             DCR  B               B = OFFSET, LOWWRN[0]
0B32 3E 01          MVI  A,1             A = NIBCNT = 1
0B34 CD B3 0F       CALL MVLNIB          MVLNIB(WORK1[DSCSIZ-1-EXPONT],
                  ;                             ( @C                        ,
                  ;                             ( 0                         ,
                  ;
                  ;                             LOWWRN[0],NIBCNT,NONBCD,ZROFLG)
                  ;                              @B      , A    ,PSW:S ,PSW:Z )
                  ;                              I       , I    , 0    , 0    )
                  ;-----------------------------------------------------
                  ;                      INITIALIZE FOR CALLS TO POSUP1
0B37 21 24 74       LXI  H,MRSTS1/2+X    HL = ADDRESS, MRSTS1
0B3A 7E             MOV  A,M
0B3B E6 CF          ANI  0CFH
0B3D 77             MOV  M,A             MRSTS1.INSFND = FALSE
                  ;                      MRSTS1.LOWPOS = FALSE
                  ;-----------------------------------------------------
                  ;                      COMPARE DESCENDING REGISTER WITH
                  ;                      WARNING VALUE
0B3E 06 10          MVI  B,10H           B.LOWPOS = TRUE
0B40 CD 85 0B       CALL POSUP1          IF DSCREG .LT. WORK1[0]
                  ;                        MRSTS1.LOWPOS = B.LOWPOS = TRUE
                  ;                      ENDIF
                  ;-----------------------------------------------------
                  ;                      BUILD POSTAGE SETTING REGISTER SAME
                  ;                      LENGTH AS DESCENDING REGISTER
                  ;                      STARTING AT WORK1[0]
                  ;                      CLEAR WORK AREA
0B43 3E C0          MVI  A,WORK1         A = OFFSET, WORK1
0B45 CD 85 0E       CALL CLRBLK          CLRBLK(WORK1)
                  ;                             ( @A  )
                  ;                             ( 0   )
0B48 01 C3 42       LXI  B,POSREGA100H+WORK1+0+DSCSIZ-NBANKS
                  ;                      B = OFFSET, POSREG
                  ;                      C = OFFSET, WORK1[0+DSCSIZ-NBANKS]
0B4B 3E 04          MVI  A,NBANKS        A = NBANKS
```

```
0B4D CD B3 0F   CALL MVLNIB       MVLNIB(WORK1[0+DSCSIZ-NBANKS],
               ;                         ( @C                    ,
               ;                         ( 0                     ,
               ;
               ;                         POSREG,NBANKS,NONBCD,ZROFLG)
               ;                          @B   , A    ,PSW:S ,PSW:Z )
               ;                          I    , I    , 0    , 0    )
               ;----------------------------------------------------------
               ;                  COMPARE DESCENDING REGISTER WITH
               ;                  POSTAGE SETTING
0B50 06 20      MVI  B,20H        B.INSFND = TRUE
0B52 CD 85 0B   CALL POSUP1       IF DSCREG .LT. WORK1[0]
               ;                    MRSTS1.INSFND = B.INSFND = TRUE
               ;                  ENDIF
               ;----------------------------------------------------------
               ;                  CHECK ASCENDING REGISTER CRC
0B55 01 38 08   LXI  B,ASCSIZ*100H+ASCREG
               ;                  B = ASCSIZ
               ;                  C = OFFSET, ASCREG[0]
0B58 3A 20 74   LDA  ASCCRC/2+X   A = ASCCRC
0B5B CD 92 0B   CALL POSUP2       IF ASCCRC INCORRECT
               ;                    FILL ASCREG WITH HEX0F
               ;                    DECLARE DEAD METER. BAD CRC
               ;                  ENDIF
               ;----------------------------------------------------------
               ;                  CHECK DESCENDING REGISTER CRC
0B5E 01 2F 07   LXI  B,DSCSIZ*100H+DSCREG
               ;                  B = DSCSIZ
               ;                  C = OFFSET, DSCREG[0]
0B61 3A 1B 74   LDA  DSCCRC/2+X   A = DSCCRC
0B64 CD 92 0B   CALL POSUP2       IF DSCCRC INCORRECT
               ;                    FILL DSCREG WITH HEX0F
               ;                    DECLARE DEAD METER. BAD CRC
               ;                  ENDIF
               ;----------------------------------------------------------
               ;                  CHECK CONTROL SUM CRC
               ;                  MRSTS2.FATMOD WILL BE USED VS ERRFLG
0B67 CD 3A 06   CALL CONSUM       CONSUM(ERRFLG)
               ;                        (PSW:Z )
               ;                        ( 0    )
               ;----------------------------------------------------------
               ;                  ENABLE OR DISABLE METER
0B6A 01 24 74   LXI  B,MRSTS1/2+X BC = ADDRESS, MRSTS1
0B6D 0A         LDAX B
0B6E E6 68      ANI  68H
0B70 67         MOV  H,A          H = FLAGS = MRSTS1.DATDOR,
               ;                              MRSTS1.INSFND,
               ;                              MRSTS1.SERMOD
0B71 03         INX  B            BC = ADDRESS, MRSTS2
0B72 0A         LDAX B
0B73 E6 81      ANI  81H
0B75 B4         ORA  H            A = FLAGS = FLAGS .OR.
               ;                              MRSTS2.FATMOD,
               ;                              MRSTS2.PRVMOD
               ;                  IF FLAGS .NE. 0
0B76 C2 D3 05   JNZ  DISABL         DISABLE
               ;                  ELSE
               ;                    COMPARE $ UNLOCK VALUE WITH SETTING
0B79 11 18 42   LXI  D,POSREG*100H+UNLOCK
               ;                    D = OFFSET, POSREG
               ;                    E = OFFSET, UNLOCK
0B7C 3E 04      MVI  A,NBANKS       A = NBANKS
0B7E CD 8E 0E   CALL CMPARE         CMPARE(POSREG,UNLOCK,NBANKS,
               ;                          ( @D    , @E    , A     ,
               ;                          ( I     , I     , I     ,
               ;
               ;                          NEGFLG,ZROFLG)
               ;                          PSW:S ,PSW:Z )
```

```
                   ;                      0     , 0     )
0B81 FC F9 05       CM   ENABLE             IF NEGFLG .EQ. TRUE
                   ;                          ENABLE
                   ;                        ENDIF
                   ;                      ENDIF
                   ;-----------------------------------------------------
0B84 C9             RET                   RETURN
                   ;-----------------------------------------------------
                   ;-----------------------------------------------------
                   ;-----------------------------------------------------
                   POSUP1;                ****LOCAL ENTRY POINT
0B85 11 C0 2F       LXI  D,DSCREG*100H+WORK1+0
                   ;                      D = OFFSET, DSCREG[0]
                   ;                      E = OFFSET, WORK1[0]
0B88 3E 07          MVI  A,DSCSIZ         A = DSCSIZ
0B8A CD 8E 0E       CALL CMPARE           CMPARE(DSCREG[0],WORK1[0],DSCSIZ,
                   ;                            ( @D       , @E      , A    ,
                   ;                            ( I        , I       , I    ,
                   ;
                   ;                            NEGFLG,ZROFLG)
                   ;                            PSW:S ,PSW:Z )
                   ;                             0     , 0     )
0B8D F0             RP                    IF NEGFLG .EQ. TRUE
0B8E 7E             MOV  A,M                MRSTS1.FLAG = B.FLAG = TRUE
0B8F B0             ORA  B
0B90 77             MOV  M,A
                   ;                      ENDIF
0B91 C9             RET                   RETURN
                   ;-----------------------------------------------------
                   ;-----------------------------------------------------
                   ;-----------------------------------------------------
                   POSUP2;                ****LOCAL ENTRY POINT
0B92 CD B1 0E       CALL CRC              CRC(REGSTR[0],REGSIZ,CRCVAL)
                   ;                         ( @C       , B     , D     )
                   ;                         ( I        , I     , 0     )
0B95 BA             CMP  D                PSW:Z = NOERR = REGCRC .EQ. CRCVAL
0B96 C8             RZ                    IF NOERR .EQ. FALSE
                   ;                        FILL BAD REGISTER WITH HEXOF
0B97 3E 0F          MVI  A,0FH              A = HEXOF
0B99 C3 24 0F       JMP  FILNIB             FILNIB(REGSTR[0],HEXOF,REGSIZ)
                   ;                              ( @C       , A    , B     )
                   ;                              ( 0        , I    , I     )
                   ;                        DECLARE DEAD METER. BAD CRC
0B9C 3E 00          MVI  A,BADCRC           A = CODE = BADCRC
0B9E C3 85 10       JMP NVMDED              NVMDED(CODE,ERRFLG)
                   ;                              ( A  ,PSW:Z )
                   ;                              ( I  , 0     )
                   ;                      ENDIF
                   ;                      RETURN
                   ;-----------------------------------------------------
                   ;-----------------------------------------------------
                   ;-----------------------------------------------------
                   ;PROERR(ERRFLG)(XMTBUF)
                   ;       (BIT    )(BYTSTR)
                   ;       ( 0     )( 0     )
                   ;       (PSW:Z )( RAM   )
                   ;       ( C     )( C     )
                   ;
                   ;REGISTERS DESTROYED
                   ;PSW DESTROYED
                   ;
                   ;PROCESS PROCEDURAL ERROR
                   ;
                   PROERR;                ****ENTRY POINT
0BA1 CD F4 0A       CALL MTRSTS           PUT STATUS MESSAGE IN TRANSMIT BUFFER
0BA4 11 53 74       LXI  D,XMTBUF/2+X+3
                   ;                      DE =  ADDRESS, XMTBUF[3]
                   ;                      DECLARE PROCEDURAL ERROR
```

```
0BA7 1A           LDAX D             XMTBUF[3].PROERR = TRUE
0BA8 F6 02        ORI  2
0BAA 12           STAX D
0BAB AF           XRA  A             PSW:Z = ERRFLG = TRUE
0BAC C3 64 04     JMP  PERDSP        MAKE PROCEDURAL ERROR DISPLAY
                 ;                   RETURN
                 ;RDCYC(INCYC ,INCYC,ADRESS,MRSTS1)(DATA1 )
                 ;     (BITSTR,BIT  ,ADRESS,BITSTR)(BITSTR)
                 ;      ( 0     , 0   , 0     , -    )( I    )
                 ;      ( A     ,PSW:C, HL    , @HL  )( 6800 )
                 ;      ( C     , C   , C     , NC   )( NC   )
                 ;
                 ;REGISTERS NOT CHANGED
                 ;PSW DESTROYED
                 ;
                 ;RETURN STATUS OF METER CYCLE SWITCH
                 ;
                 RDCYC;              ****ENTRY POINT
                 ;                   DEFINE ADDRESS FOR CALLING ROUTINES
0BAF 21 24 74     LXI  H,MRSTS1/2+X  HL = ADDRESS, MRSTS1
                 ;                   READ CYCLE SWITCH
0BB2 3A 00 68     LDA  DATA1         A = INCYC,INCYCN = DATA1.2,DATA1.3
0BB5 E6 30        ANI  30H
0BB7 C2 C2 0B     JNZ  RDCYC1        IF BOTH SIDES OF SWITCH CLOSED
                 ;                     DECLARE DEAD METER; BAD CYCLE SWITCH
0BBA 3E 04        MVI  A,BADCYC        A = BADCYC
0BBC CD 85 10     CALL NVMDED          NVMDED(BADCYC,ERRFLG)
                 ;                            ( A     ,PSW:Z )
                 ;                            ( I     , 0    )
0BBF C3 B6 01     JMP PWRDN            ABORT
                 RDCYC1;             ELSE
0BC2 17           RAL                  PSW:C = INCYC = DATA1.2
0BC3 17           RAL
0BC4 17           RAL
0BC5 9F           SBB  A               A.0..7 = INCYC
0BC6 C9           RET                  RETURN
                 ;                   ENDIF
                 ;RECEVE()(SID,SOD,SOE,RECBUF,NORFLG)
                 ;        (BIT,BIT,BIT,BYTSTR,BITSTR)
                 ;        ( I , 0 , 0 , 0     , I    )
                 ;        (RIM,SIM,SIM, RAM   , RAM  )
                 ;        ( NC, C , C , C     , NC   )
                 ;
                 ;REGISTERS DESTROYED
                 ;PSW DESTROYED
                 ;
                 ;RECEIVE INCOMING MESSAGE IF EXTERNAL RTS IS PRESENT.
                 ;RECBUF[0], THE MESSAGE BYTE COUNT, IS CLEARED IF A
                 ;REQUEST TO SEND IS DETECTED.
                 ;
                 RECEVE;             ****ENTRY POINT
0BC7 3A 26 74     LDA  NORFLG/2+X    IF NORFLG.COMDSB .EQ. TRUE
0BCA E6 04        ANI  4
                 ;                     COMMUNICATIONS ARE DISABLED
0BCC C0           RNZ                  RETURN
                 ;                   END IF
0BCD 20           RIM                INPUT BIT
                 ;                   A.0 = BIT = RIM.SID ;RTS OR IDLE
0BCE B7           ORA A              IF RIM.SID .NE. RTS
                 ;                     NO INCOMING REQUEST TO SEND PRESENT
0BCF F0           RP                   RETURN
                 ;                   ENDIF
                 ;                   STOP TIMER
0BD0 CD 34 01     CALL STPTMR        STPTMR(WASOFF)
                 ;                         (PSW:Z )
                 ;                         ( 0    )
0BD3 21 27 0C     LXI  H,RECE06      SET TO REACH QUIT ROUTINE VIA RETURN
0BD6 E5           PUSH H
```

```
0BD7 21 48 74   LXI  H,RECBUF/2+X  HL = ADDRESS, RECBUF[N=0]
               ;                   (2 MVI VS 1 LXI FOR T3 = 100.012 USEC)
0BDA 06 00      MVI  B,0           B = BYTCNT = 0
0BDC 0E 80      MVI  C,80H         C = SIM*2 .AND. HEXFF, WHERE
               ;                       SIM.SOE = ENABLD = 1
0BDE 70         MOV  M,B           RECBUF[0] = Q

               RECE01;             DO UNTIL BIT .EQ. EOM
0BDF 3E C0      MVI  A,0C0H          SIM.SOD = ONEBIT=1 ;CTS,OR EOB ECHO
               ;                     SIM.SOE = ENABLD = 1
0BE1 30         SIM                  OUTPUT ONEBIT
0BE2 11 FB FE   LXI  D,-261          DE = COUNT ;FOR T13 = 3.494 MSEC
               RECE02;               DO UNTIL (BIT .EQ. START) .OR.
               ;                       (COUNT .GE. 0)
0BE5 20         RIM                    INPUT BIT
               ;                       A.0 = BIT = RIM.SID ;START,RTS,EOB
0BE6 13         INX  D                 DE = COUNT = COUNT+1
0BE7 A2         ANA  D                 A.0 = BIT .AND. COUNT.0
0BE8 FA E5 0B   JM   RECE02
               ;                     ENDDO
               ;
0BEB B2         ORA  D               IF COUNT .GE. 0
               ;                       T13 TIMEOUT OCCURRED
               ;                       START NOT RECEIVED AFTER RTS
0BEC F0         RP                     QUIT
               ;                     ENDIF
               ;                     THE FIRST BYTE'S START BIT HAS BEEN
               ;                     READ. IT WILL BE READ AGAIN AND
               ;                     ECHOED LATER.
               ;                     POINT AT NEXT BYTE IN RECBUF.
0BED 23         INX  H               HL = ADDRESS, RECBUF[N=N+1]
               ;                     CHECK FOR BUFFER OVERFLOW
0BEE 04         INR  B               B = BYTCNT = BYTCNT+1
0BEF 3E 07      MVI  A,7             IF 7 .LT. BYTCNT
0BF1 B8         CMP  B
               ;                       TRYING TO RECEIVE 8TH BYTE
0BF2 D8         RC                     QUIT
               ;                     ENDIF
               ;                     SET TO INPUT 10 BITS
               ;                     1 START, 8 DATA, AND 1 EOB OR EOM
0BF3 16 0A      MVI  D,10            D = BITCNT = 10

               RECE03;               LOOP ;BREAK ON BITCNT .EQ. 0
0BF5 20         RIM                    INPUT BIT
               ;                       A.0 = BIT = RIM.SID
0BF6 17         RAL                    PSW:CY  = BIT
0BF7 79         MOV  A,C               PSW:CY,A = SIM*2
0BF8 1F         RAR                    A = SIM
               ;                       SIM.SOD = ECHO = BIT
               ;                       SIM.SOE = ENABLD = 1
0BF9 30         SIM                    OUTPUT 10 ECHO BITS
0BFA 15         DCR  D                 D = BITCNT = BITCNT-1
               ;                       IF BITCNT .EQ. 0
0BFB CA 0C 0C   JZ   RECE04              BREAK
               ;                       ENDIF
0BFE 17         RAL                    PSW:CY = BIT
               ;                       SHIFT 9 BITS INTO BUFFER
               ;                       1 START,(LOST); 8 DATA,(KEPT)
0BFF 7E         MOV  A,M               PSW:CY,A = RECBUF[N]*2
0C00 1F         RAR                    RECBUF[N] = (PSW:CY,A)/2
0C01 77         MOV  M,A
0C02 77         MOV  M,A               DELAY ;BIT PERIOD = 103.923 USEC
0C03 3E 07      MVI  A,7
0C05 3D         DCR  A
0C06 F2 05 0C   JP   $-1
0C09 C3 F5 0B   JMP  RECE03
               RECE04;               ENDLOOP
0C0C B7         ORA  A               CHECK FOR EOM
```

```
0C0D FA DF 0B   JM   RECE01
                ;                    ENDDO
0C10 3E 21      MVI  A,33            DELAY ;T8 = 1264.965 USEC
0C12 3D         DCR  A
0C13 F2 12 0C   JP   $-1
                ;                    CHECK FOR NO-ERROR PULSE
0C16 20         RIM                  INPUT BIT
                ;                    A.0 = BIT = RIM.SID
0C17 B7         ORA  A               IF BIT .EQ. ACK
0C18 F2 1F 0C   JP   RECE05
                ;                      MESSAGE RECEIVED WITHOUT ERROR
                ;                      PUT NONZERO BYTE COUNT IN BUFFER
0C1B 78         MOV  A,B               RECBUF[0] = BYTCNT
0C1C 32 48 74   STA  RECBUF/2+X
               RECE05;               ENDIF
0C1F F1         POP  PSW             CLEAN UP STACK
0C20 16 22      MVI  D,34            DELAY ;T15 = 1560.533 USEC
0C22 15         DCR  D
0C23 F2 22 0C   JP   $-1
0C26 C9         RET                  RETURN
                ;
               RECE06;               QUIT RECEIVE ROUTINE
0C27 3E 40      MVI  A,40H           SIM.SOD = IDLE = 0
                ;                    SIM.SOE = ENABLD = 1
0C29 30         SIM                  OUTPUT IDLE
0C2A 16 C2      MVI  D,194           DELAY ;T15 = 1558.298 USEC
0C2C 15         DCR  D
0C2D F2 2C 0C   JP   $-1
0C30 C9         RET                  RETURN
               ;REDSTS(TRPSW,PRVSW)(PORTA ,PORTC )
               ;       (BYTE ,BYTE )(BITSTR,BITSTR)
               ;       ( O    , O   )( I/O  , I    )
               ;       ( B    , A   )( 7001 , 7003 )
               ;       ( C    , C   )( C    , NC   )
               ;
               ;REGISTERS DESTROYED
               ;PSW DESTROYED
               ;
               ;RETURNS VALUES FOR TRIP SWITCH AND PRIVELEGED SWITCH
               ;OFF = HEX00
               ;ON  = HEXFF
               ;
               REDSTS;               ****ENTRY POINT
                ;                    FETCH PORTA IMAGE
                ;                    SENSOR LEDS ASSUMED TO BE OFF
0C31 21 01 70   LXI  H,PORTA         HL = ADDRESS, PORTA
0C34 56         MOV  D,M             D = LEDOFF = PORTA
                ;                    TURN SENSOR LEDS ON
0C35 7A         MOV  A,D             PORTA = PORTA .AND. HEXDF
0C36 E6 DF      ANI  0DFH
0C38 77         MOV  M,A
                ;                    READ SENSORS
0C39 3A 03 70   LDA  PORTC
0C3C 07         RLC
0C3D 07         RLC
0C3E 07         RLC                  PSW:CY = TRPBIT = PORTC.2
0C3F 4F         MOV  C,A             C.0    = PRVBIT = PORTC.3
0C40 9F         SBB  A               B = TRPSW = TRPBIT*HEXFF
0C41 47         MOV  B,A
0C42 79         MOV  A,C             A = PRVSW = (.NOT. PRVBIT)*HEXFF
0C43 07         RLC
0C44 3F         CMC
0C45 9F         SBB  A
                ;                    TURN SENSOR LEDS OFF
0C46 72         MOV  M,D             PORTA = LEDOFF
0C47 C9         RET                  RETURN
               ;SELVAL(ERRFLG)(NORFLG,MRSTS1,POSREG)
               ;       (BIT   )(BITSTR,BITSTR,NIBSTR)
```

```
                  ;      ( 0    )( 0    , I    , I    )
                  ;      (PSW:Z )( RAM  , RAM  , RAM  )
                  ;      ( C    )( C    , NC   , NC   )
                  ;
                  ;REGISTERS DESTROYED
                  ;PSW DESTROYED
                  ;
                  ;PROCESS SELECTION VALUE REQUEST
                  ;
                  SELVAL;                 ****ENTRY POINT
0C48 21 26 74       LXI  H,NORFLG/2+X     HL = ADDRESS, NORFLG
0C4B 7E             MOV  A,M              NORFLG.QUEPOS = FALSE
0C4C E6 BF          ANI  0BFH
0C4E 77             MOV  M,A
0C4F 3A 24 74       LDA  MRSTS1/2+X       IF MRSTS1.UNKSEL .EQ. TRUE
0C52 B7             ORA  A
                  ;                         SELECTION VALUE IS UNKNOWN
0C53 FA A1 0B       JM   PROERR             PROERR(ERRFLG)
                  ;                               (PSW:Z )
                  ;                               ( 0    )
                  ;                         RETURN
                  ;                       ELSE
                  ;                         FLAG VERIFICATION OF SELECTION VALUE
0C56 7E             MOV  A,M                NORFLG.UNVSEL = FALSE
0C57 E6 FD          ANI  0FDH
0C59 77             MOV  M,A
0C5A 11 60 0C       LXI  D,SELV01           DE = ADDRESS, SELV01
                  ;                         PUT REPLY IN TRANSMIT BUFFER
0C5D C3 5B 0D       JMP  VALREQ             VALREQ(POSREG,POSFMT,HPSET,ERRFLG)
                  ;                               (@@DE+0,@DE+1 ,@DE+2,PSW:Z )
                  ;                               ( I    , I    , I    , 0    )
                  ;                         RETURN
                  ;                       ENDIF
                  SELV01;                 ARGUMENT LIST FOR VALREQ
0C60 42 40 81       DB   POSREG,POSFMT,HPSET
                  ;SEREOE(ERRFLG)(CMBBUF,LOWWRN,SETLIM,AMTBUF,WORK1 ,UNLOCK)
                  ;      (BIT   )(NIBSTR,NIBSTR,NIBSTR,NIBSTR,NIBSTR,NIBSTR)
                  ;      ( 0    )( I    , 0    , 0    , I    , I/0  , 0    )
                  ;      (PSW:Z )( RAM  , RAM  , RAM  , RAM  , RAM  , RAM  )
                  ;      ( C    )( C    , C    , C    , NC   , C    , C    )
                  ;
                  ;PSW DESTROYED
                  ;REGISTERS DESTROYED
                  ;
                  ;PERFORM SERVICE FUNCTIONS WHICH ARE INITIATED BY THE
                  ;ENTRY OF AN AMOUNT AND COMBINATION
                  ;
                  SEREOE;                 ****ENTRY POINT
                  ;                       CHECK METER STATUS
0C63 CD 4E 0F       CALL LSTATE           LSTATE(FATMOD,NORMOD,SERMOD,PRVMOD)
                  ;                             (PSW:S ,PSW:Z ,PSW:P ,PSW:C )
                  ;                             ( 0    , 0    , 0    , 0    )
                  ;                       IF FATMOD .EQ. TRUE
                  ;                         PROCESS ERROR
0C66 FA A1 0B       JM   PROERR             PROERR(ERRFLG)
                  ;                               (PSW:Z )
                  ;                               ( 0    )
                  ;                       ELSE
                  ;                         CHECK FORMAT BYTE IN CMBBUF
0C69 21 78 74       LXI  H,CMBBUF/2+X       HL = ADDRESS, CMBBUF[0..1]
0C6C 7E             MOV  A,M                IF CMBBUF[0..1] .NE. HEX1F
0C6D FE 1F          CPI  1FH
                  ;                           BAD FORMAT, PROCEEDURAL ERROR
0C6F C2 A1 0B       JNZ  PROERR               PROERR(ERRFLG)
                  ;                                 (PSW:Z )
                  ;                                 ( 0    )
                  ;                         ELSE
                  ;                         CHECK FOR OUT OF RANGE COMBINATION
```

```
0C72 23         INX  H                HL = ADDRESS, CMBBUF[2..3]
0C73 7E         MOV  A,M              A = CMBBUF[2..3]
0C74 FE 04      CPI  4                IF CMBBUF[2..3] .GE. 4
               ;                        BAD COMBINATION, PROCEEDURAL ERROR
0C76 D2 A1 0B   JNC  PROERR             PROERR(ERRFLG)
               ;                              (PSW:Z )
               ;                              ( 0    )
               ;                      ELSE
               ;                      --CASE (CMBBUF[2..3])
0C79 11 1C 07   LXI  D,DSCSIZ*100H+LOWWRN
0C7C FE 01      CPI  1                  **01:
               ;                          CHANGE LOW POSTAGE WARN LIMIT
0C7E CA FB 0C   JZ   SRVCNV               SRVCNV(LOWWRN,DSCSIZ,ERRFLG)
               ;                                 ( @E   , D    ,PSW:Z )
               ;                                 ( O    , I    , O    )
0C81 11 1E 05   LXI  D,(NBANKS+1)*100H+SETLIM
0C84 FE 02      CPI  2                  **02:
               ;                          CHANGE SETTING LIMIT
0C86 CA FB 0C   JZ   SRVCNV               SRVCNV(SETLIM,NBANKS+1,ERRFLG)
               ;                                 ( @E   , D      ,PSW:Z )
               ;                                 ( O    , I      , O    )
0C89 06 E0      MVI  B,AMTBUF
               ;                        **03:
               ;                          CHANGE SERIAL NUMBER
0C8B F2 38 0A   JP   MSERNO               MSERNO(AMTBUF,ERRFLG)
               ;                                 ( @B   ,PSW:Z )
               ;                                 ( I    , O    )
               ;                        **00:
0C8E 15         DCR  D                    D = NBANKS
               ;                          CHANGE DOLLAR UNLOCK VALUE
0C8F CD AA 0A   CALL MSG2MU               MSG2MU(AMTBUF,NBANKS,ERRFLG)
               ;                                 ( @B   , D    ,PSW:Z )
               ;                                 ( I    , I    , O    )
               ;                          IF ERRFLG .EQ. TRUE
               ;                            BAD AMOUNT, PROCEEDURAL ERROR
0C92 CA A1 0B   JZ   PROERR                 PROERR(ERRFLG)
               ;                                  (PSW:Z )
               ;                                  ( O    )
               ;                          ELSE
               ;                            REDEFINE $ UNLOCK VALUE
0C95 3E 04      MVI  A,NBANKS               A = NBANKS
0C97 01 18 CC   LXI  B,(WORK1+16-NBANKS)*100H+UNLOCK
               ;                            B = OFFSET, WORK1[16-NBANKS]
               ;                            C = OFFSET, UNLOCK
0C9A CD B3 0F   CALL MVLNIB                 MVLNIB(UNLOCK,WORK1[16-NBANKS],
               ;                                   ( @C   , @B              ,
               ;                                   ( O    , I               ,
               ;
               ;                            NBANKS,NONBCD,ZERO )
               ;                             A    ,PSW:S ,PSW:Z)
               ;                             I    , O    , O    )
0C9D 0C         INR  C                      PSW:Z = ERRFLG = FALSE
               ;                          ENDIF
               ;                      --ENDCASE
               ;                      ENDIF
               ;                    ENDIF
0C9E C9         RET                 RETURN
               ;SETPOS(MSGBUF,ERRFLG)(SETLIM,WORK1 ,WORK2 ,MRSTS1,
               ;      (NIBSTR,BIT   )(NIBSTR,NIBSTR,NIBSTR,BITSTR,
               ;      ( I    , O    )( I    , O    , O    , O    ,
               ;      ( @B   ,PSW:Z )( RAM  , RAM  , RAM  , RAM  ,
               ;      ( NC   , C    )( NC   , C    , C    , C    ,
               ;
               ;      NORFLG,POSREG)
               ;      BITSTR,NIBSTR)
               ;       O    , O    )
               ;       RAM  , RAM  )
               ;       C    , C    )
```

```
                        ;
                        ;REGISTERS DESTROYED
                        ;PSW DESTROYED
                        ;
                        ;PROCESS SET POSTAGE COMMAND
                        ;
                        SETPOS;                   ****ENTRY POINT
                        ;                         SET TO REACH PROERR VIA RETURN
0C9F 21 A1 0B   LXI  H,PROERR
0CA2 E5         PUSH H
0CA3 CD 4E 0F   CALL LSTATE               LSTATE(FATMOD,NORMOD,SERMOD,PRVMOD)
                ;                               (PSW:S ,PSW:Z ,PSW:P ,PSW:CY)
                ;                               ( 0    , 0    , 0    , 0   ,  )
                ;                         IF NORMOD .EQ. FALSE
                ;                           METER NOT IN NORMAL MODE
0CA6 C0         RNZ                         PROERR(ERRFLG)
                ;                         ELSE
                ;                           PUT NEW SETTING VALUE INTO WORK1
0CA7 16 04      MVI  D,NBANKS               D = NIBCNT = NBANKS
0CA9 CD AA 0A   CALL MSG2MU                 MSG2MU(MSGBUF,NIBCNT,ERRFLG)
                ;                                 ( @B    , D    ,PSW:Z )
                ;                                 ( I  .  , I    , 0    )
0CAC F5         PUSH PSW                    SAVE A,PSW
0CAD 21 24 74   LXI  H,MRSTS1/2+X           HL = ADDRESS, MRSTS1
0CB0 7E         MOV  A,M                    MRSTS1.ENABLD = FALSE
0CB1 E6 FB      ANI  0FBH
0CB3 77         MOV  M,A
0CB4 F1         POP  PSW                    RESTORE A,PSW
                ;                           IF ERRFLG .EQ. TRUE
                ;                             NEW SETTING VALUE IS IMPROPER
0CB5 C8         RZ                            PROERR(ERRFLG)
                ;                           ELSE
                ;                             FETCH SETTING LIMIT EXPONENT
0CB6 06 1F      MVI  B,SETLIM+1               B = OFFSET, SETLIM[1]
0CB8 CD 35 0F   CALL GETNIB                   GETNIB(EXPONT,ZROFLG,SETLIM[1])
                ;                                   ( A     ,PSW:Z , @B       )
                ;                                   ( 0     , 0    , I        )
                ;                             CALCULATE WORK2 INDEX FOR MANTISSA
0CBB 2F         CMA                           A = -EXPONT-1
0CBC C6 10      ADI  16                       C = I = 15-EXPONT
0CBE 4F         MOV  C,A
                ;                             CLEAR WORK2
0CBF 3E D0      MVI  A,WORK2                  A = OFFSET, WORK2
0CC1 CD 85 0E   CALL CLRBLK                   CLRBLK(WORK2)
                ;                                   ( @A   )
                ;                                   ( 0    )
                ;                             PUT SET LIMIT MANTISSA INTO WORK2
0CC4 81         ADD  C                        C = OFFSET, WORK2[I]
0CC5 4F         MOV  C,A
0CC6 05         DCR  B                        B = OFFSET, SETLIM[0]
0CC7 CD 35 0F   CALL GETNIB                   GETNIB(MANTIS,ZROFLG,SETLIM[0])
                ;                                   ( A     ,PSW:Z , @B       )
                ;                                   ( 0     , 0    , I        )
0CCA CD EE 0F   CALL PUTNIB                   PUTNIB(WORK2[I],MANTIS)
                ;                                   ( @C      , A     )
                ;                                   ( 0       , I     )
                ;                             COMPARE NEW SETTING VS SETTING LIM
0CCD 11 DB CB   LXI  D,(WORK1+15-NBANKS)*100H+(WORK2+15-NBANKS)
                ;                             D = OFFSET, WORK1[N=15-NBANKS]
                ;                             E = OFFSET, WORK2[N]
0CD0 3E 05      MVI  A,NBANKS+1               A = NIBCNT = NBANKS+1
0CD2 CD 8E 0E   CALL CMPARE                   CMPARE(WORK1[N],WORK2[N],NIBCNT,
                ;                                   ( @D      , @E      , A     ,
                ;                                   ( I       , I       , I     ,
                ;
                ;                                   NEGFLG,ZROFLG)
                ;                                   PSW:S ,PSW:Z )
                ;                                    0    , 0     )
```

```
                   ;                         IF NEGFLG .EQ. FALSE
                   ;                           NEW SETTING EXCEEDS LIMIT
OCD5 F0             RP                         PROERR(ERRFLG)
                   ;                         ELSE
OCD6 F1             POP  PSW                   CLEAN UP STACK
                   ;                           SET POSTAGE
OCD7 11 26 74       LXI  D,NORFLG/2+X          DE = ADDRESS, NORFLG
OCDA 1A             LDAX D                     NORFLG.LATDSB = FALSE
OCDB E6 FE          ANI  OFEH
OCDD F6 02          ORI  2                     NORFLG.UNVSEL = TRUE
OCDF 12             STAX D
OCE0 7E             MOV  A,M                   MRSTS1.UNKSEL = TRUE
OCE1 F6 80          ORI  80H
OCE3 77             MOV  M,A
OCE4 E5             PUSH H                     SAVE HL
OCE5 CD 25 1A       CALL MVPOST                MVPOST(ERROR)
                   ;                                 ( A   )
                   ;                                 ( O   )
OCE8 E1             POP  H                     RESTORE HL
OCE9 B7             ORA  A                     PSW:Z = NOERR = ERROR .EQ. 0
                   ;                           IF NOERR .EQ. FALSE
                   ;                             METER DID NOT SET
OCEA C2 80 08       JNZ  FATERR                  FATERR(ERROR,ERRFLG)
                   ;                                   ( A   ,PSW:Z )
                   ;                                   ( I   , O    )
                   ;                           ELSE
                   ;                             REPORT SUCCESSFUL SETTING
OCED 01 42 CC       LXI  B,(WORK1+16-NBANKS)*100H+POSREG
                   ;                             B = OFFSET, WORK1[N]
                   ;                             C = OFFSET, POSREG
OCF0 3E 04          MVI  A,NBANKS                A = NIBCNT = NBANKS
OCF2 CD B3 OF       CALL MVLNIB                  MVLNIB(POSREG,WORK1[N],NBANKS,
                   ;                                   ( @C   , @B     , A    ,
                   ;                                   ( O    , I      , I    ,
                   ;
                   ;                                   NONBCD,ZROFLG)
                   ;                                   PSW:S ,PSW:Z )
                   ;                                    O    , O    )
OCF5 7E             MOV  A,M                     MRSTS1.UNKSEL = FALSE
OCF6 E6 7F          ANI  7FH
OCF8 77             MOV  M,A
                   ;                             CLEAR ERROR FLAG
OCF9 0C             INR  C                       C = OFFSET, POSREG[1]
                   ;                             PSW:Z = ERRFLG = C.EQ.0=FALSE
                   ;                           ENDIF
                   ;                         ENDIF
                   ;                       ENDIF
                   ;                     ENDIF
OCFA C9             RET                  RETURN
                   ;SRVCNV(SRVREG,MAXCNT,ERRFLG)(AMTBUF,DIEDCM)
                   ;     (NIBSTR,BYTE  ,BIT   )(NIBSTR,BYTE  )
                   ;     ( O    , I    , O    )( I    , I    )
                   ;     ( @E   , D    ,PSW:Z )( RAM  , RAM  )
                   ;     ( C    , C    , C    )( NC   , NC   )
                   ;
                   ;PSW DESTROYED
                   ;REGISTERS DESTROYED
                   ;
                   ;CONVERT MESSAGE FORMATTED VALUE IN AMTBUF INTO A
                   ;SPECIAL SERVICE REGISTER FORMAT IN THE FORM:
                   ;MANTISSA*10**EXPONENT, IN WHICH
                   ;SRVREG[0] = MANTISSA
                   ;SRVREG[1] = EXPONENT
                   ;
                   SRVCNV;               ****ENTRY POINT
                   ;                     SET TO REACH PROERR VIA RETURN
OCFB 21 A1 0B       LXI  H,PROERR
OCFE E5             PUSH H
```

```
                    ;                         FETCH VALUES FROM MESSAGE FORMAT
0CFF 06 E1          MVI  B,AMTBUF+1           B = OFFSET, AMTBUF[1]
0D01 CD 35 0F       CALL GETNIB               GETNIB(DECPOS,ZROFLG,AMTBUF[1])
                    ;                               ( A    ,PSW:Z , @B      )
                    ;                               ( 0    , 0    , I       )
0D04 6F             MOV  L,A                  L = DECPOS
0D05 05             DCR  B                    B = OFFSET, AMTBUF[0]
0D06 CD 35 0F       CALL GETNIB               GETNIB(MSGCNT,ZROFLG,AMTBUF[0])
                    ;                               ( A    ,PSW:Z , @B      )
                    ;                               ( 0    , 0    , I       )
0D09 67             MOV  H,A                  H = MSGCNT
                    ;                         IF ZROFLG .EQ. TRUE
                    ;                           NO VALUE WAS ENTERED
0D0A C8             RZ                          PROERR(ERRFLG)
                    ;                         ELSE
                    ;                         POINT TO RIGHT OF H/O MESSAGE DIGIT
0D0B E6 01          ANI  1                    B = OFFSET, AMTBUF[I=
                    ;                                   (MSGCNT .AND. HEX01)+3]
0D0D C6 E3          ADI AMTBUF+3
0D0F 47             MOV  B,A
0D10 4F             MOV  C,A                  C = OFFSET, AMTBUF[I]
                    ;                         SCAN DIGITS TO RIGHT OF H/O MSG DIGIT
0D11 7C             MOV  A,H                  A = NIBCNT = MSGCNT-1
0D12 3D             DCR  A
0D13 CD B3 0F       CALL MVLNIB               MVLNIB(AMTBUF[I],AMTBUF[I],NIBCNT,
                    ;                               ( @C       , @B       , A    ,
                    ;                               ( 0        , I        , I    ,
                    ;
                    ;                               NONBCD,ZROFLG)
                    ;                               PSW:S ,PSW:Z )
                    ;                                0    , 0    )
                    ;                         IF ZROFLG .EQ. FALSE
                    ;                           NOT ALL DIGITS SCANNED WERE ZEROES
0D16 C0             RNZ                         PROERR(ERRFLG)
                    ;                         ELSE
0D17 3A 35 74       LDA  DIEDCM/2+X           A = DIEDCM-DECPOS
0D1A 95             SUB  L
                    ;                         IF (DIEDCM-DECPOS) .LT. 0
                    ;                           BAD DECIMAL IN MESSAGE FORMAT
0D1B D8             RC                          PROERR(ERRFLG)
                    ;                         ELSE
                    ;                         CALCULATE EXPONENT
0D1C 84             ADD  H                    L = EXPONT = MSGCNT-1+DIEDCM-DECPOS
0D1D 3D             DCR  A
0D1E 6F             MOV  L,A
0D1F BA             CMP  D                    IF EXPONT .GE. MAXCNT
                    ;                           MESSAGE IS TOO LONG
0D20 D0             RNC                         PROERR(ERRFLG)
                    ;                         ELSE
                    ;                         FETCH H/O MESSAGE DIGIT AS MANTISSA
0D21 05             DCR  B                    B = OFFSET, AMTBUF[I=I-1]
0D22 CD 35 0F       CALL GETNIB               GETNIB(MANTIS,ZROFLG,AMTBUF[I])
                    ;                               ( A    ,PSW:Z , @B      )
0D25 FE 0A          CPI  10                   IF MANTIS .GE. 10
                    ;                           NON BCD CHAR IN MESSAGE
0D27 D0             RNC                         PROERR(ERRFLG)
                    ;                         ELSE
0D28 C1             POP  B                      CLEAN UP STACK
                    ;                           PUT MANTISSA IN SERVICE REGISTER
0D29 4B             MOV  C,E                    C = OFFSET, SRVREG[0]
0D2A CD EE 0F       CALL PUTNIB                 PUTNIB(SRVREG[0],MANTIS)
                    ;                                 ( @C       , A    )
                    ;                                 ( 0        , I    )
                    ;                           PUT EXPONENT IN SERVICE REGISTER
0D2D 0C             INR  C                      C = OFFSET, SRVREG[1]
0D2E 7D             MOV  A,L                    A = EXPONT
0D2F CD EE 0F       CALL PUTNIB                 PUTNIB(SRVREG[1],EXPONT)
                    ;                                 ( @C       , A    )
```

```
                 ;                          ( 0       , I    )
0D32 0C            INR  C               PSW:Z = ERRFLG = FALSE
                 ;                      ENDIF
0D33 C9            RET                  RETURN
                 ;SRVREQ(SRVVAL,SRVHDR,ERRFLG)(WORK1 ,WORK2 ,DIEDCM)
                 ;      (NIBSTR,BYTE  ,BIT   )(NIBSTR,NIBSTR,BYTE  )
                 ;      ( I    , I    , 0    )( 0    , 0    , I    )
                 ;      ( @B   , C    ,PSW:Z )( RAM  , RAM  , RAM  )
                 ;      ( NC   , C    , C    )( C    , C    , NC   )
                 ;
                 ;PSW DESTROYED
                 ;REGISTERS DESTROYED
                 ;
                 ;EXPAND COMPRESSED SERVICE REGISTER TO WORK BUFFER.
                 ;CALL VALREQ TO BUILD MESSAGE IN XMTBUF.
                 ;
                 SRVREQ;                ****ENTRY POINT
                 ;                      CLEAR WORK AREA
0D34 3E C0         MVI A,WORK1          A = OFFSET, WORK1
0D36 CD 85 0E      CALL CLRBLK          CLRBLK(WORK1)
                 ;                             ( @A  )
                 ;                             ( 0   )
0D39 21 6A 74      LXI  H,(WORK2+4)/2+X
                 ;                      HL = ADDRESS, WORK2[4..5]
0D3C 71            MOV  M,C             WORK2[4..5] = SRVHDR
0D3D 0E C4         MVI  C,WORK1+4       C = OFFSET, WORK1[4]
                 ;                      MOVE MANTISSA INTO WORK AREA
0D3F 3E 01         MVI  A,1             A = NIBCNT = 1
0D41 CD B3 0F      CALL MVLNIB          MVLNIB(WORK1[4],SRVVAL[0],NIBCNT,PSW)
                 ;                             ( @C      , @B       , A    ,PSW)
                 ;                             ( 0       , I        , I    , 0 )
0D44 04            INR  B               B = OFFSET, SRVVAL[1]
                 ;                      FETCH EXPONENT
0D45 CD 35 0F      CALL GETNIB          GETNIB(EXPONT,PSW,SRVVAL[1])
                 ;                             ( A     ,PSW, @B       )
                 ;                             ( 0     , 0 , I        )
0D48 3C            INR  A               A = NIBCNT = EXPONT+1
0D49 07            RLC                  B = FORMAT = HEX10*NIBCNT
0D4A 07            RLC
0D4B 07            RLC
0D4C 07            RLC
0D4D 47            MOV  B,A
0D4E 3A 35 74      LDA  DIEDCM/2+X      A = FORMAT = FORMAT+DIEDCM
0D51 80            ADD  B
0D52 2B            DCX  H               HL = ADDRESS, WORK2[2..3]
0D53 77            MOV  M,A             WORK2[2..3] = FORMAT
0D54 2B            DCX  H               HL = ADDRESS, WORK2[0..1]
0D55 36 C4         MVI  M,WORK1+4       WORK2[0..1] = OFFSET, WORK1[4]
0D57 EB            XCHG                 DE = ADDRESS, WORK2[0..1]
                   ;                    PUT REPLY INTO TRANSMIT BUFFER
0D58 C3 5B 0D      JMP  VALREQ          VALREQ(WORK1[4],WORK2[2],WORK2[4],
                 ;                             (@@DE+0  ,@DE+1    ,@DE+2    ,
                 ;                             ( I      , I       , I       ,
                 ;
                 ;                             ERRFLG)
                 ;                             PSW:Z )
                 ;                              0    )
                 ;                      RETURN
                 ;VALREQ(SOURCE,VALFMT,ANSHDR,ERRFLG)(DIEDCM,DEFDCM,XMTBUF)
                 ;      (NIBSTR,BYTE  ,BYTE  ,BYTE  )(BYTE  ,BYTE  ,NIBSTR)
                 ;      ( I    , I    , I    , 0    )( I    , I    , 0    )
                 ;      (@@DE+0, @DE+1, @DE+2,PSW:Z )( RAM  , RAM  , RAM  )
                 ;      ( NC   , NC   , NC   , C    )( NC   , NC   , C    )
                 ;
                 ;PSW DESTROYED
                 ;ALL REGISTERS DESTROYED
                 ;
                 ;BUILD VALUE REPLY MESSAGE IN TRANSMIT BUFFER
                 ;
```

```
                VALREQ;                  ****ENTRY POINT
                ;                        FETCH OFFSET OF SOURCE
0D5B EB          XCHG                    HL = ADDRESS, (OFFSET, SOURCE[L=0])
0D5C 46          MOV  B,M                B = OFFSET, SOURCE[L=0]
                ;                        FETCH FORMAT TEMPLATE FOR MESSAGE
0D5D 23          INX  H                  HL = ADDRESS, VALFMT
0D5E 7E          MOV  A,M                E = DECPOS = VALFMT[1]
0D5F E6 0F       ANI  0FH
0D61 5F          MOV  E,A
0D62 7E          MOV  A,M                D = NDIGIT = VALFMT[0]
0D63 AB          XRA  E
0D64 0F          RRC
0D65 0F          RRC
0D66 0F          RRC
0D67 0F          RRC
0D68 57          MOV  D,A
                ;                        FETCH HEADER FOR REPLY
0D69 23          INX  H                  HL = ADDRESS, ANSHDR
0D6A 4E          MOV  C,M                C = ANSHDR
                ;                        SCAN FOR MOST SIGNIFICANT DIGIT
                VALR01;                  DO WHILE SOURCE[L] .EQ. 0
0D6B CD 35 0F    CALL GETNIB               GETNIB(LDIGIT,ZROFLG,SOURCE[L])
                ;                                ( A    , PSW:Z, @B      )
                ;                                ( O    , O    , I       )
0D6E C2 78 0D    JNZ  VALR02
0D71 04          INR  B                    B = OFFSET, SOURCE[L=L+1]
0D72 15          DCR  D                    D = NDIGIT = NDIGIT-1
0D73 C2 6B 0D    JNZ  VALR01               IF NDIGIT .EQ. 0
0D76 14          INR  D                      D = NDIGIT = 1
0D77 05          DCR  B                      B = OFFSET, SOURCE[L=L-1]
                ;                            BREAK
                ;                          ENDIF
                VALR02;                  ENDDO
0D78 1C          INR  E                  IF DECPOS .EQ. 0
0D79 1D          DCR  E
0D7A C2 9E 0D    JNZ  VALR05
                ;                          METER CHARACTERISTCS WILL
                ;                          DETERMINE FORMAT.
                ;                          ADJUST VALUES SO THAT AT LEAST ONE
                ;                          DIGIT WILL BE TO LEFT OF DECIMAL.
0D7D 2A 35 74    LHLD DIEDCM/2+X           L = DIEDCM
                ;                          H = DEFDCM
0D80 5D          MOV  E,L                  E = DECPOS = DIEDCM
0D81 7D          MOV  A,L                  A = ADJUST = DIEDCM+1-NDIGIT
0D82 3C          INR  A
0D83 92          SUB  D
0D84 FA 8D 0D    JM   VALR03               IF ADJUST .GE. 0
0D87 6F          MOV  L,A                    L = ADJUST
0D88 82          ADD  D                      D = NDIGIT = NDIGIT+ADJUST
0D89 57          MOV  D,A
0D8A 78          MOV  A,B                    B = OFFSET, SOURCE[L=L-ADJUST]
0D8B 95          SUB  L
0D8C 47          MOV  B,A
                VALR03;                    ENDIF
                ;                          SUPPRESS TRAILING ZERO IN THE
                ;                          EVENT DIEDCM .GT. DEFDCM
0D8D C5          PUSH B                    SAVE BC
0D8E 78          MOV  A,B                  B = OFFSET, SOURCE[R=L+NDIGIT-1]
0D8F 82          ADD  D
0D90 3D          DCR  A
0D91 47          MOV  B,A
0D92 CD 35 0F    CALL GETNIB               GETNIB(RDIGIT,ZROFLG,SOURCE[R])
                ;                                ( A    , PSW:Z, @B      )
                ;                                ( O    , O    , I       )
0D95 C1          POP  B                    B = SOURCE[L]
                ;                          C = ANSHDR
0D96 C2 9E 0D    JNZ  VALR04               IF RDIGIT .EQ. 0
                ;                            TRAILING ZERO IS PRESENT
0D99 7A          MOV  A,D                    D = NDIGIT = NDIGIT+DEFDCM-DECPOS
```

```
0D9A 93        SUB  E
0D9B 84        ADD H
0D9C 57        MOV  D,A
0D9D 5C        MOV  E,H                 E = DECPOS = DEFDCM
              VALR04;                  ENDIF
              VALR05;                 ENDIF
              ;                       CLEAR TRANSMIT BUFFER
0D9E 3E A0     MVI  A,XMTBUF          A = OFFSET, XMTBUF
0DA0 CD 85 0E  CALL CLRBLK            CLRBLK(XMTBUF)
              ;                              ( @A   )
              ;                              ( O    )
              ;                       BUILD MESSAGE IN TRANSMIT BUFFER
0DA3 7A        MOV  A,D               L = MSGSIZ = 2+(NDIGIT+1)/2
0DA4 B7        ORA  A
0DA5 1F        RAR
0DA6 CE 02     ACI  2
0DA8 6F        MOV  L,A
0DA9 61        MOV  H,C               H = ANSHDR
0DAA 22 50 74  SHLD XMTBUF/2+X        XMTBUF[0..1] = MSGSIZ
              ;                       XMTBUF[2..3] = ANSHDR
0DAD 0E A4     MVI  C,XMTBUF+4        C = OFFSET, XMTBUF[4]
0DAF 7A        MOV  A,D               A = NDIGIT
0DB0 CD EE 0F  CALL PUTNIB            PUTNIB(XMTBUF[4],NDIGIT)
              ;                              ( @C      , A    )
              ;                              ( O       , I    )
0DB3 0C        INR  C                 C = OFFSET, XMTBUF[5]
0DB4 7B        MOV  A,E               A = DECPOS
0DB5 CD EE 0F  CALL PUTNIB            PUTNIB(XMTBUF[5],DECPOS)
              ;                              ( @C      , A    )
              ;                              ( O       , I    )
0DB8 0C        INR  C                 C = OFFSET, XMTBUF[I=6+(NDIGIT.MOD.2)]
0DB9 7A        MOV  A,D
0DBA E6 01     ANI  1
0DBC 81        ADD  C
0DBD 4F        MOV  C,A
0DBE 7A        MOV  A,D               A = NDIGIT
0DBF CD B3 0F  CALL MVLNIB            MVLNIB(XMTBUF[I],SOURCE[L],NDIGIT,
              ;                              ( @C      , @B     , A    ,
              ;                              ( O       , I      , I    ,
              ;
              ;                               NONBCD,ZROFLG)
              ;                               PSW:S ,PSW:Z )
              ;                                O    , O    )
0DC2 FA A1 0B  JM   PROERR            IF NONBCD .EQ. TRUE
              ;                         PROCESS ERROR
              ;                         PROERR(ERRFLG)
              ;                                ( A     )
              ;                                ( O     )
              ;                         RETURN
              ;                       ELSE
0DC5 0C        INR  C                   PSW:Z = ERRFLG = FALSE
0DC6 C9        RET                      RETURN
              ;                       ENDIF
              ;XEQHDR(HEADER,ERRFLG)(DBUF   ,XMTBUF,NORFLG)
              ;      (BYTE   ,BIT   )(NIBSTR,NIBSTR,BITSTR)
              ;      ( I     , O    )( I/O  , I     , O     )
              ;      ( A     ,PSW:Z )( RAM  , RAM   , RAM   )
              ;      ( NC    , C    )( C    , NC    , C     )
              ;
              ;PSW = DESTROYED
              ;
              ;SUPERVISES THE EXECUTION OF INTERNALLY GENERATED HEADERS
              ;
              XEQHDR;                 ****ENTRY POINT
0DC7 E5        PUSH H                 SAVE HL
0DC8 D5        PUSH D                 SAVE DE
0DC9 C5        PUSH B                 SAVE BC
0DCA 47        MOV  B,A               B = HEADER
```

```
                   ;                  STOP TIMER
0DCB CD 34 01       CALL STPTMR       STPTMR(WASOFF)
                   ;                        (PSW:Z )
                   ;                        ( 0    )
0DCE 3A 40 74       LDA  DBUF/2+X     A = DBUF[0..1]
0DD1 B7             ORA  A            PSW:Z = DBUF[0..1] .EQ. 0
0DD2 78             MOV  A,B          A = HEADER
0DD3 C2 E7 0D       JNZ  XEQH02       IF DBUF[0..1] .EQ. 0
                   ;                    DISPLAY HAS KEYENTERED DATA
0DD6 FE C4          CPI  HSETDA         IF(HEADER .LT .0) .AND.
                   ;                      (HEADER .NE. HSETDA)
0DD8 CA E7 0D       JZ   XEQH01
0DDB B7             ORA  A
0DDC F2 E7 0D       JP   XEQH01
                   ;                      PROCESS HEADER WITH DATA IN DBUF
0DDF 06 82          MVI  B,DBUF+2         B = OFFSET, DBUF[2]
0DE1 CD 41 09       CALL HDRPLS           HDRPLS(HEADER,DBUF[2],ERRFLG)
                   ;                            ( A     , @B    ,PSW:Z)
                   ;                            ( I     , I     , 0   )
0DE4 C3 EA 0D       JMP  XEQH03
                  XEQH01;               ELSE
                   ;                      PROCESS HEADER WITHOUT DATA
                   ;                      HDRONY(HEADER,ERRFLG)
                   ;                            ( A     ,PSW:Z)
                   ;                            ( I     , 0   )
                   ;                    ENDIF
                  XEQH02;             ELSE
                   ;                    PROCESS HEADER WITHOUT DATA
0DE7 CD D5 08       CALL HDRONY         HDRONY(HEADER,ERRFLG)
                   ;                          ( A     ,PSW:Z)
                   ;                          ( I     , 0   )
                  XEQH03;             ENDIF
0DEA CA 11 0E       JZ   XEQH07       IF ERRFLG .EQ. FALSE
0DED F5             PUSH PSW            SAVE A, PSW
0DEE 3A 50 74       LDA  XMTBUF/2+X     A = BYTCNT = XMTBUF[0..1]
0DF1 B7             ORA  A              PSW:Z = BYTCNT .EQ. 0
                   ;                    PSW:CY = 0
0DF2 CA 02 0E       JZ   XEQH04         IF BYTCNT .NE. 0
                   ;                      CONVERT BYTE COUNT TO NIBBLE COUNT
0DF5 17             RAL                   A = NIBCNT = 2*BYTCNT
0DF6 01 80 A2       LXI  B,(XMTBUF+2)*100H+DBUF
                   ;                      B = OFFSET, XMTBUF[2]
                   ;                      C = OFFSET, DBUF[0]
                   ;                      MOVE DATA INTO DBUF
0DF9 CD B3 0F       CALL MVLNIB           MVLNIB(DBUF[0],XMTBUF[2],NIBCNT)
                   ;                            ( @C     , @B       , A     )
                   ;                            ( 0      , I        , I     )
0DFC CD 5A 05       CALL VALDSP           MOVE DBUF INTO DISPLAY
0DFF C3 10 0E       JMP  XEQH06
                  XEQH04;               ELSE
                   ;                      BYTCNT .EQ. 0
                   ;                      COMMAND AFFECTED STATUS ONLY
0E02 3A 40 74       LDA  DBUF/2+X         IF DBUF[0..1] = HEX00
0E05 B7             ORA  A
0E06 C2 10 0E       JNZ  XEQH05
                   ;                        KEYENTERED DISPLAY UNCHANGED
                   ;                        QUE POSTAGE REQUEST
0E09 21 26 74       LXI  H,NORFLG/2+X       HL = ADDRESS, NORFLG
0E0C 7E             MOV  A,M                NORFLG.QUEPOS = TRUE
0E0D F6 40          ORI  40H
0E0F 77             MOV  M,A
                  XEQH05;                 ENDIF
                  XEQH06;               ENDIF
0E10 F1             POP  PSW            A = HEADER
                   ;                    PSW:Z = ERRFLG
                  XEQH07;             ENDIF
0E11 C1             POP  B            RESTORE BC
0E12 D1             POP  D            RESTORE DE
```

```
0E13 E1         POP  H              RESTORE HL
0E14 C9         RET                 RETURN
               ;XMIT()(SID,SOD,SOE,XMTBUF,NORFLG)
               ;      (BIT,BIT,BIT,BYTSTR,BYTSTR)
               ;      ( I , O , O , I/O  , I     )
               ;      (RIM,SIM,SIM, RAM  , RAM   )
               ;      ( NC, C , C , C    , NC    )
               ;
               ;REGISTERS DESTROYED
               ;PSW DESTROYED
               ;
               ;ATTEMPT TO TRANSMIT MESSAGE IN XMTBUF.
               ;ONE ATTEMPT ONLY.  XMTBUF[0], THE MESSAGE BYTE COUNT,
               ;IS CLEARED WHETHER OR NOT THE MESSAGE IS ACTUALLY SENT.
               ;XMTBUF[0] IS ASSUMED .GT. 0, AND .LE. 7 ON ENTRY.
               ;
               XMIT;                ****ENTRY POINT
               ;                    FETCH BYTE COUNT OF OUTBOUND MESSAGE
0E15 21 50 74   LXI  H,XMTBUF/2+X   HL =  ADDRESS, XMTBUF[N=0]
0E18 4E         MOV  C,M            C = BYTCNT = XMTBUF[N]
               ;                    CANCEL MSG BY CLEARING XMTBUF[0]
0E19 36 00      MVI  M,0            XMTBUF[N] = 0
0E1B 3A 26 74   LDA  NORFLG/2+X     IF NORFLG.COMDSB .EQ. TRUE
0E1E E6 04      ANI  4
               ;                      COMMUNICATIONS ARE DISABLED
0E20 C0         RNZ                   RETURN
               ;                    ENDIF
               ;                    STOP TIMER
0E21 CD 34 01   CALL STPTMR         STPTMR(WASOFF)
               ;                          (PSW:Z )
               ;                          ( 0    )
0E24 E5         PUSH H              SAVE HL
0E25 C5         PUSH B              SAVE BC
0E26 CD C7 0B   CALL RECEVE         IF INCOMING RTS IS PRESENT
               ;                      RECEIVE MESSAGE
               ;                    ENDIF
0E29 3E C0      MVI  A,0C0H         SIM.SOD = RTS = 1
               ;                    SIM.SOE = ENABLD = 1
0E2B 30         SIM                 OUTPUT RTS
0E2C C1         POP  B              RESTORE BC
0E2D E1         POP  H              RESTORE HL
0E2E 16 D9      MVI  D,217          D = COUNT ;FOR T13 = 3.509 MSEC
               XMIT01;              DO UNTIL BIT .EQ. CTS
0E30 15         DCR  D                COUNT = COUNT-1
0E31 CA 7B 0E   JZ   XMIT06           IF COUNT+1 .EQ. 0
               ; >>JUMP AHEAD<<         TIMEOUT HAS OCCURRED
               ;                        QUIT
               ;                      ENDIF
0E34 20         RIM                   INPUT BIT
               ;                      A.0 = BIT = RIM.SID ;CTS OR IDLE
0E35 B7         ORA  A                CHECK BIT
0E36 F2 30 0E   JP   XMIT01
               ;                    ENDDO

               XMIT03;              DO UNTIL BYTCNT .EQ. 0
               ;                      DEFINE STOP BIT
0E39 3E 01      MVI  A,1              IF 1 .LT. BYTCNT
0E3B B9         CMP  C
               ;                        THIS IS NOT LAST BYTE
               ;                        PSW:CY = STOP = EOB = 1
               ;                      ELSE
               ;                        THIS IS THE LAST BYTE
               ;                        PSW:CY = STOP = EOM = 0
               ;                      ENDIF
0E3C 23         INX  H                HL = ADDRESS, XMTBUF[N=N+1]
0E3D 3E 12      MVI  A,18             DELAY ;FOR T4 = 178.234 USEC
0E3F 3D         DCR  A
0E40 F2 3F 0E   JP   $-1
```

```
                     ;                   SET TO OUTPUT 9 BITS FROM LOOP
                     ;                   8 DATA, AND 1 EOB OR EOM
0E43 06 0A            MVI  B,9+1         BITCNT = 10 = 9+1
0E45 3E 40            MVI  A,40H         SIM.SOD = START = 0
                     ;                   SIM.SOE = ENABLD = 1
0E47 57               MOV  D,A           D.0 = OUTBIT = START
0E48 30               SIM                OUTPUT = START
                     ;                   LOAD 8 DATA BITS
0E49 7E               MOV A,M            A = XMIBUF[N]
                     ;                   SAVE 8 DATA BITS AND 1 STOP BIT
0E4A F5               PUSH PSW

                     XMIT04;             LOOP ;BREAK IF BITCNT .EQ. 0
0E4B 3E 06            MVI  A,6             DELAY ;BIT PERIOD = 103.923 USEC
0E4D 3D               DCR  A
0E4E F2 4D 0E         JP   $-1
0E51 F0               RP
0E52 F1               POP  PSW             GET NEXT BIT
0E53 1F               RAR                  PSW.CY = OUTBIT
0E54 F5               PUSH PSW
0E55 3E 80            MVI  A,80H           PSW:CY,A = SIM*2
0E57 1F               RAR                  A = SIM
                     ;                     SIM.SOD = OUTBIT
                     ;                     SIM.SOE = ENABLD = 1
0E58 5A               MOV  E,D             E.0 = PRVBIT = OUTBIT
0E59 57               MOV  D,A             D.0 = OUTBIT
0E5A 05               DCR  B               BITCNT = BITCNT-1
                     ;                     IF BITCNT .EQ. 0
0E5B CA 68 0E         JZ   XMIT05            BREAK
                     ;                     ENDIF
0E5E 30               SIM                  OUTPUT OUTBIT
0E5F 20               RIM                  READ ECHO
                     ;                     A.0 = ECHO = RIM.SID
0E60 AB               XRA  E               IF ECHO .NE. PRVBIT
0E61 F2 4B 0E         JP   XMIT04
0E64 F1               POP  PSW               CLEAN UP STACK
0E65 C3 7B 0E         JMP  XMIT06            QUIT
                     ; >>JUMP AHEAD<<
                     ;                     ENDIF
                     XMIT05;             ENDLOOP
0E68 F1               POP  PSW           CLEAN UP STACK
0E69 20               RIM                READ ECHO
                     ;                   A.0 = ECHO = RIM.SID
0E6A AB               XRA  E             IF ECHO .NE. STOP
0E6B FA 7B 0E         JM   XMIT06          QUIT
                     ; >>JUMP AHEAD<<
                     ;                   ENDIF
0E6E 0D               DCR  C             C = BYTCNT = BYTCNT-1
0E6F C2 39 0E         JNZ  XMIT03
                     ;                 ENDDO

0E72 3E C0            MVI  A,0C0H      SIM.SOD = ACK = 1
                     ;                 SIM.SOE = ENABLD = 1
0E74 30               SIM              OUTPUT ACK
0E75 16 29            MVI  D,41        DELAY ;T7 = 336.914 USEC
0E77 15               DCR  D
0E78 F2 77 0E         JP   $-1
                     XMIT06;           >>TARGET OF JUMP AHEAD<<
                     ;                 QUIT XMIT ROUTINE
0E7B 3E 40            MVI  A,40H       SIM.SOD = IDLE = 0
                     ;                 SIM.SOE = ENABLD = 1
0E7D 30               SIM              OUTPUT IDLE
0E7E 16 C8            MVI  D,200       DELAY ;T14 = 1606.908 USEC
0E80 15               DCR  D
0E81 F2 80 0E         JP   $-1
0E84 C9               RET              RETURN
                     ;CLRBLK(BLOCK )
                     ;      (NIBSTR)
```

```
                   ;      ( U    )
                   ;      ( @A   )
                   ;      ( C    )
                   ;
                   ;PSW:S, Z, P, CY = NO CHANGE
                   ;
                   ;CLEAR A 16 NIBBLE BLOCK TO ZEROS
                   ;BLOCK[0..15] = 0
                   ;
                   CLRBLK;                 ****ENTRY POINT
0E85 F5              PUSH PSW              SAVE A, PSW
0E86 C5              PUSH B                SAVE BC
0E87 4F              MOV  C,A              C = OFFSET, BLOCK
0E88 AF              XRA  A                A = NIBVAL = 0
0E89 06 10           MVI  B,16             B = NIBCNT = 16
0E8B C3 26 0F        JMP  FILN01           FILNIB(BLOCK,NIBVAL,NIBCNT)
                   ;                             ( @C   , A    , B    )
                   ;                             ( O    , I    , I    )
                   ;                       RESTORE BC
                   ;                       RESTORE A, PSW
                   ;                       RETURN
                   ;CMPARE(MINUEN,SUBTRA,NNIB ,SGNFLG,ZROFLG)
                   ;      (NIBSTR,NIBSTR,BYTE ,BIT   ,BIT   )
                   ;      ( I    , I    , I   , O    , O    )
                   ;      ( @D   , @E   , A   ,PSW:S ,PSW:Z )
                   ;      ( NC   , NC   , NC  , C    , C    )
                   ;
                   ;PSW:CY = NO CHANGE
                   ;PSW:S, Z, P CHANGED
                   ;
                   ;COMPARE EQUAL LENGTH BCD NIBBLE STRINGS
                   ;
                   CMPARE;                 ****ENTRY POINT
0E8E E5              PUSH H                SAVE HL
0E8F F5              PUSH PSW              SAVE A, PSW
0E90 C5              PUSH B                SAVE BC
0E91 D5              PUSH D                SAVE DE
0E92 67              MOV  H,A              H = COUNT = NNIB
                   CMPAR1;                 DO WHILE COUNT .GT. 0
0E93 25              DCR  H                  H = COUNT-1
0E94 FA A9 0E        JM   CMPAR2
0E97 43              MOV  B,E                B = OFFSET,
                   ;                             SUBTRA[SINDEX = NNIB-COUNT]
0E98 CD 35 0F        CALL GETNIB             GETNIB(SDIGIT,ZERO ,SUBTRA[SINDEX])
                   ;                               ( A    ,PSW:Z, @B             )
                   ;                               ( O    , O   , I              )
0E9B 4F              MOV  C,A                C = SDIGIT
0E9C 42              MOV  B,D                B = OFFSET,
                   ;                             MINUEN[MINDEX = NNIB-COUNT]
0E9D CD 35 0F        CALL GETNIB             GETNIB(MDIGIT,ZERO ,MINUEN[MINDEX])
                   ;                               ( A    ,PSW:Z, @B             )
                   ;                               ( O    , O   , I              )
0EA0 91              SUB  C                  A = DIFRNC = MDIGIT-SDIGIT
0EA1 C2 A9 0E        JNZ  CMPAR2             IF DIFRNC .NE. 0
                   ;                           BREAK
                   ;                         ENDIF
0EA4 1C              INR  E                  E = OFFSET,
                   ;                             SUBTRA[SINDEX = NNIB-(COUNT-1)]
0EA5 14              INR  D                  D = OFFSET,
                   ;                             MINUEN[MINDEX = NNIB-(COUNT-1)]
                   ;                         H = COUNT = COUNT-1
0EA6 C3 93 0E        JMP  CMPAR1
                   CMPAR2;                 ENDDO
0EA9 D1              POP  D                RESTORE DE
0EAA C1              POP  B                RESTORE BC
                   ;                       IF NNIB .EQ. 0
0EAB 67              MOV  H,A                H = DIFRNC = NNIB = 0
                   ;                       ELSE
```

```
                ;                   H = DIFRNC
                ;                   ENDIF
OEAC F1           POP  PSW          RESTORE A, PSW:CY
                ;                   OUTPUT PSW:S = SGNFLG
                ;                   OUTPUT PSW:Z = ZROFLG
OEAD 24           INR  H
OEAE 25           DCR  H
OEAF E1           POP  H            RESTORE HL
OEB0 C9           RET               RETURN
                ;CRC(BLOCK ,NIBCNT,CRCVAL)
                ;  (NIBSTR,UBYTE ,UBYTE )
                ;  ( I     , I    , O    )
                ;  ( @C    , B    , D    )
                ;  ( NC    , NC   , C    )
                ;
                ;PSW = NO CHANGE
                ;
                ;COMPUTE CRC FOR BLOCK OF NIBCNT NIBBLES
                ;
                CRC;                ****ENTRY POINT
OEB1 C5           PUSH B            SAVE BC
OEB2 F5           PUSH PSW          SAVE A, PSW
OEB3 78           MOV  A,B          A = NIBCNT
OEB4 41           MOV  B,C          B = OFFSET, BLOCK[N = 0]
OEB5 4F           MOV  C,A          C = NIBCNT
OEB6 16 FF        MVI  D,OFFH       D = CRCVAL = HEXFF
                CRC1;               DO UNTIL NIBCNT = 0
OEB8 CD 35 OF     CALL GETNIB         GETNIB(NIBVAL,ZERO ,BLOCK[N])
                ;                           ( A    ,PSW:Z, @B     )
                ;                           ( O    , O   , I      )
OEBB CD C6 OE     CALL CRCNIB         CRCNIB(NIBVAL,CRCVAL)
                ;                           ( A    , D    )
                ;                           ( I    , I/O  )
OEBE 04           INR  B              B = OFFSET, BLOCK[N = N+1]
OEBF OD           DCR  C              NIBCNT = NIBCNT-1
OEC0 C2 B8 OE     JNZ  CRC1
                ;                   ENDDO
OEC3 F1           POP  PSW          RESTORE A, PSW
OEC4 C1           POP  B            RESTORE BC
OEC5 C9           RET
                ;CRCNIB(NIBVAL,CRCVAL)
                ;      (BYTE  ,BYTE  )
                ;      ( I    , I/O  )
                ;      ( A    , D    )
                ;      ( NC   , C    )
                ;
                ;PSW DESTROYED
                ;
                ;INCLUDE NIBBLE INTO DEVELOPING VALUE OF CRC
                ;
                CRCNIB;             ****ENTRY POINT
OEC6 C5           PUSH B            SAVE BC
OEC7 06 04        MVI  B,4          B = BITCNT = 4
                ;                   SHIFT BITS TO HIGH ORDER OF NIBVAL
OEC9 07           RLC               A = NIBVAL = NIBVAL*HEX10
OECA 07           RLC
OECB 07           RLC
OECC 07           RLC
                                    ROTATE NIBVAL ONE BIT AT A TIME
                ;                   BACK INTO ITS ORIGINAL FORM WHILE
                ;                   MODIFYING CRCVAL TO REFLECT
                ;                   THE BIT'S VALUE
                CRCNI1;             DO UNTIL BITCNT .EQ. 0
OECD 07           RLC                 CY = NIBBIT
                ;                     A = NIBVAL = ((NIBVAL*2) .AND.
                ;                         HEXFF)+NIBBIT
OECE 4F           MOV  C,A            C = NIBVAL
OECF 7A           MOV  A,D            A = CRCVAL
```

```
0ED0 17          RAL                  CY = CRCBIT
                ;                     A = CRCVAL = ((CRCVAL*2) .AND.
                ;                                HEXFF)+NIBBIT
0ED1 D2 D6 0E    JNC  CRCNI2          IF CRCBIT = 1
0ED4 EE 9B       XRI  9BH               A = CRCVAL = CRCVAL .XOR. HEX9B
                CRCNI2;               ENDIF
0ED6 57          MOV  D,A             D = CRCVAL
0ED7 79          MOV  A,C             A = NIBVAL
0ED8 05          DCR  B               B = BITCNT = BITCNT-1
0ED9 C2 CD 0E    JNZ  CRCNI1
                ;                    ENDDO
0EDC C1          POP  B              RESTORE BC
0EDD C9          RET                 RETURN
                ;DBLANK()(PORTA )
                ;        (BITSTR)
                ;        ( I/O  )
                ;        ( 7001 )
                ;        ( C    )
                ;
                ;REGISTERS DESTROYED
                ;PSW DESTROYED
                ;
                ;DISPLAY BLANKING ROUTINE
                ;
                DBLANK;              ****ENTRY POINT
                ;                    PREVENT INTERRUPT DISPLAY REFRESH
0EDE CD 34 01    CALL STPTMR         STPTMR(WASOFF)
                ;                          (PSW:Z )
                ;                          ( 0    )
                ;                    FLUSH POSSIBLE NOISE OUT OF DISPLAY
0EE1 CD F6 0E    CALL DFLUSH         DFLUSH(ADDRESS,PORTA)
                ;                          ( HL     , @HL )
                ;                          ( 0        -   )
                ;                    (PORTA .AND HEX0F) .EQ. HEX0F, FOR
                ;                    3 DARK BITS AND IDLE DISPLAY CLOCK
0EE4 7E          MOV  A,M
0EE5 E6 F1       ANI  0F1H
0EE7 77          MOV  M,A            PORTA = PORTA .AND. HEXF1, FOR
                ;                    3 START BITS AND IDLE DISPLAY CLOCK
0EE8 35          DCR  M              PULSE DISPLAY CLOCK
0EE9 34          INR  M
                ;                    SET TO OUTPUT 35*3 DARK BITS
0EEA F6 0F       ORI  0FH
0EEC 77          MOV  M,A            PORTA = PORTA .OR. HEX0F, FOR
                ;                    3 DARK BITS AND IDLE DISPLAY CLOCK
0EED 3E 22       MVI  A,34           A = COUNT = 34
                DBLAN1;              ****ALTERNATE ENTRY POINT
                DBLAN2;              DO UNTIL COUNT .LT. 0
0EEF 35          DCR  M                PULSE DISPLAY CLOCK
0EF0 34          INR  M
0EF1 3D          DCR  A                A = COUNT = COUNT-1
0EF2 F2 EF 0E    JP   DBLAN2
                ;                    ENDDO
0EF5 C9          RET
                ;DFLUSH(ADDRES)(PORTA )
                ;      (ADDRES)(BITSTR)
                ;      ( 0    )( I/O  )
                ;      ( HL   )( 7001 )
                ;      ( C    )( C    )
                ;
                ;REGISTERS DESTROYED
                ;PSW DESTROYED
                ;
                ;FLUSH POSSIBLE NOISE OUT OF DISPLAY SHIFT REGISTER
                ;
                DFLUSH;              ****ENTRY POINT
0EF6 21 01 70    LXI  H,PORTA        HL = ADDRESS, PORTA
```

```
0EF9 7E          MOV  A,M
0EFA F6 0F       ORI  0FH
0EFC 77          MOV  M,A          PORTA = PORTA .OR. HEX0F, FOR
                                   3 DARK BITS AND IDLE DISPLAY CLOCK
                ;                  CLOCK 36*3 DARK BITS INTO DISPLAY
                ;
0EFD 3E 23       MVI  A,35         A = COUNT = 35
0EFF C3 EF 0E    JMP  DBLAN1
                ;                  RETURN
                ;DSBKBD()(KDCTRL,CHRBKT,CTLBKT)
                ;        (BITSTR,BYTE  ,BYTE  )
                ;        ( 0    , 0    , 0    )
                ;        ( RAM  , RAM  , RAM  )
                ;        ( C    , C    , C    )
                ;
                ;PSW:S, Z, P, CY = NO CHANGE
                ;
                ;DISABLE KEYBOARD
                ;
                DSBKBD;            ****ENTRY POINT
0F02 F5          PUSH PSW          SAVE A, PSW
                ;                  PREVENT KDIO FROM SCANNING KEYBOARD
0F03 3A 27 74    LDA  KDCTRL/2+X   KDCTRL.KBDDSB = TRUE
0F06 F6 01       ORI  01H
0F08 32 27 74    STA  KDCTRL/2+X
                ;                  CLEAR OUTPUT OF DBOUNCE ROUTINE
0F0B AF          XRA  A            CHRBKT = HEX00
0F0C 32 2C 74    STA  CHRBKT/2+X
0F0F 32 2B 74    STA  CTLBKT/2+X   CTLBKT = HEX00
0F12 F1          POP  PSW          RESTORE A, PSW
0F13 C9          RET               RETURN
                ;ENAKBD()(KEYBKT,KDCTRL)
                ;        (BYTE  ,BITSTR)
                ;        ( 0    , 0    )
                ;        ( RAM  , RAM  )
                ;        ( C    , C    )
                ;
                ;PSW:S, Z, P, CY = NO CHANGE
                ;
                ;ENABLE KEYBOARD
                ;
                ENAKBD;            ****ENTRY POINT
0F14 F5          PUSH PSW          SAVE A, PSW
                ;                  FORCE KDIO TO RESYNC KEYBOARD SCAN
0F15 3E 80       MVI  A,MULKEY     KEYBKT = MULKEY
0F17 32 2A 74    STA  KEYBKT/2+X
                ;                  ALLOW KDIO TO SCAN KEYBOARD
0F1A 3A 27 74    LDA  KDCTRL/2+X   KDCTRL.KDBDSB = FALSE
0F1D E6 FE       ANI  0FEH
0F1F 32 27 74    STA  KDCTRL/2+X
0F22 F1          POP  PSW          RESTORE A, PSW
0F23 C9          RET               RETURN
                ;FILNIB(DEST  ,NIBVAL,NIBCNT)
                ;      (NIBSTR,BYTE  ,UBYTE )
                ;      ( 0    , I    , I    )
                ;      ( @C   , A    , B    )
                ;      ( C    , NC   , NC   )
                ;
                ;PSW:S, Z, P, CY = NO CHANGE
                ;
                ;FILL A NIBBLE STRING WITH A VALUE
                ;DEST[0..NIBCNT-1] = NIBVAL
                ;
                FILNIB;            ****ENTRY POINT
0F24 F5          PUSH PSW          SAVE A, PSW
0F25 C5          PUSH B            SAVE BC
                FILN01;            ****SPECIAL JUMP ENTRY
                ;                  C = OFFSET, DEST[N = 0]
                ;                  FILL NIBCNT NIBBLES IN DEST WITH NIBVAL
```

```
0F26 04          INR  B           CONDITION NIBCNT FOR DO WHILE
               FILN02;            DO WHILE NIBCNT .NE. 0
0F27 05          DCR  B             B = NIBCNT-1
0F28 CA 32 0F    JZ   FILN03
               ;                    PUT NIBVAL INTO DEST
0F2B CD EE 0F    CALL PUTNIB        PUTNIB(DEST[N],NIBVAL)
               ;                           ( @C    , A    )
               ;                           ( 0     , I    )
               ;                    POINT AT NEXT NIBBLE TO RIGHT
0F2E 0C          INR  C             C = OFFSET, DEST[N+1]
               ;                    B = NIBCNT = NIBCNT-1
0F2F C3 27 0F    JMP  FILN02
               FILN03;            ENDDO
0F32 C1          POP  B           RESTORE BC
0F33 F1          POP  PSW         RESTORE A, PSW
0F34 C9          RET              RETURN
               ;GETNIB(NIBVAL,ZERO ,SOURCE)
               ;      (BYTE  ,BIT  ,NIB   )
               ;      ( 0    , 0   , I    )
               ;      ( A    ,PSW:Z, @B   )
               ;      ( C    , C   , NC   )
               ;
               ;PSW:CY = NO CHANGE
               ;PSW:S, Z, P CHANGED; CORRESPOND TO VALUE OF NIBVAL
               ;
               ;FETCH HIGH ORDER 4 BIT VALUE FROM SOURCE[N=EVEN]
               ;OR LOW ORDER 4 BIT VALUE FROM SOURCE[N=ODD],
               ;AND PLACE IT IN LOW ORDER OF NIBVAL.
               ;CLEAR HIGH ORDER OF NIBVAL.
               ;NIBVAL = SOURCE[N],   ZERO = NIBVAL .EQ. 0
               ;
               GETNIB;            ****ENTRY POINT
0F35 E5          PUSH H           SAVE HL
0F36 F5          PUSH PSW         SAVE A, PSW
               ;                  FLAG WHETHER L/O NIBBLE OF BYTE WANTED
0F37 AF          XRA  A           A = OFFSET, SOURCE[N]/2
0F38 78          MOV  A,B
0F39 1F          RAR
               ;                  PSW:CY = ODD = TRUE, IF N = ODD
               ;                  CALCULATE ADDRESS OF SOURCE
0F3A 26 74       MVI  H,X/100H    HL = ADDRESS, SOURCE[N]
0F3C 6F          MOV  L,A
               GETN01;            ****SPECIAL JUMP ENTRY
               ;                  FETCH BYTE CONTAINING DESIRED NIBBLE
0F3D 7E          MOV  A,M         A = SOURCE[N]
               ;                  CHECK WHETHER NIBBLE IN HIGH ORDER
0F3E DA 45 0F    JC   GETN02      IF ODD .EQ. FALSE
               ;                    MOVE H/O NIBBLE TO L/O
0F41 0F          RRC                A = SOURCE[N] = SOURCE[N]/HEX10
0F42 0F          RRC
0F43 0F          RRC
0F44 0F          RRC
               GETN02;            ENDIF
               ;                  CLEAR HIGH ORDER NIBBLE
0F45 E6 0F       ANI  0FH         H = NIBVAL = SOURCE[N] .AND. HEX0F
0F47 67          MOV  H,A
0F48 F1          POP  PSW         RESTORE PSW:CY
0F49 7C          MOV  A,H         A = NIBVAL
               ;                  INDICATE NIBVAL STATUS
0F4A 3C          INR  A           PSW:Z = ZERO = NIBVAL .EQ. 0
0F4B 3D          DCR  A
0F4C E1          POP  H           RESTORE HL
0F4D C9          RET              RETURN
               ;LSTATE(FATMOD,NORMOD,SERMOD,PRVMOD)(MRSTS1,MRSTS2)
               ;      (BIT   ,BIT   ,BIT   ,BIT   )(BITSTR,BITSTR)
               ;      ( 0    , 0    , 0    , 0    )( I    , I    )
               ;      (PSW:S ,PSW:Z ,PSW:P ,PSW:CY)(RAM   ,RAM   )
               ;      ( C    , C    , C    , C    )( NC   , NC   )
```

```
                      ;
                      ;PSW:S = MINUS STATUS IF FATAL MODE
                      ;PSW:Z = ZERO STATUS IF NORMAL MODE
                      ;PSW:P = EVEN PARITY STATUS IF SERVICE MODE
                      ;PSW:CY= 1 IF PRIVILEGED MODE
                      ;
                      ;COPIES METER STATE FLAGS INTO PSW FOR EASY TESTING
                      ;
                      LSTATE;              ****ENTRY POINT
 0F4E E5                PUSH H             SAVE HL
 0F4F F5                PUSH PSW           H = A, SAVED FOR RETURN
 0F50 E1                POP  H
 0F51 3A 25 74          LDA  MRSTS2/2+X    L = MRSTS2.FATMOD + MRSTS2.PRVMOD
 0F54 E6 81             ANI  81H               (PSW:S POS  ) , (PSW:CY POS )
 0F56 6F                MOV  L,A
 0F57 3A 24 74          LDA  MRSTS1/2+X    A = MRSTS1.SERMOD
 0F5A E6 08             ANI  08H               (            )
 0F5C 0F                RRC                    (PSW:P POS  )
 0F5D B5                ORA  L             A = FATMOD, PRVMOD, SERMOD
                      ;                        (PSW:S, PSW:CY, PSW:P)
 0F5E C2 63 0F          JNZ  LSTAT1        IF NO STATUS BITS ARE SET
 0F61 3E 40             MVI  A,40H           A = NORMOD
                      ;                          (PSW:Z)
                      LSTAT1;              ENDIF
 0F63 6F                MOV  L,A           L = A = STATUS
 0F64 E5                PUSH H             RESTORE A; PSW = STATUS
 0F65 F1                POP  PSW
 0F66 E1                POP  H             RESTORE HL
 0F67 C9                RET                RETURN
                      ;MOVBIT(SOURCE,SBIT ,DEST  ,DBIT ,VALUE)
                      ;      (BITSTR,UBYTE,BITSTR,UBYTE,BIT  )
                      ;      ( I    , I   , O    , I    , O   )
                      ;      ( @H   , L   , @D   , E    ,PSW:Z)
                      ;      ( NC   , NC  , C    , NC   , C   )
                      ;
                      ;PSW:CY = NO CHANGE
                      ;PSW:S, Z, P CHANGED; CORRESPOND TO VALUE OF BIT
                      ;
                      ;MOVE BIT FROM BIT POSITION SBIT IN SOURCE TO BIT POSITION
                      ;DBIT IN DEST.  VALUE INDICATES WHETHER BIT IS 0 OR 1.
                      ;BIT 0 IS HIGH ORDER BIT OF STRING.
                      ;DEST[DBIT] = SOURCE[SBIT]
                      ;
                      MOVBIT;              ****ENTRY POINT
 0F68 E5                PUSH H             SAVE HL
 0F69 C5                PUSH B             SAVE BC
 0F6A F5                PUSH PSW           SAVE A, PSW
 0F6B D5                PUSH D             SAVE DE
                      ;                    H = SRCOFS = OFFSET, SOURCE
                      ;                    BUILD SOURCE ADDRESS AND MASK
 0F6C CD 8A 0F          CALL MOVB01        MOVB01(SRCOFS,SBIT,SRCADR,SMASK)
                      ;                          ( H    , L  , HL   , A    )
                      ;                          ( I    , I  , O    , O    )
                      ;                    HL = SRCADR = ADDRESS, SOURCE.SBIT
 0F6F 47                MOV  B,A           B = SMASK
 0F70 7E                MOV  A,M           PSW:CY = SOURCE.SBIT
 0F71 A0                ANA  B
 0F72 C6 FF             ADI  0FFH
                      ;                    IF SOURCE.SBIT .NE. 0
 0F74 9F                SBB  A               B = SRCBIT = HEXFF
 0F75 47                MOV  B,A
                      ;                    ELSE
                      ;                      B = SRCBIT = HEX00
                      ;                    ENDIF
 0F76 E1                POP  H             H = DSTOFS = OFFSET, DEST
                      ;                    L = DBIT
 0F77 E5                PUSH H             RESAVE HL
                      ;                    BUILD DESTINATION ADDRESS AND MASK
```

```
0F78 CD 8A 0F   CALL MOVB01        MOVB01(DSTOFS,DBIT,DSTADR,DMASK)
                ;                        ( H    , L  , HL   , A   )
                ;                        ( I    , I  , O    , O   )
                ;                  HL = DSTADR = ADDRESS, DEST.DBIT
0F7B 4F           MOV  C,A         C = DMASK
0F7C A0           ANA  B           B = DSTBIT = DMASK .AND. SRCBIT
0F7D 47           MOV  B,A
0F7E 79           MOV  A,C         A = DEST.DBIT = 0
0F7F 2F           CMA
0F80 A6           ANA  M
0F81 B0           ORA  B           DEST.DBIT = DEST.DBIT .OR. DSTBIT
0F82 77           MOV  M,A
0F83 D1           POP  D           RESTORE DE
0F84 F1           POP  PSW         RESTORE A, PSW:CY
0F85 04           INR  B           PSW:Z = DSTBIT .EQ. 0
0F86 05           DCR  B
0F87 C1           POP  B           RESTORE BC
0F88 E1           POP  H           RESTORE HL
0F89 C9           RET              RETURN
                ;MOVB01(NIBOFS,BITNO,BYTADR,MASK)
                ;       (OFFSET,UBYTE,ADDR  ,BYTE)
                ;       ( I    , I   , O    , O  )
                ;       ( H    , L   , HL   , A  )
                ;       ( C    , C   , C    , C  )
                ;
                ;PSW:S, Z, P, CY DESTROYED
                ;REGISTER DE DESTROYED
                ;
                ;CONVERT NIBBLE OFFSET AND BIT NUMBER INTO ADDRESS OF
                ;BYTE CONTAINING BIT.  A BIT SELECTION MASK IS ALSO
                ;PRODUCED
                ;
                MOVB01;            ****ENTRY POINT FOR MOVBIT ONLY
0F8A 7D           MOV  A,L         E = ((BITNO/4)+NIBOFS)/2
0F8B 1F           RAR
0F8C 1F           RAR
0F8D E6 2F        ANI  2FH
0F8F 84           ADD  H
0F90 1F           RAR
0F91 5F           MOV  E,A
0F92 7C           MOV  A,H         PSW:CY = NIBOFS .MOD. 2
0F93 1F           RAR
0F94 7D           MOV  A,L         A = BITNO
0F95 D2 9A 0F     JNC  MOVB02      IF PSW:CY .EQ. 1
                ;                    NIBOFS NOT ON BYTE BOUNDARY
0F98 DE 04        SBI  4             MAKE CORRECTION TO BITNO
                MOVB02;            ENDIF
0F9A E6 07        ANI  07H         A = BITNUM, WITHIN BYTE
0F9C 16 00        MVI  D,0         DE = ((BITNO/4)+NIBOFS)/2
0F9E 21 00 74     LXI  H,X         HL = BYTADR
0FA1 19           DAD  D
0FA2 E5           PUSH H           SAVE BYTADR
0FA3 5F           MOV  E,A         DE = BITNUM
0FA4 21 AB 0F     LXI  H,MOVB03    HL = ADDRESS, MASK
0FA7 19           DAD  D
0FA8 7E           MOV  A,M         A = MASK
0FA9 E1           POP  H           HL = BYTADR
0FAA C9           RET              RETURN
                ;
                MOVB03;            MASK TABLE
0FAB 80           DB   80H         0 BIT MASK; HIGH ORDER
0FAC 40           DB   40H         1
0FAD 20           DB   20H         2
0FAE 10           DB   10H         3
0FAF 08           DB   08H         4
0FB0 04           DB   04H         5
0FB1 02           DB   02H         6
0FB2 01           DB   01H         7 BIT MASK; LOW ORDER
```

```
                ;MVLNIB(DEST   ,SOURCE,NIBCNT,NONBCD,ZERO  )
                ;      (NIBSTR,NIBSTR,BYTE  ,BIT   ,BIT    )
                ;      ( 0    , I    , I    , 0    , 0     )
                ;      ( @C   , @B   , A    ,PSW:S ,PSW:Z  )
                ;      ( C    , NC   , NC   , C    , C     )
                ;
                ;PSW:CY = NO CHANGE
                ;PSW:S, Z, P CHANGED
                ;
                ;FOR A STRING ADDRESSED AT THE LEFT SIDE,
                ;FROM RIGHT TO LEFT MOVE NIBCNT NIBBLES FROM SOURCE TO
                ;DEST.  THE NONBCD AND ZERO FLAGS REFER TO THE LARGEST
                ;NIBBLE VALUE MOVED.
                ;DEST[0..NIBCNT-1] = SOURCE[0..NIBCNT-1]
                ;
                MVLNIB;                  ****ENTRY POINT
0FB3 C5           PUSH B                 SAVE  BC
                MVLN01;                  ****SPECIAL JUMP ENTRY
0FB4 F5           PUSH PSW               SAVE A, PSW
0FB5 D5           PUSH D                 SAVE DE
0FB6 3D           DCR  A                 D = NIBCNT-1
0FB7 57           MOV  D,A
0FB8 80           ADD  B                 B = OFFSET, SOURCE[N=NIBCNT-1]
0FB9 47           MOV  B,A
0FBA 7A           MOV  A,D               A = NIBCNT-1
0FBB 81           ADD  C                 C = OFFSET, DEST[N=NIBCNT-1]
0FBC 4F           MOV  C,A
0FBD D1           POP  D                 RESTORE DE
0FBE F1           POP  PSW               RESTORE A, PSW
0FBF C3 C3 0F     JMP  MVRN01            MVRNIB(DEST[N],SOURCE[N],NIBCNT,
                ;                              ( @C    , @B      , A    ,
                ;                              ( 0     , I       , I    ,
                ;
                ;                              NONBCD,ZERO )
                ;                              PSW:S ,PSW:Z)
                ;                               0    , 0   )
                ;                        RESTORE BC
                ;                        RETURN
                ;MVRNIB(DEST   ,SOURCE,NIBCNT,NONBCD,ZERO  )
                ;      (NIBSTR,NIBSTR,BYTE  ,BIT   ,BIT    )
                ;      ( 0    , I    , I    , 0    , 0     )
                ;      ( @C   , @B   , A    ,PSW:S ,PSW:Z)
                ;      ( C    , NC   , NC   , C    , C     )
                ;
                ;PSW:CY = NO CHANGE
                ;PSW:S, Z, P CHANGED
                ;
                ;FOR A STRING ADDRESSED AT THE RIGHT SIDE,
                ;FROM RIGHT TO LEFT MOVE NIBCNT NIBBLES FROM SOURCE TO
                ;DEST.  THE NONBCD AND ZERO FLAGS REFER TO THE LARGEST
                ;NIBBLE VALUE MOVED.
                ;DEST[1-NIBCNT..0] = SOURCE[1-NIBCNT..0]
                ;
                MVRNIB;                  ****ENTRY POINT
0FC2 C5           PUSH B                 SAVE BC
                MVRN01;                  ****SPECIAL JUMP ENTRY
0FC3 F5           PUSH PSW               SAVE A, PSW
0FC4 E5           PUSH H                 SAVE HL
0FC5 67           MOV  H,A               H = NIBCNT
                ;                        B = OFFSET, SOURCE[N=0]
                ;                        C = OFFSET, DEST[N=0]
                ;                        SET FLAGS FOR RETURN IF NIBCNT .LE. 0
0FC6 2E 00        MVI  L,0               L = FLAGV = 0; WHICH WILL PRODUCE:
                ;                        PSW:Z = ZERO = TRUE
                ;                        PSW:S = NONBCD = FALSE
                ;                        MOVE NIBCNT NIBBLES
                MVRN02;                  DO WHILE NIBCNT .GT. 0
```

```
0FC8 25        DCR  H          H = NIBCNT-1
0FC9 FA E7 0F  JM   MVRN06
               ;               MOVE ONE NIBBLE
0FCC CD 35 0F  CALL GETNIB     GETNIB(NIBVAL,ZERO ,SOURCE[N])
               ;                     ( A    ,PSW:Z, @B       )
               ;                     ( 0    , 0   , I        )
0FCF CD EE 0F  CALL PUTNIB     PUTNIB(DEST[N],NIBVAL)
               ;                     ( @C    , A    )
               ;                     ( 0     , I    )
               ;               CHECK FOR NONZERO NIBBLE
0FD2 CA DB 0F  JZ   MVRN04     IF ZERO .EQ. FALSE
               ;                 CHECK FOR NO PREVIOUS FLAGS
0FD5 2C        INR  L            IF FLAGV .EQ. 0
0FD6 2D        DCR  L
0FD7 C2 DB 0F  JNZ  MVRN03
0FDA 2C        INR  L              L = FLAGV = 1
               ;                   WHICH WILL PRODUCE:
               ;                   PSW:Z = ZERO = FALSE
               ;                   PSW:S = NONBCD = FALSE
              MVRN03;            ENDIF
              MVRN04;          ENDIF
               ;               CHECK FOR NONBCD NIBBLE
0FDB FE 0A     CPI  10         IF NIBVAL .GE. 10
0FDD DA E2 0F  JC   MVRN05
0FE0 2E 80     MVI  L,80H        L = FLAGV = HEX80
               ;                 WHICH WILL PRODUCE:
               ;                 PSW:Z = ZERO = FALSE
               ;                 PSW:S = NONBCD = TRUE
              MVRN05;          ENDIF
               ;               MOVE INDICES FROM RIGHT TO LEFT
0FE2 05        DCR  B          B = OFFSET, SOURCE[N=N-1]
0FE3 0D        DCR  C          C = OFFSET.DEST[N=N-1]
               ;               H = NIBCNT = NIBCNT-1
0FE4 C3 C8 0F  JMP  MVRN02
              MVRN06;        ENDDO
0FE7 4D        MOV  C,L      C = FLAGV
0FE8 E1        POP  H        RESTORE HL
0FE9 F1        POP  PSW      RESTORE A, PSW:CY
0FEA 0C        INR  C        PSW = STATUS, FLAGV
0FEB 0D        DCR  C
0FEC C1        POP  B        RESTORE BC
0FED C9        RET           RETURN
              ;PUTNIB(DEST  ,NIBVAL)
              ;      (NIBBLE,BYTE  )
              ;      ( 0    , I    )
              ;      ( @C   , A    )
              ;      ( C    , NC   )
              ;
              ;PSW:S, Z, P, CY = NO CHANGE
              ;
              ;INSERT LOW ORDER 4 BITS OF NIBVAL INTO DEST
              ;DEST = NIBVAL .AND. HEX0F
              ;
              PUTNIB;        ****ENTRY POINT
0FEE E5        PUSH H        SAVE HL
0FEF C5        PUSH B        SAVE BC
0FF0 F5        PUSH PSW      SAVE A, PSW
               ;             CLEAR H/O NIBBLE OF NIBVAL
0FF1 E6 0F     ANI  0FH      B = NIBVAL = NIBVAL .AND. HEX0F
0FF3 47        MOV  B,A
               ;             FLAG WHETHER NIBBLE GOES INTO L/O
               ;             OF BYTE CONTAINING DEST
0FF4 AF        XRA  A        PSW:CY = OFFSET, DEST .MOD. 2
0FF5 79        MOV  A,C
0FF6 1F        RAR
               ;             A = (OFFSET, DEST)/2
0FF7 26 74     MVI  H,X/100H HL = ADDRESS, DEST
0FF9 6F        MOV  L,A
```

```
                        ;                 MAKE MASK TO CLEAR L/O OF BYTE
     0FFA 0E F0          MVI  C,0F0H      C = MASK = HEXF0
                        ;                 CHECK WHETHER NIBBLE GOES IN H/O
     0FFC DA 07 10       JC   PUTN01      IF PSW:CY .EQ. 0
                        ;                   MAKE MASK TO CLEAR H/O OF BYTE
     0FFF 0E 0F          MVI  C,0FH         C = MASK = HEX0F
                        ;                   SHIFT L/O NIBBLE OF NIBVAL TO H/O
     1001 78             MOV  A,B           B = NIBVAL = NIBVAL * HEX10
     1002 07             RLC
     1003 07             RLC
     1004 07             RLC
     1005 07             RLC
     1006 47             MOV  B,A
                        PUTN01;           ENDIF
                        ;                 FETCH BYTE CONTAINING DEST
     1007 7E             MOV  A,M         A = DEST
                        ;                 MAKE HOLE IN BYTE FOR NIBBLE
     1008 A1             ANA  C           A = DEST = 0
                        ;                 PUT NIBBLE IN HOLE
     1009 B0             ORA  B           DEST = NIBVAL
     100A 77             MOV  M,A
     100B F1             POP  PSW         RESTORE A, PSW
     100C C1             POP  B           RESTORE BC
     100D E1             POP  H           RESTORE HL
     100E C9             RET              RETURN
                        ;RSCAN(SOURCE,NIBCNT,NONBCD,ZERO   )
                        ;     (NIBSTR,BYTE  ,BIT   ,BIT    )
                        ;     ( I    , I    , O    , O     )
                        ;     ( @B   , A    ,PSW:S ,PSW:Z  )
                        ;     ( NC   , NC   , C    , C     )
                        ;
                        ;PSW:CY= NO CHANGE
                        ;PSW:S, Z, P CHANGED
                        ;
                        ;FOR A STRING ADDRESSED AT THE RIGHT SIDE,
                        ;FROM RIGHT TO LEFT SCAN NIBCNT NIBBLES.
                        ;THE NONBCD AND ZERO FLAGS REFER TO THE LARGEST
                        ;NIBBLE SCANNED.
                        ;SCAN SOURCE[1-NIBCNT..0]
                        ;
                        RSCAN;            ****ENTRY POINT
     100F C5             PUSH B           SAVE BC
                        ;                 SCAN BY MOVING SOURCE INTO ITSELF
     1010 48             MOV  C,B         C = OFFSET, SOURCE
     1011 C3 C3 0F       JMP  MVRN01      MVRNIB(SOURCE,SOURCE,NIBCNT,
                        ;                        ( @C    , @B   , A    ,
                        ;                        ( O     , I    , I    ,
                        ;
                        ;                        NONBCD,ZERO  )
                        ;                        PSW:S ,PSW:Z )
                        ;                         O    , O    )
                        ;                 RESTORE BC
                        ;                 RETURN
                        ;TDBITM(SOURCE,BITCNT,DEST  ,DBIT  ,SBIT  )
                        ;      (BITSTR,UBYTE ,BITSTR,UBYTE ,BYTSTR)
                        ;      ( I    , I    , O    , I    , I    )
                        ;      ( @H   , L    , @D   , E    , @BC  )
                        ;      ( NC   , C    , C    , C    , NC   )
                        ;
                        ;REGISTERS DESTROYED
                        ;PSW DESTROYED
                        ;
                        ;TABLE DRIVEN BIT MOVE ROUTINE.
                        ;MOVES BITCNT BITS INTO DEST STARTING AT DEST.DBIT;
                        ;THE SOURCE BITS ARE SOURCE.SBIT[0] THROUGH
                        ;SOURCE.SBIT[BITCNT-1]
                        ;
```

```
                  TDBITM;              ****ENTRY POINT
1014 7D             MOV  A,L           A = BITCNT = BITCNT+1
1015 3C             INR  A
                  ;                    BC = ADDRESS, SBIT[N=0]
                  TDBIT1;              DO WHILE BITCNT .NE. 0
1016 3D             DCR  A               A =  BITCNT = BITCNT-1
1017 C8             RZ
1018 F5             PUSH PSW             SAVE A, PSW
1019 0A             LDAX B               L = SBIT[N]
101A 6F             MOV  L,A
                  ;                      MOVE BIT
101B CD 68 0F       CALL MOVBIT          MOVBIT(SOURCE,SBIT[N],DEST,DBIT,VALUE)
                  ;                            ( @H   , L     , @D , E  ,PSW:Z)
                  ;                            ( I    , I     , O  , I  , O   )
101E F1             POP  PSW             A = BITCNT
101F 03             INX B                BC = ADDRESS, SBIT[N=N+1]
1020 1C             INR  E               E = DBIT = DBIT+1
1021 C3 16 10       JMP  TDBIT1
                  ;                    ENDDO
                  ;                    RETURN
                  ;VCALL(RTNADR)
                  ;     (ADDR  )
                  ;     ( I    )
                  ;     ( HL   )
                  ;
                  ;REGISTER AND STATUS CHANGES DEPEND ON ROUTINE @HL
                  ;
                  ;VECTOR CALL TO ROUTINE WHOSE ADDRESS IS IN HL
                  ;
                  VCALL;              ****ENTRY POINT
1024 E9             PCHL              GO TO ROUTINE @HL
                  ;                   RETURN VIA RTS IN THAT ROUTINE
                  ;VCALLS(RTNADR)
                  ;      (ADDR  )
                  ;      ( I    )
                  ;      ( HL   )
                  ;      ( NC   )
                  ;
                  ;PSW:S, Z, P, CY = NO CHANGE
                  ;
                  ;VECTOR CALL TO ROUTINE @HL
                  ;
                  VCALLS;             ****ENTRY POINT
1025 C5             PUSH B            SAVE ALL REGISTERS
1026 D5             PUSH D
1027 E5             PUSH H
1028 F5             PUSH PSW
                  ;                   VECTOR CALL TO ROUTINE @HL
1029 CD 24 10       CALL VCALL        VCALL(RTNADR)
                  ;                        ( HL   )
                  ;                        ( I    )
                  ;                   RESTORE ALL REGISTERS
102C F1             POP  PSW
102D E1             POP  H
102E D1             POP  D
102F C1             POP  B
1030 C9             RET
                  ;NVM30F()(PORTA )
                  ;        (BITSTR)
                  ;        ( I/O  )
                  ;        ( 7001 )
                  ;        ( C    )
                  ;
                  ;REGISTERS NOT CHANGED
                  ;PSW NOT CHANGED
                  ;
                  ;REMOVE 30 VOLTS FROM NONVOLATILE MEMORY TO DISABLE
```

```
                    ;WRITING AND ERASING.
                    ;
                    NVM30F;                 ****ENTRY POINT
1031 F5               PUSH PSW              SAVE A,PSW
1032 C5               PUSH B                SAVE BC
                    ;                       REMOVE 30 VOLTS FROM NVM
1033 3A 01 70         LDA  PORTA            PORTA = PORTA .OR. HEX40
1036 F6 40            ORI  40H
1038 32 01 70         STA  PORTA
                    ;                       PAUSE FOR 10 MSEC TO ALLOW NVM
                    ;                       VOLTAGE TO TRANSITION FROM
                    ;                       -30 TO +5
103B 01 64 00         LXI  B,100            BC = LOOPCT = 100
                    NVM30G;                 DO UNTIL LOOPCT .EQ. 0
103E CD 19 0B         CALL NPAUSE             NPAUSE(LOOPCT,ZROFLG)
                    ;                               ( BC    ,PSW:Z )
                    ;                               ( I/O   , O    )
1041 C2 3E 10         JNZ  NVM30G
                    ;                       ENDDO
1044 C1               POP  B                RESTORE BC
1045 F1               POP  PSW              RESTORE A,PSW
1046 C9               RET                   RETURN
                    ;NVM30T()(PORTA )
                    ;         (BITSTR)
                    ;         ( I/O  )
                    ;         ( 7001 )
                    ;         ( C    )
                    ;
                    ;REGISTERS NOT CHANGED
                    ;PSW NOT CHANGED
                    ;
                    ;APPLY 30 VOLTS TO NONVOLATILE MEMORY TO ENABLE
                    ;WRITING AND ERASING.
                    ;
                    NVM30T;                 ****ENTRY POINT
1047 F5               PUSH PSW              SAVE A,PSW
                    ;                       SUPPLY 30 VOLTS TO NVM
1048 3A 01 70         LDA  PORTA            PORTA = PORTA .AND. HEXBF
104B E6 BF            ANI  0BFH
104D 32 01 70         STA  PORTA
                    ;                       DELAY ABOUT 100 USEC BEFORE RETURNING
1050 3E 0B            MVI  A,11
1052 3D               DCR  A
1053 C2 52 10         JNZ  $-1
1056 F1               POP  PSW              RESTORE A,PSW
1057 C9               RET                   RETURN
                    ;NVMBYT(ADRESS,NVMRED[J],BYTE)
                    ;      (ADRESS,NIBSTR   ,BYTE)
                    ;      ( I/O  , I       , O  )
                    ;      ( HL   , @HL     , A  )
                    ;      ( C    , NC      , C  )
                    ;
                    ;PSW DESTROYED
                    ;REGISTERS NOT CHANGED
                    ;
                    ;ASSEMBLE 2 NIBBLES FROM NVM INTO A SINGLE BYTE
                    ;
                    NVMBYT;                 ****ENTRY POINT
1058 C5               PUSH B                SAVE BC
1059 7E               MOV  A,M              B = HINIB = NVMRED[J]*HEX10
105A 87               ADD  A
105B 87               ADD  A
105C 87               ADD  A
105D 87               ADD  A
105E 47               MOV  B,A
                    ;                       POINT AT NEXT NIBBLE
105F CD BB 11         CALL NVMNXT           NVMNXT(ADRESS,NVMRED[J=J+?])
```

```
                   ;                      ( HL    , @HL          )
                   ;                      ( I/O   , -            )
1062 7E              MOV  A,M           A = LOWNIB = NVMRED[J] .AND. HEXOF
1063 E6 0F           ANI  0FH
1065 B0              ORA  B             A = BYTE = LOWNIB .OR. HINIB
1066 C1              POP  B             RESTORE BC
1067 C9              RET                RETURN
                   ;NVMCHG()(NVMCTL)
                   ;        (NIBSTR)
                   ;        ( I    )
                   ;        ( RAM  )
                   ;        ( NC   )
                   ;
                   ;A,PSW DESTROYED
                   ;REGISTERS DESTROYED
                   ;
                   ;PROVIDES NVM NORMAL BLOCK IF METER IN NORMAL MODE.
                   ;PROVIDES NVM SERVICE BLOCK IF METER NOT IN NORMAL MODE.
                   ;
                   ;NVMCTL[0] = F IF NO BLOCK IS OPEN
                   ;          = 0 IF NORMAL BLOCK IS OPEN
                   ;          = 1 IF SERVICE BLOCK IS OPEN
                   ;NVMCTL[1] = NUMBER OF OPEN BLOCK
                   ;
                   NVMCHG;              ****ENTRY POINT
                   ;                    FETCH BLOCK TYPE
1068 06 66           MVI  B,NVMCTL      B = OFFSET, NVMCTL[0]
106A CD 35 0F        CALL GETNIB        GETNIB(BLKTYP,ZROFLG,NVMCTL[0])
                   ;                          ( A    ,PSW:Z , @B      )
                   ;                          ( 0    , 0    , I      )
106D FE 02           CPI  2             IF BLKTYP .LT. 2
106F D0              RNC
                   ;                      A BLOCK IS OPEN
                   ;                      DETERMINE METER STATUS
1070 CD 4E 0F        CALL LSTATE          LSTATE(FATMOD,NORMOD,SERMOD,PRVMOD)
                   ;                            (PSW:S ,PSW:Z ,PSW:P ,PSW:C )
                   ;                            ( 0    , 0    , 0    , 0    )
1073 CA 77 10        JZ   NVMCH1          IF NORMOD .EQ. FALSE
                   ;                        A SERVICE BLOCK IS REQUIRED
1076 3D              DCR  A                 A = DIFRNC = BLKTYP-(SRVTYP=1)
                   NVMCH1;                ELSE
                   ;                        A NORMAL BLOCK IS REQUIRED
                   ;                        A = DIFRNC = BLKTYP-(NORHDR=0)
                   ;                      ENDIF
1077 B7              ORA  A               IF DIFRNC .NE. 0
1078 C8              RZ
                   ;                        CURRENT BLOCK NOT REQUIRED
1079 CD DE 0E        CALL DBLANK            STOP CLOCK. BLANK DISPLAY
                   ;                        CLOSE CURRENT BLOCK
107C F3              DI                     DISABLE INTERRUPTS
107D CD 9E 12        CALL NVMWR             NVMWR(ERRFLG)
                   ;                             (PSW:Z )
                   ;                             ( 0    )
1080 FB              EI                     ENABLE INTERRUPTS
                   ;                        IF ERRFLG .EQ. FALSE
                   ;                          OPEN REQUIRED BLOCK
1081 C2 C4 11        JNZ  NVMOPN              NVMOPN(ERRFLG)
                   ;                                (PSW:Z )
                   ;                                ( 0    )
                   ;                        ENDIF
                   ;                      ENDIF
                   ;                    ENDIF
1084 C9              RET                RETURN
                   ;NVMDED(CODE,ERRFLG)(SERFLG,NVMRED)
                   ;      (BYTE,BIT   )(BIT   ,NIBSTR)
                   ;      ( I  , O    )( O    , I    )
                   ;      ( A  ,PSW:Z )( RAM  , NVM  )
                   ;      ( C  , C    )( C    , NC   )
```

```
               ;
               ;A,PSW DESTROYED
               ;REGISTERS DESTROYED
               ;
               ;FLAG METER DEAD AND INDICATE ERROR
               ;
               NVMDED;                ****ENTRY POINT
1085 47          MOV  B,A             B = CODE
               ;                      TEST SPECIAL NVM LOCATION
1086 3A BE 46    LDA  NVMRED+KILCOD   IF NVMRED[KILCOD] .EQ. HEXOF
1089 3C          INR  A
108A E6 0F       ANI  0FH
108C C2 A0 10    JNZ NVMDE2
               ;                        LOCATION STILL CLEAR
               ;                        WRITE ERROR CODE TO LOCATION
108F 78          MOV  A,B               A[1] = CODE
1090 21 BE 02    LXI  H,KILCOD          H = BASE = KILCOD
1093 CD 47 10    CALL NVM30T            TURN ON -30 V TO NVM
1096 CD 61 12    CALL NVMWN             NVMWN(CODE,BASE,ERRFLG)
               ;                              (A[1], HL ,PSW:Z )
               ;                              ( I  , I  , O    )
               NVMDE1;                  ****ENTRY POINT
               ;                            NVMDE1(CODE,ERRFLG)
               ;                          -        ( B  ,PSW:Z )
               ;                                   ( I  , O    )
               ;                        FLAG METER DEAD
1099 21 10 74    LXI  H,SERFLG/2+X      HL = ADDRESS, SERFLG
109C 7E          MOV  A,M               SERFLG.DEAD = TRUE
109D F6 80       ORI  80H
109F 77          MOV  M,A
               NVMDE2;                ENDIF
10A0 CD 31 10    CALL NVM30F          TURN OFF -30 V TO NVM
               ;                      DECLARE FATAL ERROR
10A3 78          MOV  A,B             A = DEDCOD = HEX20+CODE
10A4 F6 20       ORI  20H
10A6 C3 80 08    JMP  FATERR          FATERR(DEDCOD,ERRFLG)
               ;                            ( A    ,PSW:Z )
               ;                            ( I    , O    )
               ;                      RETURN
               ;NVMDXB(ERRFLG,BLKCTL)
               ;      (BIT   ,NIBSTR)
               ;      ( O    , I    )
               ;      (PSW:Z , B    )
               ;      ( C    , NC   )
               ;
               ;A,PSW DESTROYED
               ;REGISTERS DESTROYED
               ;
               ;DEACTIVATES NVM BLOCK
               ;
               NVMDXB;                ****ENTRY POINT
               ;                      MOVE NVM CONTROL BYTE TO ACCUMULATOR
10A9 78          MOV  A,B             A = BLKCTL
               ;                      FORM BASE VALUE FOR BLOCK
10AA CD 91 11    CALL NVMMAP          NVMMAP(BLKCTL,BASE,BLKTYP)
               ;                             ( A    , HL , A[1] )
               ;                             ( I    , O  , O    )
               ;                      WRITE NUL HEADER TO DEACTIVATE BLOCK
10AD AF          XRA  A               A[1] = NULHDR = 0
10AE C3 61 12    JMP  NVMWN           NVMWN(NULHDR,BASE,ERRFLG)
               ;                           ( A[1] , HL ,PSW:Z )
               ;                           ( I    , I  , O    )
               ;                      RETURN
               ;NVMER(ERRFLG)(NVMCTL,NVMERS,NVMRED,SERFLG)
               ;     (BIT   )(NIBSTR,NIBSTR,NIBSTR,BITSTR)
               ;     ( O    )( I    , O    , I    , I    )
               ;     (PSW:Z )( RAM  , NVM  , NVM  , RAM  )
               ;     ( C    )( NC   , C    , NC   , C    )
```

```
                 ;
                 ;A,PSW DESTROYED
                 ;REGISTERS DESTROYED
                 ;
                 ;ERASE A BLOCK OF NONVOLATILE MEMORY
                 ;
                 NVMER;                  ****ENTRY POINT
                 ;                       GET CONTROL BYTE TO ERASE NEXT BLOCK
10B1 CD 9F 11      CALL NVMNBK           NVMNBK(ERRFLG,OLDCTL,NXTCTL,
                 ;                              (PSW:Z , B    , C    ,
                 ;                              ( 0    , 0    , 0    ,
                 ;
                 ;                              ADRESS,NVMCTL)
                 ;                               HL    , @HL  )
                 ;                               0     , -    )
10B4 C8            RZ                    IF ERRFLG .EQ. FALSE
                 ;                         SET TO CHECK AND ERASE NEXT BLOCK
10B5 79            MOV  A,C                NVMCTL = NXTCTL .OR. HEXF0
10B6 F6 F0         ORI  0F0H
10B8 77            MOV  M,A
                 ;                         FETCH BLOCK LENGTH
10B9 CD DF 11      CALL NVMPRP             NVMPRP(NIBCNT,OFFSET,RAM[I])
                 ;                                ( B    , C    , @C   )
                 ;                                ( 0    , 0    , -    )
10BC C5            PUSH B                  SAVE BC
                 ;                         FETCH BASE ADDRESS OF CURRENT BLOCK
10BD 7E            MOV  A,M                A = NVMCTL
10BE CD 91 11      CALL NVMMAP             NVMMAP(NVMCTL,BASE,BLKTYP)
                 ;                                ( A    , HL , A[1] )
                 ;                                ( I    , 0  , 0    )
10C1 E5            PUSH H                  SAVE HL
                 ;                         FORM NVM READ ADDRESS
10C2 11 00 44      LXI  D,NVMRED           HL = ADDRESS, NVMRED[J=BASE]
10C5 19            DAD  D
10C6 E5            PUSH H                  SAVE HL
                 ;                         INITIALIZE CRC VALUE
10C7 16 FF         MVI  D,0FFH             D = CRCVAL = HEXFF
                 ;                         CHECK BLOCK HEADER
10C9 7E            MOV  A,M                A = BLKHDR[0] = NVMRED[J]
10CA E6 0F         ANI  0FH                IF BLKHDR[0] .EQ. 0
10CC C2 EB 10      JNZ  NVMER4
                 ;                           BLOCK IS INACTIVE AND NOT ERASED
                 ;                           POINT AT START OF BLOCK'S DATA
10CF 23            INX  H                    HL = ADDRESS, NVMRED[J=J+2]
10D0 23            INX  H
                 ;                           CHECK BLOCK CHECKSUM
                 NVMER1;                     LOOP - WITH 1 BREAK
10D1 05            DCR  B                      B = NIBCNT = NIBCNT-1
10D2 FA DF 10      JM   NVMER2                 IF NIBCNT .LT. 0
                 ;                               BREAK
                 ;                             ENDIF
                 ;                             DEVELOP CRC
10D5 7E            MOV  A,M                    A = DATA = NVMRED[J]
10D6 CD C6 0E      CALL CRCNIB                 CRCNIB(DATA,CRCVAL)
                 ;                                    ( A  , D     )
                 ;                                    ( I  , 0     )
                 ;                             POINT AT NEXT DATA
10D9 CD BB 11      CALL NVMNXT                 NVMNXT(ADRESS,NVMRED[J=J+?])
                 ;                                    ( HL   , @HL         )
                 ;                                    ( I/O  , -           )
10DC C3 D1 10      JMP  NVMER1
                 NVMER2;                     ENDLOOP
                 ;                           FETCH CRC FROM NVM
10DF CD 58 10      CALL NVMBYT               NVMBYT(ADRESS,NVMRED[J],NVMCRC)
                 ;                                  ( HL    , @HL      , A    )
                 ;                                  ( I/O   , I        , 0    )
10E2 BA            CMP  D                    IF NVMCRC .NE. CRCVAL
10E3 CA EB 10      JZ   NVMER3
```

```
                     ;                    DECLARE DEAD METER. WEAK NVM
10E6 3E 02             MVI  A,NVMRET      A = NVMRET
10E8 CD 85 10          CALL NVMDED        NVMDED(NVMRET,ERRFLG)
                     ;                           ( A    ,PSW:Z )
                     ;                           ( I    , 0    )
                     NVMER3;             ENDIF
                     NVMER4;            ENDIF
10EB D1                POP  D           DE = ADDRESS, NVMRED[J=BASE]
10EC E1                POP  H           HL = BASE
10ED 01 00 40          LXI  B,NVMERS    HL = ADDRESS, NVMERS[I=BASE]
10F0 09                DAD  B
10F1 F1                POP  PSW         B = NIBCNT = NIBCNT+4
10F2 C6 04             ADI  4
10F4 47                MOV  B,A
10F5 3A 10 74          LDA  SERFLG/2+X  IF SERFLG.DEAD .EQ. TRUE
10F8 B7                ORA  A
10F9 F2 FE 10          JP   NVMER5
10FC AF                XRA  A             PSW:Z = ERRFLG = TRUE
10FD C9                RET
                     NVMER5;            ELSE
10FE CD 47 10          CALL NVM30T        SUPPLY 30 VOLTS TO NVM
                     NVMER6;              LOOP - WITH 2 BREAKS
1101 05                DCR  B               B = NIBCNT = NIBCNT-1
                     ;                      IF NIBCNT .LT. 0
                     ;                        PSW:Z = ERRFLG = FALSE
1102 FA 31 10          JM   NVM30F            REMOVE 30 VOLTS FROM NVM
                     ;                        BREAK
                     ;                      ENDIF
1105 F3                DI                   DISABLE INTERRUPTS
                     ;                      START ERASE FUNCTION
1106 77                MOV  M,A             NVMERS[J] = DUMMY
                     ;                      PAUSE FOR 10 MSEC
1107 C5                PUSH B               SAVE BC
1108 01 64 00          LXI  B,100           BC = LOOPCT = 100
                     NVMER7;                DO UNTIL LOOPCT .EQ. 0
110B CD 19 0B          CALL NPAUSE            NPAUSE(LOOPCT,ZROFLG)
                     ;                               ( BC   ,PSW:Z )
                     ;                               ( I/O  , 0    )
110E C2 0B 11          JNZ  NVMER7
                     ;                      ENDDO
1111 C1                POP  B               RESTORE BC
                     ;                      STOP ERASE FUNCTION
1112 1A                LDAX D               A = GARBAGE = NVMRED[J]
1113 7B                MOV  A,E             A=(ADDRESS,NVMRED[J]).AND.HEX3F
1114 E6 3F             ANI  3FH
1116 CA 1A 11          JZ   NVMER8          IF A .EQ. 0
                     ;                        HEADER[0] NOT JUST ERASED
1119 FB                EI                     ENABLE INTERRUPTS
                     NVMER8;                ENDIF
                     ;                      ADVANCE ERASE ADDRESS
111A CD BB 11          CALL NVMNXT          NVMNXT(ADRESS,NVMERS[I=I+?])
                     ;                             ( HL   , @HL         )
                     ;                             ( I/O  , -           )
                     ;                      READ ERASED NIBBLE
111D 1A                LDAX D               C = DATA = NVMRED[J] .AND. HEXF0
111E F6 F0             ORI  0F0H
1120 4F                MOV  C,A
                     ;                      ADVANCE READ ADDRESS
1121 EB                XCHG
1122 CD BB 11          CALL NVMNXT          NVMNXT(ADRESS,NVMRED[J=J+?])
                     ;                             ( HL   , @HL         )
                     ;                             ( I/O  , -           )
1125 EB                XCHG
                     ;                      CHECK FOR PROPER ERASURE
1126 0C                INR  C               IF DATA+1 .NE. 0
1127 CA 01 11          JZ   NVMER6
                     ;                        BAD ERASURE
```

```
                      ;                           DECLARE DEAD METER. BAD NVM
     112A 3E 01         MVI  A,NVMBAD             A = NVMBAD
     112C C3 85 10      JMP  NVMDED               NVMDED(NVMBAD,ERRFLG)
                      ;                                  ( A    ,PSW:Z )
                      ;                                  ( I    , 0    )
                      ;                           BREAK
                      ;                         ENDIF
                      ;                       ENDLOOP
                      ;                     ENDIF
                      ;                   ENDIF
                      ;                   RETURN
                      ;NVMFND(ERRFLG)(NVMCTL,NVMRED)
                      ;      (BIT   )(NIBSTR,NIBSTR)
                      ;      ( 0    )( I/0  , I    )
                      ;      (PSW:Z )( RAM  , NVM  )
                      ;      ( C    )( C    , NC   )
                      ;
                      ;A,PSW DESTROYED
                      ;REGISTERS DESTROYED
                      ;
                      ;FIND CURRENT BLOCK CORRESPONDING TO METER MODE
                      ;
                      NVMFND;                  ****ENTRY POINT
     112F 11 33 74      LXI  D,NVMCTL/2+X      DE = ADDRESS, NVMCTL[0..1]
     1132 1A            LDAX D                 PSW:CY = OPEN = NVMCTL[0] .LT. 2
     1133 FE 20         CPI  20H
     1135 3E 02         MVI  A,SFTWRE          A = SFTWRE
                      ;                        IF OPEN .EQ. TRUE
                      ;                          LOOKING FOR BLOCK IS INAPPROPRIATE
                      ;                          DECLARE DEAD METER. SOFTWARE ERROR
     1137 DA 85 10      JC   NVMDED              NVMDED(SFTWRE,ERRFLG)
                      ;                                ( A    ,PSW:Z )
                      ;                                ( I    , 0    )
                      ;                        ELSE
                      ;                          SET TO LOCATE ACTIVE SERVICE HEADER
     113A 06 F1         MVI  B,0F1H              B = TEST = HEXF1
                      ;                          SET TO INCREMENT TO BLOCK 0
     113C 1A            LDAX D                   NVMCTL[1] = HEX0F
     113D F6 0F         ORI  0FH
     113F 12            STAX D
                      ;                          THERE ARE 2 SERVICE BLOCKS
     1140 0E 02         MVI  C,2                 C = BLKCTR = 2
                      ;                          DETERMINE METER MODE
     1142 CD 4E 0F      CALL LSTATE              LSTATE(FATMOD,NORMOD,SERMOD,PRVMOD)
                      ;                                (PSW:S ,PSW:Z ,PSW:P ,PSW:C )
                      ;                                ( 0    , 0    , 0    , 0    )
     1145 C2 4E 11      JNZ  NVMFN1              IF NORMOD .EQ. TRUE
                      ;                            SET TO INCREMENT TO BLOCK 2
     1148 1A            LDAX D                     NVMCTL[1] = HEX01
     1149 A0            ANA  B
     114A 12            STAX D
                      ;                            SET TO LOCATE ACTIVE NORMAL HEADER
     114B 05            DCR  B                     B = TEST = HEXF0
                      ;                            THERE ARE 14 NORMAL BLOCKS
     114C 0E 0E         MVI  C,14                  C = BLKCTR = 14
                      NVMFN1;                    ENDIF
                      NVMFN2;                    LOOP - WITH 2 BREAKS
                      ;                            INCREMENT BLOCK NUMBER
     114E 1A            LDAX D                     NVMCTL[1] = NVMCTL[1]+1
     114F 3C            INR  A
     1150 F6 F0         ORI  0F0H
     1152 12            STAX D
                      ;                            FETCH CORRESPONDING BASE ADDRESS
     1153 CD 91 11      CALL NVMMAP                NVMMAP(NVMCTL,BASE,BLKTYP)
                      ;                                  ( A     , HL , A[1] )
                      ;                                  ( I     , 0  , 0    )
                      ;                            CONVERT TO READ ADDRESS
     1156 C5            PUSH B                     SAVE BC
```

```
1157 01 00 44   LXI  B,NVMRED          HL = ADDRESS, NVMRED[J=BASE]
115A 09         DAD  B
115B C1         POP  B                 RESTORE BC
115C 0D         DCR  C                 C = BLKCTR = BLKCTR-1
               ;                       PSW:S = DONE = BLKCTR .LT. 0
115D 3E 01      MVI  A,NVMBAD          A = NVMBAD
               ;                       IF DONE .EQ. TRUE
               ;                         DECLARE DEAD METER. BAD NVM
115F FA 85 10   JM   NVMDED              NVMDED(NVMBAD,ERRFLG)
               ;                               ( A    ,PSW:Z )
               ;                               ( I    , O    )
               ;                         BREAK
               ;                       ENDIF
               ;                       FETCH BLOCK HEADER
1162 CD 58 10   CALL NVMBYT            NVMBYT(ADRESS,NVMRED[J],HEADER)
               ;                              ( HL   , @HL      , A     )
               ;                              ( I/O  , I        , O     )
1165 B8         CMP  B                 IF HEADER .EQ. TEST
1166 C2 4E 11   JNZ  NVMFN2
1169 04         INR  B                   PSW:Z = ERRFLG = FALSE
116A C9         RET                      BREAK
               ;                       ENDIF
               ;                     ENDLOOP
               ;                   ENDIF
               ;                   RETURN
               ;NVMLOD()(NORFLG,NVMCTL,MRSTS1)
               ;        (BITSTR,NIBSTR,BITSTR)
               ;        ( O    , O    , O     )
               ;        ( RAM  , RAM  , RAM   )
               ;        ( C    , C    , C     )
               ;
               ;A,PSW DESTROYED
               ;REGISTERS DESTROYED
               ;
               ;INITIALIZATION. LOAD NONVOLATILE MEMORY
               ;
               NVMLOD;                 ****ENTRY POINT
116B 21 26 74   LXI  H,NORFLG/2+X   HL = ADDRESS, NORFLG
               ;                    SENT STATUS AND POSTAGE AFTER POWERUP
116E 7E         MOV  A,M            NORFLG.QUESTS = NORFLG.QUEPOS = TRUE
116F F6 C0      ORI  0C0H
1171 77         MOV  M,A
               ;                    DECLARE THAT NO BLOCK IS OPEN
1172 3E F0      MVI  A,0F0H         NVMCTL = HEXF0
1174 32 33 74   STA  NVMCTL/2+X
               ;                    METER GUARANTEED TO BE IN NORMAL MODE
               ;                    SEARCH FOR NORMAL BLOCK
1177 CD 2F 11   CALL NVMFND         NVMFND(ERRFLG)
               ;                          (PSW:Z )
               ;                          ( O    )
               ;                    IF ERRFLG .EQ. FALSE
117A C4 EE 11   CNZ NVMRD             LOAD NORMAL BLOCK
               ;                    ENDIF
117D 21 24 74   LXI  H,MRSTS1/2+X   HL = ADDRESS, MRSTS1
               ;                    SET TO LOAD SERVICE BLOCK
               ;                    INITIALIZE CHECK DATE STATUS
1180 7E         MOV  A,M            MRSTS1.DATDOR = MRSTS1.SERMOD = TRUE
1181 F6 48      ORI  48H
1183 77         MOV  M,A
1184 E5         PUSH H              SAVE HL
               ;                    SEARCH FOR SERVICE BLOCK
1185 CD 2F 11   CALL NVMFND         NVMFND(ERRFLG)
               ;                          (PSW:Z )
               ;                          ( O    )
               ;                    IF ERRFLG .EQ. FALSE
1188 C4 EE 11   CNZ  NVMRD            LOAD SERVICE BLOCK
               ;                    ENDIF
118B E1         POP  H              RESTORE HL
```

```
                 ;                      RETURN TO NORMAL MODE
                 ;                      DISABLE METER
118C 7E            MOV  A,M             MRSTS1.SERMOD = MRSTS1.ENABLD = FALSE
118D E6 F3         ANI  0F3H
118F 77            MOV  M,A
1190 C9            RET                  RETURN
                 ;NVMMAP(NVMCTL,BASE  ;BLKTYP)
                 ;      (NIBSTR,ADRESS,NIBSTR)
                 ;      ( I    , 0    , 0    )
                 ;      ( A    , HL   , A[1] )
                 ;      ( C    , C    , C    )
                 ;
                 ;PSW DESTROYED
                 ;REGISTERS NOT CHANGED
                 ;
                 ;MAPS BLOCK NUMBER IN L/O NIBBLE OF ACCUMULATOR INTO
                 ;CORRESPONDING NONVOLATILE MEMORY ADDRESS
                 ;
                 NVMMAP;                ****ENTRY POINT
1191 0F            RRC                  A = NVMCTL[1]*HEX10+NVMCTL[0]
1192 0F            RRC
1193 0F            RRC
1194 0F            RRC
1195 F5            PUSH PSW             SAVE A,PSW
1196 E6 F0         ANI  0F0H            HL = BASE = NVMCTL[1]*HEX40
1198 6F            MOV  L,A
1199 26 00         MVI  H,0
119B 29            DAD  H
119C 29            DAD  H
119D F1            POP  PSW             RESTORE A,PSW
                 ;                      A[1] = BLKTYP = NVMCTL[0]
119E C9            RET                  RETURN
                 ;NVMNBK(ERRFLG,OLDCTL,NXTCTL,ADRESS,NVMCTL)(NVMCTL)
                 ;      (BIT   ,NIBSTR,NIBSTR,ADRESS,NIBSTR)(NIBSTR)
                 ;      ( 0    , 0    , 0    , 0    , -    )( I    )
                 ;      (PSW:Z , B    , C    , HL   , @HL  )( RAM  )
                 ;      ( C    , C    , C    , C    , -    )( NC   )
                 ;
                 ;A,PSW DESTROYED
                 ;REGISTERS DESTROYED
                 ;
                 ;DEVELOP CONTROL BYTE VALUES FOR DEACTIVATING BLOCK OF
                 ;CURRENT TYPE, AND FOR OPENING NEXT BLOCK.
                 ;
                 NVMNBK;                ****ENTRY POINT
                 ;                      SET NVMCTL TO INDICATE ACTIVE CLOSED
                 ;                      BLOCK CORRESPONDING TO CURRENT STATUS
119F CD 2F 11      CALL NVMFND          NVMFND(ERRFLG)
                 ;                            (PSW:Z )
                 ;                            ( 0    )
11A2 C8            RZ                   IF ERRFLG .EQ. FALSE
                 ;                        NVMCTL[0] = HEXF, NO FILES OPEN
                 ;                        NVMCTL[1] = ACTIVE BLOCK NUMBER
11A3 21 33 74      LXI  H,NVMCTL/2+X      HL = ADDRESS, NVMCTL
11A6 46            MOV  B,M               B = OLDCTL = NVMCTL
11A7 0E 02         MVI  C,2               C = NVMCTL = HEX02
11A9 78            MOV  A,B               A = OLDCTL+1
11AA 3C            INR  A
11AB CA B9 11      JZ   NVMNB1            IF OLDCTL+1 .EQ. 0
                 ; >>JUMP AHEAD<<           OLD BLOCK WAS 15
                 ;                          NEWCTL SET FOR BLOCK 2, NORMAL
                 ;                          PSW:Z = ERRFLG = FALSE
                 ;                        ELSE
                 ;                          OLD BLOCK WAS NOT 15
11AE E6 0F         ANI  0FH                 A=OLDBLK+1=(OLDCTL+1).AND.HEX0F
11B0 4F            MOV  C,A                 C = OLDBLK+1
11B1 DE 03         SBI  3                   A = OLDBLK-2
11B3 F2 B9 11      JP   NVMNB1              IF OLDBLK-2 .GE. 0
```

```
               ; >>JUMP AHEAD<<          OLD BLOCK WAS 2 TO 14
               ;                         NEWCTL SET FOR BLK 3 TO 15, NORM
               ;                         PSW:Z = ERRFLG = FALSE
               ;                       ELSE
               ;                         OLD BLOCK WAS 0 OR 1
               ;                         SET NEWCTL FOR BLK 0 OR 1, SERVC
11B6 EE EF       XRI  0EFH               C=NEWCTL=(OLDBLK-2).XOR.HEXEF
11B8 4F          MOV  C,A
               ;                       ENDIF
               ;                     ENDIF
               NVMNB1;               >>TARGET OF JUMP AHEAD<<
11B9 B1          ORA  C              PSW:Z = ERRFLG = FALSE
11BA C9          RET
               ;                   ENDIF
               ;                   RETURN
               ;NVMNXT(ADRESS)
               ;      (ADRESS)
               ;      ( I/O  )
               ;      ( HL   )
               ;      ( C    )
               ;
               ;A,PSW DESTROYED
               ;REGISTERS NOT CHANGED
               ;
               ;ADVANCE ADDRESS TO NEXT HIGHER LOCATION SKIPPING XXXF
               ;
               NVMNXT;             ****ENTRY POINT
11BB 23          INX  H            HL = ADRESS = ADRESS+1
11BC 7D          MOV  A,L          IF ADRESS[3] .EQ. HEXOF
11BD E6 0F       ANI  0FH
11BF FE 0F       CPI  0FH
11C1 C0          RNZ
11C2 23          INX  H              HL = ADRESS = ADRESS+1
               ;                   ENDIF
11C3 C9          RET               RETURN
               ;NVMOPN(ERRFLG)(NVMCTL,SERFLG)
               ;      (BIT   )(NIBSTR,BITSTR)
               ;      ( 0    )( 0    , I    )
               ;      (PSW:Z )( RAM  , RAM  )
               ;      ( C    )( C    , C    )
               ;
               ;A,PSW DESTROYED
               ;REGISTERS DESTROYED
               ;
               ;OPENS NVM BLOCK
               ;
               NVMOPN;             ****ENTRY POINT
11C4 3A 10 74    LDA  SERFLG/2+X   IF SERFLG.DEAD .EQ. TRUE
11C7 F6 7F       ORI  7FH            PSW:Z = ERRFLG = TRUE
11C9 2F          CMA
               ;                   ELSE
               ;                     PSW:Z = ERRFLG = FALSE
               ;                   ENDIF
11CA C8          RZ                IF ERRFLG .EQ. FALSE
               ;                     ERASE NEXT BLOCK
11CB CD B1 10    CALL NVMER          NVMER(ERRFLG)
               ;                          (PSW:Z )
               ;                          ( 0    )
11CE C8          RZ                  IF ERRFLG .EQ. FALSE
11CF CD 47 10    CALL NVM30T           TURN ON -30V TO NVM
               ;                       DEVELOP CONTROL BYTES FOR OPENING
               ;                       NEXT BLOCK AND DEACTIVATING
               ;                       OLD BLOCK
11D2 CD 9F 11    CALL NVMNBK           NVMNBK(ERRFLG,OLDCTL,NXTCTL,
               ;                             (PSW:Z , B    , C    ,
               ;                             ( 0    , 0    , 0    ,
               ;
               ;                              ADRESS,NVMCTL)
```

```
                     ;                                  HL    , @HL   )
                     ;                                  D     , -     )
11D5 F3               DI                     DISABLE INTERRUPTS
                     ;                       OPEN NEXT BLOCK
11D6 71               MOV  M,C               NVMCTL = NXTCTL
                     ;                       DEACTIVATE OLD BLOCK
11D7 CD A9 10         CALL NVMDXB            NVMDXB(ERRFLG,OLDCTL)
                     ;                             (PSW:Z , B     )
                     ;                             ( 0    , I     )
11DA FB               EI                     ENABLE INTERRUPTS
11DB CD 31 10         CALL NVM30F            TURN OFF -30V TO NVM
                     ;                     ENDIF
                     ;                   ENDIF
11DE C9               RET                RETURN
                     ;NVMPRP(NIBCNT,OFFSET,RAM[I])(NVMCTL)
                     ;      (BYTE  ,OFFSET,NIBSTR)(NIBSTR)
                     ;      ( 0    , 0    , -    )( I     )
                     ;      ( B    , C    , @C   )( RAM   )
                     ;      ( C    , C    , NC   )( NC    )
                     ;
                     ;A,PSW DESTROYED
                     ;REGISTERS NOT CHANGED
                     ;
                     ;RETURN RAM PARAMETERS CORRESPONDING TO NVM BLOCK TYPE
                     ;
                     NVMPRP;             ****ENTRY POINT
11DF 06 22            MVI  B,NORSIZ      B = NIBCNT = NORSIZ
11E1 0E 28            MVI  C,NORSTR      C = OFFSET = NORSTR
11E3 3A 33 74         LDA  NVMCTL/2+X    IF NVMCTL[1] .LT. 2
11E6 E6 0E            ANI  0EH
11E8 C0               RNZ
11E9 06 28            MVI  B,SRVSIZ        B = NIBCNT = SRVSIZ
11EB 0E 00            MVI  C,SRVSTR        C = OFFSET = SRVSTR
                     ;                   ENDIF
11ED C9               RET                RETURN
                     ;NVMRD()(NVMCTL,RAM[I],NVMRED)
                     ;        (NIBSTR,NIBSTR,NIBSTR)
                     ;        ( I    , 0    , I    )
                     ;        ( RAM  , RAM  , NVM  )
                     ;        ( NC   , C    , NC   )
                     ;
                     ;A,PSW DESTROYED
                     ;REGISTERS DESTROYED
                     ;
                     ;READ NONVOLATILE MEMORY INTO RAM
                     ;
                     NVMRD;              ****ENTRY POINT
                     ;                   GET RAM DESTINATION PARAMETERS
11EE CD DF 11         CALL NVMPRP        NVMPRP(NIBCNT,OFFSET,RAM[I])
                     ;                         ( B    , C    , @C   )
                     ;                         ( 0    , 0    , -    )
                     ;                   DEFINE NVM SOURCE BASE
11F1 3A 33 74         LDA  NVMCTL/2+X    A = NVMCTL
11F4 CD 91 11         CALL NVMMAP        NVMMAP(NMVCTL,BASE,BLKTYP)
                     ;                         ( A    , HL , A[1] )
                     ;                         ( I    , 0  , 0    )
                     ;                   FORM NVM READ ADDRESS OF SOURCE DATA
11F7 11 02 44         LXI  D,NVMRED+2    HL = ADDRESS, NVMRED[]=BASE+2]
11FA 19               DAD  D
                     ;                   INITIALIZE CRC VALUE
11FB 16 FF            MVI  D,0FFH        D = CRCVAL = HEXFF
                     NVMRD1;             LOOP - WITH 1 BREAK
11FD 05               DCR  B               B = NIBCNT = NIBCNT-1
11FE FA 0F 12         JM   NVMRD2          IF NIBCNT .LT. 0
                     ;                       BREAK
                     ;                     ENDIF
                     ;                     COPY NVM TO RAM
1201 7E               MOV  A,M             A = NVMRED[]]
```

```
1202 CD EE 0F   CALL PUTNIB        PUTNIB(RAM[I],NVMRED[J])
               ;                         ( @C   , A       )
               ;                         ( O    , I       )
               ;                   UPDATE CRC
1205 CD C6 0E   CALL CRCNIB        CRCNIB(NVMRED[J],CRCVAL)
               ;                         ( A       , D    )
               ;                         ( I       , I/O  )
1208 0C         INR  C             C = OFFSET, RAM[I=I+1]
               ;                   CALCULATE NEXT NVM SOURCE ADDRESS
1209 CD BB 11   CALL NVMNXT        NVMNXT(ADRESS,NVMRED[J=J+?])
               ;                         ( HL   , @HL          )
               ;                         ( I/O  , -            )
120C C3 FD 11   JMP  NVMRD1
               NVMRD2;           ENDDO
               ;                 CHECK CRC VALUES
120F CD 58 10   CALL NVMBYT      NVMBYT(ADRESS,NVMRED[J],NVMCRC)
               ;                       ( HL   , @HL     , A    )
               ;                       ( I/O  , I       , O    )
1212 BA         CMP  D           IF NVMCRC .NE. CRCVAL
1213 C8         RZ
               ;                   DECLARE DEAD METER. BAD CRC
1214 3E 00      MVI  A,BADCRC      A = BADCRC
1216 C3 85 10   JMP  NVMDED        NVMDED(BADCRC,ERRFLG)
               ;                         ( A    ,PSW:Z )
               ;                         ( I    , O    )
               ;                 ENDIF
               ;                 RETURN
               ;NVMSTO(ERRFLG)(MRSTS1,MRSTS2,NVMCTL)
               ;      ( BIT  )(BITSTR,BITSTR,NIBSTR)
               ;      (  O   )( I/O  , I/O  , O    )
               ;      (PSW:Z )( RAM  , RAM  , RAM  )
               ;      (  C   )( C    , C    , C    )
               ;
               ;A,PSW DESTROYED
               ;REGISTERS DESTROYED
               ;
               ;STARTING WITH NO NVM BLOCKS OPEN:
               ;WRITE NEW ACTIVE NVM BLOCK NOT CORRESPONDING TO CURRENT
               ;METER MODE.
               ;OPEN AN ERASED BLOCK CORRESPONDING TO CURRENT METER MODE.
               ;
               NVMSTO;           ****ENTRY POINT
1219 CD 4E 0F   CALL LSTATE      LSTATE(FATMOD,NORMOD,SERMOD,PRVMOD)
               ;                       (PSW:S ,PSW:Z ,PSW:P ,PSW:C )
               ;                       ( O    , O    , O    , O    )
121C F2 21 12   JP   NVMST1      IF FATMOD .EQ. TRUE
121F AF         XRA  A             ERRFLG = PSW:Z = TRUE
1220 C9         RET
               NVMST1;           ELSE
               ;                   ERASE BLOCK FOR UNTOGGLED NORMOD
1221 CD B1 10   CALL NVMER         NVMER(ERRFLG)
               ;                        (PSW:Z )
               ;                        ( O    )
               ;                   IF ERRFLG .EQ. TRUE
1224 CA B6 01   JZ   PWRDN           REINITIALIZE METER
               ;                   ELSE
               ;                     SET TO TOGGLE NORMOD INDIRECTLY BY
               ;                     TOGGLING THE SERVICE OR PRIVILEGED
               ;                     MODE FLAGS
1227 21 24 74   LXI  H,MRSTS1/2+X    HL=ADDRESS,MRSTS?=ADDRESS,MRSTS1
122A 1E 08      MVI  E,08H           E.M = E.SERMOD = TRUE
122C EA 32 12   JPE  NVMST2          IF LSTATE(SERMOD) .EQ. FALSE
122F 23         INX  H                 HL=ADDRESS,MRSTS?=ADDRESS,MRSTS2
1230 1E 01      MVI  E,01H             E.M = E.PRVMOD = TRUE
               NVMST2;               ENDIF
               ;                     TOGGLE NORMOD
1232 7B         MOV  A,E             MRSTS?.M = MRSTS?.M .XOR. E.M
1233 AE         XRA  M
```

```
1234 77         MOV  M,A
1235 E5         PUSH H                 SAVE HL
1236 D5         PUSH D                 SAVE DE
               ;                       ERASE BLOCK FOR TOGGLED NORMOD
1237 CD B1 10   CALL NVMER             NVMER(ERRFLG)
               ;                            (PSW:Z )
               ;                            ( 0    )
               ;                       IF ERRFLG .EQ. TRUE
123A CA B6 01   JZ   PWRDN               REINITIALIZE METER
               ;                       ELSE
123D F3         DI                       DISABLE INTERRUPTS
               ;                         SET TO STORE BLK FOR TOG NORMOD
123E CD 9F 11   CALL NVMNBK              NVMNBK(ERRFLG,OLD,NXT,ADR,NVMCTL)
               ;                               (PSW:Z , B , C , HL, @HL  )
               ;                               ( 0    , 0 , 0 , 0 , -    )
               ;                         IF ERRFLG .EQ. TRUE
1241 CA B6 01   JZ   PWRDN                 REINITIALIZE METER
               ;                         ELSE
1244 CD 47 10   CALL NVM30T                TURN ON -30 V TO NVM
1247 E5         PUSH H                     SAVE HL
               ;                           DEACTIVATE BLK FOR TOG NORMOD
1248 CD A9 10   CALL NVMDXB                NVMDXB(ERRFLG,OLD)
               ;                                 (PSW:Z , B )
               ;                                 ( 0    , I )
               ;                           OPEN BLK FOR TOG NORMOD
124B E1         POP  H                     RESTORE HL
124C 71         MOV  M,C                   NVMCTL = NXT
               ;                           STORE BLK FOR TOGLED NORMOD
124D CD 9E 12   CALL NVMWR                 NVMWR(ERRFLG)
               ;                                (PSW:Z )
               ;                                ( 0    )
               ;                           RETURN TO UNTOGGLED NORMOD
1250 D1         POP  D                     RESTORE DE
1251 E1         POP  H                     RESTORE HL
1252 7B         MOV  A,E                   MRSTS?.M =
1253 AE         XRA  M                            MRSTS?.M .XOR. E.M
1254 77         MOV  M,A
               ;                           GET CONTROL BYTES
1255 CD 9F 11   CALL NVMNBK                NVMNBK(ERRFLG,OLD,NXT,
               ;                                 (PSW:Z , B , C ,
               ;                                 ( 0    , 0 , 0 ,
               ;
               ;                                 ADRESS,NVMCTL)
               ;                                  HL    , @HL  )
               ;                                  0     , -    )
               ;                           OPEN ERASED BLOCK
1258 71         MOV  M,C                   NVMCTL = NXT
1259 CD 47 10   CALL NVM30T                TURN ON -30 V TO NVM
               ;                           DEACTIVATE OLD BLOCK
125C CD A9 10   CALL NVMDXB                NVMDXB(ERRFLG,OLD)
               ;                                 (PSW:Z , B )
               ;                                 ( 0    , I )
125F FB         EI                         ENABLE INTERRUPTS
1260 C9         RET
               ;                         ENDIF
               ;                       ENDIF
               ;                     ENDIF
               ;                   ENDIF
               ;                   RETURN
               ;NVMWN(DATA  ,BASE  ,ERRFLG)(NVMRED,NVMWRT)
               ;     (NIBBLE,ADRESS,BIT   )(NIBSTR,NIBSTR)
               ;     ( I    , I    , 0    )( I    , 0    )
               ;     ( A[1] , HL   ,PSW:Z )( NVM  , NVM  )
               ;     ( C    , NC   , C    )( NC   , C    )
               ;
               ;A,PSW DESTROYED
               ;REGISTERS NOT CHANGED
               ;
```

```
                ;WRITE NIBBLE TO NONVOLATILE MEMORY
                ;
                NVMWN;                  ****ENTRY POINT
1261 C5           PUSH B                SAVE REGISTERS
1262 D5           PUSH D
1263 E5           PUSH H
1264 E5           PUSH H
1265 01 00 48     LXI  B,NVMWRT         DE = ADDRESS, NVMWRT[BASE]
1268 09           DAD  B
1269 EB           XCHG
126A E1           POP  H                HL = ADDRESS, NVMRED[BASE]
126B 01 00 44     LXI  B,NVMRED
126E 09           DAD  B
126F F5           PUSH PSW              SAVE A,PSW
                ;                       START WRITING DATA
1270 12           STAX D                NVMWRT[BASE] = DATA
                ;                       DELAY FOR 1 MSEC
1271 01 0A 00     LXI  B,10             BC = LOOPCT = 10
                NVMWN1;                 DO UNTIL LOOPCT .EQ. 0
1274 CD 19 0B     CALL NPAUSE             NPAUSE(LOOPCT,ZROFLG)
                ;                               ( BC   ,PSW:Z )
                ;                               ( I/O  , O    )
1277 C2 74 12     JNZ NVMWN1
                ;                       ENDDO
                ;                       STOP WRITE FUNCTION
127A 7E           MOV  A,M              A = GARBAGE = NVMRED[BASE]
127B C1           POP  B                B = DATA
                ;                       C = GARBAGE
127C 7E           MOV  A,M              A = SAVDAT = NVMRED[BASE]
127D 90           SUB  B                A = TEST = (SAVDAT-DATA) .AND. HEXOF
127E E6 0F        ANI  0FH
1280 C2 87 12     JNZ  NVMWN2            IF TEST .EQ. 0
                ;                         SAVDAT .EQ. DATA
1283 3C           INR  A                  PSW:Z = ERRFLG = FALSE
1284 C3 9A 12     JMP NVMWN4
                NVMWN2;                  ELSE
                ;                         SAVDAT .NE. DATA
1287 01 9A 12     LXI  B,NVMWN3           SET TO RETURN TO ENDIF
128A C5           PUSH B
128B 01 42 B9     LXI  B,-(NVMRED+KILCOD)
                ;                         BC = -(ADDRESS, NVMRED[KILCOD])
128E 09           DAD  B                  HL = BASE-KILCOD
128F 7C           MOV  A,H                PSW:Z = (BASE-KILCOD).EQ.0
1290 B5           ORA  L
1291 3E 01        MVI  A,NVMBAD           A = NVMBAD
1293 47           MOV  B,A                B = NVMBAD
                ;                         IF (BASE-KILCOD).EQ.0
                ;                           DECLARE DEAD METER. BAD NVM
                ;                           DO NOT WRITE NVMBAD INTO NVM
1294 CA 99 10     JZ   NVMDE1             NVMDE1(NVMBAD,ERRFLG)
                ;                                ( B    ,PSW:Z )
                ;                                ( I    , O    )
                ;                         ELSE
                ;                           DECLARE DEAD METER. BAD NVM
                ;                           WRITE NVMBAD INTO NVM
1297 C2 85 10     JNZ  NVMDED             NVMDED(NVMBAD,ERRFLG)
                ;                                ( A    ,PSW:Z )
                ;                                ( I    , O    )
                NVMWN3;                   ENDIF
                NVMWN4;                  ENDIF
129A E1           POP  H                 RESTORE REGISTERS
129B D1           POP  D
129C C1           POP  B
129D C9           RET
                ;NVMWR(ERRFLG)(NVMCTL,RAM[I],SERFLG)
                ;     (BIT   )(NIBSTR,NIBSTR,BITSTR)
                ;     ( O    )( I/O  , I    , I    )
                ;     (PSW:Z )( RAM  , RAM  , RAM  )
```

```
                ;     ( C    )( C     , NC    , NC    )
                ;
                ;A,PSW DESTROYED
                ;REGISTERS DESTROYED
                ;
                ;WRITE BLOCK FROM RAM TO NONVOLATILE MEMORY
                ;
                NVMWR;                  ****ENTRY POINT
                ;                       FETCH RAM SOURCE PARAMETERS
129E CD DF 11     CALL NVMPRP           NVMPRP(NIBCNT,OFFSET,RAM[I])
                ;                              ( B     , C     , @C    )
                ;                              ( 0     , 0     , -     )
12A1 79           MOV  A,C              C = NIBCNT
12A2 48           MOV  C,B
12A3 47           MOV  B,A              B = OFFSET, RAM[I]
                ;                       INITIALIZE CRC VALUE
12A4 16 FF        MVI  D,0FFH           D = CRCVAL = HEXFF
12A6 3A 33 74     LDA NVMCTL/2+X        A = NVMCTL
12A9 FE 20        CPI  20H              IF NVMCTL[0] .LT. 2
12AB D2 E6 12     JNC  NVMWR3
12AE CD 47 10     CALL NVM30T             TURN ON -30 V TO NVM
                ;                         FETCH NVM DESTINATION BASE
12B1 CD 91 11     CALL NVMMAP             NVMMAP(NVMCTL,BASE,BLKTYP)
                ;                                ( A     , HL , A[1] )
                ;                                ( I     , 0  , 0    )
                ;                         STORE BLOCK TYPE IN NVM HEADER
12B4 23           INX  H                  HL = BASE +1
12B5 CD 61 12     CALL NVMWN              NVMWN(BLKTYP,BASE+1,ERRFLG)
                ;                              ( A[1] , HL    ,PSW:Z )
                ;                              ( I    , I     , 0    )
                ;                         POINT AT START OF DATA IN NVM
12B8 23           INX  H                  HL = BASE+2
                NVMWR1;                   LOOP - WITH 1 BREAK
12B9 0D           DCR  C                    C = NIBCNT = NIBCNT-1
12BA FA CD 12     JM   NVMWR2               IF NIBCNT .LT. 0
                ;                             BREAK
                ;                           ENDIF
                ;                           FETCH DATA FROM RAM
12BD CD 35 0F     CALL GETNIB               GETNIB(DATA ,ZROFLG,RAM[I])
                ;                                  ( A[1],PSW:Z , @B    )
                ;                                  ( 0    , 0    , I     )
                ;                           UPDATE CRC VALUE
12C0 CD C6 0E     CALL CRCNIB               CRCNIB(DATA ,CRCVAL)
                ;                                  ( A[1], D     )
                ;                                  ( I    , 0     )
                ;                           WRITE DATA TO NVM
12C3 CD 61 12     CALL NVMWN                NVMWN(DATA ,BASE+?,ERRFLG)
                ;                                 ( A[1], HL    ,PSW:Z )
                ;                                 ( I    , I     , 0    )
                ;                           POINT AT NEXT DATA LOCATIONS
12C6 04           INR  B                    B = OFFSET, RAM[I=I+1]
12C7 CD BB 11     CALL NVMNXT               NVMNXT(ADRESS,BASE+?)
                ;                                  ( HL    , @HL  )
                ;                                  ( I/O   , -    )
12CA C3 B9 12     JMP NVMWR1
                NVMWR2;                   ENDDO
                ;                         STORE CRC IN NVM
12CD 7A           MOV  A,D                A[1] = CRCVAL[0]
12CE 0F           RRC
12CF 0F           RRC
12D0 0F           RRC
12D1 0F           RRC
12D2 CD 61 12     CALL NVMWN              NVMWN(CRCVAL[0],BASE+?,ERRFLG)
                ;                              ( A[1]      , HL    ,PSW:Z )
                ;                              ( I         , I     , 0    )
12D5 CD BB 11     CALL NVMNXT             NVMNXT(ADRESS,BASE+?)
                ;                                ( HL    , @HL  )
                ;                                ( I/O   , -    )
```

```
12D8 7A        MOV  A,D          A[1] = CRCVAL[1]
12D9 CD 61 12  CALL NVMWN        NVMWN(CRCVAL[1],BASE+?,ERRFLG)
              ;                       ( A[1]    , HL   ,PSW:Z )
              ;                       ( I       , I    , O    )
              ;                  INDICATE BLOCK NOT OPEN
12DC 21 33 74  LXI  H,NVMCTL/2+X HL = ADDRESS, NVMCTL
12DF 3E F0     MVI  A,0F0H       NVMCTL[0] = HEX0F
12E1 B6        ORA  M
12E2 77        MOV  M,A
12E3 CD 31 10  CALL NVM30F       TURN OFF -30V TO NVM
              NVMWR3;          ENDIF
12E6 3A 10 74  LDA  SERFLG/2+X  IF SERFLG.DEAD .EQ. TRUE
12E9 E6 80     ANI  80H           PSW:Z = ERRFLG = TRUE
12EB EE 80     XRI  80H
              ;                ELSE
              ;                  PSW:Z = ERRFLG = FALSE
              ;                ENDIF
12ED C9        RET             RETURN
              ;ACCODE(ERRFLG)(WORK1 ,DSCREG,RSTCNT,SERFLG)
              ;       (BIT   )(NIBCTR,NIBSTR,NIBBLE,BITSTR)
              ;       ( O    )( O    , I    , I    , I    )
              ;       (PSW:Z )( RAM  , RAM  , RAM  , RAM  )
              ;       ( C    )( C    , NC   , NC   , NC   )
              ;
              ;A,PSW DESTROYED
              ;REGISTERS DESTROYED
              ;
              ;BUILD ACCESS CODE MESSAGE IN TRANSMIT BUFFER
              ;
              ACCODE;          ***ENTRY POINT
              ;                CLEAR WORK AREA
12EE 3E C0     MVI  A,WORK1    A = OFFSET, WORK1
12F0 CD 85 0E  CALL CLRBLK     CLRBLK(WORK1)
              ;                      ( @A  )
              ;                      ( O   )
              ;                PUT 10 DGT CONTROL SUM IN WORK1[0..9]
12F3 CD 3A 06  CALL CONSUM     CONSUM(ERRFLG)
              ;                      (PSW:Z )
              ;                      ( O    )
              ;                IF ERRFLG .EQ. TRUE
              ;                  PROCESS ERROR
12F6 CA A1 0B  JZ   PROERR       PROERR(ERRFLG)
              ;                        (PSW:Z )
              ;                        ( O    )
              ;                ELSE
              ;                  MOVE CONTROL SUM TO WORK1[6..15]
12F9 01 C6 C0  LXI  B,(WORK1+0)*100H+(WORK1+6)
              ;                  B = OFFSET, WORK1[0]
              ;                  C = OFFSET, WORK1[6]
12FC 3E 0A     MVI  A,10         A = NIBCNT = 10
12FE CD B3 0F  CALL MVLNIB       MVLNIB(WORK1[6],WORK1[0],NIBCNT,
              ;                         ( @C      , @B      , A     ,
              ;                         ( O       , I       , I     ,
              ;
              ;                         NONBCD,ZROFLG)
              ;                         PSW:S ,PSW:Z )
              ;                          O    , O    )
              ;                  PUT DESC REGISTER IN WORK1[0..4]
1301 01 C0 2F  LXI  B,DSCREG*100H+WORK1
              ;                  B = OFFSET, DSCREG[0]
              ;                  C = OFFSET, WORK1[0]
1304 3E 05     MVI  A,5          A = NIBCNT = 5
1306 CD B3 0F  CALL MVLNIB       MVLNIB(WORK1[0],DSCREG[0],NIBCNT,
              ;                         ( @C      , @B      , A     ,
              ;                         ( O       , I       , I     ,
              ;
              ;                         NONBCD,ZROFLG)
              ;                         PSW:S ,PSW:Z )
```

```
                       ;                          0    , 0    )
                       ;                          PARSE RSTCNT INTO RESET NUMBER AND
                       ;                          RESET BIT
1309 01 C5 12    LXI  B,RSTCNT*100H+(WORK1+5)
                       ;                          B = OFFSET, RSTCNT
                       ;                          C = OFFSET, WORK1[5]
130C CD 35 0F    CALL GETNIB                      GETNIB(RSTCNT,ZROFLG,RSTCNT)
                       ;                                ( A    ,PSW:Z , @B    )
                       ;                                ( 0    , 0    , I     )
130F 0F          RRC
1310 57          MOV  D,A                         D[1] = RSTCNT/2
                       ;                          D[0].0 = RSTBIT = RSTCNT .MOD. 2
1311 07          RLC                              A = RSTBIT
1312 E6 01       ANI 01H
                       ;                          PUT RSTBIT INTO WORK1[5]
1314 CD EE 0F    CALL PUTNIB                      PUTNIB(WORK1[5],RSTBIT)
                       ;                                ( @C     , A    )
                       ;                                ( 0      , I    )
                       ;                          EXTRACT RESET NUMBER FROM RIGHTMOST
                       ;                          DIGIT OF WORK1[0..4] WHICH WILL NOT
                       ;                          BE TRANSFORMED INTO A NON BCD DIGIT.
1317 0D          DCR  C                           C = OFFSET, WORK1[I=4]
1318 41          MOV  B,C                         B = OFFSET, WORK1[I=4]
1319 1E 05       MVI  E,5                         E = NIBCNT = 5
                 ACCOD1;                          DO UNTIL NIBCNT .EQ. 0; WITH 1 BREAK
131B CD 35 0F    CALL GETNIB                        GETNIB(BCDDGT,ZROFLG,WORK1[I])
                       ;                                  ( A    ,PSW:Z , @B     )
                       ;                                  ( 0    , 0    , I      )
131E FE 08       CPI  8                             IF BCDDGT .LT. 8
1320 D2 2A 13    JNC  ACCOD2
1323 AA          XRA  D                               BCDDGT = BCDDGT .XOR. RSTNO
1324 CD EE 0F    CALL PUTNIB                          PUTNIB(WORK1[I],BCDDGT)
                       ;                                    ( @C     , A    )
                       ;                                    ( 0      , I    )
1327 C3 30 13    JMP  ACCOD3                          BREAK
                 ACCOD2;                            ENDIF
132A 05          DCR  B                             B = OFFSET, WORK1[I=I-1]
132B 0D          DCR  C                             C = OFFSET, WORK1[I=I-1]
132C 1D          DCR  E                             E = NIBCNT = NIBCNT-1
132D C2 1B 13    JNZ  ACCOD1
                 ACCOD3;                          ENDDO
                       ;                          CALCULATE CRC OF WORK AREA
1330 01 C0 10    LXI  B,16*100H+WORK1
                       ;                          B = NIBCNT = 16
                       ;                          C = OFFSET, WORK1[0]
1333 CD B1 0E    CALL CRC                         CRC(WORK1[0],NIBCNT,CRCVAL)
                       ;                             ( @C     , B    , D     )
                       ;                             ( I      , I    , 0     )
1336 3A 10 74    LDA  SERFLG/2+X                  PSW:Z=NVMOK=SERFLG.WEKNVM .EQ. FALSE
1339 E6 20       ANI  20H
133B 7A          MOV  A,D                         A = CRCVAL
133C CA 40 13    JZ   ACCOD4                      IF NVMOK .EQ. FALSE
133F 2F          CMA                                A = CRCVAL = .NOT. CRCVAL
                 ACCOD4;                          ENDIF
                       ;                          COMPLETE ACCESS CODE IN WORK[0..7]
                       ;                          AS FOLLOWS:
                       ;                          WORK1[4].0..3 = WORK1[4].0..3
                       ;                          WORK1[5].1..2 = WORK1[5].1..2 .OR.
                       ;                                          CRCVAL.0..1
                       ;                          WORK1[6].0 = 0
                       ;                          WORK1[6].1..3 = CRCVAL.2..4
                       ;                          WORK1[7].0 = 0
                       ;                          WORK1[7].1..3 = CRCVAL.5..7
1340 57          MOV  D,A                         D = CRCVAL
1341 E6 F8       ANI  0F8H                        D = FCRC2
1343 82          ADD  D
1344 57          MOV  D,A
1345 17          RAL                              A = FCRC1
```

```
1346 17          RAL
1347 17          RAL
1348 E6 06       ANI  6
134A 21 62 74    LXI  H,(WORK1+4)/2+X HL = ADDRESS, WORK1[4..5]
134D B6          ORA  M                WORK1[4..5] = WORK1[4..5] .OR. FCRC1
134E 77          MOV  M,A
134F 7A          MOV  A,D              A = FCRC3 = FCRC2 .AND. HEX77
1350 E6 77       ANI  77H
1352 23          INX  H                HL = ADDRESS, WORK1[6..7]
1353 77          MOV  M,A              WORK1[6..7] = FCRC3
                ;                      BUILD ACCESS CODE MSG IN XMIT BUFFER
1354 11 5A 13    LXI  D,ACCOD5         DE = ADDRESS, ACCOD5
1357 C3 5B 0D    JMP  VALREQ           VALREQ(WORK1 ,ACCFMT,HACODE,ERRFLG)
                ;                            (@@DE+0,@DE+1 ,@DE+2 ,PSW:Z )
                ;                            ( I     , I     , I     , O     )
                ;                    ENDIF
                ;                    RETURN
                ACCOD5;              ARGUEMENTS FOR VALREQ
135A C0 8F 90    DB   WORK1,ACCFMT,HACODE
                ;BINOCT(BINARY,OCTAL ,DIGCNT)
                ;      (BITSTR,NIBSTR,BYTE   )
                ;      ( I     , O     , I     )
                ;      ( @H    , @D    , B     )
                ;      ( NC    , C     , C     )
                ;
                ;A,PSW DESTROYED
                ;REGISTERS DESTROYED
                ;
                ;INSERT BITS FROM BIT STRING 3 AT A TIME INTO A PREVIOUSLY
                ;CLEARED NIBBLE STRING.
                ;DIGCNT ASSUMED .NE. 0.
                ;
                BINOCT;              ****ENTRY POINT
135D 78          MOV  A,B            E = DBIT = DIGCNT*4-1
135E 07          RLC
135F 07          RLC
1360 3D          DCR  A
1361 5F          MOV  E,A
1362 90          SUB  B              L = SBIT = DBIT-DIGCNT
1363 6F          MOV  L,A
                BINOC1;              DO UNTIL DBIT .LT. 0
                ;                      SET TO MOVE 3 BITS INTO OCTAL NIBBLE
1364 0E 03       MVI  C,3              C = BITCNT = 3
                BINOC2;                DO UNTIL BITCNT .EQ. 0
                ;                        MOVE 3 L/O BITS INTO NIBBLE
1366 CD 68 0F    CALL MOVBIT             MOVBIT(BINARY,SBIT,OCTAL,DBIT,ZRO)
                ;                              ( @H    , L   , @D   , E   ,P:Z)
                ;                              ( I     , I   , O    , I   , O )
1369 2D          DCR  L                  L = SBIT = SBIT-1
136A 1D          DCR  E                  E = DBIT = DBIT-1
136B 0D          DCR  C                  C = BITCNT = BITCNT-1
136C C2 66 13    JNZ  BINOC2
                ;                      ENDDO
                ;                      SKIP OVER H/O BIT IN NIBBLE
136F 1D          DCR  E                E = DBIT = DBIT-1
1370 F2 64 13    JP   BINOC1
                ;                    ENDDO
1373 C9          RET                 RETURN
                ;VRCDR(ERRFLG)(DSCREG,DSCCRC)
                ;     (BIT    )(NIBSTR,BYTE   )
                ;     ( O     )( O     , O     )
                ;     (PSW:Z  )( RAM   , RAM   )
                ;     ( C     )( C     , C     )
                ;
                ;A,PSW DESTROYED
                ;REGISTERS DESTROYED
                ;
                ;CLEAR VARIABLE RMRS DESCENDING REGISTER
```

```
                        ;
                        VRCDR;                      ****ENTRY POINT
                        ;                           PERFORM RULE CHECKING AND REFORMATTING
1374 CD 03 14           CALL VRPREP                 VRPREP(ERRFLG)
                        ;                                 (PSW:Z )
                        ;                                 ( 0    )
1377 C8                 RZ                          IF ERRFLG .EQ. FALSE
                        ;                             CLEAR DESCENDING REGISTER
1378 AF                 XRA  A                        A = NIBVAL = 0
1379 06 07              MVI  B,DSCSIZ                 B = DSCSIZ
137B 0E 2F              MVI  C,DSCREG                 C = OFFSET, DSCREG
137D CD 24 0F           CALL FILNIB                   FILNIB(DSCREG,NIBVAL,DSCSIZ)
                        ;                                    ( @C    , A     , B     )
                        ;                                    ( 0     , I     , I     )
                        ;                             UPDATE DESCENDING REGISTER CRC
1380 CD B1 0E           CALL CRC                      CRC(DSCREG,DSCSIZ,CRCVAL)
                        ;                                ( @C    , B     , D     )
                        ;                                ( I     , I     , 0     )
1383 7A                 MOV  A,D                      DSCCRC = CRCVAL
1384 32 13 74           STA  DSCCRC/2+X
                        ;                             CHECK METER STATUS
1387 CD 4E 0F           CALL LSTATE                   LSTATE(FATMOD,NORMOD,SERMOD,PRVMOD)
                        ;                                    (PSW:S ,PSW:Z ,PSW:P ,PSW:C )
                        ;                                    ( 0    , 0    , 0    , 0    )
                        ;                             IF FATMOD .EQ. FALSE
                        ;                               EXECUTE RESET
138A F2 03 14           JP   VRXEQ                      VRXEQ(ERRFLG)
                        ;                                    (PSW:Z )
                        ;                                    ( 0    )
                        ;                             ELSE
                        ;                               DECLARE DEAD METER. FATAL RESET
138D 3E 03              MVI  A,FATRST                   A = FATRST
138F C3 85 10           JMP  NVMDED                     NVMDED(FATRST,ERRFLG)
                        ;                                     ( A     ,PSW:Z )
                        ;                                     ( I     , 0    )
                        ;                             ENDIF
                        ;                           ENDIF
                        ;                           RETURN
                        ;VRCLR(ERRFLG)(AMTBUF)
                        ;     (BIT   )(NIBSTR)
                        ;     ( 0    )( I     )
                        ;     (PSW:Z )( RAM   )
                        ;     ( C    )( NC    )
                        ;
                        ;A,PSW DESTROYED
                        ;REGISTERS DESTROYED
                        ;
                        ;SELECT VARIABLE RMRS CLEAR REGISTER FUNCTION
                        ;
                        VRCLR;                      ****ENTRY POINT
                        ;                           SELECT FUNCTION VIA AMOUNT FORMAT
1392 21 70 74           LXI  H,AMTBUF/2+X           HL = ADDRESS, AMTBUF[0..1]
1395 7E                 MOV  A,M                    A = AMTBUF[0..1]
                        ;                           CASE (AMTBUF[0..1])
1396 FE 1F              CPI  1FH                      **1F: CLEAR RESET ERROR COUNTER
1398 CA A3 13           JZ   VRCREC                         VRCREC(ERRFLG,ADRESS,AMTBUF)
                        ;                                          (PSW:Z , HL    , @HL   )
                        ;                                          ( 0    , I     , -     )
139B FE 22              CPI  22H                      **22: CLEAR DESCENDING REGISTER
139D CA 74 13           JZ   VRCDR                          VRCDR(ERRFLG)
                        ;                                         (PSW:Z )
                        ;                                         ( 0    )
                        ;                             **ELSE:
                        ;                                   PROCESS ERROR
13A0 C3 A1 0B           JMP  PROERR                         PROERR(ERRFLG)
                        ;                                          (PSW:Z )
                        ;                                          ( 0    )
                        ;                           ENDCASE
                        ;                           RETURN
```

```
                ;VRCREC(ERRFLG,ADRESS,AMTBUF)(AMTBUF)
                ;      (BIT   ,ADRESS,NIBSTR)(NIBSTR)
                ;      ( 0    , I    , -    )( 0     )
                ;      (PSW:Z , HL   , @HL  )( RAM   )
                ;      ( C    , C    , -    )( C     )
                ;
                ;A,PSW DESTROYED
                ;REGISTERS DESTROYED
                ;
                ;CLEAR VARIABLE RMRS RESET ERROR COUNTER
                ;
                VRCREC;                  ****ENTRY POINT
                ;                        CHECK AMOUNT BUFFER
13A3 23           INX  H                 HL = ADDRESS, AMTBUF[2..3]
13A4 7E           MOV  A,M               IF AMTBUF[2..3] .EQ. HEX00
13A5 B7           ORA  A
                ;                          DON'T CLEAR DES REG BY MISTAKE
13A6 CA A1 0B     JZ   PROERR              PROERR(ERRFLG)
                ;                                (PSW:Z )
                ;                                ( 0    )
                ;                        ELSE
                ;                          CHECK METER STATUS
13A9 CD 4E 0F     CALL LSTATE              LSTATE(FATMOD,NORMOD,SERMOD,PRVMOD)
                ;                                (PSW:S ,PSW:Z ,PSW:P ,PSW:C )
                ;                                ( 0    , 0    , 0    , 0    )
                ;                          IF FATMOD .EQ. TRUE
                ;                            PROCESS ERROR
13AC FA A1 0B     JM   PROERR                PROERR(ERRFLG)
                ;                                  (PSW:Z )
                ;                                  ( 0    )
                ;                          ELSE
                ;                            ALTER AMOUNT FORMAT
13AF 3A 35 74     LDA  DIEDCM/2+X            A = DIEDCM
13B2 0E E1        MVI  C,AMTBUF+1            C = OFFSET, AMTBUF[1]
13B4 CD EE 0F     CALL PUTNIB                PUTNIB(AMTBUF[1],DIEDCM)
                ;                                  ( @C      , A     )
                ;                                  ( 0       , I     )
                ;                            PERFORM RULE CHECK AND REFORMATTING
13B7 CD 03 14     CALL VRPRE1                VRPRE1(ERRFLG)
                ;                                  (PSW:Z )
                ;                                  ( 0    )
                ;                            IF ERRFLG .EQ. FALSE
                ;                              EXECUTE RESET
13BA C2 03 14     JNZ  VRXEQ                   VRXEQ(ERRFLG)
                ;                                    (PSW:Z )
                ;                                    ( 0    )
                ;                            ENDIF
                ;                          ENDIF
                ;                        ENDIF
13BD C9           RET                    RETURN
                ;VRMRS(ERRFLG)(CMBBUF)
                ;      (BIT   )(NIBSTR)
                ;      ( 0    )( I    )
                ;      (PSW:Z )( RAM  )
                ;      ( C    )( NC   )
                ;
                ;A,PSW DESTROYED
                ;REGISTERS DESTROYED
                ;
                ;SELECT VARIABLE RMRS FUNCTION
                ;
                VRMRS;                   ****ENTRY POINT
                ;                        SELECT FUNCTION VIA COMBINATION FORMAT
13BE 3A 78 74     LDA  CMBBUF/2+X        A = CMBBUF[0..1]
                ;                        CASE (CMBBUF[0..1])
13C1 FE 4F        CPI  4FH                 **4F: CLEAR REGISTERS
13C3 CA 92 13     JZ   VRCLR                     VRCLR(ERRFLG)
                ;                                      (PSW:Z )
```

```
                    ;                                       ( 0    )
     13C6 FE 6F       CPI  6FH              **6F: RESET POSTAGE
     13C8 CA CE 13    JZ   VRSET                  VRSET(ERRFLG)
                    ;                                 (PSW:Z )
                    ;                                 ( 0    )
                    ;                       **ELSE:
                    ;                             PROCESS ERROR
     13CB C3 A1 0B    JMP  PROERR                 PROERR(ERRFLG)
                    ;                                    (PSW:Z )
                    ;                                    ( 0    )
                    ;                     ENDCASE
                    ;                     RETURN
                    ;VRSET(ERRFLG)(AMTBUF,DSCREG,DSCCRC)
                    ;     (BIT   )(NIBSTR,NIBSTR,BYTE  )
                    ;     ( 0    )( I    , 0    , 0    )
                    ;     (PSW:Z )( RAM  , RAM  , RAM  )
                    ;     ( C    )( NC   , C    , C    )
                    ;
                    ;A,PSW DESTROYED
                    ;REGISTERS DESTROYED
                    ;
                    ;RESET VARIABLE RMRS DESCENDING REGISTER
                    ;
                    VRSET;                ****ENTRY POINT
                    ;                     CHECK METER STATUS
     13CE CD 4E 0F    CALL LSTATE         LSTATE(FATMOD,NORMOD,SERMOD,PRVMOD)
                    ;                           (PSW:S ,PSW:Z ,PSW:P ,PSW:C )
                    ;                           ( 0    , 0    , 0    , 0    )
                    ;                     IF NORMOD .EQ. FALSE
                    ;                       PROCESS ERROR
     13D1 C2 A1 0B    JNZ  PROERR             PROERR(ERRFLG)
                    ;                               (PSW:Z )
                    ;                               ( 0    )
                    ;                     ELSE
                    ;                       CHECK AMOUNT FORMAT
     13D4 3A 70 74    LDA  AMTBUF/2+X         IF AMTBUF[1] .EQ. HEX0F
     13D7 E6 0F       ANI  0FH
     13D9 FE 0F       CPI  0FH
                    ;                         PROCESS ERROR. NO DECIMAL ENTERED
     13DB CA A1 0B    JZ   PROERR             PROERR(ERRFLG)
                    ;                                (PSW:Z )
                    ;                                ( 0    )
                    ;                       ELSE
                    ;                         PERFORM RULE CHECK AND REFORMATTING
     13DE CD 03 14    CALL VRPREP             VRPREP(ERRFLG)
                    ;                                (PSW:Z )
                    ;                                ( 0    )
     13E1 C8          RZ                      IF ERRFLG .EQ. FALSE
                    ;                           CALC NEW DESC REGISTER VALUE
     13E2 0E E7       MVI  C,AMTBUF+8-1         C = OFFSET, AMTBUF[7]
     13E4 06 35       MVI  B,DSCREG+DSCSIZ-1    B = OFFSET, DSCREG[I=DSCSIZ-1]
     13E6 11 07 07    LXI  D,DSCSIZ*100H+DSCSIZ
                    ;                           D = DSCSIZ
                    ;                           E = DSCSIZ
     13E9 CD F8 06    CALL DECADD               DECADD(AMTBUF[7],DSCREG[I],
                    ;                                 ( @C      , @B      ,
                    ;                                 ( I/O     , I       ;
                    ;
                    ;                                 DSCSIZ,DSCSIZ,OVRFLO)
                    ;                                 D     , E    ,PSW:C )
                    ;                                 I     , I    , 0    )
                    ;                           IF OVRFLO .EQ. TRUE
                    ;                             PROCESS ERROR. OVERFLOW
     13EC DA A1 0B    JC   PROERR                 PROERR(ERRFLG)
                    ;                                   (PSW:Z )
                    ;                                   ( 0    )
                    ;                           ELSE
                    ;                             UPDATE DESCENDING REGISTER
     13EF 0E 2F       MVI  C,DSCREG               C = OFFSET, DSCREG
```

```
13F1 06 E1      MVI  B,AMTBUF+8-DSCSIZ     B = OFFSET, AMTBUF[I=8-DSCSIZ]
13F3 3E 07      MVI  A,DSCSIZ              A = DSCSIZ
13F5 CD B3 0F   CALL MVLNIB                MVLNIB(DSCREG,AMTBUF[I],DSCSIZ,
               ;                                 ( @C   , @B     , A    ,
               ;                                 ( 0    , I      , I    ,
               ;
               ;                                 NONBCD,NONZRO)
               ;                                 PSW:S ,PSW:Z )
               ;                                  0    , 0    )
               ;                           UPDATE DESC REGISTER CRC
13F8 47         MOV  B,A                   B = DSCSIZ
13F9 CD B1 0E   CALL CRC                   CRC(DSCREG,DSCSIZ,CRCVAL)
               ;                              ( @C   , B    , D    )
               ;                              ( I    , I    , 0    )
13FC 7A         MOV  A,D                   DSCCRC = CRCVAL
13FD 32 1B 74   STA  DSCCRC/2+X
               ;                           EXECUTE RESET
1400 C3 03 14   JMP  VRXEQ                 VRXEQ(ERRFLG)
               ;                                (PSW:Z )
               ;                                ( 0    )
               ;                        ENDIF
               ;                      ENDIF
               ;                    ENDIF
               ;                  ENDIF
               ;                  RETURN
               ;  Recharging programs have been deleted.
               VRPREP;
               VRPRE1; and
               VRXEQ;  are two (2) of the modules which have been removed for security
               ;  purposes.  One suitable system for the deleted set of modules
               ;  is disclosed in U. S. Patent No. 4,097,923 for REMOTE POSTAGE
               ;  METER CHARGING SYSTEM USING AN ADVANCED MICROCOMPUTERIZED
               ;  POSTAGE METER issued on June 27,1978 to Alton B. Eckert, Howell
               ;  A. Jones, Jr. and Frank T. Check, Jr.  This patent is hereby
               ;  incorporated by reference into the subject patent application.
               ; (***************************************************************)
               ;
               ;THIS IS THE DEMO PROGRAM FOR 6 STEPS/DIGIT MECHANISM
               ;  USED FOR 45 DEG ENCODER  & 30 DEG SENSOR MOUNTING
               ;Objective
               ;  Position the stepper motor through specified number of steps.
               ;  Flag the errors if
               ;                     1. the move fails
               ;                     2. if the sensors are not in home position
               ;                        after the completion of a move
               ;Level:
               ;  Calls RENC , BKLASH routines
               ;  utilizes look up table setup for determining the step count
               ;  requirements for retries.
               ;  Exits with the power held on to both motors.  It is the duty of the
               ;  invoking routine to judiciously hold the appropriate home phase.
               ;Procedure MOVCLS(MOTOR,RETRIES,MCOUNT,SPEED:ERROR)
               ;ERROR := 0
               ;Input (PORT.SENSOR,SENSPTN)
               ;SENSPTN := SENSPTN and MSNMASK
               ;If SENSPTN = (BODO or BODC or BCDO or BCDC) then PASSFLAG := 0
               ;                                                 go to Loop1
               ;                                            else ERROR := 5
               ;                                                 End MOVCLS
               ;
               ;Loop1:     Do while (RETRIES > 0 and MCOUNT <> 0 and ERROR > 0 )
               ;           If PASSFLAG = 0 then  ECOUNT := MCOUNT * 2
               ;                                 MSTEP := MCOUNT * 6
               ;           Input (PORT.SENSOR,SENSPTN)
               ;           If MOTOR = BANK then
               ;                         SENSPTN := (SENSPTN / 4) and MASKDSENSR
               ;           If SENSPTN = 11 then MOTPTN := PHASE1    (....  11H..)
               ;                         else MOTPTN := PHASE2           44H
               ;           If MCOUNT > 0 then MOTPTN := MOTPTN * 4
```

```
                  ;         Input (PORTB,MOTHPTN)
                  ;         IF MOTOR = BANK then MOTPTN := MOTPTN and MASKMSN
                  ;                              MOTHPTN := MOTHPTN and MASKLSN
                  ;                              MOTHPTN := MOTHPTN or MOTPTN
                  ;                         else MOTPTN := MOTPTN and MASKLSN
                  ;                              MOTHPTN := MOTHPTN and MASKMSN
                  ;                              MOTHPTN := MOTHPTN or MOTPTN
                  ;         Output ( PORTB,MOTHPTN)
                  ;         If MCOUNT > 0 then  MSTEP := MSTEP-1
                  ;                             MOTPTN := MOTPTN * 2
                  ;                       else  MSTEP := MSTEP + 1
                  ;                             MOTPTN := MOTPTN / 2
                  ;         For X = 1 to SPEED by 1
                  ;                 Procedure RENC (MOTOR,SPEED,OLDPTN :ERROR,ADJCOUNT)
                  ;         End For
                  ;         If MSTEP <> 0 then
                  ;                 If ERROR = 0 then Continue Do
                  ;         else For Y =1 to 60 by 1
                  ;                     Procedure RENC (MOTOR,OLDPTN: ERRORT,ADJCOUNT)
                  ;              End For
                  ;         MSTEP := MSTEP (look-up)
                  ;         PASSFLAG := PASSFLAG + 1
                  ;         Continue Do
                  ;   End Do
                  ;   If RETRIES = 0 or MCOUNT = 0 then
                  ;                              Procedure BKLASH
                  ;If ERROR > 0 THEN End
                  ;If BNKPAT = 01 then ERROR := 5; End
                  ;          else if BNKPAT = 10 then ERROR :5; End
                  ;                              else if MCOUNT = 0 THEN    End
                  ;                                                   else ERROR := 6;End
                  ;If DGTPAT = 01 then ERROR := 5; End
                  ;         else if DGTPAT = 10 then ERROR := 5 ; End
                  ;                             else if MCOUNT = 0 then End
                  ;                                                   else ERROR := 6
                  ;End movcls
                  ;
                  ;
                  ; PARAM     (*C-REG*) COUNT : BYTE; (*- FOR CW, + FOR CCW*)
                  ;   (*E-REG*) MOTOR : MOTORS; (*1 FOR BANK, 0 FOR DIGIT*)
                  ;   (*H-REG*) SPEED : BYTE  ;Stepping speed of motor
                  ;   (*L-REG*) TRIES : BYTE;
                  ;
                  ; VAR       (*B-REG*) ENC_COUNT : BYTE;
                  ;   (*C-REG*) MOT_COUNT : BYTE;
                  ;   (*D-REG*) PATTERN : BYTE;
                  ;
0000              BODO       EQU     0000B
0003              BODC       EQU     0011B
000C              BCDO       EQU     1100B
000F              BCDC       EQU     1111B
0000              PFLAG0     EQU     00
0003              DGTMSK     EQU     03H
000C              BNKMSK     EQU     0CH
000F              LSNMSK     EQU     0FH
00F0              MSNMSK     EQU     0F0H
0011              PHASE1     EQU     11H
0044              PHASE2     EQU     44H
0003              SENSCL     EQU     03H
0005              ERROR5     EQU     05H
0006              ERROR6     EQU     06H
                 MOVCLS:                                          ; BEGIN
1403 AF             XRA     A        ; ERROR := NO_ERRORS;
1404 32 38 74       STA     ERROR
                  ;
                  ;
1407 3A 00 68 MOVC4:       LDA     PORT2A  ;Combination sensor check
140A E6 0F          ANI     LSNMSK
```

```
140C FE 00          CPI     BODO
140E CA 23 14       JZ      MOVC7
1411 FE 03          CPI     BODC
1413 CA 23 14       JZ      MOVC7
1416 FE 0C          CPI     BCDO
141B CA 23 14       JZ      MOVC7
141B FE 0F          CPI     BCDC
141D CA 23 14       JZ      MOVC7
1420 C3 F9 14       JMP     MOVC60
               ;
               ;
1423 3E 00     MOVC7:       MVI     A,PFLAG0  ;Passflag:=0
1425 F5             PUSH    PSW
1426 7D        MOVC05:      MOV     A,L       ; WHILE (TRIES > 0) AND (COUNT <> 0)
1427 B7             ORA     A         ;         AND (ERROR = NO_ERRORS) DO
1428 CA DB 14       JZ      MOVC50    ;branch here to movc70 for backlash correction
142B 79             MOV     A,C
142C B7             ORA     A
142D CA DB 14       JZ      MOVC50    ;branch here to movc70 for backlash correction
1430 3A 38 74       LDA     ERROR
1433 B7             ORA     A
1434 C2 DB 14       JNZ     MOVC50
                                      ;     BEGIN
1437 F1             POP     PSW       ;Passflag check.
1438 B7             ORA     A
1439 F5             PUSH    PSW       ;
143A C2 56 14       JNZ     MOVC8
143D 79        MOVC1:       MOV     A,C               ;
143E 87             ADD     A
143F 47             MOV     B,A               ;ENC COUNT=2*COUNT
1440 87             ADD     A
1441 80             ADD     B                 ;STEP = 6*COUNT
1442 4F             MOV     C,A
               ;
               ;
1443 7B             MOV     A,E
1444 B7             ORA     A
1445 3A 00 68       LDA     PORT2A
1448 CA 4D 14       JZ      MOVC6
               ;
               ;
144B 0F             RRC                       ;BANK MOTOR
144C 0F             RRC                       ;
                                      ;     CASE SIGN (MOT_COUNT) OF
144D E6 03     MOVC6:       ANI     DGTMSK            ;
144F 16 44          MVI     D,PHASE2          ;
1451 CA 56 14       JZ      MOVC8             ;
1454 16 11          MVI     D,PHASE1
               MOVC8:                         ;
1456 79             MOV     A,C                ;
1457 B7             ORA     A                  ;
1458 7A             MOV     A,D                ;
                                      ;
1459 FA 5F 14       JM      MOVC15            ;
145C 07             RLC
145D 07             RLC                                   ;
                                      ;                  AND PHASED AND PHASEA;
145E 57        MOVC10:      MOV     D,A       ;     END;
               MOVC15:                        ;     REPEAT
145F 7B             MOV     A,E       ;       CASE MOTOR OF
1460 B7             ORA     A
1461 7A             MOV     A,D
1462 CA 73 14       JZ      MOVC20
1465 E6 F0          ANI     MSNMSK
1467 C5             PUSH    B
1468 47             MOV     B,A
1469 3A 02 70       LDA     PORTB
```

```
146C E6 0F          ANI     LSNMSK
146E B0             ORA     B
146F C1             POP     B
1470 C3 7E 14       JMP     MOVC25
1473 E6 0F   MOVC20:  ANI     LSNMSK  ;        DIGIT: PORTB := (PATTERN OR PHASESOFF R
1475 C5             PUSH    B
1476 47             MOV     B,A
1477 3A 02 70       LDA     PORTB              ;
147A E6 F0          ANI     MSNMSK             ;
147C B0             ORA     B                  ;
147D C1             POP     B                  ;
                                  ;            IS BEING MOVED
147E 32 02 70 MOVC25:  STA     PORTB   ;          END;
1481 79             MOV     A,C     ;      CASE SIGN (MOT_COUNT) OF
1482 B7             ORA     A
1483 7A             MOV     A,D
1484 FA 8C 14       JM      MOVC30
                                  ;           +1: BEGIN
1487 0D             DCR     C       ;             MOT_COUNT := MOT_COUNT - 1;
1488 07             RLC             ;             PATTERN := PATTERN ROL 1
1489 C3 8E 14       JMP     MOVC35  ;             END;
             MOVC30:                    ;          -1: BEGIN
148C 0C             INR     C       ;             MOT_COUNT := MOT_COUNT - 1;
148D 0F             RRC             ;             PATTERN := PATTERN ROR 1
                                  ;             END;
148E 57      MOVC35:  MOV     D,A     ;          END;
148F C5             PUSH    B       ;      READ_ENCODERS (10, MOTOR, ENC_COUNT)
1490 48             MOV     C,B
1491 D5             PUSH    D
1492 E5             PUSH    H
1493 6C             MOV     L,H
1494 CD 99 19       CALL    RENC
1497 E1             POP     H
1498 D1             POP     D
1499 79             MOV     A,C
149A C1             POP     B
149B 47             MOV     B,A
149C 79             MOV     A,C     ;    UNTIL (MOT_COUNT = 0) OR (ERROR <> NO_ERRORS);
149D B7             ORA     A
149E CA A8 14       JZ      MOVC40
14A1 3A 3B 74       LDA     ERROR
14A4 B7             ORA     A
14A5 CA 5F 14       JZ      MOVC15
14A8 C5      MOVC40:  PUSH    B        ;     READ_ENCODERS (60, MOTOR, ENC_COUNT);
14A9 48             MOV     C,B
14AA D5             PUSH    D
14AB E5             PUSH    H
14AC 2E 3C          MVI     L,60.
14AE CD 99 19       CALL    RENC
14B1 E1             POP     H
14B2 D1             POP     D
14B3 79             MOV     A,C
14B4 C1             POP     B
14B5 47             MOV     B,A
14B6 B7             ORA     A       ;    COUNT := ENC_COUNT / 2;
14B7 F2 BC 14       JP      MOVC45
14BA 2F             CMA
14BB 3C             INR     A
14BC E5      MOVC45:  PUSH    H
14BD D5             PUSH    D
14BE 16 00          MVI     D,00H   ;Step error computation/lookup
14C0 5F             MOV     E,A
14C1 21 08 15       LXI     H,TABBASE
14C4 19             DAD     D
14C5 4E             MOV     C,M
14C6 78             MOV     A,B
14C7 B7             ORA     A
14C8 F2 CF 14       JP      MOVC42
```

```
14CB 79          MOV     A,C
14CC 2F          CMA
14CD 3C          INR     A
14CE 4F          MOV     C,A
14CF D1       MOVC42:    POP     D
14D0 E1          POP     H
14D1 2D          DCR     L
14D2 F1          POP     PSW
14D3 3C          INR     A                   ;PASSFLAG:=PASSFLAG+1
14D4 F5          PUSH    PSW
14D5 C3 26 14    JMP     MOVC05
              ;
              ;
              ;
14D8 CD 1B 15 MOVC70:    CALL    BKLASH
14DB F1       MOVC50:    POP     PSW         ;retrieve passflag;
14DC 3A 38 74    LDA     ERROR
14DF B7          ORA     A
14E0 C0          RNZ
                 ;
              ;
              ;
14E1 3A 39 74    LDA     BNKPAT  ; IF BANK_PAT NOT IN [00H, 03H]
14E4 B7          ORA     A       ;    OR DIGIT_PAT NOT IN [00H,03H] THEN
14E5 CA ED 14    JZ      MOVC55
14E8 FE 03       CPI     SENSCL
14EA C2 F9 14    JNZ     MOVC60
14ED 3A 3A 74 MOVC55:    LDA     DGTPAT
14F0 B7          ORA     A
14F1 CA FF 14    JZ      MOVC65
14F4 FE 03       CPI     SENSCL
14F6 CA FF 14    JZ      MOVC65
                                 ;    BEGIN
14F9 3E 05    MOVC60:    MVI     A,ERROR5    ;     ERROR := NOT_HOME;
14FB 32 38 74    STA     ERROR
14FE C9          RET             ;    RETURN
                                 ;    END;
14FF 79       MOVC65:    MOV     A,C     ; IF COUNT <> 0 THEN ERROR := MOVE_FAILED
1500 B7          ORA     A
1501 C8          RZ
1502 3E 06       MVI     A,ERROR6
1504 32 38 74    STA     ERROR
1507 C9          RET
                                 ; END;
              ;
              ;
1508 00       TABBASE:DB 0
1509 04          DB      4H
150A 06          DB      6D
150B 08          DB      8D
150C 0C          DB      12D
150D 10          DB      16D
150E 12          DB      18D
150F 14          DB      20D
1510 18          DB      24D
1511 1C          DB      28D
1512 1E          DB      30D
1513 22          DB      34D
1514 24          DB      36D
1515 28          DB      40D
1516 2A          DB      42D
1517 2C          DB      44D
1518 30          DB      48D
1519 34          DB      52D
151A 36          DB      54D
              ;
              ;
```

```
                ;BACKLASH CORRECTION ROUTINE
                ;This routine advances the digit stepper motor by one step
                ;beyond the expected settling point and then drives one
                ;step backwards  to the final settling point
                ;None of the registers are affected.
                ;This routine will be invoked only if all retries are exhausted or if al
                ;motor phases are applied.
                ;This routine will not be invoked in case of an error condition arises
                ;in RENC routine before the specified number of pulses are applied
                ;
151B F5         BKLASH:    PUSH    PSW
151C C5            PUSH    B
151D 7B            MOV     A,E             ;motor type check
151E B7            ORA     A
151F C2 3C 15      JNZ     BKL50
1522 3A 02 70      LDA     PORTB
1525 F5            PUSH    PSW
1526 E6 F0         ANI     MSNMSK
1528 F5            PUSH    PSW
1529 7A            MOV     A,D             ;D register has the next pattern output
152A E6 0F         ANI     LSNMSK
152C 47            MOV     B,A
152D F1            POP     PSW
152E B0            ORA     B
152F 32 02 70      STA     PORTB
1532 CD A9 17      CALL    DEL30M          ;forward pulse
1535 F1            POP     PSW
1536 32 02 70      STA     PORTB
1539 CD A9 17      CALL    DEL30M          ;backward pulse to final settling point
153C C1         BKL50:     POP     B
153D F1            POP     PSW
153E C9            RET
                ;
                ;
                ;   LEDON ROUTINE
                ;   TURNS ON THE STROBE FOR LEDS
                ;
                ;
153F F5         LEDON:     PUSH    PSW             ;SAVE CONTENTS
1540 3A 01 70      LDA     PORTA           ;LOADS THE CURRENT STATUS
1543 E6 DF         ANI     0DFH            ;BIT RESET
1545 32 01 70      STA     PORTA           ;PORT RESET
1548 F1            POP     PSW
1549 C9            RET                     ;
                ;
                ;
                ;   LEDOFF ROUTINE
                ;   TURNS THE STROBE OFF
                ;
                ;
154A F5         LEDOFF:    PUSH    PSW                     ;
154B 3A 01 70      LDA     PORTA           ;
154E F6 20         ORI     20H             ;
1550 32 01 70      STA     PORTA           ;
1553 F1            POP     PSW         ;
1554 C9            RET                 ;
                ;
                ;
                ;
                ;
                ;
                ;
                ;   DELAY ROUTINES
                ;
                ;
1555 00         DEL300:    NOP
1556 00            NOP             ;ADJUST TIME
```

```
15AB 79          MOV     A,C      ; CASE PATTERN ROL 2 OR NEW_PATTERN OF
15AC 07          RLC
15AD 07          RLC
15AE B3          ORA     E
15AF 5F          MOV     E,A
15B0 AF          XRA     A
15B1 57          MOV     D,A
15B2 21 B8 15    LXI     H,ENCT
15B5 19          DAD     D
15B6 7E          MOV     A,M
15B7 C9          RET
15B8 00        ENCT:     DB      0       ;     00H: ENCODER_MOVE := 0;
15B9 01          DB      1       ;     01H: ENCODER_MOVE := +1;
15BA FF          DB      -1      ;     02H: ENCODER_MOVE := -1;
15BB 02          DB      +2      ;     03H: ENCODER_MOVE := +2;
15BC FF          DB      -1      ;     04H: ENCODER-MOVE := -1;
15BD 00          DB      0       ;     05H: ENCODER_MOVE := 0;
15BE 02          DB      +2      ;     06H: ENCODER_MOVE := +2;
15BF 01          DB      +1      ;     07H: ENCODER_MOVE := +1;
15C0 01          DB      +1      ;     08H: ENCODER_MOVE := +1;
15C1 02          DB      +2      ;     09H: ENCODER_MOVE := +2;
15C2 00          DB      0       ;     0AH: ENCODER_MOVE := 0;
15C3 FF          DB      -1      ;     0BH: ENCODER_MOVE := -1;
15C4 02          DB      +2      ;     0CH: ENCODER_MOVE := +2;
15C5 FF          DB      -1      ;     0DH: ENCODER_MOVE := -1;
15C6 01          DB      +1      ;     0EH: ENCODER_MOVE := +1;
15C7 00          DB      0       ;     0FH: ENCODER_MOVE := 0;
                                 ; END
                                 ; END;
               ; (*************************************************************)
               ;THIS SEGMENT IS USED TO MOVE THE BANK & DIGIT IN TO HOME
               ;POSITION UPON DETECTION OF AN ERROR IN ATTEMPT TO
               ;POSITION THE RACKS TO 00.00
               ;
               ; PROCEDURE ENDMOV_CLOSED;
               ;
               ; PARAM    (*C-REG*) COUNT : BYTE; (*- FOR CW, + FOR CCW*)
               ;   (*E-REG*) MOTOR : MOTORS; (*1 FOR BANK, 0 FOR DIGIT*)
               ;
               ; VAR      (*B-REG*) ENC_COUNT : BYTE;
               ;   (*C-REG*) MOT_COUNT : BYTE;
               ;   (*D-REG*) PATTERN : BYTE;
               ;
               ;
               ;
00F0           MSNMASK   EQU     0F0H
000F           LSNMASK   EQU     0FH
0014           NUMRD1    EQU     20D
003C           SETLTIM   EQU     60D
               ;
               ;
               ;
               ;
               ;
15C8 AF        ENDMOV:   XRA     A                        ;     REPEAT
15C9 32 38 74    STA     ERROR
15CC 7B        ENDM05:   MOV     A,E      ;         CASE MOTOR OF
15CD B7          ORA     A
15CE 7A          MOV     A,D
15CF CA E0 15    JZ      ENDM20          ;MOTOR(BANK,DIGIT)
               ;
               ;
15D2 E6 F0       ANI     MSNMASK
15D4 C5          PUSH    B
15D5 47          MOV     B,A
15D6 3A 02 70    LDA     PORTB
15D9 E6 0F       ANI     LSNMASK
15DB B0          ORA     B
```

```
1557 CD 64 15      CALL    DEL75   ;75 MICRO SECS
155A CD 64 15      CALL    DEL75   ;
155D CD 64 15      CALL    DEL75           ;
1560 CD 64 15      CALL    DEL75           ;
1563 C9            RET                     ;
                 ;
                 ;
                 ;
1564 F5          DEL75:    PUSH    PSW                 ;
1565 3E 0A         MVI     A,0AH               ;
1567 3D          DEL1:     DCR     A                   ;
1568 C2 67 15      JNZ     DEL1                ;
156B F1            POP     PSW                 ;
156C C9            RET                         ;
                 ;
                 ;
                 ;   SENSOR INITIALISATION ROUTINE
                 ;
                 ;
156D             INITSM:
156D CD 3F 15 SENSR:       CALL    LEDON               ;LED STROBE ON
1570 CD 64 15      CALL    DEL75               ;SETTLING TIME
1573 3A 00 68      LDA     PORT2AD
1576 47            MOV     B,A                 ;
1577 E6 03         ANI     DGTMSK
1579 CA 9E 15      JZ      SENS35
157C FE 03         CPI     DGTMSK
157E C2 A3 15      JNZ     SENS40
1581 3E 02         MVI     A,02H
1583 32 02 70 SENS25:      STA     PORTB
1586 CD A9 17      CALL    DEL30M
1589 3A 00 68      LDA     PORT2AD
158C 47            MOV     B,A
158D E6 03         ANI     DGTMSK              ;
158F 32 3A 74      STA     DGTPAT              ;DIGIT PATTERN
1592 78            MOV     A,B                 ;
1593 0F            RRC                         ;
1594 0F            RRC                         ;
1595 E6 03         ANI     DGTMSK              ;
1597 32 39 74      STA     BNKPAT              ;BANK PATTERN
159A CD 4A 15      CALL    LEDOFF
159D C9            RET                         ;
                 ;
                 ;
159E 3E 08       SENS35:   MVI     A,08H
15A0 C3 83 15      JMP     SENS25
                 ;
                 ;
15A3 3E 0F       SENS40:   MVI     A,15D
15A5 32 38 74      STA     ERROR
15A8 C3 9E 15      JMP     SENS35
                 ;
                 ; (*****************************************************************)
                 ;Objective: To compare present encoder status to previous encoder value
                 ;           and determine the deviation as no change, clockwise movement
                 ;           of one step, counterclockwise movement of one step or as an
                 ;           error, which corresponds to a two step jump in the status.
                 ;
                 ;           Does not call any subroutines
                 ;
                 ;
                 ; FUNCTION (*A-REG*) ENCODER_MOVE : BYTE;
                 ;
                 ; PARAM     (*C-REG*) PATTERN : ENCODER_PATTERNS;
                 ;   (*E-REG*) NEW_PATTERN : ENCODER_PATTERNS;
                 ;
                 ENCMOV:                         ; BEGIN
```

```
15DC C1            POP     B
15DD C3 EB 15      JMP     ENDM25
                   ;
                   ;
15E0 E6 0F         ENDM20: ANI     LSNMASK     ;  DIGIT: PORTB := (PATTERN OR PHASESOFF ROL 4)
15E2 C5            PUSH    B
15E3 47            MOV     B,A
15E4 3A 02 70      LDA     PORTB                  ;
15E7 E6 F0         ANI     MSNMASK                ;
15E9 B0            ORA     B                      ;
15EA C1            POP     B                      ;
                                   ;              IS BEING MOVED
15EB 32 02 70 ENDM25:  STA     PORTB   ;             END;
15EE 79            MOV     A,C     ;          CASE SIGN (MOT_COUNT) OF
15EF B7            ORA     A
15F0 7A            MOV     A,D
15F1 FA F9 15      JM      ENDM30
                                   ;              +1: BEGIN
15F4 0D            DCR     C       ;                 MOT_COUNT := MOT_COUNT - 1;
15F5 07            RLC             ;                 PATTERN := PATTERN ROL 1
15F6 C3 FB 15      JMP     ENDM35  ;                 END;
                   ;
                   ;
              ENDM30:                      ;              -1: BEGIN
15F9 0C            INR     C       ;                 MOT_COUNT := MOT_COUNT - 1;
15FA 0F            RRC             ;                 PATTERN := PATTERN ROR 1
                                   ;                 END;
15FB 57       ENDM35:  MOV     D,A         ;             END;
15FC C5            PUSH    B       ;          READ_ENCODERS (10, MOTOR, ENC_COUNT)
15FD 48            MOV     C,B
15FE D5            PUSH    D
15FF E5            PUSH    H
1600 2E 14         MVI     L,NUMRD1
1602 CD 99 19      CALL    RENC
1605 E1            POP     H
1606 D1            POP     D
1607 79            MOV     A,C
1608 C1            POP     B
1609 47            MOV     B,A
160A 79            MOV     A,C     ;     UNTIL (MOT_COUNT = 0) OR (ERROR <> NO_ERRORS);
160B B7            ORA     A
160C C2 CC 15      JNZ     ENDM05
                   ;
                   ;
160F C5       ENDM40:  PUSH    B           ;      READ_ENCODERS (60, MOTOR, ENC_COUNT);
1610 48            MOV     C,B
1611 D5            PUSH    D
1612 E5            PUSH    H
1613 2E 3C         MVI     L,SETLTIM
1615 CD 99 19      CALL    RENC
1618 E1            POP     H
1619 D1            POP     D
161A 79            MOV     A,C
161B C1            POP     B
161C 47            MOV     B,A
161D B7            ORA     A       ;     COUNT := ENC_COUNT / 2;
161E 3E 07         MVI     A,07H              ;ERROR 7
1620 C8            RZ                         ;NORMAL EXIT
                   ;
                   ;
1621 32 38 74      STA     ERROR
1624 C9            RET                        ;ERROR EXIT
                   ;
0044          HPHAM1   EQU     044H
0088          HPHASE   EQU     88H
0000          SENS00   EQU     00H
0001          SENS01   EQU     01H
```

```
0002            SENS02      EQU     02H
0003            SENS03      EQU     03H
0004            SENS04      EQU     04H
0005            SENS05      EQU     05H
0006            SENS06      EQU     06H
0007            SENS07      EQU     07H
0008            SENS08      EQU     08H
0009            SENS09      EQU     09H
000A            SENS10      EQU     0AH
000B            SENS11      EQU     0BH
000C            SENS12      EQU     0CH
000D            SENS13      EQU     0DH
000E            SENS14      EQU     0EH
000F            SENS15      EQU     0FH
0003            SENMSK      EQU     03H
                ;
                ;
1625 CD 6D 15   SEKPOS:     CALL    SENSR
1628 CD 3F 15       CALL    LEDON
162B CD 3B 16       CALL    HDSEEK
162E CD 4A 15       CALL    LEDOFF
1631 CD BC 18       CALL    MODLN
1634 CD B0 18       CALL    ERRHDR
1637 C4 B5 18       CNZ     EXTERR
163A C9             RET
                ;
                ;
                ;
                ;
                ;
                ;Procedure HDSEEK
                ;Objective
                ;    This segment initialises the print wheels to 00.00 position.
                ;    Prior to the movement of the racks this segment aligns the
                ;    bank and digit motors to legitimate home positions. The 00.00
                ;    location is attained by hitting against the mechanical blocks.
                ;    Three retries will be provided before coming to the conclusion
                ;    that an error in movement is detected.
                ;Level
                ;;
                ;
                ;   RCOUNTERB := 4
                ;   RCOUNTERC := 8                  ;RETRY COUNTERS
                ;SEKP00:RCOUNTERB:= RCOUNTERB-1
                ;   If RCOUNTERB = 0 then ERROR := 12 ;     End.
                ;   MOTPATN := HOMEPHASE-1
                ;   Output(PORTB,MOTPATN)
                ;   Procedure TIMEDELAY(30msec)
                ;   MOTPATN := HOMEPHASE
                ;   Output (PORTB,MOTPATN)
                ;   Procedure TIMEDELAY(30msec)
                ;   RCOUNTERC := RCOUNTERC - 1
                ;   If RCOUNTERC = 0 then ERROR := 12 ;            End.
                ;   Input (PORT.SENSOR,SENSRPTN)
                ;   SENSRPTN := SENSRPTN.LSNMASK
                ;   Case SENSRPTN   00,03,12,15     SEKP85
                ;                   01,02,13,14     SEKP01
                ;                   04,07,08,11     SEKP02
                ;                   05,06,09,10     SEKP03
                ;
                ;   SEKP01: Procedure DALIGN(,TYPE 2 ERROR)
                ;           If TYPE2ERROR = FALSE then go to STEP0
                ;           else MOTPIN:= NOPHASEON
                ;                Output (PORTB,MOTPIN)
                ;                Procedure TIMEDELAY (30msec)
                ;                Go to SEEKP00
                ;   SEKP02: Procedure BALIGN(TYPE2ERROR)
                ;           If TYPE2ERROR = FALSE then go to STEP0
```

```
;           else MOTPTN := NOPHASEON
;                Procedure TIMEDELAY(30msec)
;                Go to SEEKP00
;  SEKP03: Procedure DALIGN(TYPE2 ERROR)
;           If TYPE2ERROR = FALSE then go to STEP0
;           else  Procedure BALIGN(TYPE2ERROR)
;           If TYPE2ERROR = FALSE then go to STEP0
;           else Input (PORTB,MOTPTN)
;                MOTPTN := MOTPTN.LSNMSK
;                Output (PORTB,MOTPTN)
;                Procedure TIMEDELAY(30msec)
;                Procedure DALIGN(TYPE2ERROR)
;                If TYPE2ERROR = TRUE then Input (PORTB,MOTPTN)
;                                          MOTPTN := NOPHASEON
;                                          Output(PORTB,MOTPTN)
;                                          Procedure TIMEDELAY(30msec)
;                                          Go to SEEKP00
;               else          Input (PORTB,MOTPTN)
;                             MOTPTN:=(( MOTPTN.LSNMSK)+HOMEPHASEBANK))
;                             Output (PORTB,MOTPTN)
;                             Procedure TIMEDELAY(30msec)
;                             Go to STEP0
;  SEKP85:
;           Procedure PTNCHK(DIGIT:PTNFLAG)
;           If PTNFLAG <> 0 then go to SEKP00
;           Procedure PTNCHK(BANK,PTNFLAG)
;           If PTNFLAG <> 0 then go to SEKP00
;end case
;
;  SEKP05: Procedure MOVE(DIGIT,CCW,1,SPD8:ERROR)
;           Do while ERROR = 0
;                  Procedure MOVE(DIGIT,CCW,1,SPD8:ERROR)
;           End do.
;           Procedure SELDRN(:DRN)
;           Procedure POHOME(DRN:ERROR)
;           If ERROR <>0 then End hdseek.
;
;           Procedure MOVE(BANK,CCW,1,SPD8:ERROR)
;           Do while ERROR = 0
;                  Procedure MOVE (BANK,CCW,1,SPD8:ERROR)
;           end do.
;           If BNKPAT = 01 then DRN:=CW else DRN:=CCW
;           Procedure POHOME(DRN,ERROR)
;           If ERROR <> 0 then End Hdseek.
;           Procedure MOVE(BANK,CW,4,SPD8:ERROR)
;           If ERROR <> 0 then End Hdseek.
;           For BANK:=0 TO 4 by 1 Do
;                  Procedure MOVE(DIGIT,CCW,1,SPD8:ERROR)
;                  Do while ERROR =FALSE
;                         Procedure MOVE(DIGIT,CCW,1,SPD8:ERROR)
;                  end do
;                  Procedure SELDRN(:DRN)
;                  Procedure POHOME(DRN:ERROR)
;                  If ERROR = TRUE then End hdseek.
;                  Procedure MOVE(DIGIT,CW,9,SPD8:ERROR)
;                  If ERROR = TRUE then End Hdseek.
;                  BANK:= BANK+1
;                  If BANK = 2 then
;                            Procedure MOVE(BANK,CCW,1,SPD8:ERROR)
;                            If ERROR = TRUE then end Hdseek.
;                  end do
;           end for.
;           Procedure MOVE (BANK,CW,2,SPD8:ERROR)
;           If ERROR = TRUE then end hdseek.
;           Procedure MOVE (DIGIT,CW,2,SPD8:ERROR)
;           If ERROR = TRUE then end hdseek.
;           Input (PORTB.MOTPTN)
;           MOTPTN:=MOTPTN.MSNMSK
```

```
                    ;               Output(PORTB,MOTPIN)
                    ;END.
                    ;
                    ;
163B 01 08 04 HDSEEK:   LXI     B,408H                  ;RETRY COUNT
163E C5             PUSH    B
163F C1       SEKP00:   POP     B
1640 05             DCR     B
1641 CA 5A 16       JZ      EREXIT
                    ;
                    ;
1644 C5             PUSH    B
1645 3E 44          MVI     A,HPHAM1
1647 32 02 70       STA     PORTB
164A CD A9 17       CALL    DEL30M
164D 3E 88          MVI     A,HPHASE
164F 32 02 70       STA     PORTB
1652 CD A9 17       CALL    DEL30M
1655 C1       STEP0:    POP     B
1656 0D             DCR     C
1657 C2 60 16       JNZ     CSTEP0
165A 3E 0C    EREXIT:   MVI     A,12D
165C 32 38 74       STA     ERROR
165F C9             RET
                    ;
                    ;
1660 C5       CSTEP0:   PUSH    B
1661 3A 00 68       LDA     PORT2A                ;
1664 E6 0F          ANI     LSNMSK
                    ;
                    ;
1666 21 73 16       LXI     H,BASE5
1669 16 00          MVI     D,00H
166B 87             ADD     A
166C 5F             MOV     E,A
166D 19             DAD     D
166E 5E             MOV     E,M
166F 23             INX     H
1670 56             MOV     D,M
1671 EB             XCHG
1672 E9             PCHL
                    ;
                    ;
1673 D2 16    BASE5:    DW      SEKP85
1675 93 16          DW      SEKP01
1677 93 16          DW      SEKP01
1679 D2 16          DW      SEKP85
167B A5 16          DW      SEKP02
167D AF 16          DW      SEKP03
167F AF 16          DW      SEKP03
1681 A5 16          DW      SEKP02
1683 A5 16          DW      SEKP02
1685 AF 16          DW      SEKP03
1687 AF 16          DW      SEKP03
1689 A5 16          DW      SEKP02
168B D2 16          DW      SEKP85
168D 93 16          DW      SEKP01
168F 93 16          DW      SEKP01
1691 D2 16          DW      SEKP85
                    ;
                    ;
                    ;   JZ      SEKP90
                    ;                       ;CHECKING DIGIT POSITION
                    ;   CPI     SENS01
                    ;   JZ      SEKP01
                    ;
                    ;   CPI     SENS02
                    ;   JZ      SEKP01
```

```
                       ;;
                       ;  CPI     SENS13
                       ;  JZ      SEKP01
                       ;;
                       ;  CPI     SENS14
                       ;  JZ      SEKP01
                       ;;
                       ;  CPI     SENS04
                       ;  JZ      SEKP02
                       ;;
                       ;  CPI     SENS07
                       ;  JZ      SEKP02
                       ;;
                       ;  CPI     SENS08
                       ;; JZ      SEKP02
                       ;;
                       ;  CPI     SENS11
                       ;  JZ      SEKP02
                       ;;;
                       ;  CPI     SENS05
                       ;  JZ      SEKP03
                       ;;
                       ;  CPI     SENS06
                       ;  JZ      SEKP03
                       ;;
                       ;  CPI     SENS09
                       ;  JZ      SEKP03
                       ;;
                       ;  CPI     SENS10
                       ;  JZ      SEKP03
                       ;;
                       ;  CPI     SENS03
                       ;  JZ      SEKP90
                       ;;
                       ;  JMP     SEKP05
                       ;
                       ;
                       ;                  DIGIT NOT IN HOME
1693 CD E7 17 SEKP01:     CALL    DALIGN
1696 B7                   ORA     A
1697 CA 55 16             JZ      STEP0            ;No Error condition
                                                   ;Digit aligned and phased
                                                   ;Bank aligned and phased
169A
                                                   ;Type 1 error
                                                   ;Digit aligned and phased
                                                   ;Bank not aligned and/or phased
                                                   ;
169A 3E 00    SEKP04:     MVI     A,00H                   ;Type 2 error
                                                   ;Digit not aligned and/or phased
                                                   ;Bank don't care
169C 32 02 70 SEP11:      STA     PORTB
169F CD A9 17             CALL    DEL30M
16A2 C3 3F 16             JMP     SEKP00
16A5 CD 12 18 SEKP02:     CALL    BALIGN
16A8 B7                   ORA     A
16A9 CA 55 16             JZ      STEP0            ;No Error condition
                                                   ;Digit aligned and phased
                                                   ;Bank aligned and phased
                                                   ;
                                                   ;Type 1 Error
                                                   ;Bank aligned and phased
                                                   ;Digit not aligned and/or phased
16AC C3 9A 16             JMP     SEKP04
16AF CD E7 17 SEKP03:     CALL    DALIGN
16B2 B7                   ORA     A
16B3 CA 55 16             JZ      STEP0            ;NO error condition
                       ;
```

```
                        ;
     16B6
                                              ;Type 2 error
     16B6 CD 12 18        CALL     BALIGN
     16B9 B7              ORA      A
     16BA CA 55 16        JZ       STEP0            ;No error condition
                        ;
                        ;
                                              ;Type 1 Error condition
                        ;
                        ;
     16BD 3A 02 70        LDA      PORTB
     16C0 E6 0F           ANI      LSNMSK
     16C2 32 02 70        STA      PORTB
     16C5 CD A9 17        CALL     DEL30M
                        ;
                        ;
                        ;
                        ;
     16C8 CD E7 17        CALL     DALIGN
     16CB B7              ORA      A
     16CC C2 9A 16        JNZ      SEKP04
                        ;
                        ;
                        ;
                        ;   LDA      PORTB
                        ;   ANI      LSNMSK
                        ;   ORI      80H
                        ;   STA      PORTB
                        ;   CALL     DEL30M
     16CF C3 55 16          JMP      STEP0
                        ;;
                        ;
                        ;
                        ;
     16D2 1E 00         SEKP85:    MVI      E,00
     16D4 CD 2A 19          CALL     PTNCHK
     16D7 C2 3F 16          JNZ      SEKP00
     16DA 1C                INR      E
     16DB CD 2A 19          CALL     PTNCHK
     16DE C2 3F 16          JNZ      SEKP00
                        ;;
                        ;
     16E1 C1            SEKP05:    POP      B
     16E2 3A 3A 74      SEKP06:    LDA      DGTPAT
     16E5 F5                PUSH     PSW
     16E6 0E 01             MVI      C,1                 ;
     16E8 1E 00             MVI      E,00                ;DIGIT MOTOR
     16EA 21 03 08          LXI      H,803H              ;RE TRIES
     16ED CD 03 14          CALL     MOVCLS              ;EXIT FROM LOCK TRY
     16F0 3A 38 74          LDA      ERROR               ;
     16F3 B7                ORA      A                   ;
     16F4 C2 FB 16          JNZ      SEKP07
     16F7 F1                POP      PSW
     16F8 C3 E2 16          JMP      SEKP06              ;
                        ;
                        ;
                        ;
     16FB F1            SEKP07:    POP      PSW
     16FC CD 40 18          CALL     SELDRN
                        ;
     16FF CD C5 18      SEKP19:    CALL     POHOME
                        ;
     1702 C0                RNZ
     1703               SEKP10:
     1703 0E 01             MVI      C,01                ;CLOCKWISE 1STEP
     1705 1E 01             MVI      E,01
```

```
1707 21 03 08        LXI     H,803H                  ;BANK MOTOR
170A CD 03 14        CALL    MOVCLS                  ;BANK POSITION IDENTIFICATION
170D 3A 38 74        LDA     ERROR                   ;
1710 B7              ORA     A                       ;
1711 CA 03 17        JZ      SEKP10                  ;
                 ;
                 ;
1714 3A 39 74        LDA     BNKPAT
1717 2E 00           MVI     L,00H
1719 FE 01           CPI     01
171B CA 1F 17        JZ      SEKP12
171E 2C              INR     L
                 ;
                 ;
171F CD C5 18 SEKP12:        CALL    POHOME
1722 C0              RNZ
                 ;
                 ;
                 ;
1723 1E 01           MVI     E,01                    ;
1725 0E FC           MVI     C,-4H                   ;
1727 21 03 08        LXI     H,803H                  ;BANK IS BEING POSITIONED TO EXTREME
172A CD 03 14        CALL    MOVCLS                  ;
172D CD B0 18        CALL    ERRHDR                  ;
1730 C0              RNZ                             ;EXITS ON FATAL ERROR
                 ;
                 ;
1731 0E 05           MVI     C,5H                    ;
1733 C5          SEKP15:     PUSH    B                       ;INDEX STORAGE
1734 3A 3A 74 SEKP20:        LDA     DGTPAT
1737 F5              PUSH    PSW
1738 0E 01           MVI     C,1                     ;CLOCKWISE 1 STEP
173A 1E 00           MVI     E,00                    ;DIGIT MOTOR
173C 21 03 08        LXI     H,803H                  ;RETRIES
173F CD 03 14        CALL    MOVCLS                  ;MOVE DIGIT TO EXTREME..9
1742 3A 38 74        LDA     ERROR                   ;
1745 B7              ORA     A                       ;
1746 C2 4D 17        JNZ     SEKP21                  ;
1749 F1              POP     PSW
174A C3 34 17        JMP     SEKP20
                 ;
                 ;
                 ;
174D F1          SEKP21:     POP     PSW
174E CD 40 18        CALL    SELDRN
1751 CD C5 18 SEKP23:        CALL    POHOME                  ;
                 ;
1754 C2 B3 17        JNZ     SEEK26
1757 0E F7           MVI     C,-9H                   ;CLOCKWISE 9STEPS
1759 1E 00           MVI     E,00                    ;
175B 21 03 08        LXI     H,803H                  ;RE TRIES
175E CD 03 14        CALL    MOVCLS                  ;POSITION TO 0
1761 CD B0 18        CALL    ERRHDR                  ;
1764 C1              POP     B                       ;RESTORE STACK
1765 C0              RNZ                             ;FATAL ERROR  EXIT
1766 00              NOP
1767 00              NOP
1768 00              NOP
1769 00              NOP
                 ;
                 ;
                 ;
                 ;
176A 0D          SEKP22:     DCR     C                       ;
176B CA 87 17        JZ      SEKP30                  ;
176E C5          SEKP25:     PUSH    B                       ;INDEX RESTORE
176F 0E 01           MVI     C,1                     ;CLOCWISE 1 STEP
```

```
1771 1E 01          MVI     E,01                    ;BANK MOTOR
1773 21 03 08       LXI     H,803H                  ;RETRIES
1776 CD 03 14       CALL    MOVCLS                  ;GO  TO NEXT BANK
1779 CD B0 18       CALL    ERRHDR                  ;
177C C1             POP     B                       ;
177D C0             RNZ                             ;FATAL ERROR EXIT
                ;
177E 79             MOV     A,C                     ;
177F FE 03          CPI     03                      ;HOME?
1781 C2 33 17       JNZ     SEKP15                  ;
1784 C3 6A 17       JMP     SEKP22                  ;
                ;
                ;
                ;
1787 0E FE      SEKP30:     MVI     C,-2H           ;COUNTER CLOCKWISE 2 STEPS
1789 1E 01          MVI     E,01                    ;BANK MOTOR
178B 21 03 08       LXI     H,803H                  ;
178E CD 03 14       CALL    MOVCLS                  ;MOVE BANK TO HOME
1791 CD B0 18       CALL    ERRHDR                  ;
1794 C0             RNZ                             ;FATAL ERROR EXIT
                ;
                ;
1795 0E FB          MVI     C,-2H                   ;COUNTER CLOCKWISE 1 STEP
1797 1E 00          MVI     E,00                    ;DIGIT MOTOR
1799 21 03 08       LXI     H,803H                  ;
179C CD 03 14       CALL    MOVCLS                  ;SET DIGIT IN TO LOCK
179F CD B0 18       CALL    ERRHDR                  ;
17A2 C9             RET
                ;
                ;
17A3 C5         DEL6M:      PUSH    B
17A4 06 14          MVI     B,20D
17A6 C3 AC 17       JMP     DELM1
                ;
                ;
                ;
17A9 C5         DEL30M:     PUSH    B
17AA 06 64          MVI     B,100D
17AC CD 55 15   DELM1:      CALL    DEL300
17AF 05             DCR     B
17B0 C2 AC 17       JNZ     DELM1
17B3 C1         SEEK26:     POP     B
17B4 C9             RET
                ;
                ;
                ;
                ;
17B5 01 DC 17   DPTSP:      LXI     B,BASEAD
17B8 21 02 70       LXI     H,PORTB
17BB 7B             MOV     A,E
17BC B7             ORA     A
17BD 7E             MOV     A,M
17BE CA D4 17       JZ      DPTS05
                ;
                ;
17C1 7E             MOV     A,M
17C2 E6 E0          ANI     0E0H
17C4 07             RLC
17C5 07             RLC
17C6 07             RLC
17C7 E5         DPTS10:     PUSH    H
17C8 26 00          MVI     H,00H
17CA 6F             MOV     L,A
17CB 09             DAD     B
17CC 7E             MOV     A,M
17CD E1             POP     H
17CE A6             ANA     M
17CF 77             MOV     M,A
```

```
                     ;  STA      PORTB
     17D0 CD A9 17      CALL     DEL30M
     17D3 C9            RET
                     ;
                     ;
                     ;
     17D4 E6 0E      DPTS05:     ANI      0EH
     17D6 0F            RRC
     17D7 C6 04         ADI      04
     17D9 C3 C7 17      JMP      DPTS10
                     ;
                     ;
                     ;
                     ;
                     ;
     17DC FF         BASEAD:     DB       0FFH
     17DD DF            DB       0DFH
     17DE FF            DB       0FFH
     17DF BF            DB       0BFH
     17E0 EF            DB       0EFH
     17E1 FD            DB       0FDH
     17E2 7F            DB       7FH
     17E3 FB            DB       0FBH
     17E4 FE            DB       0FEH
     17E5 FF            DB       0FFH
     17E6 F7            DB       0F7H
                     ;
                     ;
                     ;
                     ;Procedure DALIGN
                     ;Objective:        this segment makes an attempt to align the digit motors to
                     ;             a legitimate home position.
                     ;
                     ;Level.
                     ;
                     ;DALIGN:
                     ;   MOTOR := DIGIT
                     ;   PHASE := DPHASE1
                     ;   DIRECTION := CW
                     ;   Procedure DPHOME(:ERROR)
                     ;   If ERROR = TRUE then
                     ;                       MOTOR := DIGIT
                     ;                       PHASE := DPHASE1
                     ;                       DIRECTION := CCW
                     ;                       Procedure DPHOME(:ERROR)
                     ;                       If ERROR <>0 then ERROR := TYPE2ERROR
                     ;                                  Procedure DPTSP(DIGIT)
                     ;                                  end.
                     ;                       else MOTOR := BANK
                     ;                            Procedure PTNCHK(:ERROR)
                     ;                            Procedure DPTSP(DIGIT)
                     ;                            If ERROR <> 0 then ERROR := TYPE2ERROR
                     ;                            end
                     ;End.
                     ;
                     ;
                     ;
     17E7 2E 00      DALIGN:     MVI      L,00
     17E9 16 33         MVI      D,33H
     17EB 1E 00         MVI      E,00H
     17ED CD 86 19      CALL     DPHOME
     17F0 CA FF 17      JZ       SEKP11
                     ;
                     ;
                     ;
                     ;
                     ;
```

```
17F3 2E 01    SEKP09:    MVI     L,01
17F5 16 33        MVI    D,33H
17F7 1E 00        MVI    E,00H
17F9 CD 86 19     CALL   DPHOME
17FC C2 0C 18     JNZ    ERSET
              ;
              ;
17FF 1E 01    SEKP11:    MVI     E,01H
1801 CD 2A 19     CALL   PTNCHK
1804 F5           PUSH   PSW
1805 1E 00        MVI    E,00
1807 CD B5 17     CALL   DPTSP
180A F1           POP    PSW
180B C8           RZ                     ;No Error condition
              ;   MVI    A,01
              ;   RET                    ;Type 1 Error set
180C CD B5 17 ERSET:     CALL    DPTSP
180F 3E 02        MVI    A,02            ;Type 2 error set
1811 C9           RET
              ;
              ;
              ;;
              ;Procedure BALIGN
              ;Objective:        this segment makes an attempt to align the bank motors to
              ;                  a legitimate home position.
              ;
              ;Level.
              ;
              ;BALIGN:
              ;    MOTOR := BANK
              ;    PHASE := DPHASE1
              ;    DIRECTION := CW
              ;    Procedure DPHOME(:ERROR)
              ;    If ERROR = TRUE then
              ;                          MOTOR := BANK
              ;                          PHASE := DPHASE1
              ;                          DIRECTION := CCW
              ;                          Procedure DPHOME(:ERROR)
              ;                          If ERROR <>0 then ERROR := TYPE2ERROR
              ;                                            Procedure DPTSP(BANK)
              ;                                            end.
              ;                          else MOTOR := DIGIT
              ;                               Procedure PTNCHK(:ERROR)
              ;                               Procedure DPTSP(BANK)
              ;                               If ERROR <> 0 then ERROR := TYPE2ERROR
              ;                               end
              ;End.
              ;
              ;
              ;
              ;
1812          BALIGN:
1812 2E 00        MVI    L,00
1814 16 33    SEKP17:    MVI     D,33H
1816 1E 01        MVI    E,01H
1818 CD 86 19     CALL   DPHOME
181B C2 31 18     JNZ    SEKP14
181E 1E 00    SEKP13:    MVI     E,00
1820 CD 2A 19     CALL   PTNCHK
1823 F5           PUSH   PSW
1824 1E 01        MVI    E,01
1826 CD B5 17     CALL   DPTSP
1829 F1           POP    PSW
182A C8           RZ                     ;No error condition
              ;   MVI    A,01
              ;   RET                    ;Type 1 error set
              ;
              ;
```

```
182B CD B5 17 BERSET:     CALL    DPTSP
182E 3E 02                MVI     A,02          ;       type 2 error set
1830 C9                   RET
                  ;
                  ;
                  ;
                  ;
1831 2E 01        SEKP14: MVI     L,01
1833 16 33                MVI     D,33H
1835 1E 01                MVI     E,01H
1837 CD 86 19             CALL    DPHOME
183A C2 2B 18             JNZ     BERSET
                  ;
                  ;
183D C3 1E 18             JMP     SEKP13
                  ;
                  ;
                  ;
                  ;
                  ;
                  ;
                  ;
                  ; Accumulator contains the last sucessfully attained
                  ;digit sensor readings
                  ;this sensor reading is compared with the new sensor readings to
                  ;determine the direction of POHOME
                  ;drive
                  ;
                  ;
1840 47           SELDRN: MOV     B,A
1841 3A 00 68             LDA     PORT2A
1844 E6 03                ANI     DGTMSK
1846 2E 00                MVI     L,00
1848 A8                   XRA     B             ;CLEARS CARRY
1849 1F                   RAR
184A D2 4E 18             JNC     SEKP08
184D 2C                   INR     L
184E C9           SEKP08: RET
                  ;
184F 16 88        MOPEN:  MVI     D,088H
1851 79           MOP05:  MOV     A,C
1852 B7                   ORA     A
1853 7A                   MOV     A,D
1854 FA 68 18             JM      MOP01
1857 07                   RLC
1858 0D                   DCR     C
1859 CA 6D 18             JZ      MOP10
185C 57           MOP02:  MOV     D,A
185D E6 0F                ANI     0FH
185F 32 02 70             STA     PORTB
1862 CD A3 17             CALL    DEL6M
1865 C3 51 18             JMP     MOP05
1868 0F           MOP01:  RRC
1869 0C                   INR     C
186A C2 5C 18             JNZ     MOP02
186D CD A9 17     MOP10:  CALL    DEL30M
1870 C9                   RET
                  ;
                  ;
                  ;
                  ;
1871 0E F4        SEKTRP: MVI     C,-12D
1873 CD 4F 18             CALL    MOPEN
1876 0E 0C                MVI     C,12D
1878 CD 4F 18             CALL    MOPEN
187B C9                   RET
                  ;
```

```
187C
                 ;         THIS SEGMENT CONTAINS THE PROCEDURES USED IN STEPPER MOTOR
                 ;         CONTROL OF THE SELECTION AND TRIP MECHANISMS.
                 ;
                 ;
                 ;         PROCEDURE MVTRIP
                 ;
                 ;
                 ;         THIS PROCEDURE MOVES THE DIGIT MOTOR FROM THE LOCKED POSITION
                 ;         TO THE TRIP POSITION OF THE TRIP SHAFT.
                 ;         ON DETECTION OF AN ERROR IN THE PROCEDURE, A FATAL ERROR
                 ;         ROUTINE IS INVOKED . UPON EXIT  FROM THE FATAL ERROR ROUTINE
                 ;         THE ZERO FLAG OF THE PROCESSOR STATUS WORD IS RESET TO ZERO
                 ;         IF A FATAL ERROR HAS OCCURED.THE ACCUMULATOR WILL HAVE THE ERRO;
                 ;
                 ;
187C CD 3F 15 MVTRIP:      CALL    LEDON
187F 21 03 10 MVTR05:      LXI     H,1003H              :# OF RE TRIES
1882 1E 00            MVI     E,00                 ;DIGIT MOTOR SELECTED
1884 0E FE            MVI     C,-2                 ;COUNTER CLOCKWISE 2 STEPS
1886 CD 03 14         CALL    MOVCLS
1889 CD 4A 15         CALL    LEDOFF               ;
188C CD BC 18         CALL    MODLN                ;
188F CD B0 18         CALL    ERRHDR
1892 C4 B5 18         CNZ     EXTERR
1895 C9               RET                          . ;
                 ;
                 ;
                 ;
                 ;
                 ;***********************************************************************
                 ;
                 ;
                 ;   PROCEDURE MVLOCK
                 ;
                 ;
                 ;   THIS PROCEDURE MOVES THE DIGIT MOTOR FROM THE TRIP POSITION TO THE
                 ;   LOCK POSITION OF THE TRIP SHAFT. ON DETECTION OF AN ERROR ,THE FATAL E
                 ;
1896 CD 3F 15 MVLOCK:      CALL    LEDON
1899 21 03 08 MVLO05:      LXI     H,803H               ;RE TRIES
189C 1E 00            MVI     E,00                 ;DIGIT MOTOR
189E 0E 02            MVI     C,2H                 ;CLOCKWISE 2 STEP
18A0 CD 03 14         CALL    MOVCLS               ;
18A3 CD 4A 15         CALL    LEDOFF
18A6 CD BC 18         CALL    MODLN                ;
18A9 CD B0 18         CALL    ERRHDR
18AC C4 B5 18         CNZ     EXTERR               ;
18AF C9               RET
                           ;
                 ;
                 ;
                 ;
                 ;***********************************************************************
                 ;
                                             ;THIS PROCEDURE ASSUMES THAT THE
                 ;
                 ;
                 ;
                 ;***********************************************************************
                 ;
                 ;
                 ;         ERRHDR  ROUTINE
                 ;         THIS ROUTINE IS CALLED ON DETECTION OF AN ERROR IN
                 ;         THE MOTOR MOVE ROUTINES.THE ZERO FLAG AND THE
                 ;         ACCUMULATOR RETURN THE FLAG INDICATION AND ERROR CODE
                 ;
```

```
                       ;
18B0                   ERRHDR:
18B0 3A 38 74 ERRH05:       LDA     ERROR                 ;
18B3 B7                     ORA     A                     ;SETTING FLAGS
18B4 C9                     RET                           ;
                       ;
                       ;
                       ;***********************************************************************
                       ;
                       ;
                       ;EXTERR ROUTINE
                       ;   This segment creates  a BCD coded error code from the
                       ;   error storage location .  Before converting to the BCD pattern
                       ;   30D is added to the error value from motor move routines.
                       ;   this routine is called upon only when an Error is detected by
                       ;   the errhdr routine.
18B5                   EXTERR:
18B5 3A 38 74               LDA     ERROR   ;
18B8 C6 1E                  ADI     30D
18BA 27                     DAA             ;
18BB C9                     RET             ;
                       ;
                       ;
                       ;
                       ;***********************************************************************
                       ;MODLN routine
                       ;
                       ;
                       ;   This routine masks off the bank home position hold and provides
                       ;the digit motor hold pattern to the interface for modulation purpose.
                       ;
18BC                   MODLN:
18BC 3A 02 70               LDA     PORTB
18BF E6 0F                  ANI     0FH
18C1 32 02 70               STA     PORTB
18C4 C9                     RET
                       ;
                       ;
                       ;
                       ;
                       ;THIS ROUTINE PLACES THE MOTOR IN TO THE APPROPRIATE HOME
                       ;POSITION WHEN AN ERROR OCCURS ON SEEK
                       ;THIS ROUTINE MOVES THE MOTORS TWO STEPS AT A TIME
                       ;DEPENDING ON THE SENSOR READINGS THE MOTOR MOVEMENT DIRECTION IS DETERM
                       ;THIS ROUTINE TRANSFORMS THE THE LAST PATTERN OUTPUT FROM DMOVE ROUTINE
                       ;BREGISTER WILL BE LOADED BY THE EXPECTED ENCODER COUNT
                       ;C REGISTER WILL BE LOADED BY THE MOTOR STEP COUNT
                       ;MOTOR STEP COUNT WILL BE DETERMINED BY THE ENCODER READINGS
                       ;BEFORE REACHING THE ERROR CONDITION THE MOTOR WAS BEING DRIVEN IN
                       ;THE CW DIRECTION
                       ;
                       ;
18C5                   POHOME:
18C5 CD 79 19 PLHOME:       CALL    SENSIN
18C8 CA D4 18               JZ      PLH12           ;SENSOR (00)
18CB FE 03                  CPI     03H
18CD CA D9 18               JZ      PLH14           ;SENSOR (00,11)
18D0 CD FD 18               CALL    PH0110          ;SENSOR (01,10)
18D3 C9                     RET
                       ;
                       ;
18D4 16 11    PLH12:        MVI     D,11H
18D6 C3 DB 18               JMP     PLH10           ;check phases/
                       ;
18D9 16 44    PLH14:        MVI     D,44H
18DB CD DF 18 PLH10:        CALL    PH0011          ;
18DE C9                     RET                     ;
```

```
                ;
                ;
                ;Procedure PH0011
                ;Objective: This segments positions the motors to a legitimate home posi
                ;           when the sensor patterns are , to start with , at 00 or 11, (the
                ;           sensors are either both pen or closed)
                ;PH0011:DIRECTION := CW
                ;   MSTEP:=-4
                ;   ECOUNT := -1
                ;   Procedure ENDMOV(NEXTPTN,MOTOR,DIRECTION,MSTEP,ECOUNT:ERROR)
                ;   If ERROR <> 0  then NEXTPTN := RRC(NEXTPTN)
                ;                       NEXTPTN := RRC(NEXTPTN)
                ;                       DIRECTION := CCW
                ;                       MSTEP      :=2
                ;                       ECOUNT:=    1
                ;                       Procedure ENDMOV(NEXTPTN,MOTOR,DIRECTION,MSTEP,
                ;   Procedure PTNCHK(MOTOR:ERROR)                              ECOUNT:ERROR)
                ;   end
                ;End.
                ;
                ;
                ;
18DF            PH0011:
18DF 0E FC         MVI      C,-4H           ;4STEPS CW
18E1 06 FF         MVI      B,-1H
18E3 CD C8 15      CALL     ENDMOV          ;POSITION TO 2STEPS BEFORE HOME
                                            ;1ENCODER STEP AWAY FROM HOME
18E6 3A 38 74      LDA      ERROR
18E9 FE 07         CPI      07H
18EB CA F9 18      JZ       PH05            ;EXIT 1. ERROR FROM TRYING TO MOVE
                                            ;TO MOVE CW (TOWARDS LOCK FROM A
                                            ;SENSOR (00,11) AFTER IDENTIFYING
                                            ;A BLOCK
18EE 7A            MOV      A,D
18EF 0F            RRC
18F0 0F            RRC                      ;MOTOR PATTERN FOR
18F1 57            MOV      D,A
18F2 0E 02         MVI      C,02H
18F4 06 01         MVI      B,01
18F6 CD C8 15      CALL     ENDMOV
                                            ;TWO MSTEPS TOWARDS SENSORS (00,11)
                                            ;IN CCW DIRECTION
18F9 CD 2A 19 PH05:         CALL    PTNCHK
18FC C9            RET
                ;
                ;
                ;
                ;Procedure PH0110
                ;Objective :        This segment positions the motors to a legitimate home
                ;           position wherein there is agreement between the phase applied
                ;           to the motor and the sensor readings observed.  Four single
                ;           step attempts will be made to position the motor to the
                ;           home position.  If a home position is reached before all
                ;           four attempts are completed, an exit will be done from this
                ;           segment.  The error will be flagged by the pattern check segment.
                ;
                ;PH0110:    If DIRECTION = CW then
                ;                            NEXTPTN := RLC (NEXTPTN)
                ;                            NEXTPTN := RLC (NEXTPTN)
                ;                            MSTEP:= -1
                ;                            ECOUNT := -1
                ;           else MSTEP:= 1
                ;                ECOUNT := 1
                ;           For TRIES = 4 to 0 by 1 do
                ;                 Procedure ENDMOV(NEXTPTN,MOTOR,DIRECTION,MSTEP,ECOUNT:ERROR)
                ;                 Procedure PTNCHK(MOTOR:ERROR)
                ;                 If ERROR = TRUE then TRIRES:= TRIES-1
```

```
                   ;                          else end
                   ;              End
                   ;End.
                   ;
                   ;
                   ;
                   ;
     18F2          PH0110:
                   ;
                   ;
     18FD 7D            MOV     A,L              ;SENSOR (01)
     18FE FE 01         CPI     01H
     1900 C2 0D 19      JNZ     PLH57            ;DIRECTION(CW,CCW)
                   ;
                   ;
     1903 7A       PLH52:       MOV     A,D            ;DIGIT SEEKING 00----------
     1904 07            RLC
     1905 07            RLC
     1906 0E FF         MVI     C,-1H
     1908 06 FF         MVI     B,-1H
     190A C3 12 19      JMP     PLH65
                   ;
                   ;
     190D 7A       PLH57:       MOV     A,D
     190E 0E 01         MVI     C,01H
     1910 06 01         MVI     B,01H
     1912 57       PLH65:       MOV     D,A            ;PATTERN IN D REGISTER
     1913 2E 04         MVI     L,04H
     1915 C5       PLH66:       PUSH    B
     1916 CD C8 15 PLH67:       CALL    ENDMOV
     1919 C1       PLH68:       POP     B
     191A CD 2A 19      CALL    PTNCHK
     191D C8            RZ                       ;EXIT 4 .NORMAL EXIT
                                                 ;STILL ERRORS COULD EXIST
                                                 ;DUE TO PTNCHK RESULTS
     191E 7A       PLH70:       MOV     A,D
     191F 2D            DCR     L
     1920 C2 15 19      JNZ     PLH66            ;2 + 2 MOTEPS OVER?
                                                 ;AGAINST A STOP
     1923 3E 09    PLH83:       MVI     A,09H
     1925 32 38 74      STA     ERROR
     1928 B7            ORA     A
     1929 C9            RET                      ;EXIT 6. THERE IS NO 00/11
                                                 ; IN THIE DIRECTION OF MOVEMENT
                   ;
                   ;
                   ;
                   ;
                   ;
                   ;
                   ;
                   ;
                   ;***************************************************************************
                   ;
                   ;
                   ;
                   ;PROCEDURE  PTNCHK( MOTOR:ERROR)
                   ;
                   ;Input (PORTB,MOTPTN)
                   ;   IF MOTOR = BANK then MOTPTN:=MOTPTN.MSNMSK
                   ;                        MOTPTN:= 4*RRC(MOTPTN)
                   ;
                   ;                             IF BNKPAT =( 01,02) THEN ERROR:=8; END.
                   ;                        IF BNKPAT = 00 AND MOTPTN = (08,05) THEN ERROR :=0
                   ;                                                                  END.
                   ;                        IF MOTPTN (02,06) THEN ERROR := 0
                   ;                                          ELSE ERROR:=8
                   ;                                              END.
```

```
                        ;
                        ;
                        ;                                  ENDIF
                        ;        ELSE           MOTPIN:= MOTPIN.LSNMSB
                        ;                  IF DGTPAT =(01,02)THEN ERROR:=8;       END.
                        ;              IF DGTPAT = 0 AND MOTPIN = (08,09) THEN ERROR := 0
                        ;                                                         END.
                        ;              IF MOTPAIN =(02,06) THEN ERROR:=8          ;END.
                        ;END                                                         ELSE ERROR := 8
                        ;                                                         END
                        ;;
                        ;
                        ;
                        ;   E REGISTER  ......        MOTOR(BANK,DIGIT)
                        ;   ERROR   CODE.....         8       FAILURE TO  ARRIVE AT HOME
                        ;
1924 7B          PTNCHK:     MOV     A,E                           ;MOTOR (BANK,DIGIT)
192B B7                      ORA     A                             ;MOTOR
192C 3A 02 70                LDA     PORTB
192F CA 68 19                JZ      PTNC10
                        ;
                        ;
1932 E6 F0                   ANI     0F0H
1934 0F                      RRC
1935 0F                      RRC
1936 0F                      RRC
1937 0F                      RRC
1938 F5                      PUSH    PSW
1939 3A 39 74                LDA     BNKPAT
193C FE 01       PTNC15:     CPI     01
193E CA 71 19                JZ      PTNC20
                        ;
                        ;
                        ;
1941 FE 02                   CPI     02H
1943 CA 71 19                JZ      PTNC20
1946 B7                      ORA     A
1947 CA 5A 19                JZ      PTNC30
                        ;
                        ;
                        ;
194A F1                      POP     PSW
194B FE 02                   CPI     02H
194D CA 55 19                JZ      PTNC40
1950 FE 06                   CPI     06H
1952 C2 72 19                JNZ     PTNC25
                        ;
                        ;
                        ;
1955 AF          PTNC40:     XRA     A
1956 32 38 74                STA     ERROR
1959 C9                      RET
                        ;
                        ;
                        ;
195A F1          PTNC30:     POP     PSW
195B FE 08                   CPI     08H
195D CA 55 19                JZ      PTNC40
1960 FE 09                   CPI     09H
1962 CA 55 19                JZ      PTNC40
1965 C3 72 19                JMP     PTNC25
                        ;
                        ;
                        ;
1968 E6 0F       PTNC10:     ANI     0FH
196A F5                      PUSH    PSW
196B 3A 3A 74                LDA     DGTPAT
```

```
1971 F1         PINC20:    POP     PSW
1972 3E 08      PINC25:    MVI     A,08H           ;ERROR :=8
1974 32 38 74       STA    ERROR
1977 B7             ORA    A                   ;NOT HOME ERROR
1978 C9             RET                        ;EXIT
                ;;
                ;
                ;
1979            SENSIN:
1979 7B             MOV    A,E             ;CHECK MOTOR BANK/DIGIT
197A B7             ORA    A
197B 3A 00 68       LDA    PORT2A
197E CA 83 19       JZ     PLH05           ;MOTOR (BANK,DIGIT)
1981 0F             RRC
1982 0F             RRC
1983 E6 03      PLH05:     ANI     DGTMSK
1985 C9             RET
                ;
                ;
                ;
1986 CD 79 19 DPHOME:      CALL    SENSIN
1989 CA 91 19       JZ     DPH1
198C FE 03          CPI    03H
198E C2 95 19       JNZ    DPH5
1991 CD DF 18 DPH1:        CALL    PH0011
1994 C9             RET
                ;
                ;
                ;
1995 CD FD 18 DPH5:        CALL    PH0110
1998 C9             RET
                ;
                ; (***********************************************************)
                ;
                ; PROCEDURE READ_ENCODERS;
                ;
                ;Objective: Read the encoder status and store the information in ram
                ;           storage and update the terminal count.  Flag errors of
                ;           1.  digit motor moved on a bank motor move
                ;           2.  digit motor moved too fast
                ;           3.  bank motor moved on a digit motor move
                ;           4.  bank motor moved too fast
                ;
                ;Initialisation requirements:
                ;           Initial patterns of bank and digit sensors be stored in the
                ;           respective locations before this module is invoked, during
                ;           power up activities.
                ;Level:
                ;           Calls ENCMOV, DEL300 and DEL75 modules.
                ;           Delay routines are used for adjusting the stepper motor rate.
                ;
                ;
                ;Procedure READENC(DGTPAT,BNKPAT,NUMREAD,MOTOR,ENCCOUNT: ENCCOUNT,ERROR)
                ;Do While (NUMREAD greater than 0 and ERROR  equal to 0
                ;   NUMREAD := NUMREAD - 1
                ;   Input (PORT.SENSOR,SENSPTN)
                ;   SENSPTN1 := SENSPTN
                ;   SENSPTN := SENSPTN.DSNSRMASK
                ;   SENSPTN1 := (SENSPTN.BSNSRMASK)/4
                ;   Case MOTOR = BANK
                ;       If SENSPTN = (DGTPAT) then
                ;                       Procedure ENCMOV(BNKPAT,SENSPTN1:COUNTING)
                ;                       If COUNTING = 2 then
                ;                                   ERROR:= 3
                ;                                   End Case
```

```
                        ;                              If ENCCOUNT greater than 0 then
                        ;                                                  ENCCOUNT:= ENCCOUNT-COUNTINC
                        ;                              else  .             ENCCOUNT:= ENCCOUNT+COUNTINC
                        ;               else           ERROR:= 1           ;DIGIT ON BANK
                        ;               End If
                        ;
                        ;           MOTOR = DIGIT
                        ;               If SENSPIN1 = BNKPAT then
                        ;                              Procedure ENCMOV(DGIPAT,SENSPIN:COUNTINC)
                        ;                              If COUNTINC = 2 then
                        ;                                                  ERROR = 4
                        ;                                                  End Case
                        ;                              If ENCCOUNT greater than 0 then
                        ;                                                  ENCCOUNT=ENCCOUNT-COUNTINC
                        ;                              else                ENCCOUNT=ENCCOUNT+COUNTINC
                        ;               else           ERROR:= 2
                        ;               End If
                        ;           End Case
                        ;End Do
                        ;BNKPAT := SENSPIN1
                        ;DGIPAT := SENSPIN
                        ;End RENC.
                        ;
                        ;
                        ;
                        ; PARAM VAR (*C-REG*) COUNT : BYTE;
                        ;   (*E-REG*) MOTOR : MOTORS;
                        ;   (*L-REG*) NUM_READS : BYTE;
                        ;
                        ; VAR       (*A-REG*) COUNT_INC : BYTE;
                        ;   (*B-REG*) NEW_BANK_PAT : ENCODER_PATTERNS;
                        ;   (*D-REG*) NEW_DIGIT_PAT : ENCODER_PATTERNS;
                        ;
0001                    ERRR1       EQU     01H
0002                    ERROR2      EQU     02H
0003                    ERROR3      EQU     03H
0004                    ERROR4      EQU     04H
                        RENC:                           ; BEGIN
1999
1999 7D                 RENC05:     MOV     A,L         ; WHILE (NUM_READS > 0) AND (ERROR = NO_ERRORS) DO
199A B7                     ORA     A
199B C8                     RZ
199C 3A 38 74               LDA     ERROR
199F B7                     ORA     A
19A0 C0                     RNZ
                                                ;     BEGIN
19A1 2D                     DCR     L           ;     NUM_READS := NUM_READS - 1;
19A2 3A 00 68               LDA     PORT2AD ;     NEW_BANK_PAT := (PORTA AND 0CH) ROR 2;
19A5 E6 0C                  ANI     BNKMSK
19A7 0F                     RRC
19A8 0F                     RRC
19A9 47                     MOV     B,A
19AA 3A 00 68               LDA     PORT2AD ;     NEW_DIGIT_PAT := PORTA AND 03H;
19AD E6 03                  ANI     DGTMSK
19AF 57                     MOV     D,A
19B0 7B                     MOV     A,E         ;     CASE MOTOR OF
19B1 B7                     ORA     A
19B2 CA E6 19               JZ      RENC20
19B5 3A 3A 74               LDA     DGTPAT  ;         BANK:  IF NEW_DIGIT_PAT <> DIGIT_PAT THEN
19B8 BA                     CMP     D
19B9 CA C4 19               JZ      RENC10
19BC 3E 01                  MVI     A,ERRR1 ;                     ERROR := DIG_ON_BANK
19BE 32 38 74               STA     ERROR
19C1 C3 14 1A               JMP     RENC35
                        RENC10:                 ;                        ELSE
                                                ;                     BEGIN
19C4 C5                     PUSH    B           ;                     COUNT_INC := ENCODER_
```

```
19C5 3A 39 74        LDA    BNKPAT  ;                 MOVE (NEW_BANK_PAT, BANK_PAT);
19C8 4F              MOV    C,A
19C9 D5              PUSH   D
19CA 5B              MOV    E,B
19CB E5              PUSH   H
19CC CD AB 15        CALL   ENCMOV
19CF E1              POP    H
19D0 D1              POP    D
19D1 C1              POP    B
19D2 FE 02           CPI    2.      ;             IF COUNT_INC = 2 THEN
19D4 C2 DF 19        JNZ    RENC15
19D7 3E 03           MVI    A,ERROR3          ;                 ERROR := BANK_TOO_FAST
19D9 32 38 74        STA    ERROR
19DC C3 14 1A        JMP    RENC35
19DF 2F      RENC15: CMA                      ;              ELSE COUNT := COUNT - COUNT_INC
19E0 3C              INR    A
19E1 81              ADD    C
19E2 4F              MOV    C,A
19E3 C3 14 1A        JMP    RENC35
                                    ;             END;
19E6 3A 39 74 RENC20: LDA   BNKPAT  ;         DIGIT: IF NEW_BANK_PAT <> BANK_PAT THEN
19E9 B8              CMP    B
19EA CA F5 19        JZ     RENC25
19ED 3E 02           MVI    A,ERROR2          ;               ERROR := BANK_ON_DIG
                                          ;NOTE .ERROR CODE MASKED FOR DEMO.........
19EF 32 38 74        STA    ERROR
19F2 C3 14 1A        JMP    RENC35
             RENC25:                      ;          ELSE
                                    ;             BEGIN
19F5 C5              PUSH   B       ;             COUNT_INC := ENCODER_
19F6 3A 3A 74        LDA    DGTPAT  ;                 MOVE (NEW_DIGIT_PAT, DIGIT_PAT);
19F9 4F              MOV    C,A
19FA D5              PUSH   D
19FB 5A              MOV    E,D
19FC E5              PUSH   H
19FD CD AB 15        CALL   ENCMOV
1A00 E1              POP    H
1A01 D1              POP    D
1A02 C1              POP    B
1A03 FE 02           CPI    2.      ;             IF COUNT_INC = 2 THEN
1A05 C2 10 1A        JNZ    RENC30
1A08 3E 04           MVI    A,ERROR4;                ERROR := DIG_TOO_FAST
1A0A 32 38 74        STA    ERROR
1A0D C3 14 1A        JMP    RENC35
1A10 2F      RENC30: CMA                      ;              ELSE COUNT := COUNT - COUNT_INC
1A11 3C              INR    A
1A12 81              ADD    C
1A13 4F              MOV    C,A
                                    ;             END;
             RENC35:                      ;   END;
1A14 78              MOV    A,B     ;     BANK_PAT := NEW_BANK_PAT;
1A15 32 39 74        STA    BNKPAT
1A18 7A              MOV    A,D     ;     DIGIT_PAT := NEW_DIGIT_PAT;
1A19 32 3A 74        STA    DGTPAT
1A1C CD 55 15        CALL   DEL300  ;     DELAY (375)
1A1F CD 64 15        CALL   DEL75
1A22 C3 99 19        JMP    RENC05  ;     END
                                    ; END;
             ;
             ; (*****************************************************************)
             ;
             ; PROCEDURE SET_CLOSED;
             ;
             ;
             ; VAR      (*C-REG*) CUR_BANK_VAL : BYTE;
             ;   (*E-REG*) INDEX : PRINT_BANKS;
             ;
```

```
1A25                MVPOST:
1A25 CD 3F 15 SETCLS:    CALL    LEDON
1A28 CD 38 1A        CALL    CHPOST
1A2B CD 4A 15        CALL    LEDOFF
1A2E CD BC 18        CALL    MODLN
1A31 CD B0 18        CALL    ERRHDR
1A34 C4 B5 18        CNZ     EXTERR
1A37 C9              RET
                ;
                ;
                ;Procedure MOVPOST
                ;Objective
                ;    sets the print wheels to a new postage value upon execution.
                ;    updates the postage value upon a sucessfull completion of a
                ;    new setting.
                ;Level
                ;   Calls GNIB, MOVCLS, ERRHDR
                ;Note:      What action is to be taken up on detection of an error is
                ;   determined solely by the invoking routine.
                ;
                ;INDEX1 := 0
                ;Do while INDEX1 <> 4
                ;   VALUE1 := GNIB(POSVAL,INDEX1:VALUE)
                ;   VALUE2 := GNIB(POSREQ,INDEX1:VALUE)
                ;   If VALUE1 = VALUE2 then INDEX1 := INDEX1+1; Continue Do
                ;   MOTOR := DIGIT
                ;   DIRECTION := CCW
                ;   RETRIES := 3
                ;   MCOUNT := 2
                ;   SPEED := 8 .................... CORRESPONDING TO 160 STEPS/SEC
                ;   Procedure MOVCLS( MOTOR,DIRECTION,MCOUNT,RETRIES,SPEED: ERROR)
                ;   Procedure ERRHDR( ERRORFLAG )
                ;   If ERRORFLAG = 0 then CURBNKVAL := 0
                ;                         BNKVAL(HOM) := 0
                ;                         INDEX := 0
                ;                         Do while INDEX <> 4
                ;                                   DELTA :=(GNIB (POSREQ,INDEX:VALUE)-
                ;                                            GNIB (POSVAL,INDEX:VALUE))
                ;                                   If DELTA <> 0 then
                ;                                        If INDEX >= 2 then
                ;                                            INDEX2:= INDEX - 1
                ;                                        else INDEX2:= INDEX-2
                ;                                        INDEX2 := COMPLMNT(INDEX2)
                ;                                        BNKVALINDEX := INDEX2 + 1
                ;                                        MOTOR := BANK
                ;                                        MCOUNT := BNKVALINDEX - CURBNKVA
                ;                                        RETRIES := 3
                ;                                        SPEED := 08
                ;                                        Procedure MOVCLS(MOTOR,MCOUNT,-
                ;                                                  -RETRIES,SPEED:ERROR)
                ;                                        Procedure ERRHDR(ERRFLAG)
                ;                                        If ERRFLAG = 0 then
                ;                                                   MOTOR := DIGIT
                ;                                                   RETRIES := 3
                ;                                                   MCOUNT := DELTA
                ;                                                   SPEED := 08
                ;                                                   Procedure MOVCLS
                ;                                                           (MOTOR,RETRIES,
                ;                                                           MCOUNT,SPEED:ERROR)
                ;                                                   ProcedureERRHDR(ERRFLAG))
                ;                                                   If ERRFLAG<>0 then End
                ;                                                   end if
                ;                                        end if
                ;                                   else INDEX := INDEX + 1
                ;
                ;                              End do
                ;                              MOTOR := BANK
```

```
                 ;                            RETRIES := 3
                 ;                            SPEED := 08
                 ;                            MCOUNT := BNKVALHOM - CURMBNKVAL
                 ;                            Procedure MOVCLS (MOTOR,SPEED,RETRIES,
                 ;                                      MCOUNT:ERROR)
                 ;                            Procedure ERRHDR(ERRFLAG)
                 ;                            If ERRFLAG = 0 then
                 ;                                  RETRIES := 3
                 ;                                  MOTOR := DIGIT
                 ;                                  MCOUNT := 2
                 ;                                  SPEED := 08
                 ;                                  Procedure MOVCLS(
                 ;                                     MOTOR,MCOUNT,
                 ;                                     SPEED,RETRIES:ERROR)
                 ;                                  Procedure ERRHDR(EFLAG)
                 ;                                  If ERRFLAG = 0 then
                 ;                                        For Z=1 to 4 by 1
                 ;                                           POSTVAL(Z)
                 ;                                            := POSREQ(Z)
                 ;                                           Z:= Z + 1
                 ;                                        end for
                 ;                                  end if
                 ;                        end
                 ;   end
                 ;End movpost
7421             PREG        EQU     7421H          ;POSTAGE VALUE LOCATION
7460             TWORK1      EQU     7460H          ;
7466             POSREQ      EQU     7466H          ;WORK1+((16-NBANKS)/2))
7421             POSVAL      EQU     PREG
                 ;
                 ;
                 ;
                 ;
                             ;
1A38 1E 00       CHPOST:     MVI     E,00.   ; IF POST_REQ = POST_VAL THEN RETURN;
1A3A 21 21 74    SETC05:     LXI     H,POSVAL
1A3D CD DB 1A        CALL    GNIB                   ;
1A40 47              MOV     B,A                    ;
1A41 21 66 74        LXI     H,POSREQ               ;
1A44 CD DB 1A        CALL    GNIB                           ;
1A47 90              SUB     B                      ;
1A48 C2 54 1A        JNZ     SETC10                 ;
1A4B 7B              MOV     A,E                    ;
1A4C 3C              INR     A                      ;
1A4D FE 04           CPI     04                     ;ALL BANKS CHECKED?
1A4F C8              RZ                             ;EXIT
1A50 5F              MOV     E,A                    ;
1A51 C3 3A 1A        JMP     SETC05                 ;
                 ;
                 ;
1A54 0E 02       SETC10:     MVI     C,+2    ; MOVE_CLOSED (DIGIT_TRIES, DIGIT,
1A56 1E 00           MVI     E,00H   ;          DIGIT_VALUE (SET) - DIGIT_VALUE (LOCK));
1A58 21 03 08        LXI     H,803H
1A5B CD 03 14        CALL    MOVCLS
1A5E CD B0 18        CALL    ERRHDR          ;ERROR PROCESSING
1A61 C0              RNZ                     ;FATAL ERROR EXIT
1A62 4F              MOV     C,A     ; CUR_BANK_VAL := BANK_VALUE (HOME);
1A63 57              MOV     D,A     ; FOR INDEX := PENNIES TO TEN_DOLLARS DO
1A64 5F          SETC15:     MOV     E,A
1A65 21 21 74        LXI     H,POSVAL;    IF POST_REQ [INDEX] <> POST_VAL [INDEX] THEN
1A68 CD DB 1A        CALL    GNIB
1A6B 47              MOV     B,A
1A6C 21 66 74        LXI     H,POSREQ                       ;
1A6F CD DB 1A        CALL    GNIB                                   ;
1A72 90              SUB     B
1A73 CA A5 1A        JZ      SETC25
1A76 F5              PUSH    PSW     ;       BEGIN
```

```
1A77 7B             MOV     A,E     ;        MOVE_CLOSED (BANK_TRIES, BANK,
1A78 FE 02          CPI     02H     ;                BANK_VALUE (INDEX) - CUR_BANK_VAL;
1A7A D2 7E 1A       JNC     SETC20
1A7D 3D             DCR     A
1A7E 3D        SETC20:      DCR     A
               ;   CMA
               ;   INR      A
1A7F F5             PUSH    PSW
1A80 91             SUB     C
1A81 4F             MOV     C,A
1A82 D5             PUSH    D
1A83 1E 01          MVI     E,01H
1A85 21 03 08       LXI     H,803H
1A88 CD 03 14       CALL    MOVCLS
1A8B D1             POP     D
1A8C F1             POP     PSW     ;        CUR_BANK_VAL := BANK_VALUE (INDEX);
1A8D 4F             MOV     C,A
1A8E F1             POP     PSW
1A8F 6F             MOV     L,A
1A90 CD B0 18       CALL    ERRHDR          ;
1A93 C0             RNZ                     ;FATAL ERROR EXIT
1A94 C5             PUSH    B       ;        MOVE_CLOSED (DIGIT_TRIES, DIGIT,
1A95 4D             MOV     C,L     ;                POST_REQ [INDEX] - POST_VAL [INDEX];
1A96 D5             PUSH    D
1A97 1E 00          MVI     E,00H
1A99 21 03 08       LXI     H,803H
1A9C CD 03 14       CALL    MOVCLS
1A9F D1             POP     D
1AA0 C1             POP     B
1AA1 CD B0 18       CALL    ERRHDR          ;
1AA4 C0             RNZ                     ;FATAL ERROR EXIT
                                    ;        END;
1AA5 7B        SETC25:      MOV     A,E
1AA6 3C             INR     A
1AA7 FE 04          CPI     04H
1AA9 DA 64 1A       JC      SETC15
1AAC 79             MOV     A,C     ; MOVE_CLOSED (BANK_TRIES, BANK, BANK_VALUE (HOME)
1AAD 2F             CMA             ;                - CUR_BANK_VAL;
1AAE 3C             INR     A
1AAF 4F             MOV     C,A
1AB0 1E 01          MVI     E,01
1AB2 21 03 08       LXI     H,803H
1AB5 CD 03 14       CALL    MOVCLS
1AB8 CD B0 18       CALL    ERRHDR                          ;
1ABB C0             RNZ                                     ;FATAL ERROR EXIT
1ABC 0E FE          MVI     C,-2.   ; MOVE_CLOSED (DIGIT_TRIES, DIGIT, DIGIT_VALUE (LOCK)
1ABE 1E 00          MVI     E,00H   ;                - DIGIT_VALUE (SET));
1AC0 21 03 08       LXI     H,803H
1AC3 CD 03 14       CALL    MOVCLS
1AC6 CD B0 18       CALL    ERRHDR              ;
1AC9 C0             RNZ                     ;FATAL ERROR
1ACA 0E 02          MVI     C,2.    ; FOR INDEX := PENNIES TO TEN_DOLLARS DO
1ACC 11 66 74       LXI     D,POSREQ;     POST_VAL [INDEX] := POST_REQ [INDEX]
1ACF 21 21 74       LXI     H,POSVAL
1AD2 1A        SETC30:      LDAX    D
1AD3 77             MOV     M,A
1AD4 13             INX     D
1AD5 23             INX     H
1AD6 0D             DCR     C
1AD7 C2 D2 1A       JNZ     SETC30
1ADA C9             RET             ; END;
               ;
               ;
               ;
               ;
               ;
               ;GETNIB ROUTINE
```

```
9484                 ;HLREGISTER HAS THE BASE ADDRESS:E REGISTER HAS THE BANK INDEX
9485                 ;RETURNS THE INDEXED NIBBLE IN ACCUMULATOR
9486                 ;
9487                 ;
9488 1ADB D5         GNIB:      PUSH    D                   ;SAVE REGISTER DE
9489 1ADC AF              XRA   A                 ;SET CY = 0
9490 1ADD 57              MOV   D,A                         ;SETTING FOR DAD OPERATION
9491 1ADE 7B              MOV   A,E                         ;
9492 1ADF 1F              RAR                               ;DIVIDE BY 2
9493 1AE0 5F              MOV   E,A                         ;
9494 1AE1 19              DAD   D                           ;ADDRESS GENERATION
9495 1AE2 D1              POP   D                           ;
9496 1AE3 7B              MOV   A,E                         ;MSB/LSB SELECTION
9497 1AE4 E6 01           ANI   01H                         ;00,02,04ETC  &01,03,05....
9498 1AE6 3E 0F           MVI   A,0FH                       ;MASK FOR LSB
9499 1AE8 C2 F3 1A        JNZ   GNI10                       ;
9500                 ;
9501                 ;
9502 1AEB 3E F0           MVI   A,0F0H                      ;MASK FOR MSB SELECTION
9503 1AED A6              ANA   M                           ;
9504 1AEE 0F              RRC                               ;
9505 1AEF 0F              RRC                               ;
9506 1AF0 0F              RRC                               ;
9507 1AF1 0F              RRC                               ;
9508 1AF2 C9              RET                               ;
9509                 ;
9510                 ;
9511 1AF3 A6         GNI10:     ANA     M                           ;
9512 1AF4 C9              RET                               ;
9513                 ;
9514                 ;
9515                 ;
9516 1AF5
9517                 ;
9518 1AF5                 END
M85 assembly errors =     0
```

CROSS REFERENCE

| LABEL | VALUE | REFERENCE |
|---|---|---|
| ACCFMT | 008F | -375 7167 |
| ACCOD1 | 131B | -7105 7120 |
| ACCOD2 | 132A | 7110 -7116 |
| ACCOD3 | 1330 | 7115 -7121 |
| ACCOD4 | 1340 | 7132 -7134 |
| ACCOD5 | 135A | 7160 -7166 |
| ACCODE | 12EE | 3274 -7042 |
| AMTBUF | 00E0 | -254 3107 4568 4756 4773 7274 7327 7401 7415 7435 |
| ASCCRC | 0040 | -101 2796 3845 4146 |
| ASCFMT | 0080 | -376 2605 |
| ASCREG | 0038 | -96 2451 2605 2778 2789 3839 4143 |
| ASCSIZ | 0008 | -360 2451 2454 2473 2484 2484 2607 2775 2778 2789 3822 3839 4143 |
| BADCRC | 0000 | -410 2427 4238 6754 |
| BADCYC | 0004 | -414 2881 2927 4292 |
| BADRAM | 000A | -421 1111 |
| BADSW | 0011 | -397 |
| BALIGN | 1812 | 8312 8329 -8651 |
| BARF | 0017 | -399 3240 |
| BASES | 1673 | 8218 -8231 |
| BASEAD | 17DC | 8510 -8547 |
| BCDC | 000F | -7553 7578 |
| BCDS | 000C | -7552 7576 |
| BERSET | 182B | -8668 8679 |

```
BINOC1    1364        -7191  7206
BINOC2    1366        -7194  7202
BINOCT    135D        -7183
BKL50     153C         7790 -7805
BKLASH    151B         7721 -7786
BLKTMR    0050         -136   699
BNKMSK    000C        -7556  9193
BNKPAT    7439         -210  7729  7885  8401  9036  9213  9233  9265
BODC      0003        -7551  7574
BODO      0000        -7550  7572
BUFOVR    0012         -398  3685
CDBUF     0316        -1435  1781  1839
CDBUF1    0320         1414 -1443
CDBUFC    0306        -1409  1777  1799  1870
CDBUFD    030F        -1424
CHPOST    1A38         9284 -9303
CHRBKT    0058         -156   573  1553  5484
CLKD01    0046          531  -539
CLKD02    0049          538  -543
CLKDEC    0040         -530   654
CLKDGT    0043         -537   634
CLRBLK    0E85         1234  3381  4081  4120  4660  4944  4973 -5252
                       7045
CMDBUF    00F0         -259  3113  4539  7359
CMDDSB    05CD        -2272  3358
CMDENB    05F3        -2317  3356
CMPAR1    0E93        -5283  5306
CMPAR2    0EA9         5285  5298 -5307
CMPARE    0E8E         3799  4189  4210  4678 -5277
CONFIG    062C        -2383  2583
CONSU1    0647         2415 -2425
CONSU2    064C         2424 -2431
CONSUM    063A        -2410  2565  4164  7049
CRC       0EB1         1282  2487  2792  2815  3842  3850  4227 -5334
                       7126  7236  7446
CRC1      0EB8        -5341  5350
CRCNI1    0ECD        -5379  5394
CRCNI2    0ED6         5388 -5390
CRCNIB    0EC6         5345 -5367  6295  6737  6985
CSMFMT    0080         -377  2607
CSTEP0    1660         8207 -8213
CTLBKT    0056         -151   574  1503  3543  5485
CTLCRC    0010          -31  2422  3837
CTLREG    7000         -324   899   961  1087
CTLSU1    065B         2462 -2465
CTLSUM    064E         2412 -2449  3833
CURBKT    005A         -161  1550  1967
DALIGN    17E7         8296  8322  8345 -8590
DATA1     6800         -325   330  4288
DBCTR     005C         -166   565  1190
DBLAN1    0EEF        -5433  5462
DBLAN2    0EEF        -5434  5438
DBLANK    0EDE         1063  1494  1962  2922 -5411  6147
DBLH01    068D        -2531  3386
DBLH02    06A6         2518 -2551
DBLH03    0605         2564 -2576
DBLH04    06E2         2516 -2598
DBLH05    06E3         2521  2532  2537  2554  2559  2568  2578 -2601
DBLHDR    0671        -2512  3390
DBOUN1    005D          568  -575
DBOUNC    0040         -562   733
DBUF      0080         -219  1412  1437  1442  1653  1719  1803  1803
                       1879  1904  1910  1933  2050  2056  2168  2182
                       2186  2217  3642  5039  5050  5075  5087
DBVAL     0002         -342   580
DECAD1    06FE        -2633  2654
DECADD    06F8         2476 -2624  2781  2829  7420
```

| | | |
|---|---|---|
| DECCOM | 070C | 2636 -2675 2736 |
| DECERR | 0720 | 2629 -2704 2729 |
| DECSU1 | 0731 | -2733 2757 |
| DECSUB | 072B | -2724 2804 |
| DEFDCM | 006C | -201 1164 3906 |
| DEL1 | 1567 | -7855 7856 |
| DEL300 | 1555 | -7843 8500 9268 |
| DEL30M | 17A9 | 7801 7804 7876 8201 8204 8310 8340 -8498 8532 8726 |
| DEL6M | 17A3 | -8492 8721 |
| DEL75 | 1564 | 7845 7846 7847 7848 -7853 7867 9269 |
| DELM1 | 17AC | 8494 -8500 8502 |
| DFLUSH | 0EF6 | 737 5417 -5454 |
| DGTMSK | 0003 | -7555 7616 7870 7872 7879 7884 8700 9094 9198 |
| DGTPAT | 743A | -211 7734 7880 8371 8423 9074 9203 9244 9267 |
| DIAFMT | 005F | -378 2604 |
| DIEDCM | 006A | -196 1161 3910 4790 4867 4936 7326 |
| DIMAGE | 0000 | -265 776 1462 1633 1649 1688 1847 1849 1850 2179 2243 |
| DISAB1 | 05D5 | 2276 -2282 |
| DISAB2 | 05EF | 2292 -2300 |
| DISABL | 05D3 | -2278 4182 |
| DISP01 | 0072 | 607 -609 |
| DISP02 | 0072 | 605 -610 |
| DISP03 | 007D | -620 658 |
| DISP04 | 007F | -623 642 |
| DISPLY | 0062 | -596 738 |
| DOACCT | 0744 | 1018 -2773 2964 |
| DOSTAT | 0778 | -2850 3509 |
| DOTR01 | 07D9 | -2973 2983 |
| DOTR02 | 07ED | 2978 -2994 |
| DOTR03 | 07F7 | -3008 3018 |
| DOTR04 | 080D | 3013 -3030 |
| DOTR05 | 080F | 3026 -3036 |
| DOTR06 | 0811 | -3040 3310 |
| DOTRIP | 07A5 | -2921 3220 3584 |
| DPH1 | 1991 | 9100 -9103 |
| DPH5 | 1995 | 9102 -9108 |
| DPHOME | 1986 | 8593 8603 8655 8678 -9099 |
| DPTS05 | 17D4 | 8515 -8537 |
| DPTS10 | 17C7 | -8523 8540 |
| DPTSP | 17B5 | -8510 8611 8616 8661 8668 |
| DSBKBD | 0F02 | 3370 -5476 |
| DSCCRC | 0036 | -91 1286 2819 3854 4156 7240 7450 |
| DSCFMT | 0070 | -379 2606 |
| DSCRID | 002F | -86 1274 2466 2471 2606 2801 2812 3847 4153 4206 7071 7231 7416 7434 |
| DSCSIZ | 0007 | -341 1274 2471 2473 2798 2801 2812 3822 3847 4089 4123 4153 4209 4556 7230 7416 7417 7417 7435 7436 |
| DSPCHR | 0008 | -349 1884 1891 2239 |
| DSPTMR | 0052 | -141 704 1515 1544 1853 2254 |
| DSPVAL | 0007 | -343 1543 1852 2253 |
| EJEC | 0000 | -473 |
| ENABL1 | 05FC | 2321 -2327 |
| ENABL2 | 0627 | 2355 -2362 |
| ENABL3 | 0627 | 2342 -2363 |
| ENABL4 | 0627 | 2337 -2364 |
| ENABLE | 05F9 | -2323 4196 |
| ENAKBD | 0F14 | 3368 -5500 |
| ENCMOV | 15AB | -7913 9218 9249 |
| ENCT | 15B8 | 7921 -7925 |
| ENDENT | 0819 | -3062 3378 |
| ENDM05 | 15CC | -7971 8024 |
| ENDM20 | 15E0 | 7974 -7987 |

| | | | | | | | | | |
|---|---|---|---|---|---|---|---|---|---|
| ENDM25 | 15EB | 7984 | -7995 | | | | | | |
| ENDM30 | 15F9 | 7999 | -8006 | | | | | | |
| ENDM35 | 15FB | 8003 | -8010 | | | | | | |
| ENDM40 | 160F | -8027 | | | | | | | |
| ENDMOV | 15C8 | -7969 | 8898 | 8912 | 8969 | | | | |
| ENTAMT | 082E | -3106 | 3464 | | | | | | |
| ENTCM1 | 0839 | 3110 | -3116 | | | | | | |
| ENTCMB | 0835 | -3112 | 3468 | | | | | | |
| ENTSER | 0848 | -3146 | 3360 | | | | | | |
| EREXIT | 165A | 8195 | -8208 | | | | | | |
| ERRCNT | 0016 | -51 | 3254 | 3831 | | | | | |
| ERRCOD | 0014 | -46 | 3246 | 3829 | | | | | |
| ERRHOS | 18B0 | -8808 | | | | | | | |
| ERRHDR | 18B0 | 8072 | 8417 | 8446 | 8464 | 8479 | 8487 | 8762 | 8785 |
| | | -8807 | 9287 | 9404 | 9436 | 9446 | 9460 | 9466 | |
| ERROR | 7438 | -209 | 7567 | 7591 | 7679 | 7723 | 7741 | 7748 | 7895 |
| | | 7970 | 8043 | 8209 | 8377 | 8396 | 8429 | 8808 | 8823 |
| | | 8900 | 8980 | 9058 | 9080 | 9187 | 9207 | 9225 | 9238 |
| | | 9256 | | | | | | | |
| ERROR2 | 0002 | -9179 | 9236 | | | | | | |
| ERROR3 | 0003 | -9180 | 9224 | | | | | | |
| ERROR4 | 0004 | -9181 | 9255 | | | | | | |
| ERROR5 | 0005 | -7562 | 7740 | | | | | | |
| ERROR6 | 0006 | -7563 | 7747 | | | | | | |
| ERRR1 | 0001 | -9178 | 9206 | | | | | | |
| ERRST | 0013 | -41 | 2604 | | | | | | |
| ERSET | 180C | 8604 | -8616 | | | | | | |
| EXTERR | 18F5 | 8073 | 8763 | 8786 | -8822 | 9288 | | | |
| EXTSER | 0852 | -3166 | 3362 | | | | | | |
| EXTTRP | 0860 | -3190 | 3364 | | | | | | |
| FATE01 | 089E | 3245 | -3260 | | | | | | |
| FATERR | 0880 | 1041 | 1220 | 1242 | 2706 | 2953 | 2988 | 3002 | -3241 |
| | | 3330 | 3603 | 3698 | 4707 | 6205 | | | |
| FATINT | 087E | 502 | 506 | -3237 | | | | | |
| FATRST | 0003 | -413 | 1270 | 7252 | | | | | |
| FILDI1 | 0327 | -1464 | 1469 | | | | | | |
| FILDIM | 0322 | 1145 | -1459 | 1672 | 1842 | 2159 | | | |
| FILN01 | 0F26 | 5258 | -5527 | | | | | | |
| FILN02 | 0F27 | -5531 | 5541 | | | | | | |
| FILN03 | 0F32 | 5533 | -5542 | | | | | | |
| FILNIB | 0F24 | 1140 | 1212 | 1229 | 1278 | 1326 | 3825 | 4234 | -5524 |
| | | 7232 | | | | | | | |
| FINTR1 | 08AA | -3287 | 3291 | | | | | | |
| FINTR2 | 08B3 | -3295 | 3306 | | | | | | |
| FINTR3 | 08BF | 3301 | -3309 | | | | | | |
| FINTR4 | 08D0 | 3022 | -3327 | | | | | | |
| FINTRP | 08A0 | 1026 | 2991 | -3276 | | | | | |
| FIXSED | 0000 | -21 | 351 | 1136 | 1136 | | | | |
| GETN01 | 0F3D | -5574 | | | | | | | |
| GETN02 | 0F45 | 5578 | -5584 | | | | | | |
| GETNIB | 0F35 | 1654 | 1806 | 1905 | 2169 | 2174 | 2223 | 2679 | 2689 |
| | | 3122 | 3661 | 3890 | 3899 | 4085 | 4651 | 4667 | 4757 |
| | | 4762 | 4806 | 4858 | 4917 | 4957 | 5288 | 5294 | 5342 |
| | | -5563 | 5816 | 6127 | 6931 | 7087 | 7106 | | |
| GNI10 | 1AF3 | 9499 | -9511 | | | | | | |
| GNIB | 1ADB | 9385 | 9388 | 9410 | 9413 | -9488 | | | |
| HACODE | 0090 | -486 | 7167 | | | | | | |
| HAREG | 0082 | -477 | 2605 | | | | | | |
| HCLRSV | 0047 | -436 | 3361 | | | | | | |
| HCONFG | 00AB | -487 | 2389 | | | | | | |
| HCSUM | 0084 | -479 | 2607 | | | | | | |
| HDIAGS | 008D | -484 | 2604 | | | | | | |
| HDISAB | 0042 | -433 | 1427 | 3357 | 3410 | | | | |
| HDISKB | 0063 | -439 | 3369 | | | | | | |
| HDLOCK | 008A | -481 | 2602 | | | | | | |
| HDREG | 0083 | -478 | 2606 | | | | | | |
| HDR001 | 091C | 3371 | -3393 | | | | | | |

| | | | | | | | | | |
|---|---|---|---|---|---|---|---|---|---|
| HDR002 | 091F | 3352 | -3398 | | | | | | |
| HDR003 | 092D | 3402 | -3407 | | | | | | |
| HDR004 | 093F | 3414 | -3420 | | | | | | |
| HDR005 | 093F | 3411 | -3421 | | | | | | |
| HDRONY | 08D5 | -3349 | 3635 | 5063 | | | | | |
| HDRP01 | 0954 | 3447 | -3452 | | | | | | |
| HDRP02 | 0954 | 3445 | -3453 | | | | | | |
| HDRP03 | 0979 | 3471 | -3485 | | | | | | |
| HDRP04 | 097C | 3460 | -3489 | | | | | | |
| HDRPLS | 0941 | -3439 | 3672 | 5051 | | | | | |
| HDSEEK | 163B | 8069 | -8191 | | | | | | |
| HENABL | 0041 | -432 | 2078 | 3355 | | | | | |
| HENAKB | 0062 | -438 | 3367 | | | | | | |
| HENDEN | 0043 | -434 | 1496 | 3377 | | | | | |
| HENTAM | 00C5 | -444 | 2018 | 3444 | 3463 | | | | |
| HENTCC | 00C6 | -445 | 2017 | 3446 | 3467 | | | | |
| HEXIRP | 004E | -437 | 3363 | | | | | | |
| HHSLIM | 008E | -485 | 2542 | | | | | | |
| HLOPOS | 008B | -482 | 2526 | | | | | | |
| HMTRKC | 008C | -483 | 2603 | | | | | | |
| HPCNT | 0085 | -480 | 2608 | | | | | | |
| HPHAM1 | 0044 | -8046 | 8199 | | | | | | |
| HPHASE | 0088 | -8047 | 8202 | | | | | | |
| HPSET | 0081 | -476 | 2077 | 2198 | 4511 | | | | |
| HREQAC | 0040 | -453 | 1723 | 3373 | | | | | |
| HREQAR | 0052 | -456 | 2032 | 2553 | 3546 | | | | |
| HREQCF | 005B | -460 | 2582 | | | | | | |
| HREQCS | 0054 | -458 | 2563 | | | | | | |
| HREQDL | 0052 | -467 | 2520 | | | | | | |
| HREQDR | 0053 | -457 | 2028 | 2550 | 3555 | | | | |
| HREQDS | 0055 | -470 | 2536 | | | | | | |
| HREQLP | 0053 | -468 | 2525 | | | | | | |
| HREQMN | 0054 | -469 | 2530 | | | | | | |
| HREQPC | 0055 | -459 | 2024 | 2577 | 3564 | | | | |
| HREQPO | 0051 | -455 | 1532 | 3381 | 3525 | 3639 | | | |
| HREQSL | 0056 | -471 | 2541 | | | | | | |
| HREQSN | 005C | -461 | 3385 | | | | | | |
| HREQST | 0050 | -454 | 3365 | | | | | | |
| HSETDA | 00C4 | -443 | 2016 | 2586 | 5044 | | | | |
| HSETMN | 00C0 | -441 | 3473 | | | | | | |
| HSETPO | 00C1 | -442 | 2064 | 3477 | | | | | |
| HSETSV | 0046 | -435 | 1757 | 3359 | | | | | |
| HSTAT | 0080 | -475 | 3991 | | | | | | |
| IDLE | 097E | 1191 | -3503 | 3506 | | | | | |
| IDLE01 | 09A4 | 3523 | -3529 | | | | | | |
| IDLE02 | 09D1 | 3538 | -3572 | | | | | | |
| IDLE03 | 09D1 | 3534 | -3573 | | | | | | |
| IDLE04 | 09E6 | 3580 | -3587 | | | | | | |
| INITSM | 156D | 1134 | -7865 | | | | | | |
| INT75 | 009D | 514 | -673 | | | | | | |
| KDCTRL | 004E | -131 | 598 | 723 | 1487 | 1510 | 1588 | 1621 | 1834 |
| | | 1838 | 2163 | 2210 | 3194 | 3581 | 4018 | 5479 | 5481 |
| | | 5506 | 5508 | | | | | | |
| KDIO | 00A7 | -697 | 1564 | | | | | | |
| KDIO01 | 00B7 | 706 | -708 | | | | | | |
| KDIO02 | 00B7 | 702 | -709 | | | | | | |
| KDIO03 | 00D0 | 721 | -731 | | | | | | |
| KDSKIP | 0002 | -344 | 1565 | | | | | | |
| KEYB01 | 034A | 1489 | 1493 | -1501 | | | | | |
| KEYB02 | 0370 | 1524 | -1530 | | | | | | |
| KEYB03 | 0375 | 1529 | -1536 | | | | | | |
| KEYB04 | 0375 | 1517 | -1537 | | | | | | |
| KEYB05 | 0375 | 1513 | -1538 | | | | | | |
| KEYB06 | 0378 | 1508 | -1540 | | | | | | |
| KEYB07 | 038C | 1547 | -1555 | | | | | | |
| KEYB08 | 038C | 1539 | -1556 | | | | | | |
| KEYB09 | 038C | 1500 | -1557 | | | | | | |

```
KEYBKT    0054      -146   563   736   851  5504
KEYBRD    032D     -1486  3588
KEYINT    4C96      -345  1566
KILCOD    02BE      -326  1126  1168  6179  6186  6912
LEDOFF    154A     -7827  7986  8070  8760  8783  9285
LEDON     153F     -7815  7866  8068  8755  8778  9283
LOKFMT    0040      -380  2602
LOWWRN    001C       -61  2526  4084  4556
LSNMAS    000F     -7961  7981  7987
LSNMSK    000F     -7557  7571  7639  7643  7796  8215  8238
LSTAT1    0F63      5622 -5625
LSTATE    0F4E      1030  1153  1180  1315  1521  1627  1679  2339
                    2513  2873  3072  3531  3728  4528  4627 -5610
                    6174  6422  6777  7242  7316  7391
MANRST    09E9      3083 -3600
MAXINT    7FA1      -346
MEMORY  M 0000         0
MESAG1    0A17      3640 -3655
MESAG2    0A17      3638 -3656
MESAG3    0A1A      3632 -3658
MESAG4    0A2E      3669 -3676
MESAG5    0A31      3675 -3681
MESAG6    0A31      3657 -3682
MESAGE    09EE      3576 -3620
MODD01    03AD      1593 -1599
MODD02    03D8      1637 -1639
MODD03    03E3      1645 -1647
MODD04    03F5      1630 -1664
MODD05    03FC      1668 -1671
MODD06    03FF      1663 -1675
MODD07    03FF      1598 -1676
MODD08    0408      1682 -1684
MODD09    040E     -1690  1702
MODD10    0419      1693 -1699
MODDSP    03A0      1562 -1586
MODLN     18BC      8071  8761  8784 -8837  9286
MOP01     1869      8714 -8723
MOP02     185C     -8718  8725
MOP05     1851     -8711  8722
MOP10     186D      8717 -8726
MOPEN     184F     -8710  8734  8736
MOVB01    0F8A      5654  5672 -5705
MOVB02    0F9A      5716 -5719
MOVB03    0FAB      5726 -5732
MOVBIT    0F68     -5647  5965  7196
MOVC05    1426     -7585  7717
MOVC1     143D     -7599
MOVC10    145E     -7629
MOVC15    145F      7625 -7630  7631
MOVC20    1473      7634 -7643
MOVC25    147E      7642 -7651
MOVC30    148C      7655 -7660
MOVC35    148E      7659 -7664
MOVC4     1407     -7570
MOVC40    14A8      7678 -7692
MOVC42    14CF      7706 -7711
MOVC45    14BC      7694 -7697
MOVC50    14D5      7587  7590  7593 -7722
MOVC55    14ED      7731 -7734
MOVC6     144D      7610 -7616
MOVC60    14F9      7580  7733 -7740
MOVC65    14FF      7736  7738 -7744
MOVC7     1423      7573  7575  7577  7579 -7583
MOVC70    1428     -7721
MOVC8     1456      7598  7618 -7620
MOVCLS    1403     -7565  8376  8395  8416  8429  8445  8463  8478
                    8486  8759  8782  9403  9430  9443  9459  9465
```

| | | |
|---|---|---|
| MRSTS1 | 0048 | -116 1009 1020 1204 1307 1330 1602 2299 2347 2589 2966 3147 3167 3200 3535 3998 4102 4169 4296 4491 4640 5617 6502 6794 |
| MRSTS2 | 004A | -121 354 2862 3243 5614 |
| MSERN1 | 0A6D | 3766 -3794 |
| MSERNO | 0A38 | 3474 -3713 4571 |
| MSG2M1 | 0AC4 | 3904 -3907 |
| MSG2M2 | 0AF2 | 3966 -3971 |
| MSG2M3 | 0AF2 | 3939 -3972 |
| MSG2M4 | 0AF2 | 3921 -3973 |
| MSG2M5 | 0AF2 | 3912 -3974 |
| MSG2MU | 0AAA | -3878 4577 4636 |
| MSNFMT | 007F | -381 2603 |
| MSNMAS | 00F0 | -7960 7977 7991 |
| MSNMSK | 00F0 | -7559 7635 7647 7793 |
| MTRCHR | 0046 | -111 1136 1159 2394 |
| MTRSTS | 0AF4 | 3520 -3990 4261 |
| MULKEY | 0080 | -347 855 5503 |
| MVDD01 | 00F0 | -779 803 |
| MVDD02 | 00FA | 783 -791 |
| MVDDAT | 00DE | 626 646 -760 |
| MVLN01 | 0FB4 | -5761 |
| MVLNIB | 0FB3 | 1913 3129 3647 3770 3783 4093 4127 4591 4716 4779 4853 5001 5079 -5759 7063 7075 7437 |
| MVLO05 | 1899 | -8779 |
| MVLOCK | 1896 | 2997 -8778 |
| MVPOST | 1A25 | 1215 1237 4700 -9282 |
| MVRN01 | 0FC3 | 5773 -5801 5929 |
| MVRN02 | 0FC8 | -5812 5846 |
| MVRN03 | 0FDB | 5827 -5832 |
| MVRN04 | 0FDB | 5823 -5833 |
| MVRN05 | 0FE2 | 5836 -5841 |
| MVRN06 | 0FE7 | 5814 -5847 |
| MVRNIB | 0FC2 | 1938 2455 3930 -5799 |
| MVTR05 | 187F | -8756 |
| MVTRIP | 187C | 2948 -8755 |
| NARG | 0000 | 0 |
| NBANKS | 0004 | -362 383 1208 1208 1225 1322 2775 2778 2798 2801 4123 4126 4188 4562 4587 4588 4635 4674 4674 4677 4712 4715 |
| NDISP | 0002 | -348 349 773 1461 1462 1649 1687 1688 2179 2243 |
| NINCYC | 0018 | -400 2987 |
| NORFLG | 004C | -126 1490 1558 1761 2089 2285 2331 3063 3117 3399 3442 3516 4320 4487 4691 5092 5127 6486 |
| NORSIZ | 0022 | -354 6689 |
| NORSTR | 0028 | -352 353 354 6690 |
| NPAUS1 | 0B1B | -4045 4047 |
| NPAUSE | 0B19 | 1367 2980 3015 3288 3303 -4042 6041 6345 6892 |
| NUMRD1 | 0014 | -7962 8015 |
| NVM30F | 1031 | 1391 -6029 6201 6335 6671 7020 |
| NVM30G | 103E | -6040 6044 |
| NVM30T | 1047 | 1361 -6063 6187 6330 6652 6821 6850 6963 |
| NVMBAD | 0001 | -411 1378 6378 6452 6917 |
| NVMBYT | 1058 | -6088 6305 6461 6748 |
| NVMCH1 | 1077 | 6137 -6140 |
| NVMCHG | 1068 | 2707 3511 -6124 |
| NVMCTL | 0066 | -186 2335 6126 6402 6493 6574 6691 6717 6960 7016 |
| NVMDE1 | 1099 | 1266 -6191 6922 |
| NVMDE2 | 10A0 | 6182 -6200 |
| NVMDED | 1085 | 1117 1381 2428 2985 2931 4239 4293 -6176 6312 6379 6409 6455 6755 6928 7253 |
| NVMDXB | 10A9 | -6222 6667 6824 6852 |

| | | |
|---|---|---|
| NVMER | 10B1 | -6248 6648 6785 6807 |
| NVMER1 | 10D1 | -6288 6302 |
| NVMER2 | 10DF | 6290 -6303 |
| NVMER3 | 10EB | 6309 -6315 |
| NVMER4 | 10EB | 6282 -6316 |
| NVMER5 | 10FE | 6326 -6329 |
| NVMER6 | 1101 | -6331 6375 |
| NVMER7 | 110B | -6344 6348 |
| NVMER8 | 111A | 6355 -6358 |
| NVMERS | 4000 | -329 1363 6319 |
| NVMFN1 | 114E | 6425 -6434 |
| NVMFN2 | 114E | -6435 6465 |
| NVMFND | 112F | -6401 6496 6510 6568 |
| NVMLOD | 116B | 1151 -6485 |
| NVMMAP | 1191 | 6226 6269 6442 -6537 6718 6965 |
| NVMNB1 | 11B9 | 6579 6588 -6599 |
| NVMNBK | 119F | 6250 -6565 6656 6815 6841 |
| NVMNXT | 11BB | 6097 6299 6360 6369 -6617 6742 6994 7008 |
| NVMOPN | 11C4 | 1300 6156 -6639 |
| NVMPRP | 11DF | 6263 -6688 6713 6952 |
| NVMRD | 11EE | 6500 6514 -6711 |
| NVMRD1 | 11FD | -6726 6745 |
| NVMRD2 | 120F | 6728 -6746 |
| NVMRED | 4400 | -328 1126 1168 1336 1372 1375 6179 6274 6447 6722 6884 6912 |
| NVMRET | 0002 | -412 6311 |
| NVMST1 | 1221 | 6780 -6783 |
| NVMST2 | 1232 | 6796 -6799 |
| NVMSTO | 1219 | 1356 3858 -6776 |
| NVMWN | 1261 | 1388 6188 6231 -6875 6970 6989 7005 7012 |
| NVMWN1 | 1274 | -6891 6895 |
| NVMWN2 | 1287 | 6904 -6908 |
| NVMWN3 | 129A | 6910 -6931 |
| NVMWN4 | 129A | 6907 -6932 |
| NVMWR | 129E | 1065 1351 3810 6150 6831 -6950 |
| NVMWR1 | 12B9 | -6975 6997 |
| NVMWR2 | 12CD | 6977 -6998 |
| NVMWR3 | 12E6 | 6962 -7021 |
| NVMWRT | 4800 | -327 6880 |
| OLDSWT | 0068 | -191 |
| PAUTHK | 041F | -1717 2002 |
| PCEFMT | 007F | -382 2608 |
| PCEREG | 0028 | -81 352 2608 2826 3822 |
| PCESIZ | 0007 | -363 2823 2826 3822 |
| PCLRK | 0447 | -1776 1993 |
| PDCMK | 0450 | -1796 1996 |
| PDCMK1 | 0461 | 1810 -1816 |
| PERDSP | 0464 | -1831 3259 4269 |
| PFLAG0 | 0000 | -7554 7583 |
| PH0011 | 18DF | 8871 -8895 9103 |
| PH0110 | 18FD | 8863 -8947 9108 |
| PH05 | 18F9 | 8902 -8915 |
| PHASE1 | 0011 | -7559 7619 |
| PHASE2 | 0044 | -7560 7617 |
| PLH05 | 1982 | 9091 -9094 |
| PLH10 | 18DB | 8868 -8871 |
| PLH12 | 18D4 | 8860 -8867 |
| PLH14 | 18D9 | 8862 -8870 |
| PLH52 | 1903 | -8955 |
| PLH57 | 190D | 8952 -8963 |
| PLH65 | 1912 | 8960 -8966 |
| PLH66 | 1915 | -8968 8977 |
| PLH67 | 1916 | -8969 |
| PLH68 | 1919 | -8970 |
| PLH70 | 191E | -8975 |
| PLH83 | 1923 | -8979 |
| PLHOME | 18C5 | -8859 |
| PNUMK | 048A | -1868 1988 |
| PNUMK1 | 04A5 | 1895 -1899 |

| | | | | | | | | | |
|---|---|---|---|---|---|---|---|---|---|
| POHOME | 18C5 | 8388 | 8408 | 8439 | -8858 | | | | |
| PORT2A | 6800 | -330 | 7570 | 7609 | 7868 | 7877 | 8214 | 8699 | 9090 |
| | | 9192 | 9197 | | | | | | |
| PORTA | 7001 | -331 | 612 | 840 | 1062 | 1092 | 1186 | 2959 | 3042 |
| | | 3278 | 4452 | 5455 | 6033 | 6035 | 6066 | 6068 | 7816 |
| | | 7818 | 7828 | 7830 | | | | | |
| PORTB | 7002 | -332 | 712 | 908 | 963 | 1060 | 7638 | 7646 | 7651 |
| | | 7791 | 7800 | 7803 | 7875 | 7980 | 7990 | 7995 | 8200 |
| | | 8203 | 8309 | 8337 | 8339 | 8511 | 8720 | 8838 | 8840 |
| | | 9026 | | | | | | | |
| PORTBI | 006E | -206 | 209 | 210 | 211 | 711 | 907 | 964 | |
| PORTC | 7003 | -333 | 847 | 4459 | | | | | |
| POSFMT | 0040 | -383 | 4511 | | | | | | |
| POSREG | 0042 | -106 | 1225 | 1322 | 2778 | 2801 | 4123 | 4185 | 4511 |
| | | 4712 | | | | | | | |
| POSREQ | 7466 | -9376 | 9387 | 9412 | 9469 | | | | |
| POSUP1 | 0B85 | 4111 | 4138 | -4205 | | | | | |
| POSUP2 | 0B92 | 4147 | 4157 | -4226 | | | | | |
| POSUPD | 0B23 | 3510 | -4074 | | | | | | |
| POSVAL | 7421 | -9377 | 9384 | 9409 | 9470 | | | | |
| PREG | 7421 | -9374 | 9377 | | | | | | |
| PROERR | 0BA1 | 494 | 496 | 498 | 500 | 504 | 508 | 512 | 1736 |
| | | 1745 | 2547 | 2567 | 3068 | 3192 | 3482 | 3678 | 3715 |
| | | -4260 | 4494 | 4533 | 4542 | 4551 | 4582 | 4625 | 4753 |
| | | 5008 | 7054 | 7287 | 7311 | 7321 | 7371 | 7396 | 7405 |
| | | 7429 | | | | | | | |
| PROKE1 | 04DB | -1974 | 1978 | | | | | | |
| PROKE2 | 04E3 | 1976 | -1979 | | | | | | |
| PROKE3 | 0502 | 1982 | -2012 | | | | | | |
| PROKEY | 04CE | 1554 | -1961 | | | | | | |
| PSETK | 0516 | 1999 | -2048 | | | | | | |
| PSETK1 | 052F | 2052 | -2075 | | | | | | |
| PSETK2 | 0536 | 2054 | -2087 | | | | | | |
| PTNC10 | 196B | 9027 | -9072 | | | | | | |
| PTNC15 | 1930 | -9037 | 9075 | | | | | | |
| PTNC20 | 1971 | 9033 | 9043 | -9078 | | | | | |
| PTNC25 | 1972 | 9053 | 9062 | -9079 | | | | | |
| PTNC30 | 195A | 9045 | -9063 | | | | | | |
| PTNC40 | 1955 | 9051 | -9057 | 9065 | 9067 | | | | |
| PTNCHK | 192A | 8362 | 8365 | 8608 | 8653 | 8915 | 8971 | -9024 | |
| PTR | 0010 | -16 | 21 | -23 | 23 | 26 | -28 | 28 | 31 |
| | | -33 | 33 | 36 | -38 | 38 | 41 | -43 | 43 |
| | | 46 | -48 | 48 | 51 | -53 | 53 | 56 | -58 |
| | | 58 | 61 | -63 | 63 | 66 | -68 | 68 | 71 |
| | | -73 | 73 | 76 | -78 | 78 | 81 | -83 | 83 |
| | | 86 | -88 | 88 | 91 | -93 | 93 | 96 | -98 |
| | | 98 | 101 | -103 | 103 | 106 | -108 | 108 | 111 |
| | | -113 | 113 | 116 | -118 | 118 | 121 | -123 | 123 |
| | | 126 | -128 | 128 | 131 | -133 | 133 | 136 | -138 |
| | | 138 | 141 | -143 | 143 | 146 | -148 | 148 | 151 |
| | | -153 | 153 | 156 | -158 | 158 | 161 | -163 | 163 |
| | | 166 | -168 | 168 | 171 | -173 | 173 | 176 | -178 |

What is claimed is:

1. A postage meter constructed and arranged to be connected to a source of supply of power for energization thereof and including printing means, said postage meter comprising:

(a) means for entering data, said data entering means including a keyboard, said keyboard including a plurality of numeric keys and a postage setting key, said keyboard including at lest two special purpose keys and a plurality of display keys;

(b) means for displaying numerical values and other data;

(c) means connected to the printing means for selecting one of a plurality of dates;

(d) the printing means including means for printing postage values and the selected date;

(e) computer means electrically connected to each of the aforesaid entering and displaying and printing means and programmed for processing data for controlling the operation thereof, said computer means programmed for storing data and for performing calculations utilizing stored data, said computer means programmed for causing said displaying means to display respective numerical values in response to the depression of selected numeric keys, and said computer means programmed for causing said displaying means to display said other data in response to the depression of selected keys; and (f) said stored data including a first amount corresponding to all the postage then available for printing, said computer means causing said displaying means to display a first numerical value in response to the depression of a first selected plurality of the numeric keys, said first numerical value corresponding to a second amount by which it is desired to modify said first amount, said computer means causing said displaying means to display a second numerical value in response to the depression of a second selected plurality of the numeric keys, said second numerical value corresponding to a predetermined combination, said computer means programmed for entering said second amount in response to the depression of one of said special purpose keys and for entering said combination in response to the depression of another of said special purpose keys, and said computer means programmed for automatically processing said second amount and said combination in response to entry of the later one of said second amount and said combination for modifying said first amount by said second amount, whereby said first amount is changed to a new first amount.

2. The postage meter according to claim 1, wherein said computer means includes means for storing a plurality of variable amounts, each of said variable amounts associated with a different one of said display keys, and said computer means programmed for causing said displaying means to display a given numerical value in response to the depression of each of said display keys, and said given numerical value corresponding to the variable amount associated with the depressed display key.

3. The postage meter according to claim 2, wherein said computer means is programmed for disabling said printing means in response to the depression of any one of said numeric keys after said first numerical value has been entered.

4. The postage meter according to claim 2, wherein said computer means is programmed for clearing the entry of the initially entered one of said second amount and combination in response to utilization of any of said keys for any purpose other than displaying numerical values and entering the unentered one of said second amount and combination.

5. The postage meter according to claim 2, wherein one of said variable amounts is said first amount, and one of said display keys is a postage unused key, whereby the depression of said postage unused key results in the display of a third numerical value corresponding to all postage then available for printing.

6. The postage meter according to claim 2, wherein one of said variable amounts corresponds to all postage that has been printed, and one of said display keys is a postage used key, whereby depression of said postage used key results in the display of a third numerical value corresponding to all postage that has been printed.

7. The postage meter according to claim 2, wherein one of said variable amounts corresponds to the total count of all printing operations of the postage meter, and one of said display keys is a piece count key, whereby depression of said piece count key results in the display of a third numerical value corresponding to the total count of all printing operations of the postage meter.

8. The postage meter according to claim 1, wherein said data entering means includes means for receiving data from an external device, and said computer means is programmed for processing received data prior to responding to subsequent key depressions.

9. The postage meter according to claim 8, wherein said computer means is programmed for processing received data for simulating the depression of the respective keys of said keyboard, whereby an external device may effectuate entry of said amount and combination.

10. The postage meter according to claim 8, wherein said computer means is programmed for receiving and processing a disable keyboard command from an external device for disabling said keyboard.

11. The postage meter according to claim 8, wherein said computer means is programmed for overriding automatic processing of said second amount and combination in response to receiving a disable keyboard command from an external device prior to entry of the later one of said second amount and combination, and said computer means programmed for thereafter entering said second amount and combination in response to an end of entry command received from an external device.

12. The postage meter according to claim 1, wherein said postage meter has a serial number, said data entering means including a third special purpose key, said computer means programmed for generating a code in response to the depression of said third special purpose key, said computer means programmed for causing said displaying means to display a third numerical value corresponding to said code, and said serial number and said first and third numerical values collectively comprising means for obtaining said second numerical value.

13. The postage meter according to claim 1, wherein said computer means is programmed for causing said displaying means to display a third numerical value in response to depression of one of said display keys, said third numerical value corresponding to said first amount.

14. The postage meter according to claim 1, wherein said computer means is programmed for disabling said printing means in response to the depression of any one of said numeric keys after said second amount has been entered.

15. A postage meter constructed and arranged to be connected to a source of supply of power for energization thereof and including printing means, said postage meter comprising:

(a) means for entering data, said data entering means including a keyboard, said keyboard including a plurality of numeric keys and a postage setting key, said keyboard including at least two special purpose keys and a plurality of display keys;
(b) means for displaying numerical values and other data;
(c) means connected to the printing means for selecting one of a plurality of dates;
(d) the printing means including means for printing postage values and the selected date; and
(e) computer means electrically connected to each of the aforesaid entering and displaying and printing means and programmed for processing data for controlling the operation thereof, said computer means programmed for storing data and for performing calculations utilizing stored data, said computer means programmed for causing said displaying means to display respective numerical values in response to the depression of selected numeric keys, said computer means programmed for causing said displaying means to display said other data in response to the depression of selected keys, said computer means programmed for causing said postage meter to enter a service mode of operation in response to data entered from said data entering means, and said stored data including a first amount corresponding to a value for controlling operation of the postage meter; and, in said service mode of operation, (f) said computer means programmed for causing said displaying means to display a first numerical value in response to the depression of a first selected plurality of the numeric keys, said first numerical value corresponding to a second amount desired to be a replacement for said first amount, said computer means programmed for causing said displaying means to display a second numerical value in response to the depression of a second selected plurality of the numeric keys, said second numerical value corresponding to a predetermined combination, said computer means programmed for entering said second amount in response to the depression of one of said special purpose keys and for entering said combination in response to the depression of another of said special purpose keys, and said computer means programmed for automatically processing said second amount and said combination in response to entry of the later one of said second amount and said combination for replacing said first amount with said second amount, whereby said first amount is changed to a new first amount.

16. The postage meter according to claim 15, wherein said data entering means includes means for receiving data from an external device, and said computer means programmed for processing received data prior to responding to subsequent key depressions.

17. The postage meter according to claim 16, wherein said computer means is programmed for processing received data for simulating the depression of the respective keys of said keyboard, whereby an external device may effectuate entry of said amount and combination.

18. The postage meter according to claim 16, wherein said computer means is programmed for receiving and processing a disable keyboard command from an external device for disabling said keyboard.

19. The postage meter according to claim 16, wherein said computer means is programmed for overriding automatic processing of said second amount and combination in response to receiving a disable keyboard command from an external device prior to entry of the later one of said second amount and combination, and said computer means programmed for thereafter entering said second amount and combination in response to an end of entry command received from an external device.

20. The postage meter according to claim 15, wherein said plurality of display keys includes a first depressable display key, and said computer means programmed for causing said displaying means to display a third numerical value in response to depression of said first display key, said third numerical value corresponding to said first amount.

21. The postage meter according to claim 15, wherein said computer means is programmed for disabling said printing means in response to the depression of any one of said numeric keys after said second amount has been entered.

22. The postage meter according to claim 15, wherein said computer means includes means for storing a plurality of first amounts, each of said first amounts associated with a different one of said display keys, and said computer means programmed for causing said displaying means to display a given numerical value in response to the depression of each of said display keys, and said given numerical value corresponding to the first amount associated with the depressed display key.

23. The postage meter according to claim 15, wherein said computer means is programmed for disabling said printing means in response to the depression of any one of said numeric keys after said first numerical value has been entered.

24. The postage meter according to claim 15, wherein said computer means is programmed for clearing the entry of the initially entered one of said second amount and combination in response to utilization of any of said keys for any purpose other than either one of displaying a numerical value and entering the unentered one of said second amount and combination.

25. The postage meter according to claim 15, wherein said first amount corresponds to a "low postage warning" value.

26. The postage meter according to claim 15, wherein said first amount corresponds to a "dollar unlock" value.

27. The postage meter according to claim 15, wherein said first amount corresponds to a "settable limit" value.

28. The postage meter according to claim 15, including said computer means programmed for causing said postage meter to enter a service mode of operation in response to data entered from said keyboard.

29. In a postage meter constructed and arranged to be connected to a source of supply of power for energization thereof and including printing means, wherein said postage meter includes A. means for entering data, said data entering means including a keyboard, said keyboard including a plurality of numeric keys and a postage setting key, said keyboard including at least two special purpose keys and a plurality of display keys, B. means for displaying numerical values and other data, C. means connected to the printing means for selecting one of a plurality of dates, D. the printing means including means for printing postage values and the selected date, and E. computer means electrically connected to each of the aforesaid entering and displaying and printing means and programmed for processing data for controlling the operation thereof, said computer means programmed for storing data and for performing calculations utilizing stored data, said computer means programmed for causing said displaying means to display respective numerical values in response to the depression of selected numeric keys, said computer means programmed for causing said displaying means to display said other data in response to the depression of selected keys, said computer means programmed for causing said postage meter to enter a service mode of operation in response to data entered from said data entering means, and wherein said computer means has stored therein a first amount corresponding to a value for controlling the operation of the postage meter; a method of changing the first amount to a new first amount when said postage meter is in the service mode of operation, said method comprising the steps of:

(a) sequentially depressing a first selected plurality of the numeric keys and one of said special purpose keys for entering a second amount into said computer means;

(b) sequentially depressing a second selected plurality of the numeric keys and another of said special purpose keys for entering a combination into said computer means; and (c) automatically processing said second amount and said combination for replacing said first amount with said second amount, whereby said first amount is changed to the new first amount.

30. The method according to claim 29 including the step of disabling said printing means.

31. The method according to claim 29, wherein said step for entering said second amount includes the step of displaying a numerical value corresponding to said second amount.

32. The method according to claim 29, wherein said step for entering said combination includes the step of displaying a numerical value corresponding to said combination.

33. The method according to claim 29 including the step of programming said computer means for clearing the initially entered one of said amount and combination in response to utilization of said keyboard for any purpose other than displaying a numerical value and entering the unentered one of said amount and combination.

34. The method according to claim 29 including the steps of:

(d) receiving data simulating the sequential depression of said keys from an external device for entering either one of said amount or combination, and (e) processing said received data.

35. The process according to claim 29 including the steps of:

(d) receiving data commanding disablement of said keyboard from an external device;

(e) receiving data simulating the sequential depression of said keys from an external device for entering said amount and combination;

(f) processing the data of steps (d) and (e), whereby said processing step (a), (b) and (c) are not used.

36. A postage meter constructed and arranged to be connected to a source of supply of power for energization thereof and including printing means, said postage meter comprising:

(a) means for entering data, said data entering means including a keyboard, said keyboard including a plurality of numeric keys and a postage setting key, said keyboard including at least two special purpose keys and a plurality of display keys;

(b) means for displaying numerical values and other data;

(c) means connected to the printing means for selecting one of a plurality of dates;

(d) the printing means including means for printing postage values and the selected date; and (e) computer means electrically connected to each of the aforesaid entering and displaying and printing means and programmed for processing data for controlling the operation thereof, said computer means programmed for storing data and for performing calculations utilizing stored data, said computer means programmed for causing said displaying means to display respective numerical values in response to the depression of selected numeric keys, said computer means programmed for causing said displaying means to display said other data in response to the depression of selected keys, said at least two special purpose keys including a first special purpose key, said computer means programmed for automatically processing respective numerical values on display in response to the depression of said first special purpose key, and said computer means programmed for causing said displaying means to display data pertaining to the operation of said postage meter in response to the depression of said first special purpose key when said displayed numerical value is a predetermined value.

37. The postage meter according to claim 36, wherein said predetermined value does not include a decimal.

38. The postage meter according to claim 36, wherein said predetermined value includes at least one numeral.

39. The postage meter according to claim 36, wherein said predetermined value includes at least one numeral and does not include a decimal.

40. The postage meter according to claim 36, wherein said predetermined value is one of a plurality thereof, and each of said predetermined values corresponding to unique data pertaining to the operation of said postage meter.

41. The postage meter according to claim 36, wherein said postage meter has a service mode of operation, said predetermined value is one of a plurality thereof, each of said predetermined values corresponding to unique data pertaining to the operation of said postage meter when said postage meter is not in said service mode of operation, and a plurality of said predetermined values corresponding to other unique data when said postage meter is in said service mode of operation.

42. The postage meter according to claim 36, wherein said computer means is programmed for causing said displaying means to display data corresponding to an access code if a numerical value is not on display and said first special purpose key is depressed.

43. The postage meter according to claim 36, wherein said computer means is programmed for causing said displaying means to display data indicating a procedural error has occurred when said displayed numerical value is not said predetermined value.

44. The postage meter according to claim 36, wherein said data caused to be displayed corresponds to a particular postage value stored in said computer means.

45. The postage meter according to claim 36, wherein said data caused to be displayed identifies a process said computer means has been commanded to perform in response to the depression of said first special purpose key.

46. The postage meter according to claim 36, wherein said data caused to be displayed corresponds to a variable accounting value stored in said computer means.

47. The postage meter according to claim 36, wherein said data caused to be displayed corresponds to the value of all postage then available for printing.

48. The postage meter according to claim 36, wherein said data caused to be displayed corresponds to the value of all postage printed by said postage meter.

49. The postage meter according to claim 36, wherein said data caused to be displayed corresponds to the total of all printing operations of said postage meter.

50. The postage meter according to claim 36, wherein said data caused to be displayed corresponds to a postage value for warning that the postage then available for printing is low.

51. The postage meter according to claim 36, wherein said data caused to be displayed corresponds to a postage value which will not be printed when equalled and will not be printed when exceeded unless said postage setting key is depressed more than once.

52. The postage meter according to claim 36, wherein said data caused to be displayed corresponds to a maximum settable postage value for printing purposes.

53. The postage meter according to claim 36, wherein said data caused to be displayed corresponds to the sum of the postage then available for printing and the total of all postage printed by the postage meter.

54. The postage meter according to claim 36, wherein said data caused to be displayed corresponds to the postage value setting of said printing means.

55. The postage meter according to claim 36, wherein said data caused to be displayed indicates that said printing means has been commanded to be enabled in response to the depression of said first special purpose key.

56. The postage meter according to claim 36, wherein said data caused to be displayed indicates that said printing means has been commanded to be disabled in response to the depression of said first special purpose key.

57. The postage meter according to claim 36, wherein said data caused to be displayed corresponds to the postage value entered via said keyboard prior in time to said printing means being commanded to be disabled in response to the depression of said first special purpose key.

58. The postage meter according to claim 36, wherein said data caused to be displayed indicates that said postage meter has been commanded to enter said service mode of operation in response to the depression of said first special purpose key.

59. The postage meter according to claim 36, wherein said data caused to be displayed indicates that said postage meter has been commanded to exit said service mode of operation in response to the depression of said first special purpose key.

60. The postage meter according to claim 36, wherein said data caused to be displayed corresponds to the serial number of said postage meter.

61. The postage meter according to claim 36, wherein said data caused to be displayed identifies a particular processing step of the computer means which has been diagnosed as having failed.

62. The postage meter according to claim 36, wherein said data caused to be displayed indicates the status of said postage meter.

63. A postage meter constructed and arranged to be connected to a source of supply of power for energization thereof and including printing means, said postage meter comprising:

(a) means for entering data, said data entering means including a keyboard, said keyboard including a plurality of numeric keys and a postage setting key, said keyboard including at least two special purpose keys and a plurality of display keys;
(b) means for displaying numerical values and other data;
(c) means connected to the printing means for selecting one of a plurality of dates;
(d) the printing means including means for printing postage values and the selected date; and
(e) computer means electrically connected to each of the aforesaid entering and displaying and printing means and programmed for processing data for controlling the operation thereof, said computer means programmed for storing data and for performing calculations utilizing stored data, said computer means programmed for causing said displaying means to display respective numerical values in response to the depression of selected numeric keys, said computer means programmed for causing said displaying means to display said other data in response to the depression of selected keys, said at least two special purpose keys including a first special purpose key, said computer means programmed for automatically processing said numerical value on display in response to the depression of said first special purpose key, and said computer means programmed for causing a particular operation of said postage meter to be performed in response to the depression of said special purpose key when said displayed numerical value is a predetermined value corresponding to said particular operation.

64. The postage meter according to claim 63, wherein said predetermined value does not include a decimal.

65. The postage meter according to claim 63, wherein said predetermined value includes at least one numeral.

66. The postage meter according to claim 63, wherein said predetermined value includes at least one numeral and does not include a decimal.

67. The postage meter according to claim 63, wherein said predetermined value is one of a plurality thereof, and each of said predetermined values corresponding to unique data pertaining to the operation of said postage meter.

68. The postage meter according to claim 63, wherein said predetermined value is one of a plurality thereof, each of said predetermined values corresponding to unique data pertaining to the operation of said postage meter when said postage meter is not in said service mode of operation, and a plurality of said predetermined values corresponding to other unique data when said postage meter is in said service mode of operation.

69. The postage meter according to claim 63, wherein said computer means is programmed for causing said displaying means to display data corresponding to an access code if a numerical value is not on display and said special purpose key is depressed.

70. The postage meter according to claim 63, wherein said computer means is programmed for causing said displaying means to display data indicating a procedural error has occurred when said displayed numerical value is not said predetermined value.

71. The postage meter according to claim 63, wherein said predetermined value corresponds to a process said computer means is commanded to perform in response to the depression of said first special purpose key.

72. The postage meter according to claim 63, wherein said operation caused to be performed is said printing is enabled in response to the depression of said first special purpose key.

73. The postage meter according to claim 63, wherein said operation caused to be performed is said printing is disabled in response to the depression of said first special purpose key.

74. The postage meter according to claim 63, wherein said operation caused to be performed is that said postage meter is caused to enter a service mode of operation.

75. The postage meter according to claim 65, wherein said operation caused to be performed is that said postage is caused to exit a service mode of operation.

76. The postage meter according to claim 63, wherein said operation caused to be performed is that said keyboard is caused to be disabled.

77. In a postage meter constructed and arranged to be connected to a source of supply of power for energization thereof and including printing means, wherein said postage meter includes A. means for entering data, said data entering means including a keyboard, said keyboard including a plurality of numeric keys and a postage setting key, said keyboard including at least two special purpose keys and a plurality of display keys, B. means for displaying numerical values and other data, C. means connected to the printing means for selecting one of a plurality of dates, D. the printing means including means for printing postage values and the selected date, and E. computer means electrically connected to each of the aforesaid entering and displaying and printing means and programmed for processing data for controlling the operation thereof, said computer means programmed for storing data and for performing calculations utilizing stored data, said computer means programmed for causing said displaying means to display respective numerical values in response to the depression of selected numeric keys, said computer means programmed for causing said displaying means to display said other data in response to the depression of selected keys, and wherein said computer means has stored therein a first amount corresponding to all postage then available for printing; a method of changing the first amount to a new first amount, said method comprising the steps of:

(a) sequentially depressing a first selected plurality of the numeric keys and one of said special purpose keys for entering a second amount into said computer means;

(b) sequentially depressing a second selected plurality of the numeric keys and another of said special purpose keys for entering a combination into said computer means; and (c) automatically processing said second amount and said combination upon entry of the later one thereof for modifying said first amount by said second amount, whereby said first amount is changed to said new first amount.

78. The method according to claim 77 including the step of disabling said printing means.

79. The method according to claim 77, wherein said step for entering said second amount includes the step of displaying a numerical value corresponding to said second amount.

80. The method according to claim 77, wherein said step for entering said combination includes the step of displaying a numerical value corresponding to said combination.

81. The method according to claim 77 including the step of programming said computer means for clearing the initially entered one of said amount and combination in response to utilization of said keyboard for any purpose other than displaying a numerical value and entering the unentered one of said amount and combination.

82. The method according to claim 77 including the steps of:

(d) receiving data simulating the sequential depression of said selected keys and either of said two special purpose keys from an external device for entering either one of said amount and combination, and (e) processing said received data.

83. The method according to claim 77 including the steps of:

(d) receiving data commanding disablement of said keyboard from an external device;

(e) receiving data simulating the depression of said selected keys from an external device;

(f) receiving data commanding the entry of said amount and combination from an external device; and (g) sequentially processing the data of steps (d), (e) and (f), whereby said processing step (a), (b) and (c) are not used.

84. In a postage meter constructed and arranged to be connected to a source of supply of power for energization thereof and including printing means, wherein said postage meter includes A. means for entering data, said data entering means including a keyboard, said keyboard including a plurality of numeric keys and a postage setting key, said keyboard including at least two special purpose keys and a plurality of display keys, B. means for displaying numerical values and other data, C. means connected to the printing means for selecting one of a plurality of dates, D. The printing means including means for printing postage values and the selected date, and E. computer means electrically connected to each of the aforesaid entering and displaying and printing means and programmed for processing data for controlling the operation thereof, said computer means programmed for storing data and for performing calculations utilizing stored data, said computer means programmed for causing said displaying means to display respective numerical values in response to the depression of selected numeric keys, said computer means programmed for causing said displaying means to display said other data in response to the depression of selected keys, and said at least two special purpose keys including a first special purpose key; a method of displaying data pertaining to the operation of said postage, said method comprising the steps of;

(a) depressing selected numeric keys for causing the display of a predetermined numerical value;

(b) depressing said first special purpose key when said predetermined numerical value is on display; and (c) programming the computer means for causing said displaying means to display data pertaining to the operation of said postage meter in response to the depression of said first special purpose key when said displayed numerical value is said predetermined value.

85. The method according to claim 84, including the step of utilizing a predetermined value which includes at least one numeral.

86. The method according to claim 84, including the step of utilizing a predetermined value which does not include a decimal.

87. The method according to claim 84, including the step of programming said computer means for causing said displaying means to display data indicating that a procedural error has occurred if said first special purpose key is depressed when the value on display is not said predetermined value.

88. The method according to claim 84, including the step of programming said computer means for causing said displaying means to display a numerical value associated with the depression of said first special purpose key if said predetermined value is not on display when said first special purpose key is depressed.

89. The improvement according to claim 84, including the step of providing a plurality of predetermined values respectively causing said displaying means to display data associated therewith.

90. In a postage meter constructed and arranged to be connected to a source of supply of power for energization thereof and including printing means, wherein said postage meter includes A. means for entering data, said data entering means including a keyboard, said keyboard including a plurality of numeric keys and a postage setting key, said keyboard including at least two special purpose keys and a plurality of display keys, B. means for displaying numerical values and other data, C. means for selecting one of a plurality of dates, D. the printing means including means for printing postage values and the selected date, and E. computer means electrically connected to each of the aforesaid entering and displaying and printing means and programmed for processing data for controlling the operation thereof, said computer means programmed for storing data and for performing calculations utilizing stored data, said computer means programmed for causing said displaying means to display respective numerical values in response to the depression of selected numeric keys, and said computer means programmed for causing said displaying means to display said other data in response to the depression of selected keys, and wherein said at least two special purpose keys includes a first special purpose key; a method of operation of said postage meter, said method comprising the steps of:

(a) depressing selected numeric keys for causing the display of a predetermined numerical value;

(b) depressing said first special purpose key when said predetermined numerical value is on display; and (c) programming said computer means for causing an operation of said postage meter corresponding to said predetermined numerical value to be performed in response to the depression of said first special purpose key.

91. The method according to claim 90, wherein step (a) includes the step of utilizing a predetermined value which includes at least one numeral.

92. The method according to claim 90, wherein step (a) includes the step of utilizing a predetermined value which does not include a decimal.

93. The method according to claim 90, including the step of programming said computer means for causing said displaying means to display data indicating that a procedural error has occurred if said first special purpose key is depressed when the value on display is not said predetermined value.

94. The method according to claim 90, including the step of programming said computer means for causing said displaying means to display a numerical value associated with the depression of said first special purpose key if said predetermined value is not on display when said first special purpose key is depressed.

95. The method according to claim 90, wherein step (c) includes the step of providing a plurality of predetermined values respectively causing said displaying means to display data associated therewith.

96. The method of claim 90, wherein step (c) includes the step of causing said printing means to be disabled.

97. The method of claim 90, wherein step (c) includes the step of causing said printing means to be enabled.

98. The method of claim 90, wherein step (c) includes the step of causing said keyboard to be disabled.

99. The method according to claim 90, wherein step (c) includes the step of causing said postage meter to enter a service mode of operation.

100. The method according to claim 90, wherein step (c) includes the step of causing said postage meter to exit a service mode of operation.

* * * * *